Oct. 24, 1939.   C. SMITH   2,176,929
CALCULATING AND ACCOUNTING MACHINE
Filed May 4, 1931   57 Sheets-Sheet 1

INVENTOR
Clyde Smith

Oct. 24, 1939.         C. SMITH         2,176,929
CALCULATING AND ACCOUNTING MACHINE
Filed May 4, 1931      57 Sheets-Sheet 4

INVENTOR
Clyde Smith

Oct. 24, 1939.  C. SMITH  2,176,929
CALCULATING AND ACCOUNTING MACHINE
Filed May 4, 1931   57 Sheets-Sheet 5

INVENTOR
Clyde Smith

Oct. 24, 1939.  C. SMITH  2,176,929
CALCULATING AND ACCOUNTING MACHINE
Filed May 4, 1931  57 Sheets-Sheet 6

INVENTOR
Clyde Smith

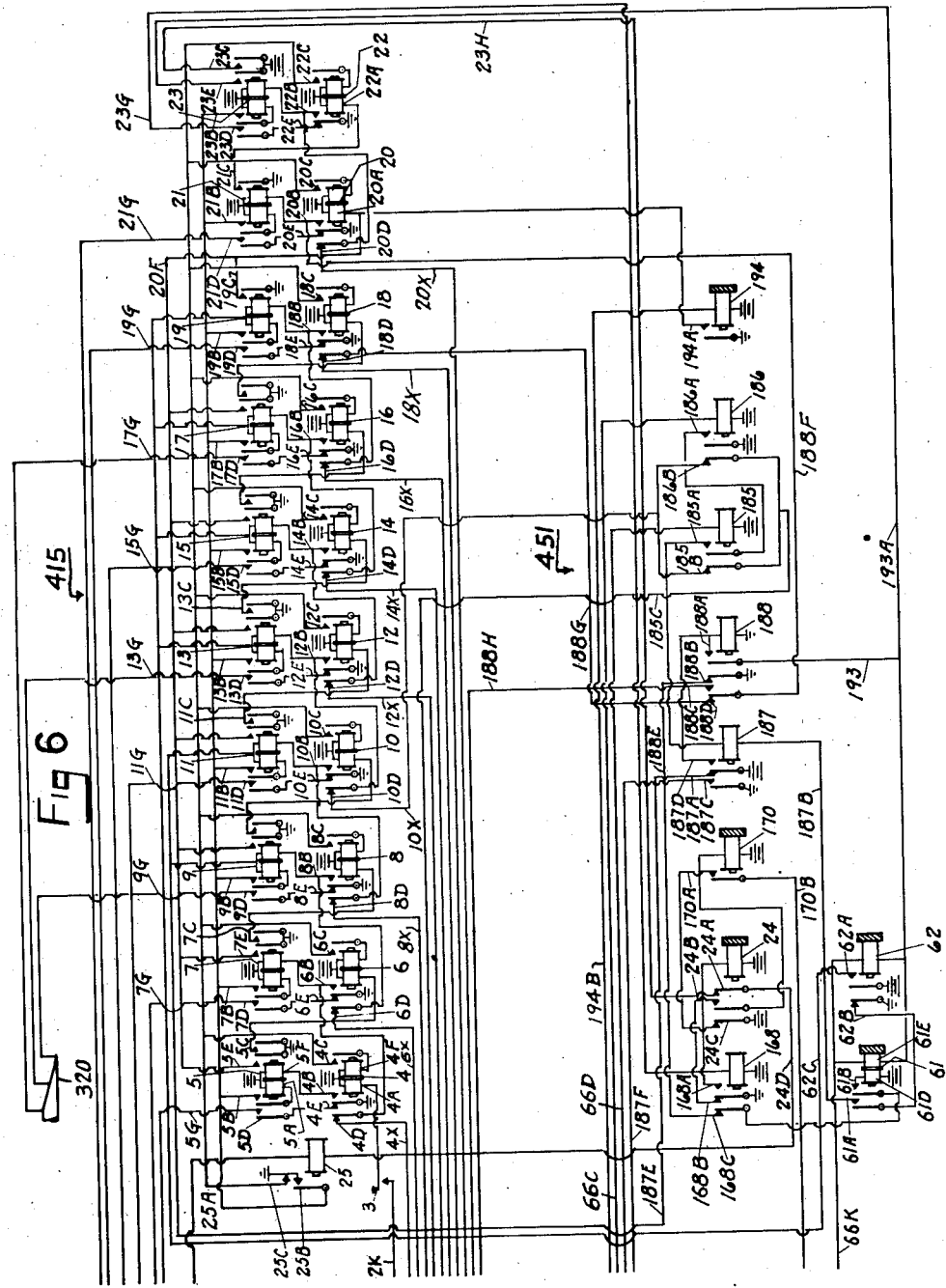

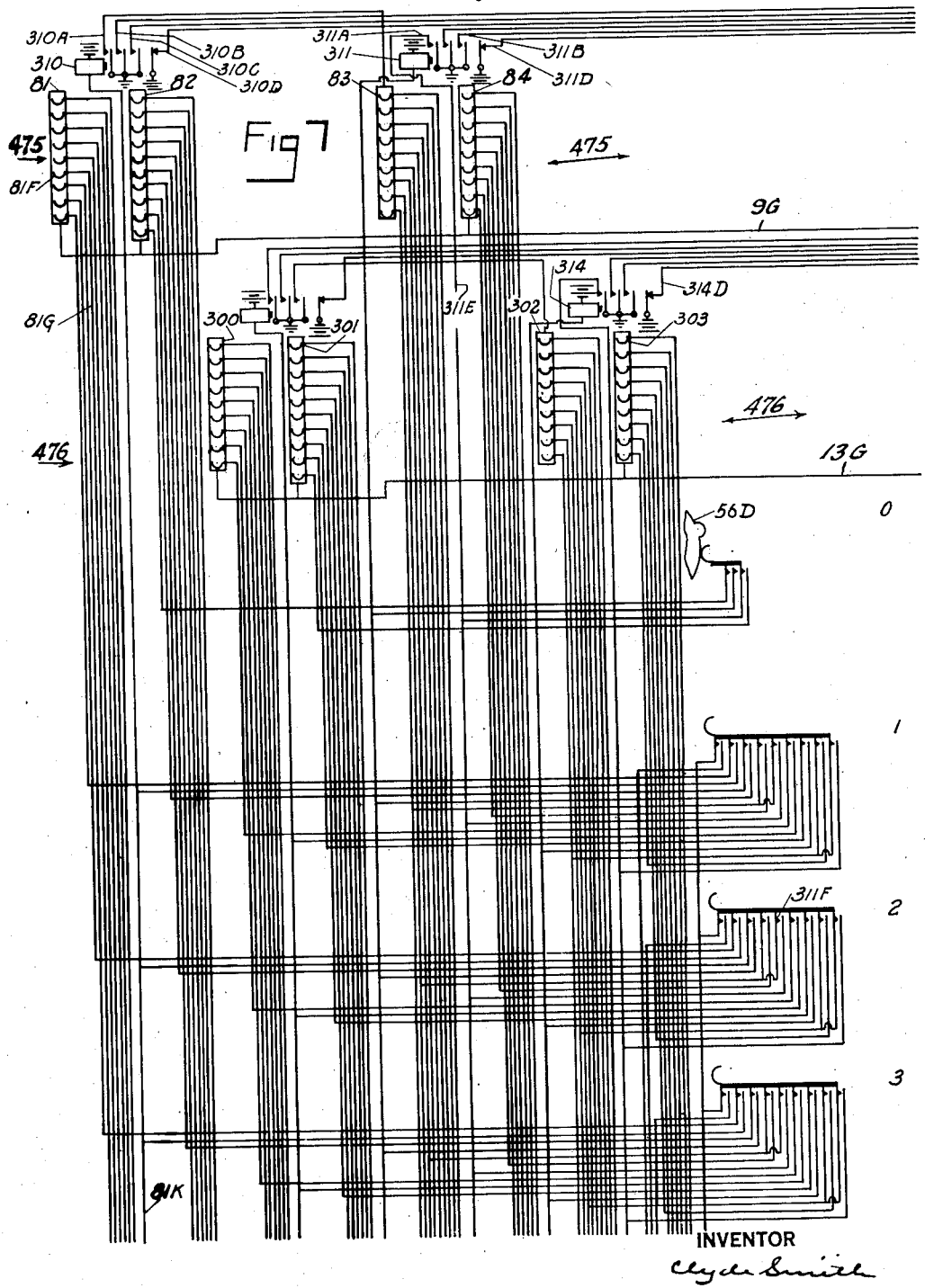

Oct. 24, 1939.  C. SMITH  2,176,929
CALCULATING AND ACCOUNTING MACHINE
Filed May 4, 1931   57 Sheets-Sheet 9

INVENTOR
Clyde Smith

Oct. 24, 1939.   C. SMITH   2,176,929
CALCULATING AND ACCOUNTING MACHINE
Filed May 4, 1931   57 Sheets-Sheet 10
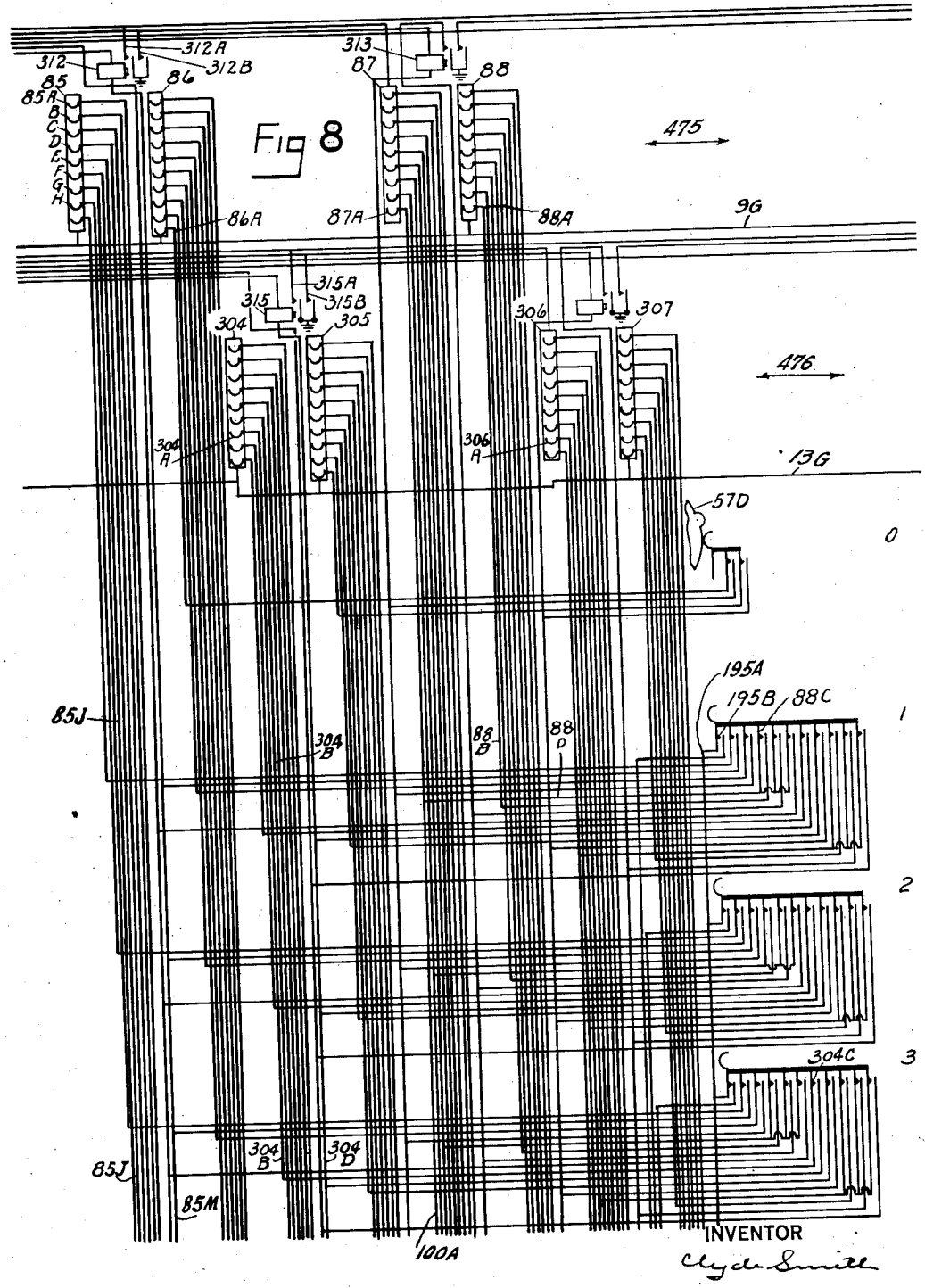

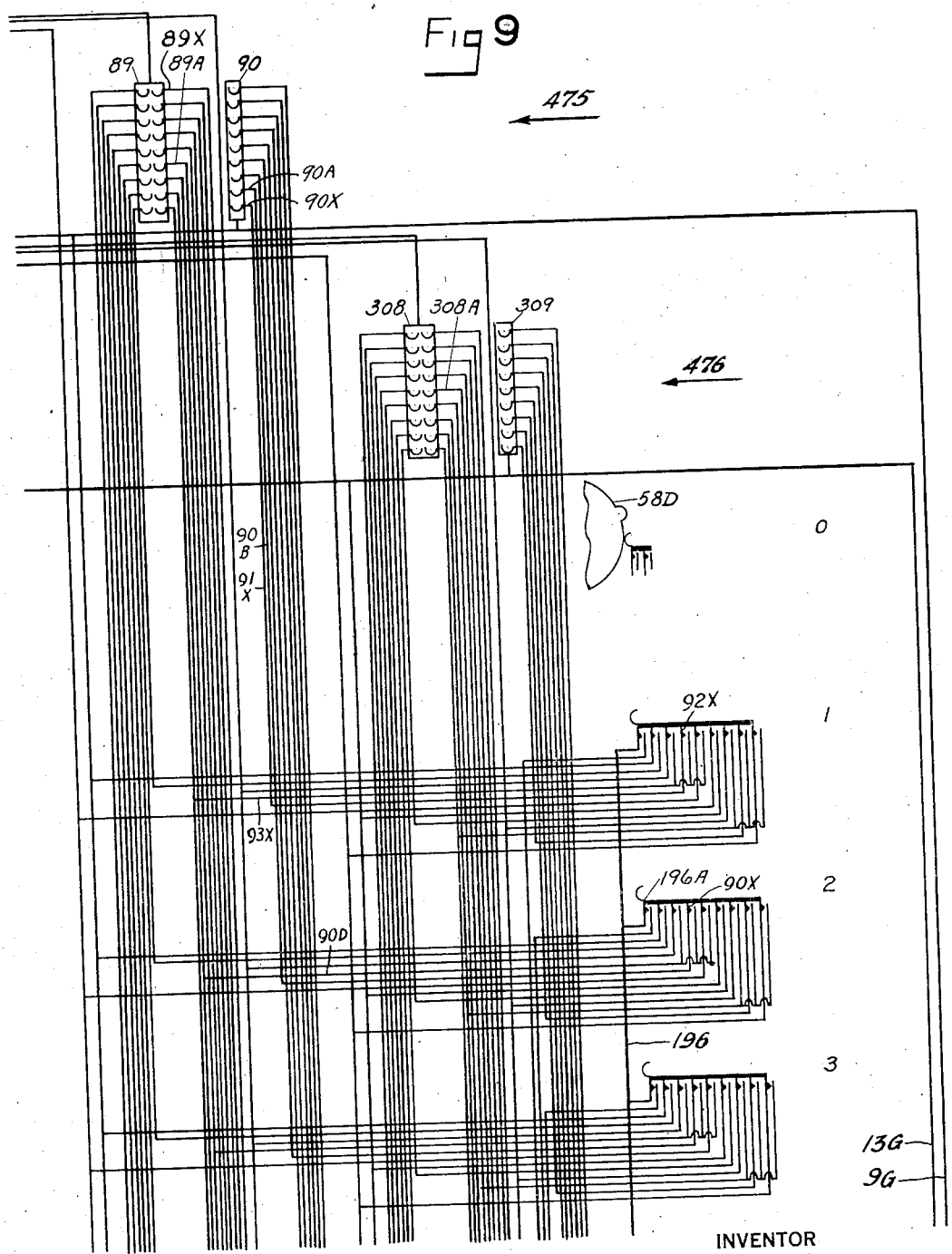

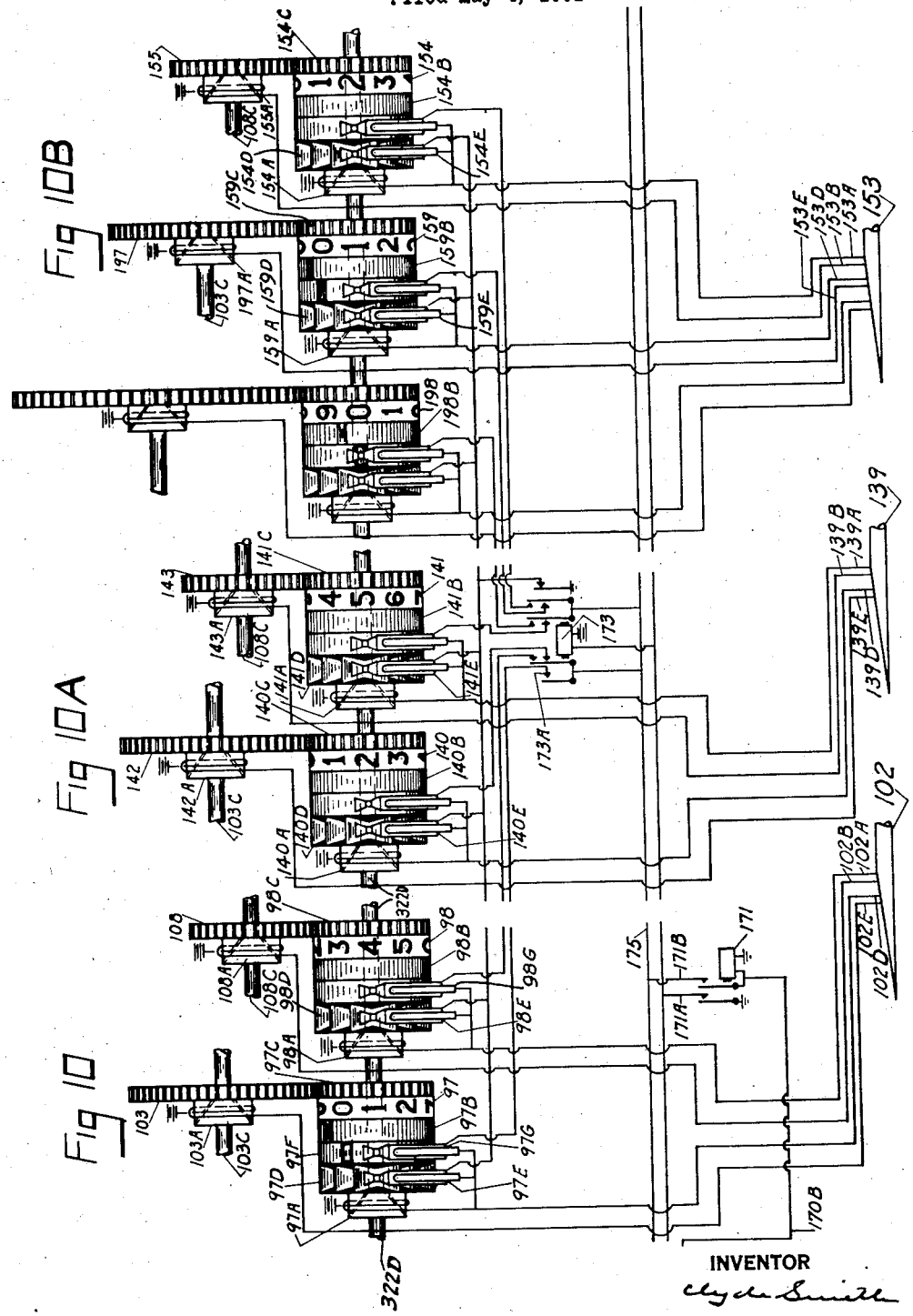

Oct. 24, 1939.  C. SMITH  2,176,929
CALCULATING AND ACCOUNTING MACHINE
Filed May 4, 1931  57 Sheets-Sheet 15

INVENTOR
Clyde Smith

Oct. 24, 1939.　　　　　C. SMITH　　　　2,176,929
CALCULATING AND ACCOUNTING MACHINE
Filed May 4, 1931　　　　57 Sheets-Sheet 16
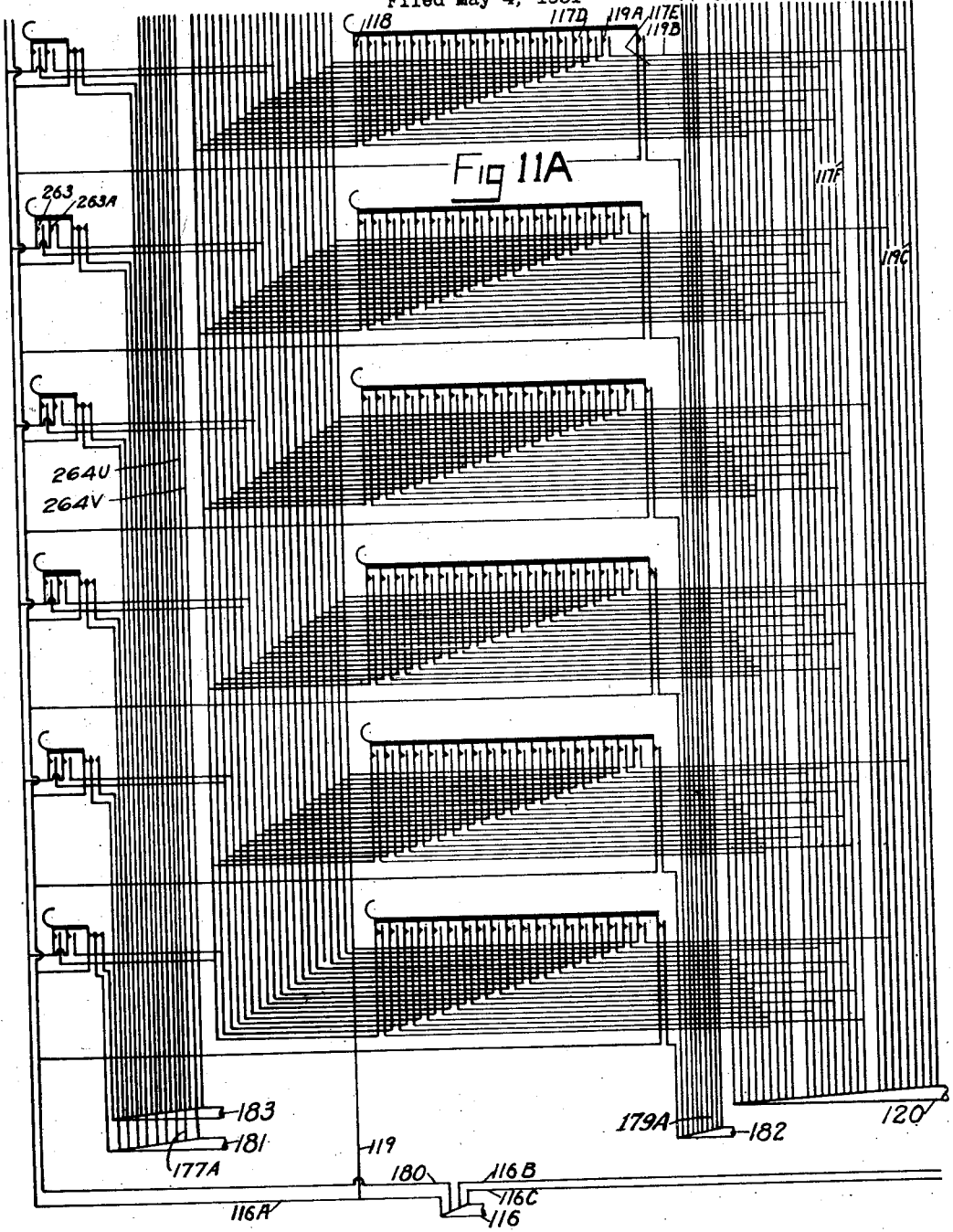
INVENTOR
Clyde Smith Oct. 24, 1939.   C. SMITH   2,176,929
CALCULATING AND ACCOUNTING MACHINE
Filed May 4, 1931   57 Sheets-Sheet 17
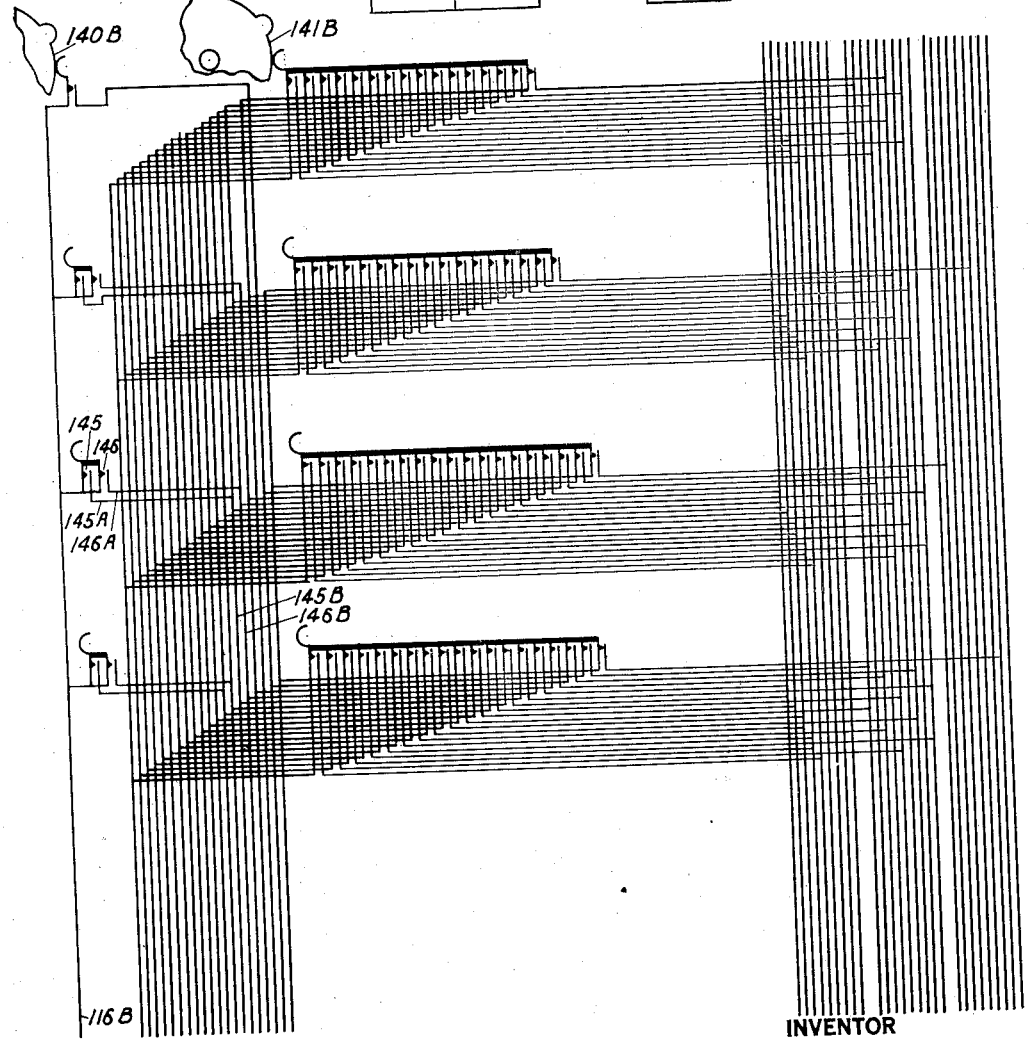
INVENTOR
Clyde Smith

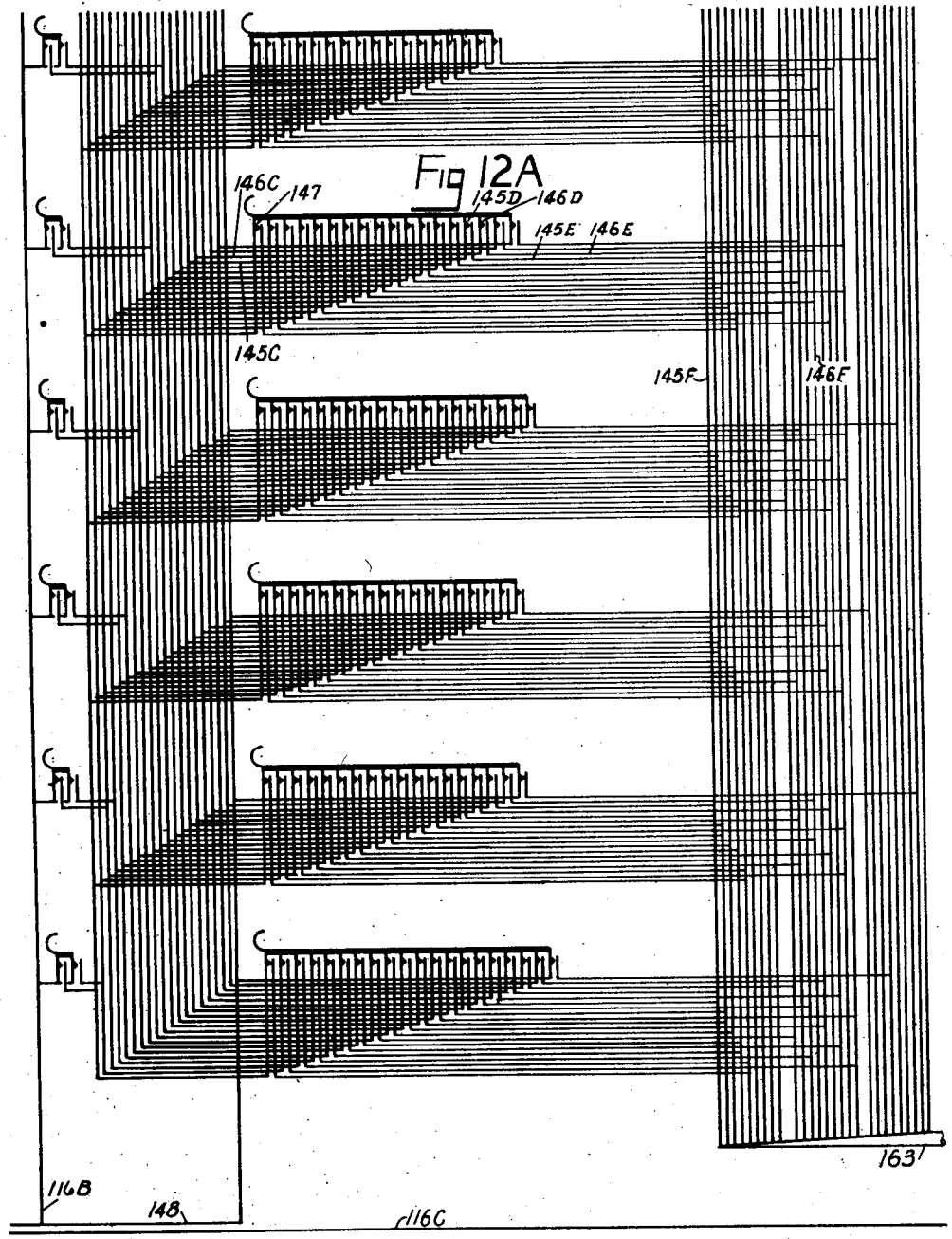

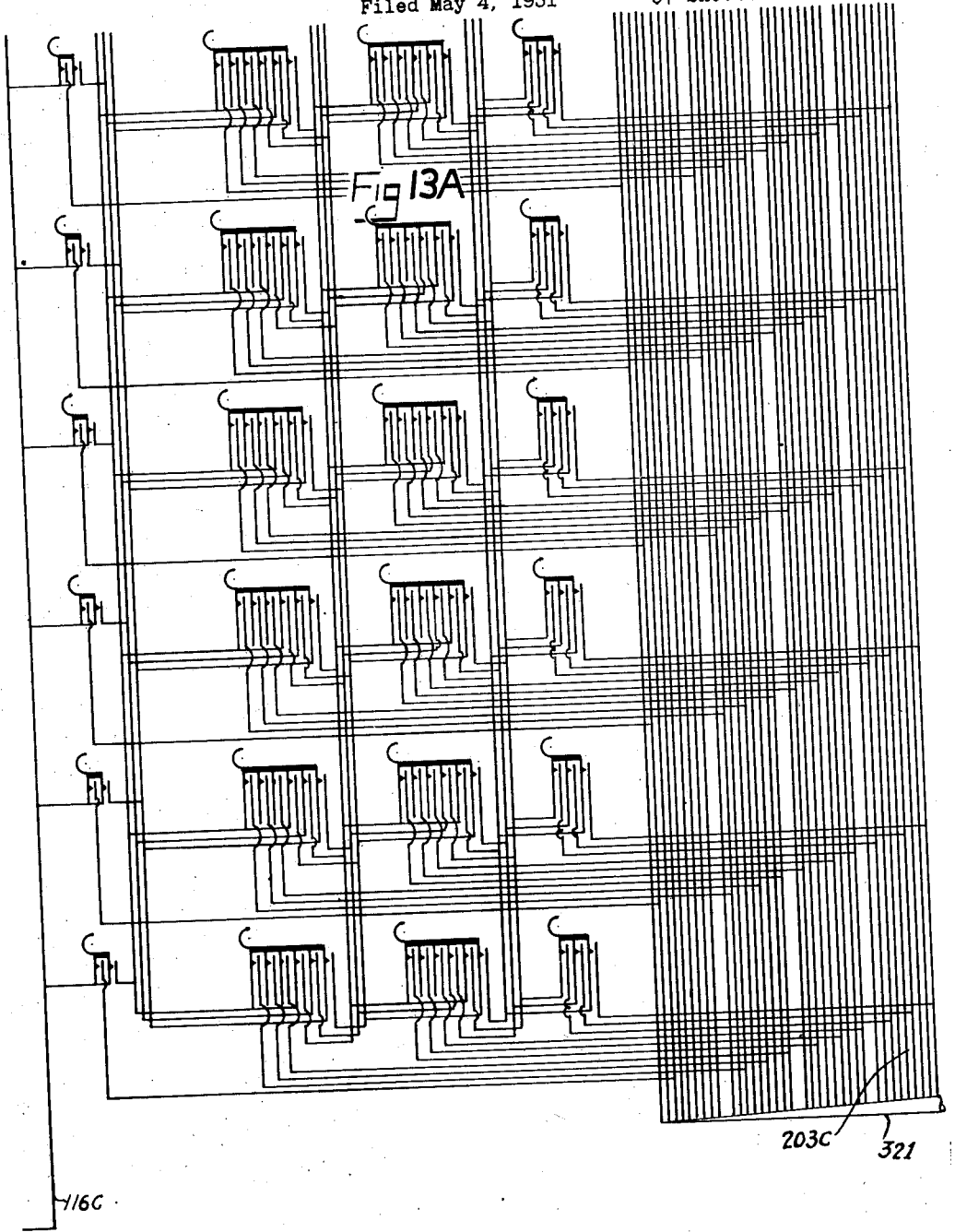

Oct. 24, 1939.   C. SMITH   2,176,929
CALCULATING AND ACCOUNTING MACHINE
Filed May 4, 1931   57 Sheets-Sheet 21

INVENTOR
Clyde Smith

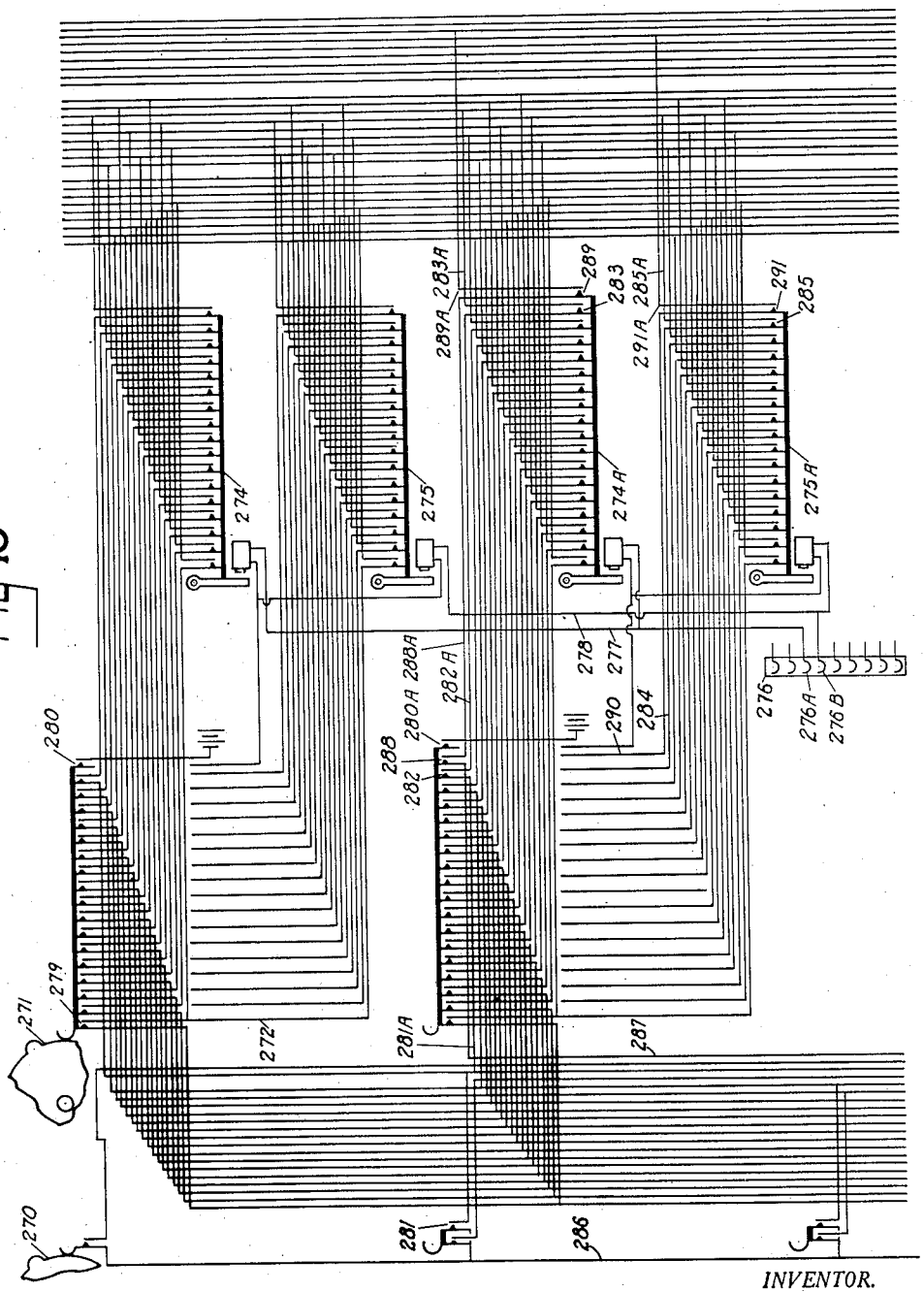

Oct. 24, 1939.　　　　C. SMITH　　　　2,176,929
CALCULATING AND ACCOUNTING MACHINE
Filed May 4, 1931　　　57 Sheets-Sheet 24

Inventor:
Clyde Smith.
By: Belt and Wallace
Attorneys

Oct. 24, 1939.  C. SMITH  2,176,929
CALCULATING AND ACCOUNTING MACHINE
Filed May 4, 1931  57 Sheets-Sheet 29

Inventor:
Clyde Smith,
By: Belt and Wallace
Attorneys

Oct. 24, 1939.　　　　C. SMITH　　　　2,176,929
CALCULATING AND ACCOUNTING MACHINE
Filed May 4, 1931　　　57 Sheets-Sheet 31

Inventor:
Clyde Smith,
By:
Belt and Wallace
Attorneys.

Oct. 24, 1939.   C. SMITH   2,176,929
CALCULATING AND ACCOUNTING MACHINE
Filed May 4, 1931   57 Sheets-Sheet 33

Inventor:
Clyde Smith,
By: Belt and Wallace
Attorneys

Oct. 24, 1939.  C. SMITH  2,176,929
CALCULATING AND ACCOUNTING MACHINE
Filed May 4, 1931   57 Sheets-Sheet 34

Inventor:
Clyde Smith,
By Belt and Wallace
Attorneys

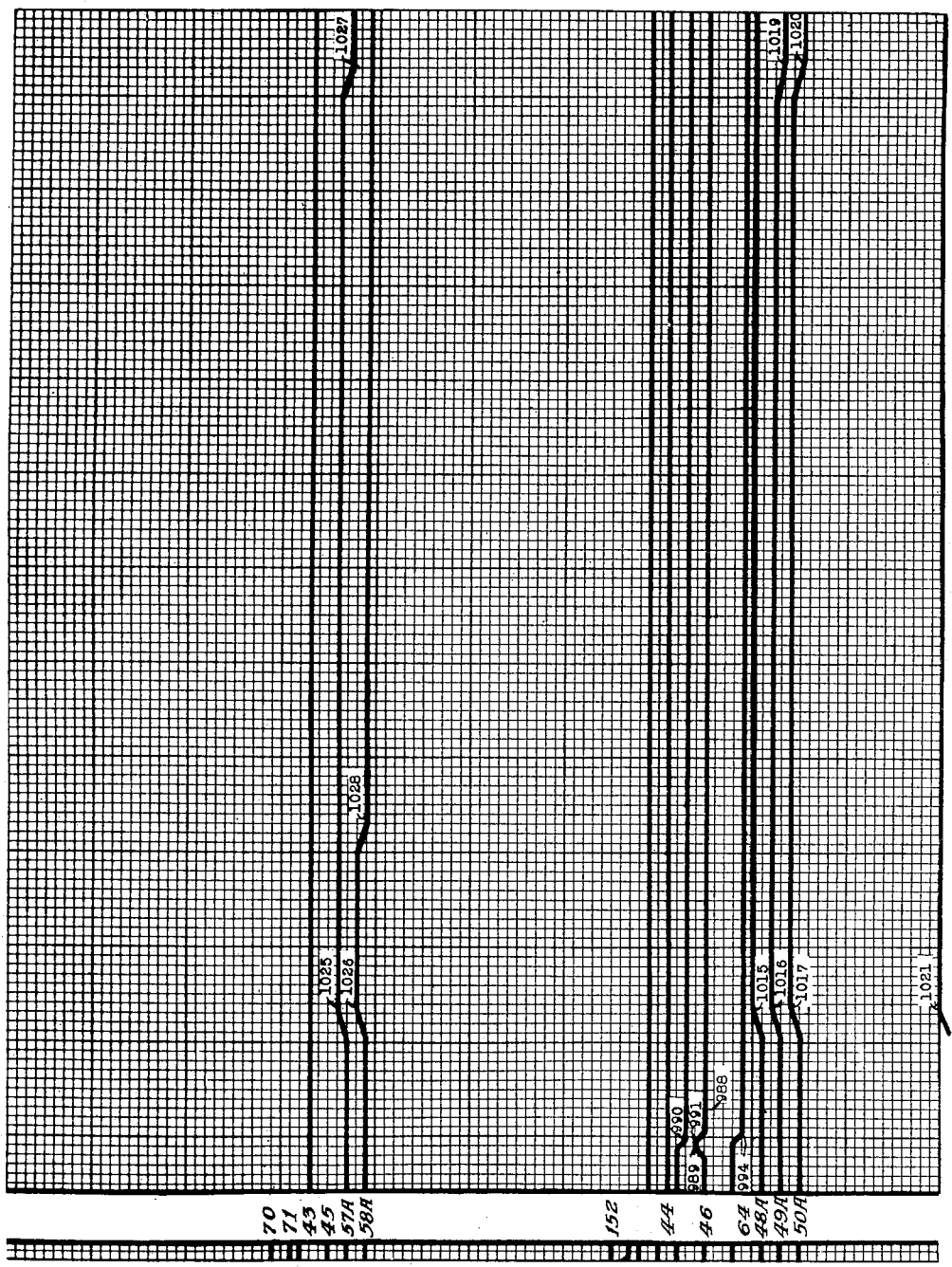

Oct. 24, 1939.  C. SMITH  2,176,929
CALCULATING AND ACCOUNTING MACHINE
Filed May 4, 1931  57 Sheets-Sheet 36

Inventor:
Clyde Smith,
By Belt and Wallace
Attorneys

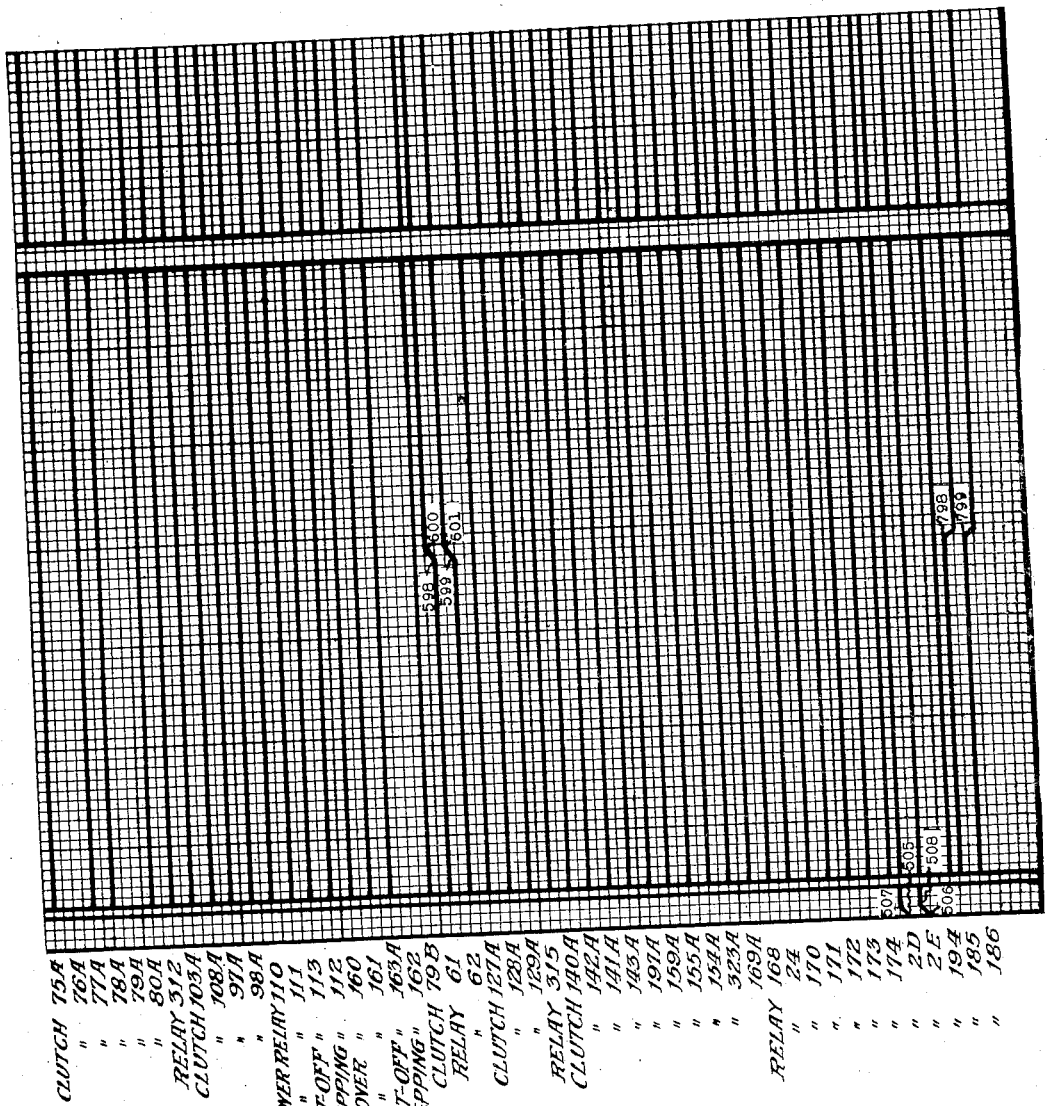

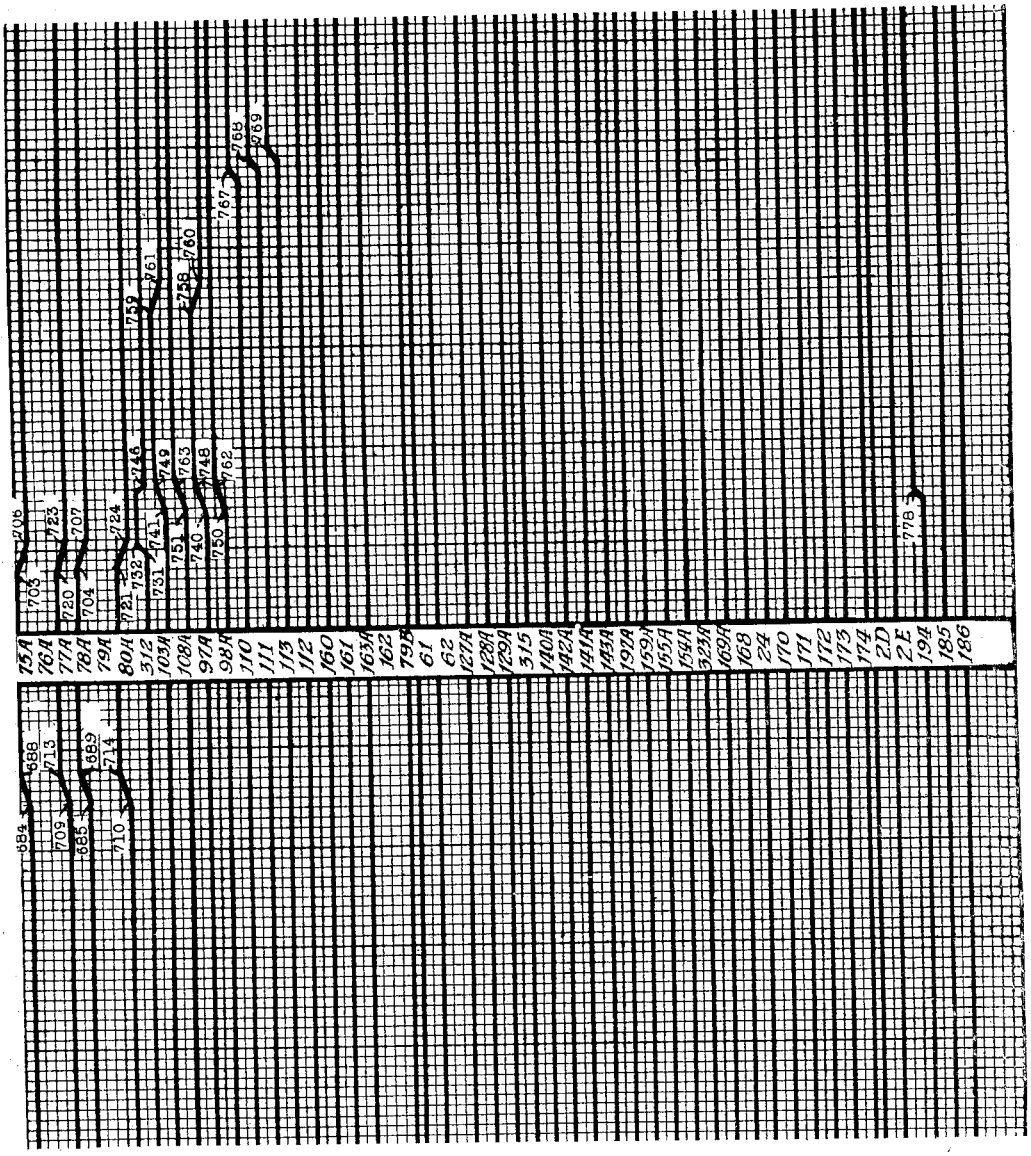

Oct. 24, 1939.  C. SMITH  2,176,929
CALCULATING AND ACCOUNTING MACHINE
Filed May 4, 1931  57 Sheets-Sheet 40

Inventor:
Clyde Smith,
By: Belt and Wallace
Attorneys

Oct. 24, 1939.　　　　　C. SMITH　　　　2,176,929
CALCULATING AND ACCOUNTING MACHINE
Filed May 4, 1931　　　57 Sheets-Sheet 41

Inventor:
Clyde Smith,
By: Belt and Wallace
Attorneys

Oct. 24, 1939.  C. SMITH  2,176,929
CALCULATING AND ACCOUNTING MACHINE
Filed May 4, 1931  57 Sheets-Sheet 43

Inventor:
Clyde Smith,
By: Belt and Wallace
Attorneys

Oct. 24, 1939.  C. SMITH  2,176,929
CALCULATING AND ACCOUNTING MACHINE
Filed May 4, 1931

Oct. 24, 1939.　　　C. SMITH　　　2,176,929
CALCULATING AND ACCOUNTING MACHINE
Filed May 4, 1931　　57 Sheets-Sheet 50

Inventor:
Clyde Smith,
By Belt and Wallace
Attorneys

Oct. 24, 1939.     C. SMITH     2,176,929
CALCULATING AND ACCOUNTING MACHINE
Filed May 4, 1931     57 Sheets-Sheet 51

Oct. 24, 1939.  C. SMITH  2,176,929
CALCULATING AND ACCOUNTING MACHINE
Filed May 4, 1931  57 Sheets-Sheet 53

Oct. 24, 1939.    C. SMITH    2,176,929
CALCULATING AND ACCOUNTING MACHINE
Filed May 4, 1931    57 Sheets-Sheet 54

Oct. 24, 1939.   C. SMITH   2,176,929
CALCULATING AND ACCOUNTING MACHINE
Filed May 4, 1931   57 Sheets-Sheet 55

Inventor:
Clyde Smith,
By Belt and Wallace
Attorneys

Oct. 24, 1939.  C. SMITH  2,176,929
CALCULATING AND ACCOUNTING MACHINE
Filed May 4, 1931   57 Sheets-Sheet 56

Oct. 24, 1939.　　　　　C. SMITH　　　　　2,176,929

CALCULATING AND ACCOUNTING MACHINE

Filed May 4, 1931　　　　57 Sheets-Sheet 57

Inventor:
Clyde Smith
By Belt and Wallace
Attorneys

Patented Oct. 24, 1939

2,176,929

UNITED STATES PATENT OFFICE 2,176,929

CALCULATING AND ACCOUNTING MACHINE

Clyde Smith, Hopkinsville, Ky., assignor to Addressograph-Multigraph Corporation, Cleveland, Ohio, a corporation of Delaware Application May 4, 1931, Serial No. 535,069

33 Claims. (Cl. 235—61.7)

The object of the present invention is certain improvements in a calculating and accounting machine.

A particular object of the present invention is the inclusion of means controlled directly by the settings of the multiplier and multiplicand to perform a multiplication and to register the product on number wheels according to prearranged circuits and circuit combinations without an intervening process of successive additive registrations. One example of multiplication in the present application is 7 times 14, wherein the units wheel moves in one action to 8 and the tens wheel in a simultaneous action to 9, giving at once the due reading of 98. The method is adaptable to multiplication by a fraction. An example herein is the multiplication of 12 by ⅓ in a like direct manner—equivalent to division of 12 by 3.

By way of improvement on the foregoing, it is an object of the invention to supply means by which selection can be made automatically among registration circuits for different multipliers.

A further object of the present invention is the provision of an improved machine employing but a single group or lot of counting relays (as I term the relays governing registration) which is brought successively into use in the successive operations through the medium of a multi-contact shift relay for each operation. To these shift relays, circuits are connected severally from the contact fingers that are made effective through card perforations as the basis for successive operations, of registering, subtracting, multiplying, etc.; circuits are multiplied from the counting relays; and circuits are connected severally, or in multiple, as required, from the numeral wheels.

A similar object is the provision of a machine employing but a single group or lot of carryover relays, likewise brought into use successively through shift relays.

A further object of the invention is the safeguard against the undiscovered loss of a card with the meter readings, and against the billing of one customer's consumption against another, while permitting the division of each customer's card into a meter and an office card. The former would contain the successive meter readings from month to month, and the latter the rates and rate quantities, which might remain unchanged for years. Associated with these safeguards are means for registering the identifying number of the customer, which has a utility in account keeping; it is effected by means previously described; i. e., through card perforations, energization of counting relays, and corresponding advancement of number wheels. For safeguarding, like perforations on the meter and office cards are required to energize two relays interposed between the perforations and the starting circuit in such wise that if the perforations are not identical the operation does not start.

Another object of the invention is to provide a set of contact bars and fingers for each monthly meter reading throughout the year and to bring the last reading and the previous reading into effective registration, wherever they may be situated on the card, through selective electrical switching rather than through mechanical placing of the card in a separate position for each month. An effect of this is to permit a meter card to be used readily for twelve months, whether its first use is for January or some later month in the year.

In general, the principal purpose of the improvements is to reduce the operating time for each bill, in the succession of possibly millions of a public utility company. Other purposes are to reduce the number of parts and thus effect economy where this can be done without loss of operating time, and to effect convenience and economy in the handling of the monthly cards.

The present machine is not designed for the performance of calculations involving either last or previous meter reading of zero, nor is it designed to perform calculations involving meter readings intermediate of which there has been an all zero condition in the denominational orders for which provision is made in the machine.

The various objects of the invention are effected by the mechanisms and circuits illustrated in the accompanying drawings, in which:

Figure 1A is an outline of an office card, with perforations for rates, consumption rate steps, minimum charge, and identifying number. The bars are likewise shown in dotted outline.

Figure 2:
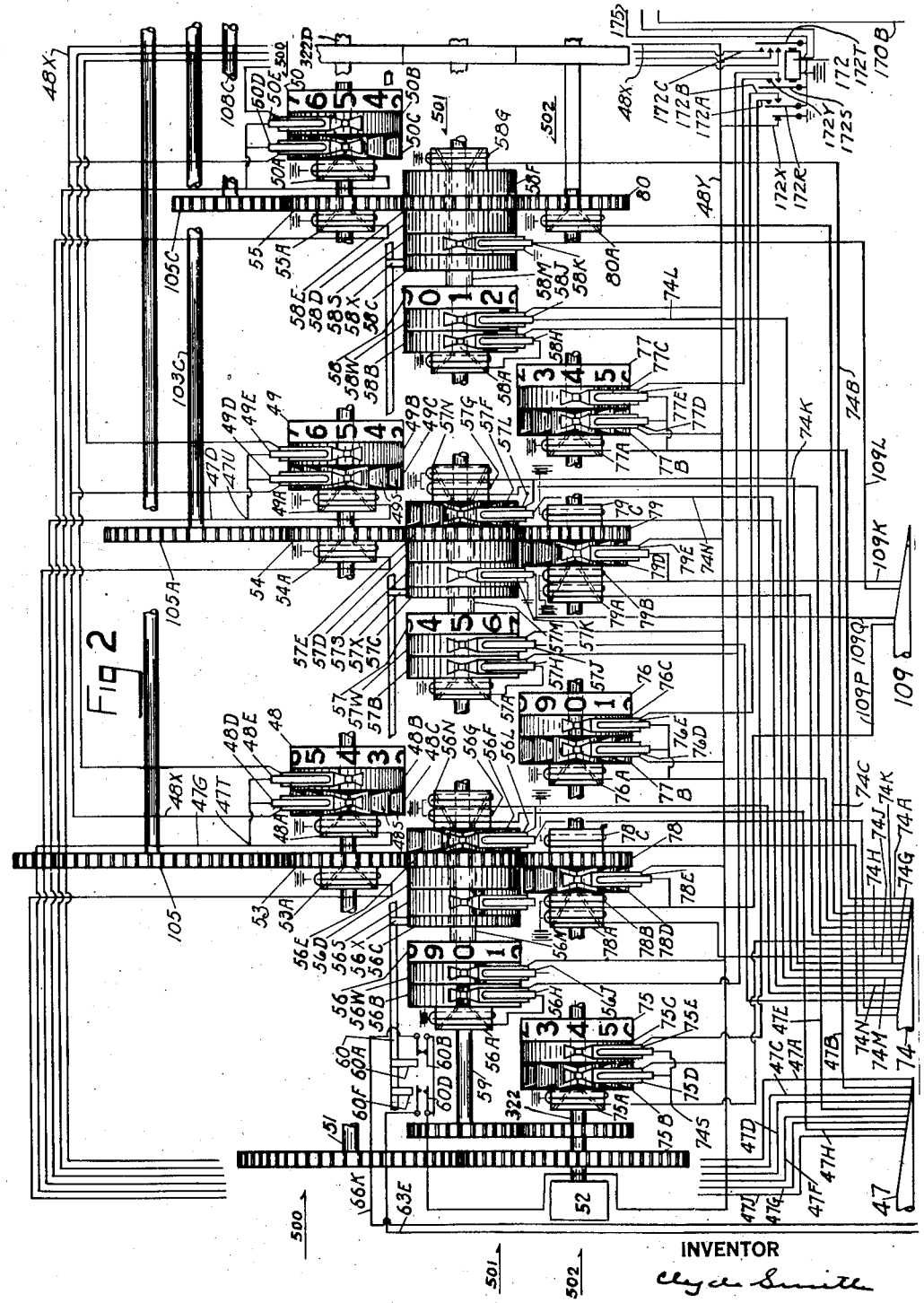

Figure 2 is a top plan view of registering and associated wheels: on line 500—500, the last reading; on line 501—501, the consumption quantity; on line 502—502, the previous reading.

Figure 3:
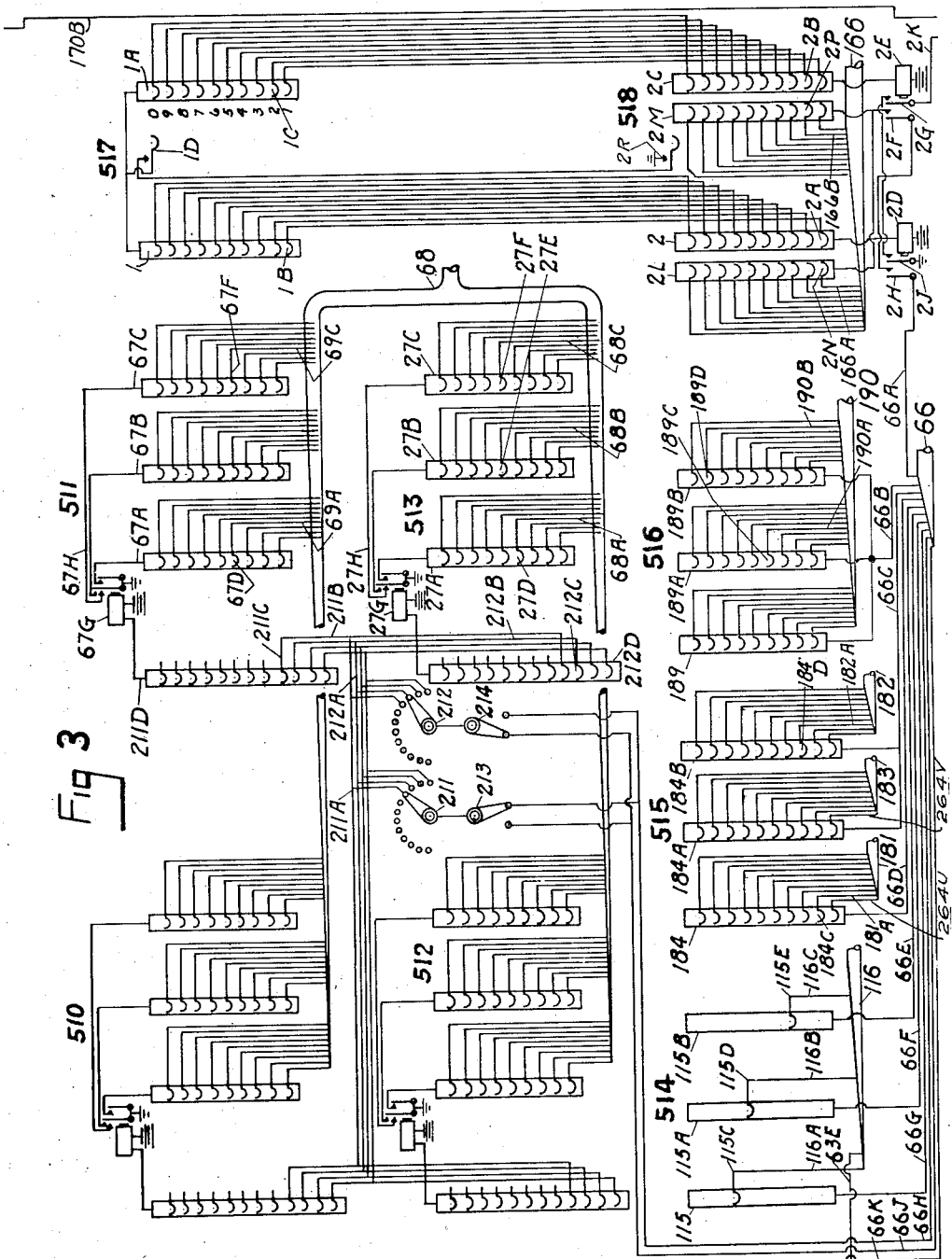

Figure 3 shows contact bars, with fingers, and switches:

At 510, 511, 512, 513, the meter reading bars for four months, with selective switches: the bars at 511 being for the previous (September) reading; and those at 513 for the last (October) reading.
At 514, rate bars for multiplication.
At 515, minimum consumption bars.
At 516, minimum money bars.
At 517, matching bars for meter card.
At 518, matching and identifying bars for office card.

Figure 4:
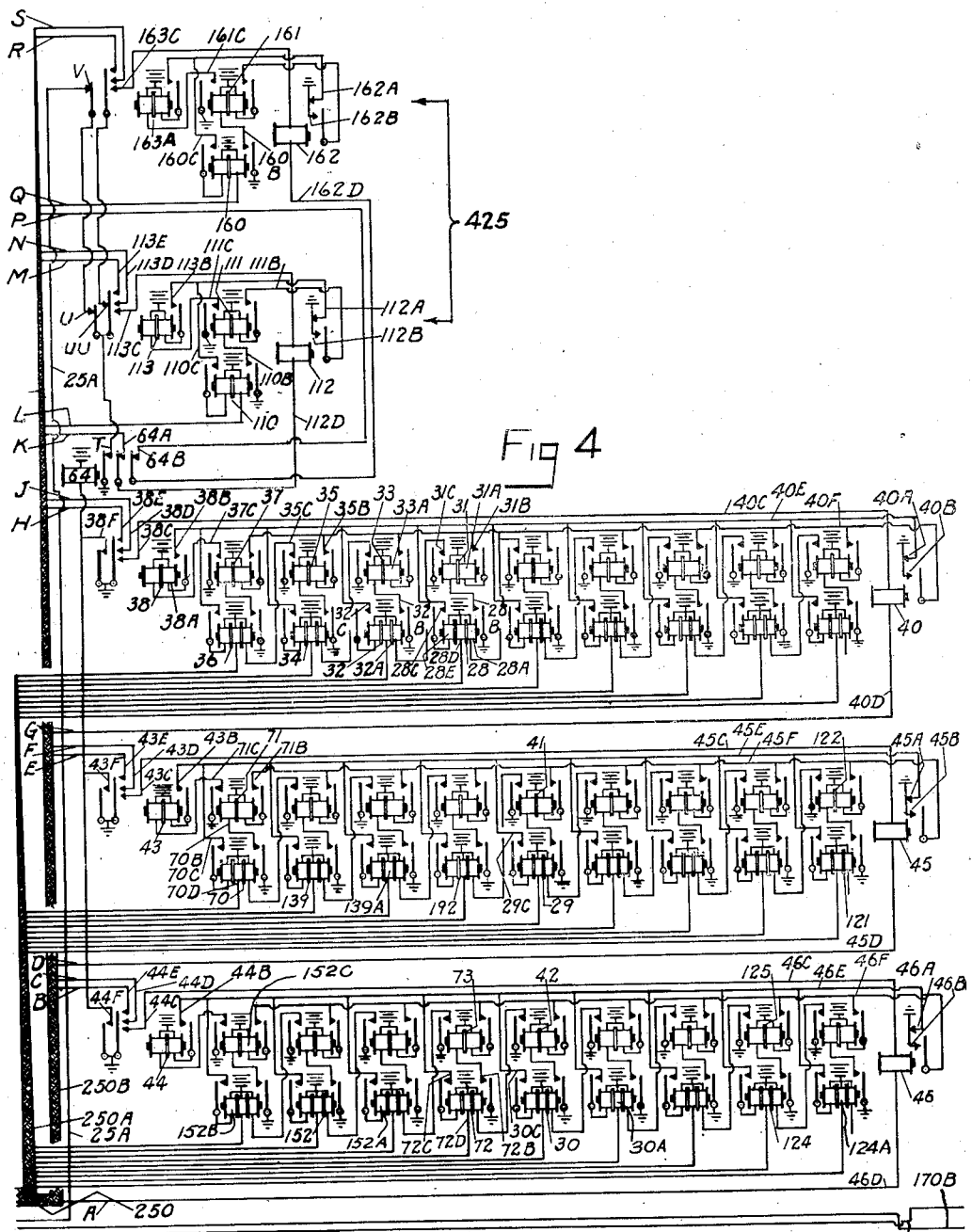

Figure 4 shows the three groups of counting relays, with their stepping relays, for all number wheel movements, except consumption; denoted generally at 425 are the set of carry-over relays and their connections, for consumption and money wheels.

Figure 5:
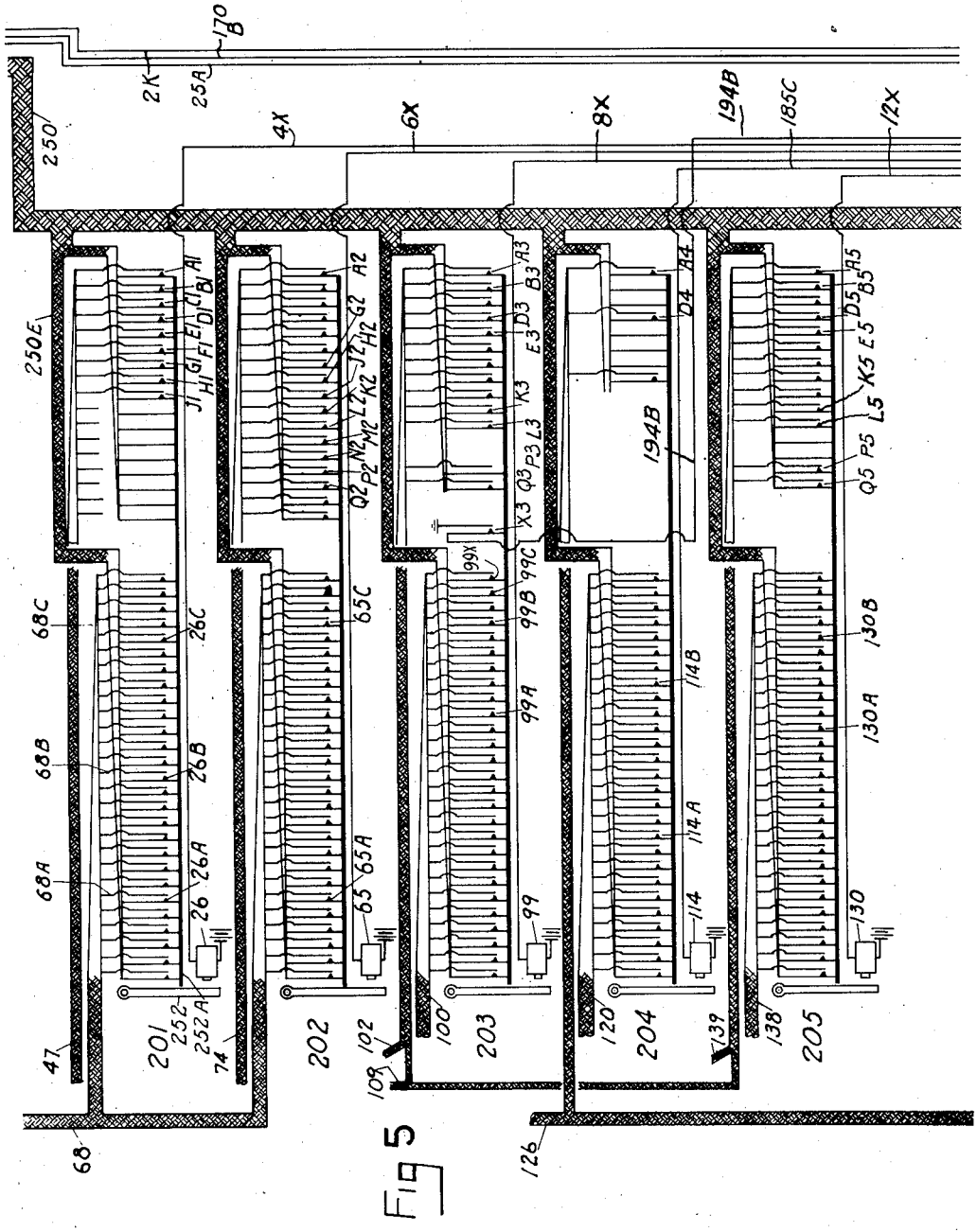
Figure 5A:
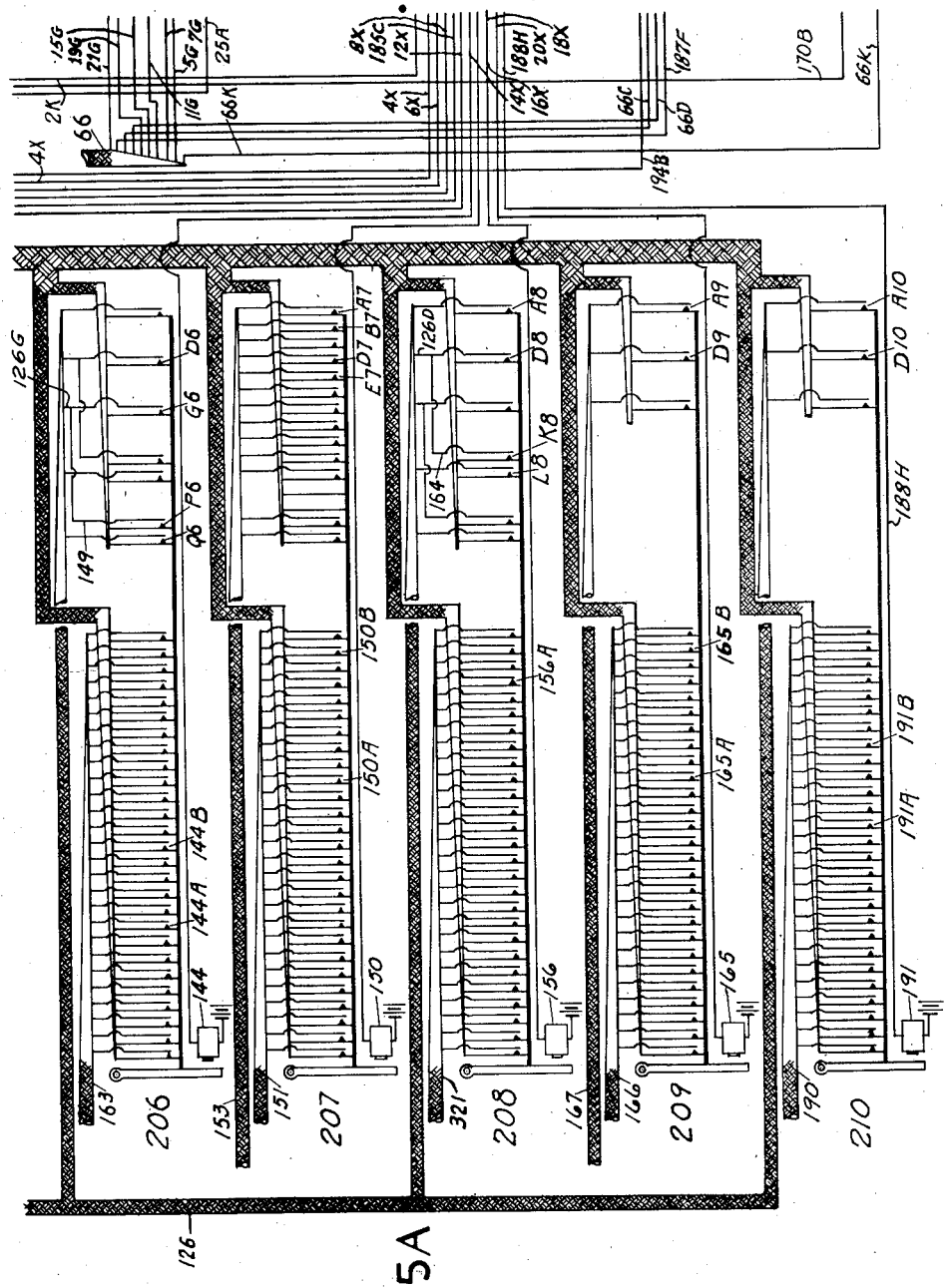

Figures 5 and 5A show the ten shift relays, one for each of the operations affecting the counting relays.

Figure 6 shows the sequence and control relays, respectively denoted generally at 415 and 451.

Figure 7 shows the contact bars and fingers; on line with 475—475 for the first step; 476—476 second step; and a fragmentary side view of the hundreds consumption contact-closing wheel, with four sets of contacts, for 0, 1, 2, 3, shown in developed view.

Figure 7A:
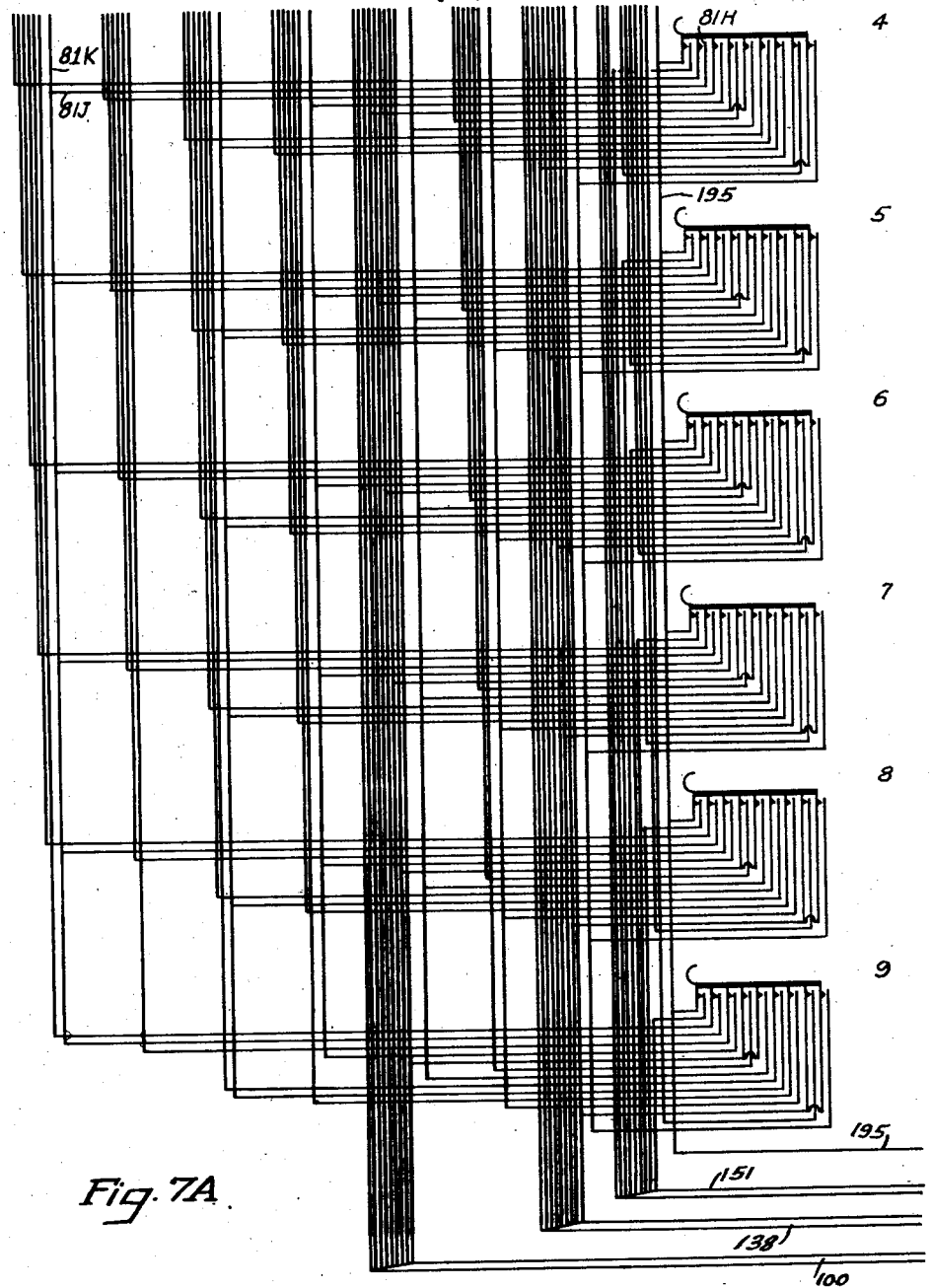
Figure 8A:
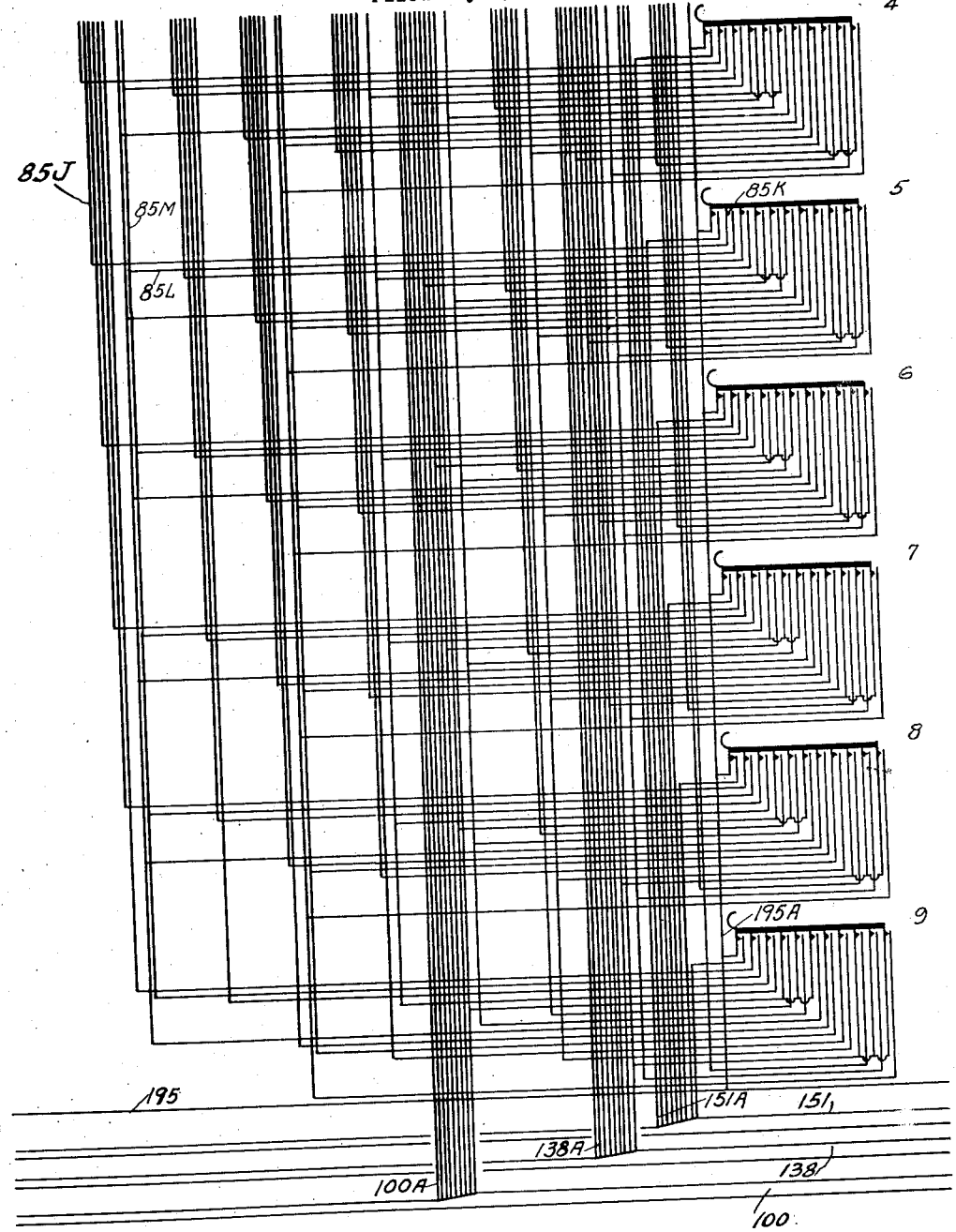
Figure 9A:
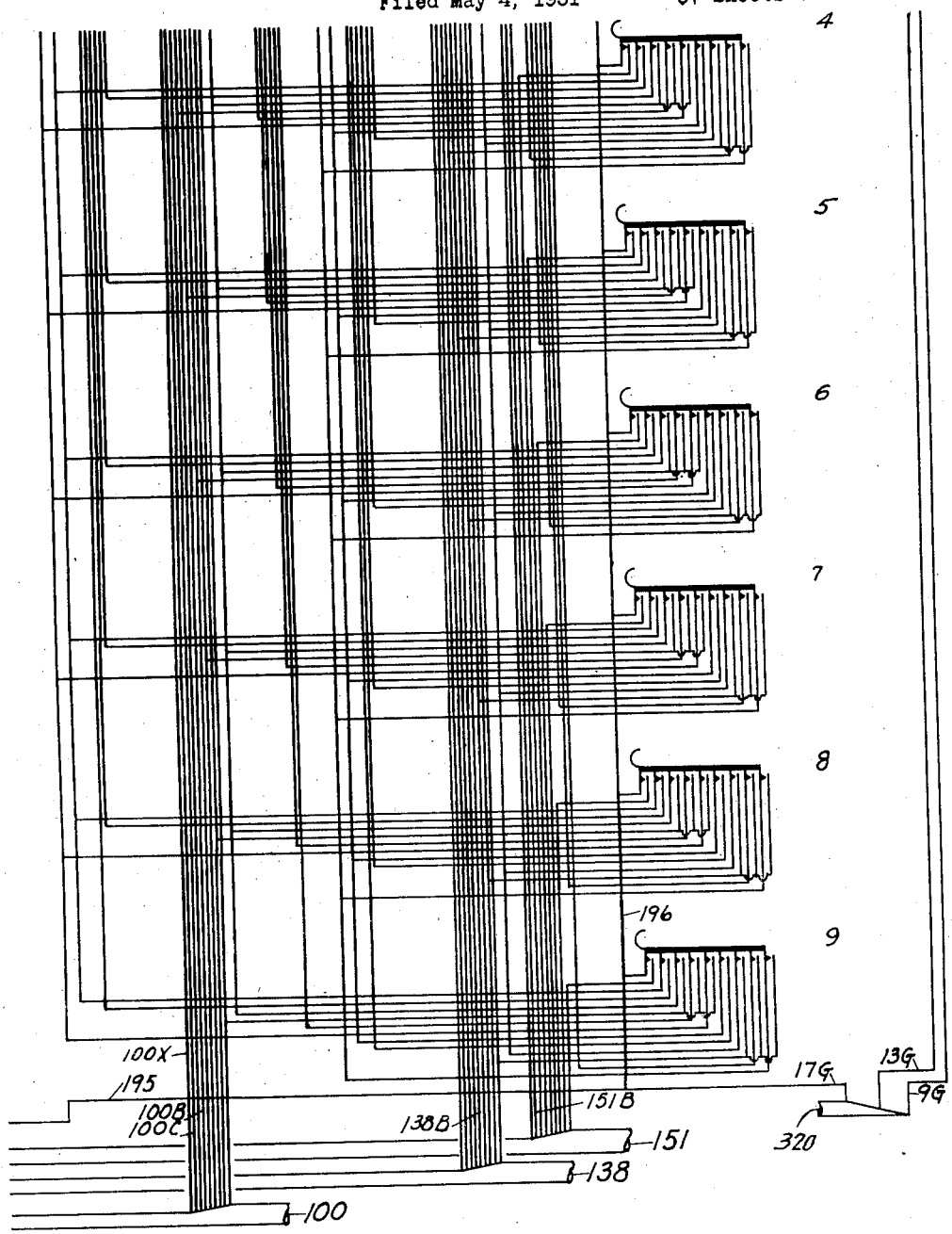

Figure 8 is similar to Figure 7, for the tens.
Figure 9 is similar to Figure 7, for the units.
Figures 7A, 8A, 9A, are respectively continuations of Figures 7, 8, 9, with six more sets of contacts.

Figure 10 is a top plan view of first step registering wheels for tens and units, less contacts.

Figures 10A and 10B are similar views, for second step and remainder.

Figure 11:
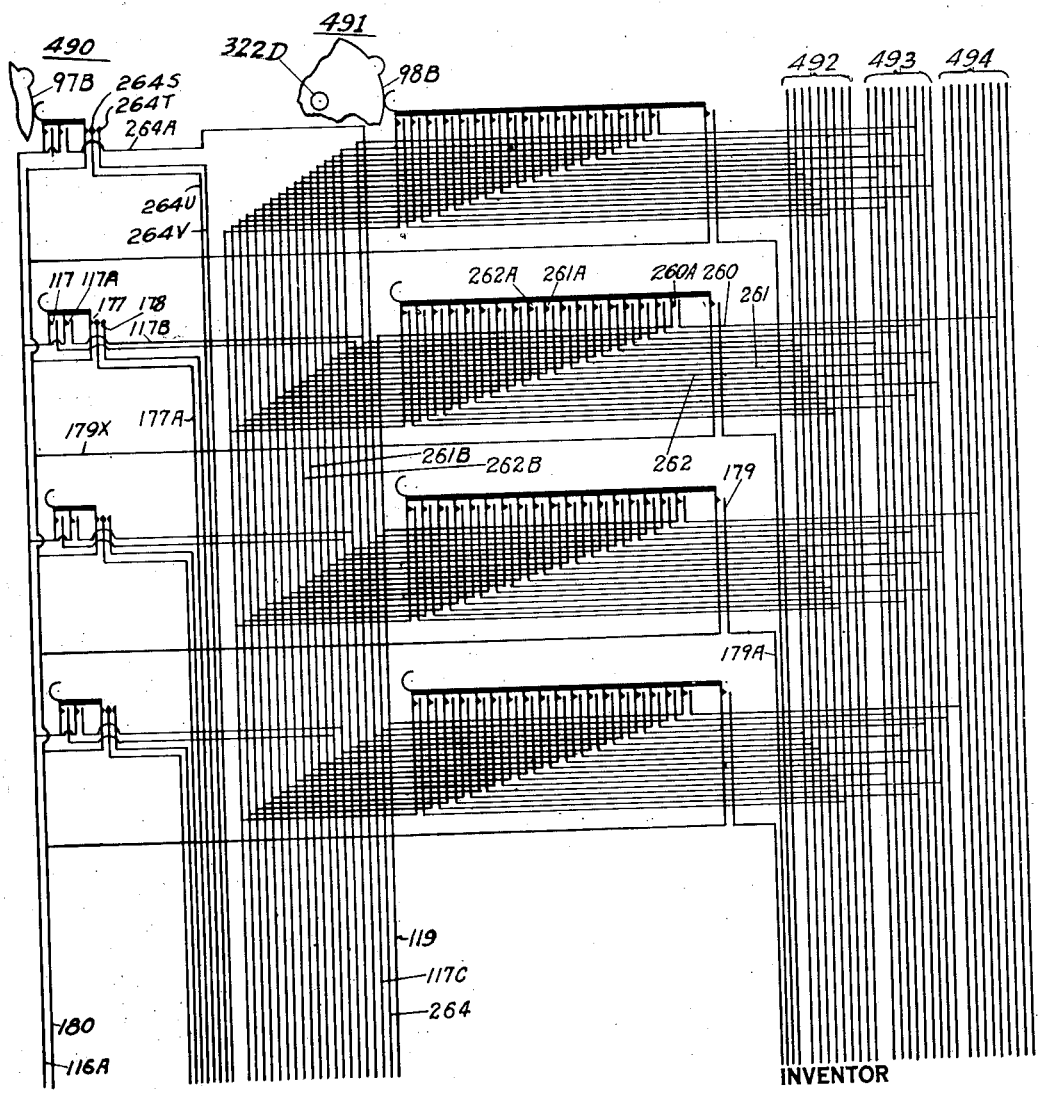

Figure 11 is a fragmentary side view of the first step contact-closing wheels, and the 0, 1, 2, 3, groups of the multiplier contact pairs and conductors. Contacts and wiring are in developed view.

Figure 11A is a continuation of Figure 11, with the 4, 5, 6, 7, 8, 9, groups.

Figures 12 and 12A are similar to Figures 11 and 11A, for the second step.

Figure 13:
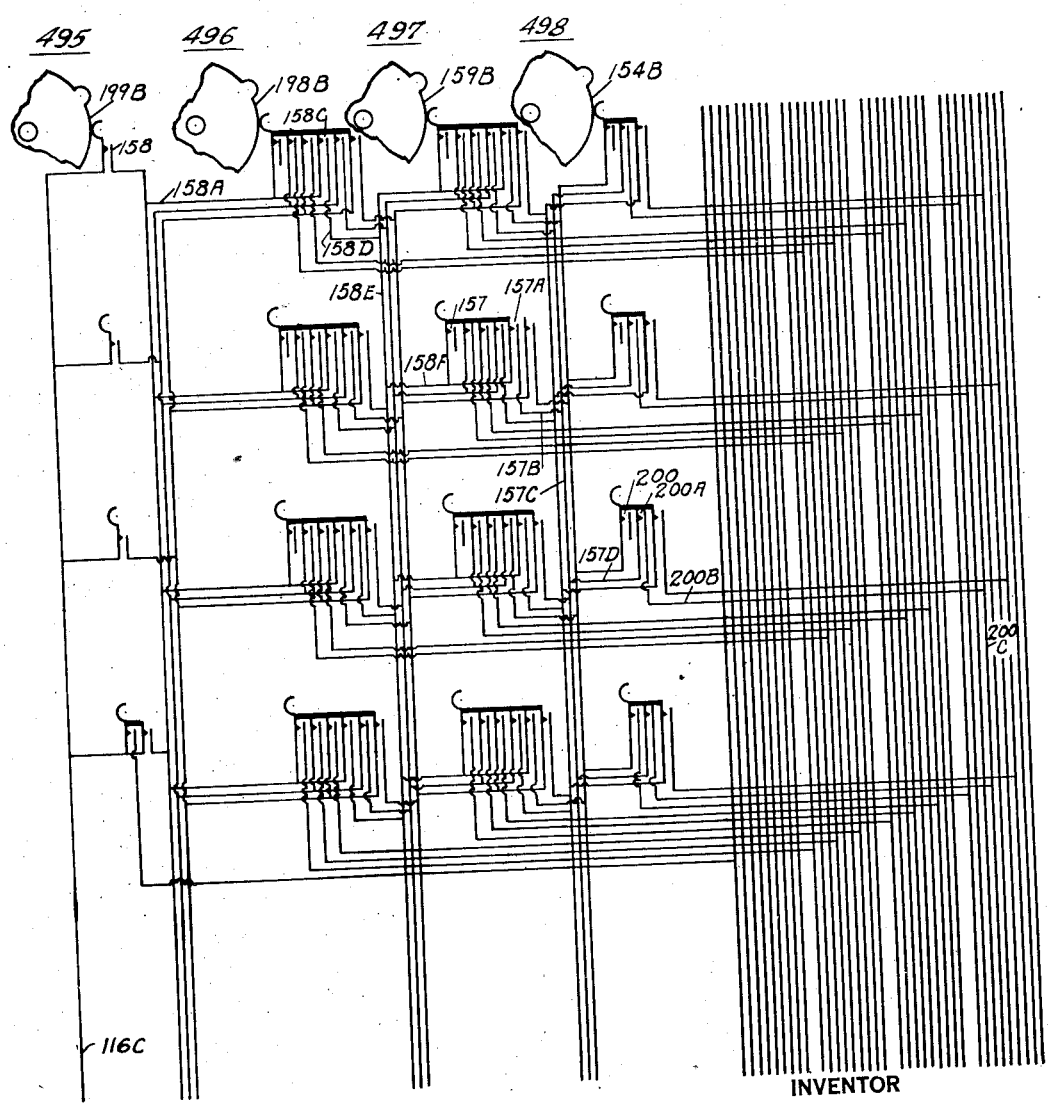

Figures 13 and 13A are similar to Figures 11 and 11A, for the remainder.

Figure 14:
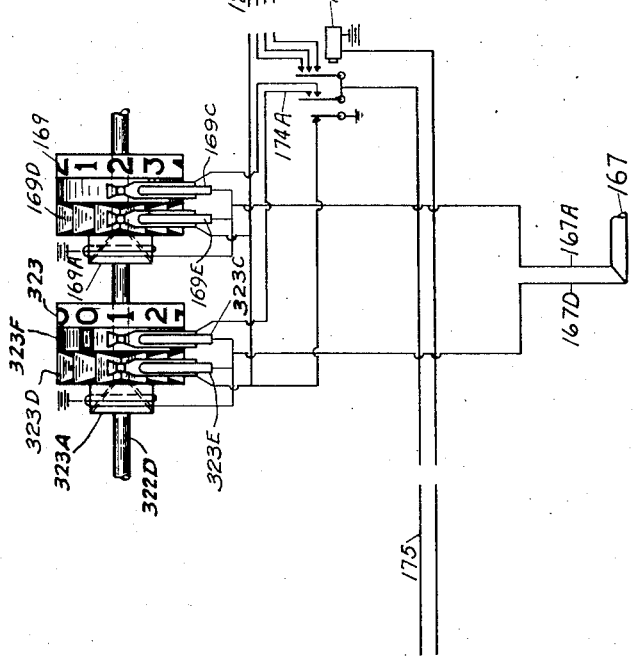

Figure 14 is a top plan view of the identifying number wheels.

Figure 15:
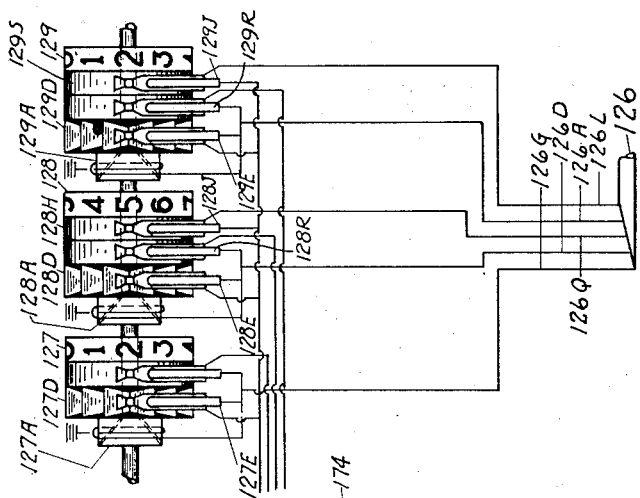

Figure 15 is a top plan view of the money wheels.

Figure 16 shows an auxiliary plan for multiplier circuits, with rate selector relays.

Figure 17 is a schematic diagram indicating the manner in which the several sheets of circuit drawings should be joined.

Figures 18 to 38, when joined, are a timing chart of the first described typical operation of the machine, Figures 18 to 24 forming the upper section of said chart when placed end to end from left to right in the order named, Figures 25 to 31 forming the central section of said chart when respectively under Figures 18 to 24, and Figures 32 to 38 forming the lower section of said chart when placed respectively under Figures 25 to 31.

Figure 39:
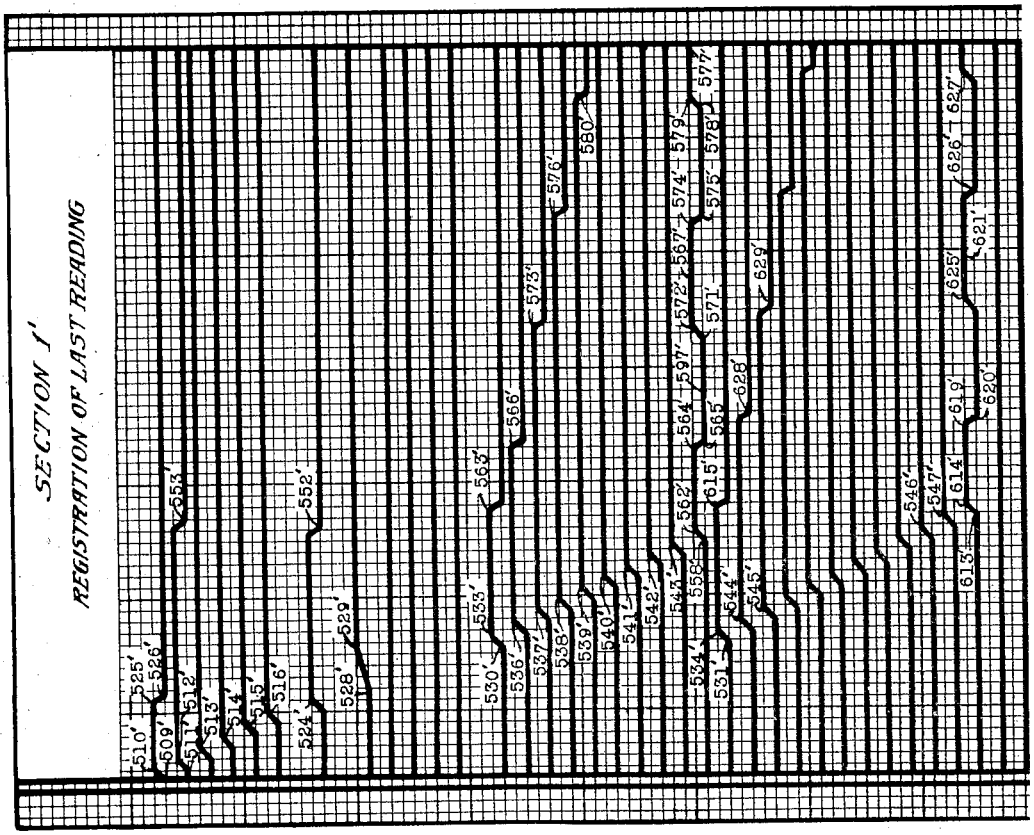
Figure 40:
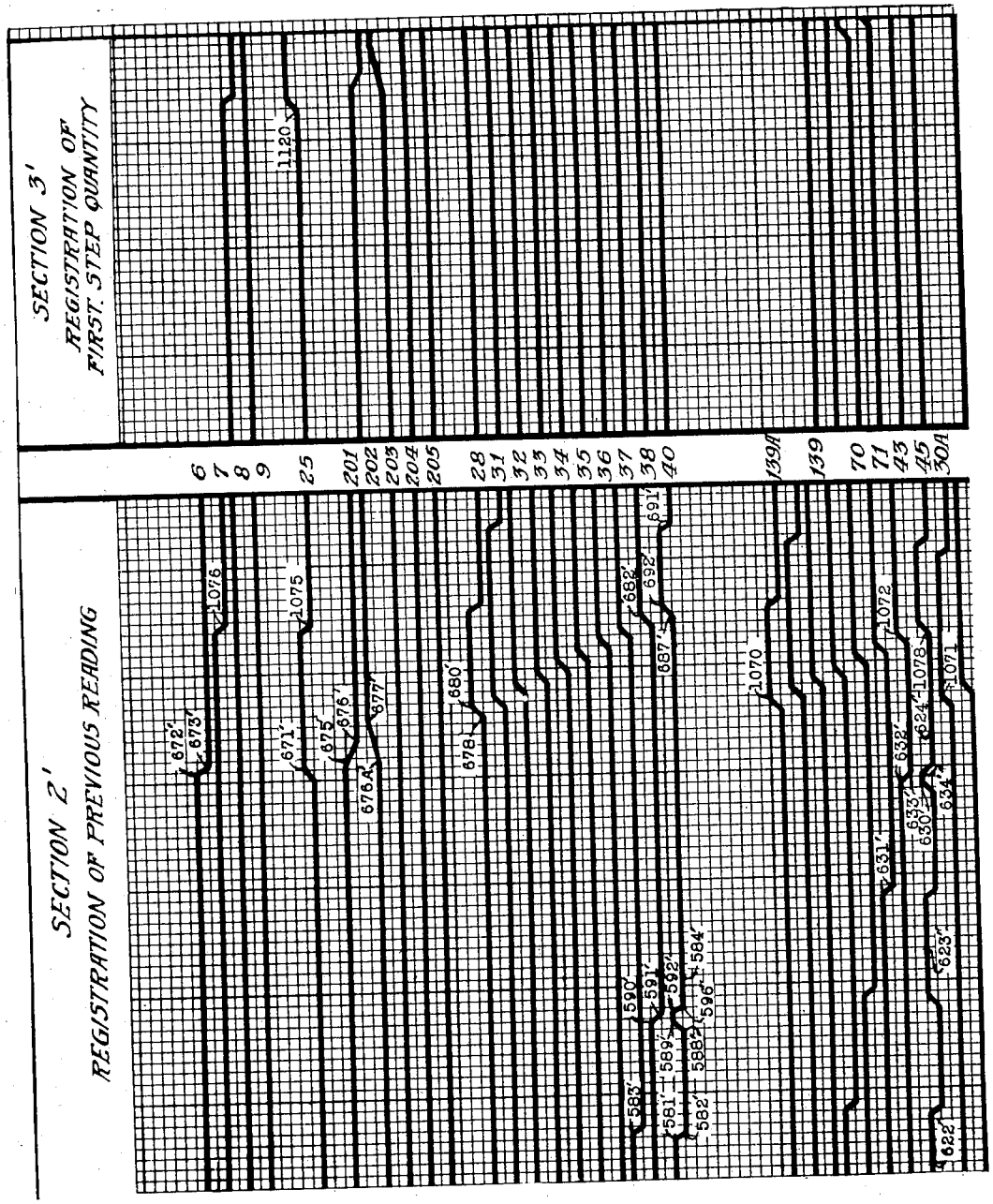
Figure 41:
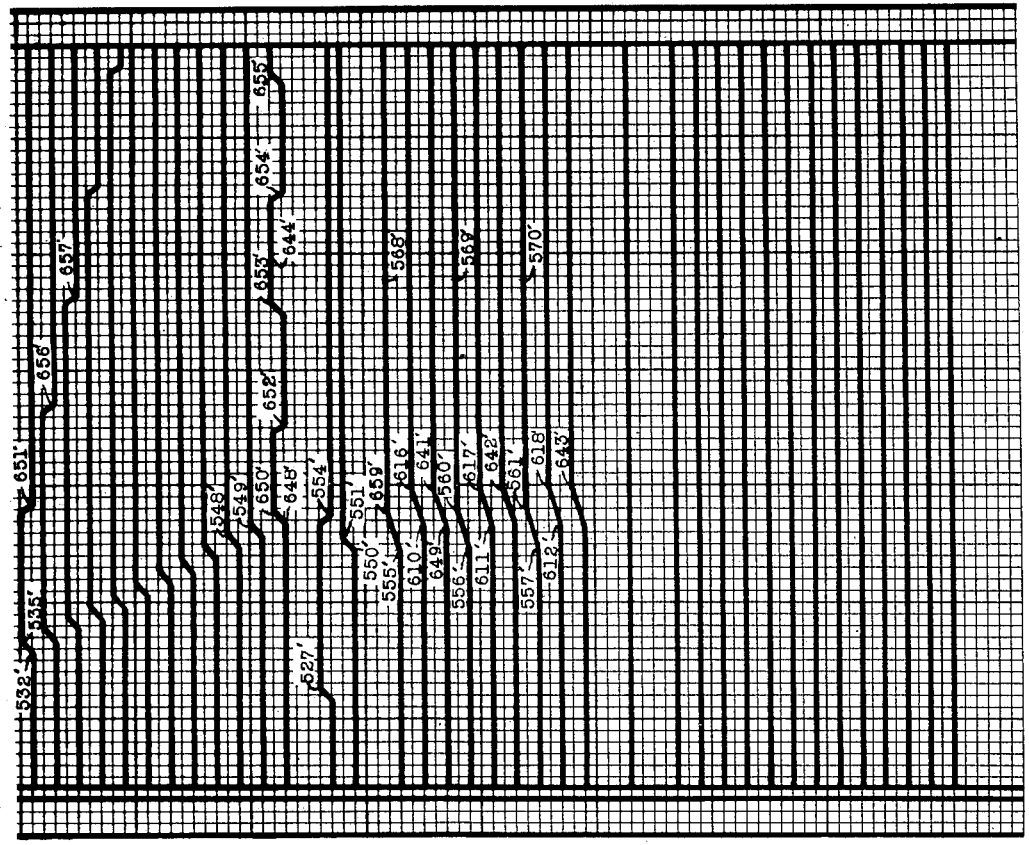
Figure 42:
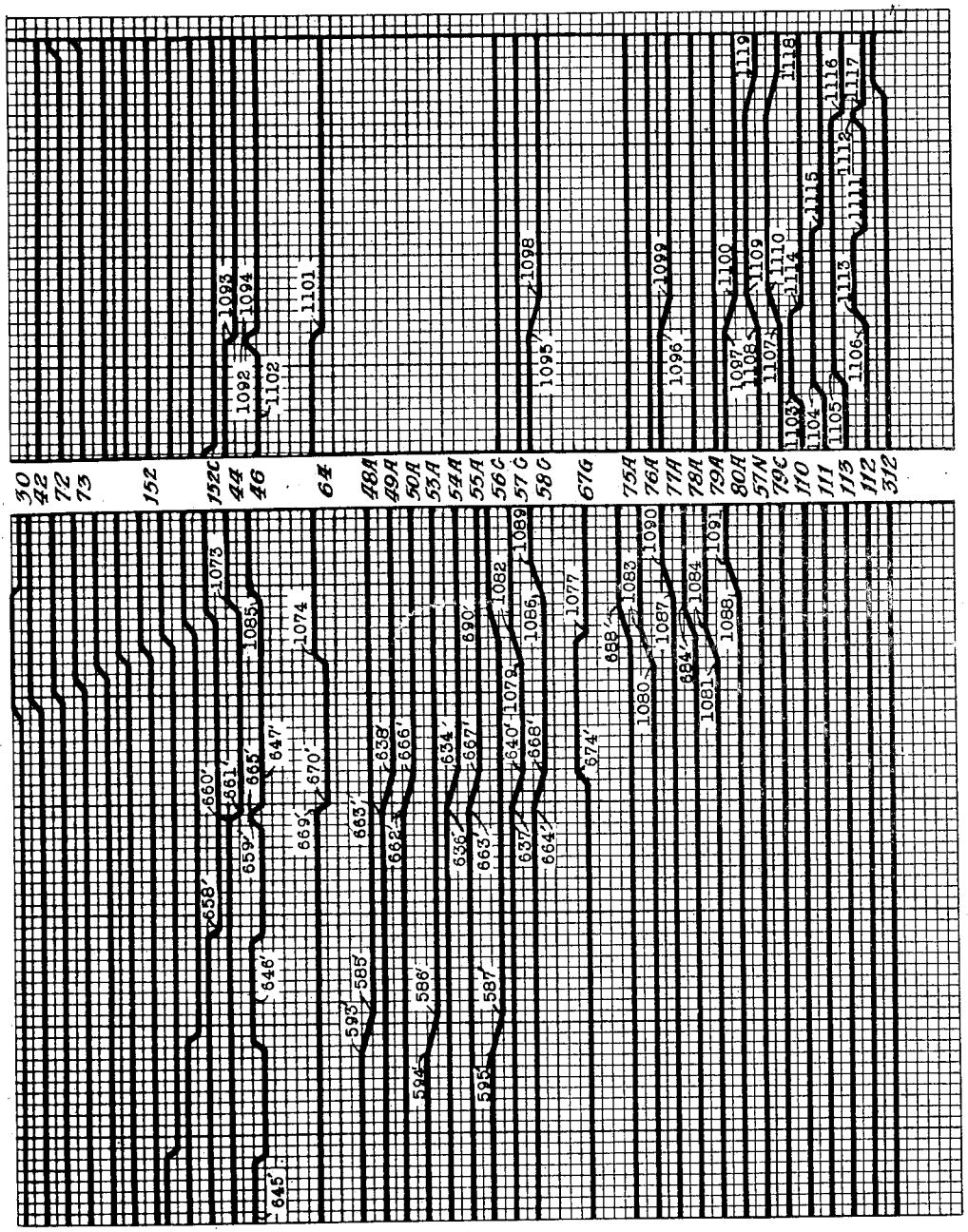
Figure 43:
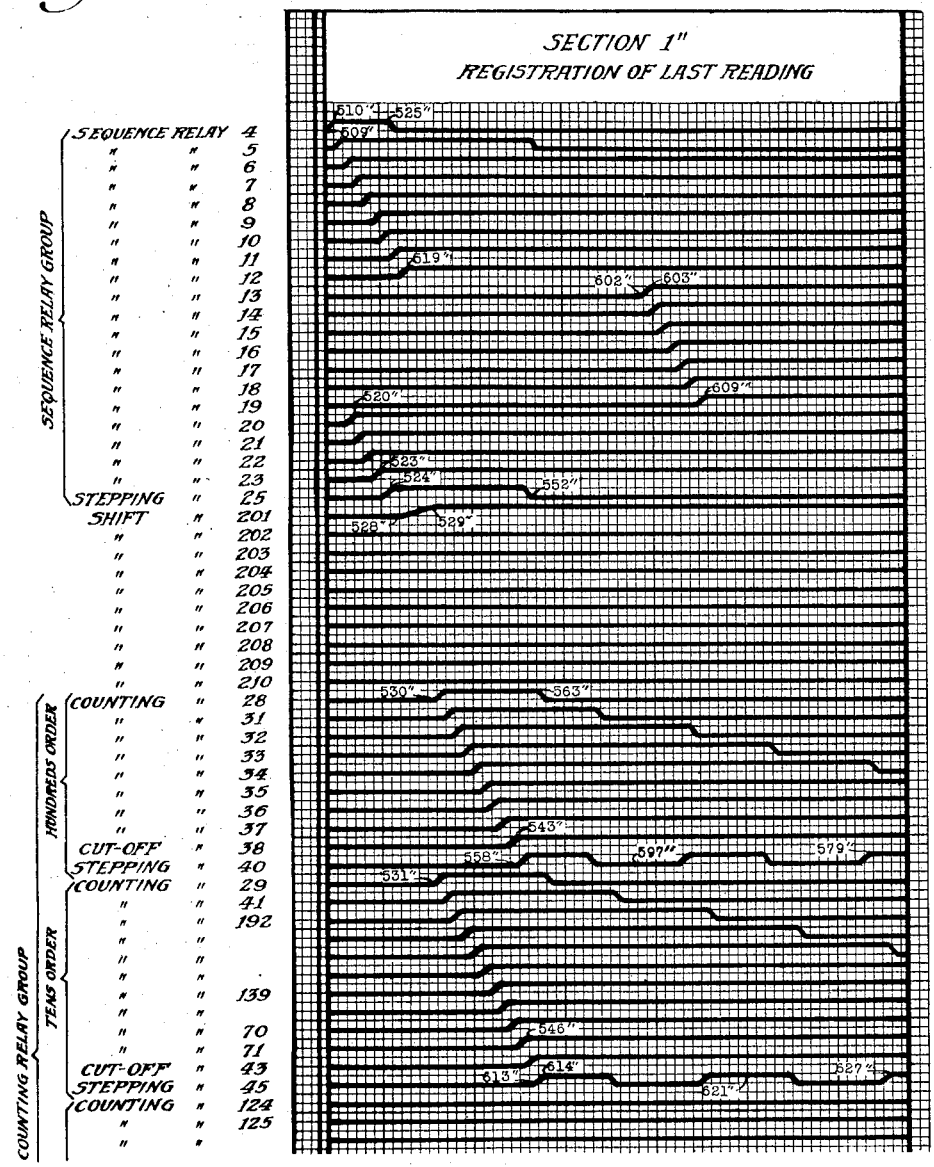
Figure 44:
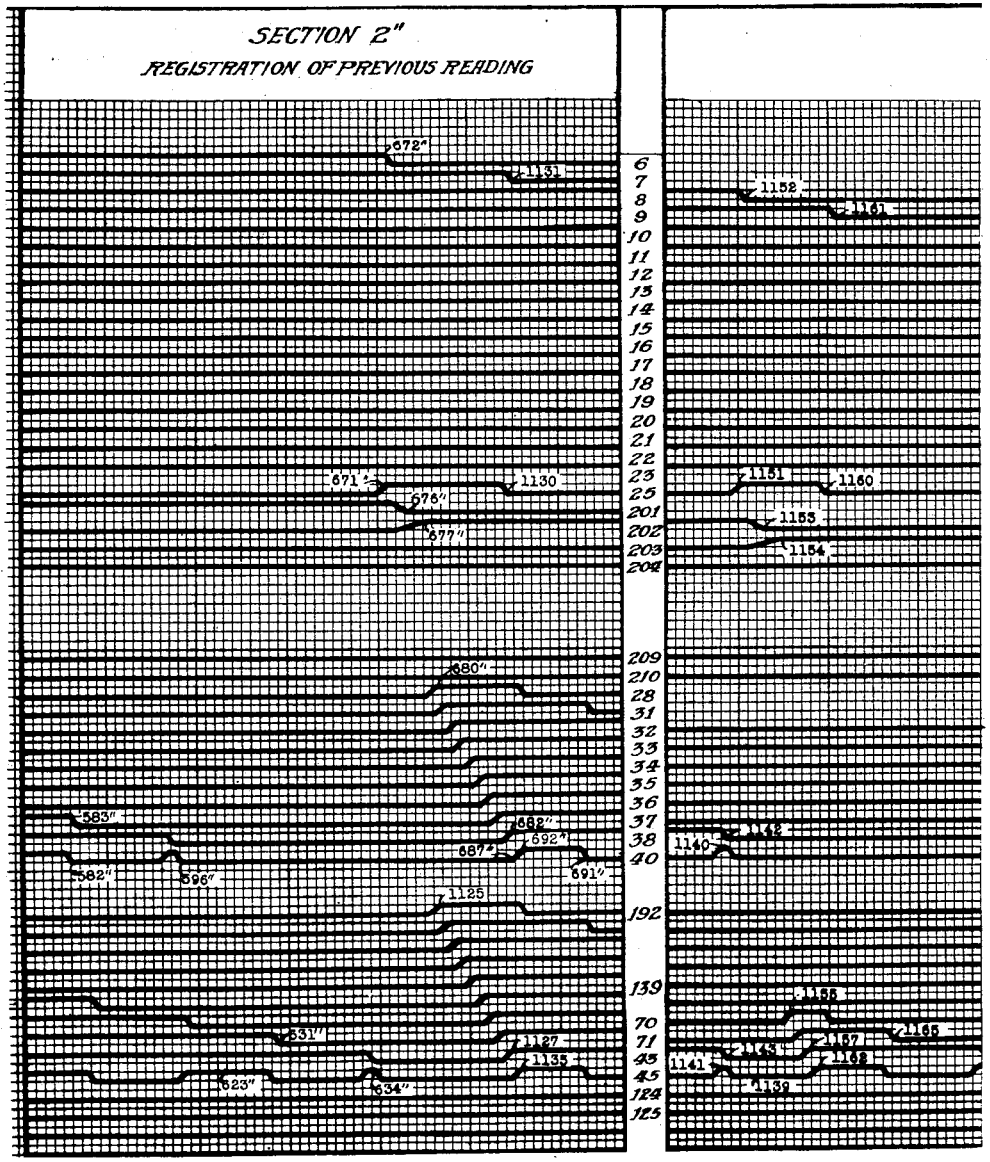
Figure 45:
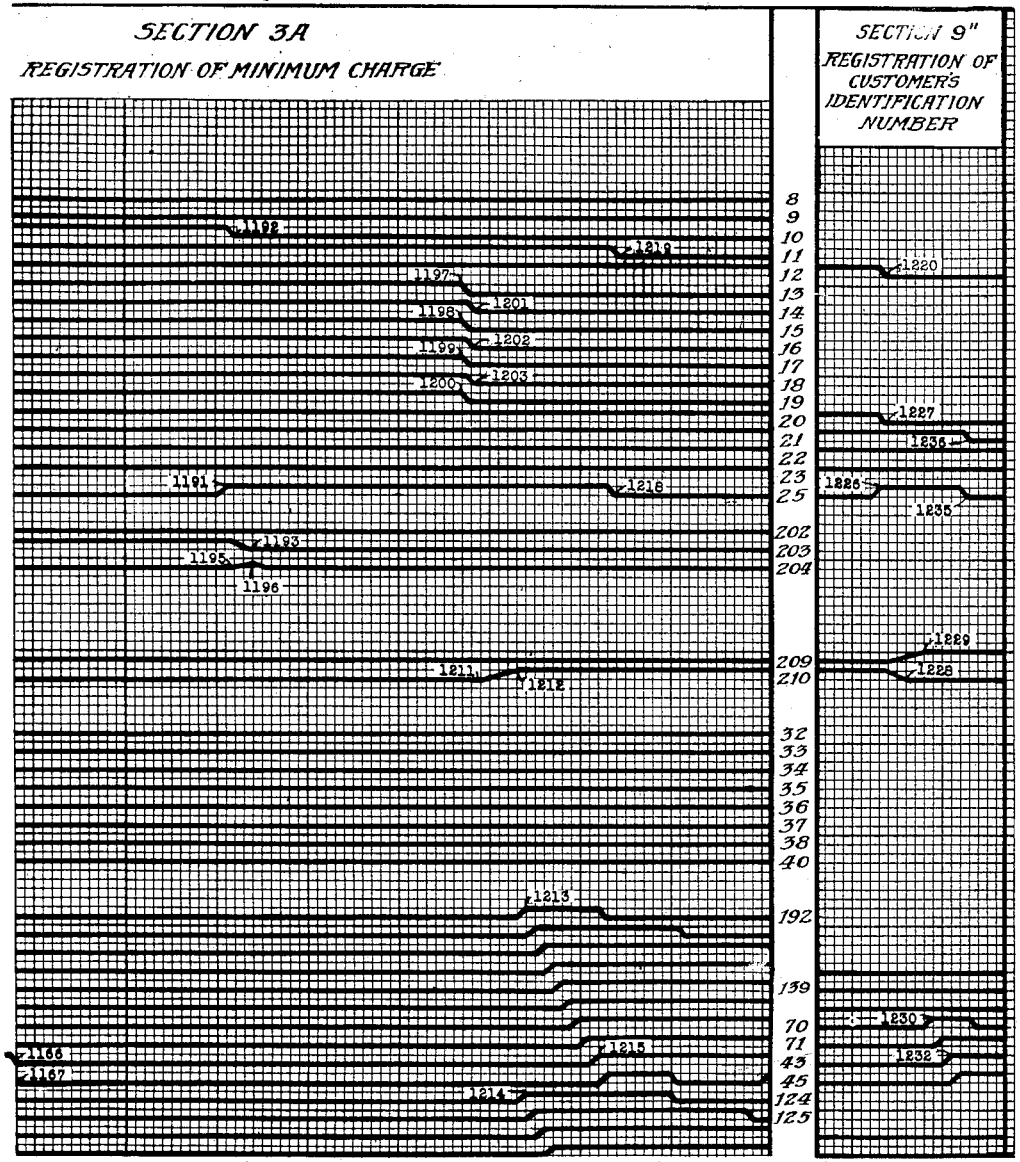
Figure 46:
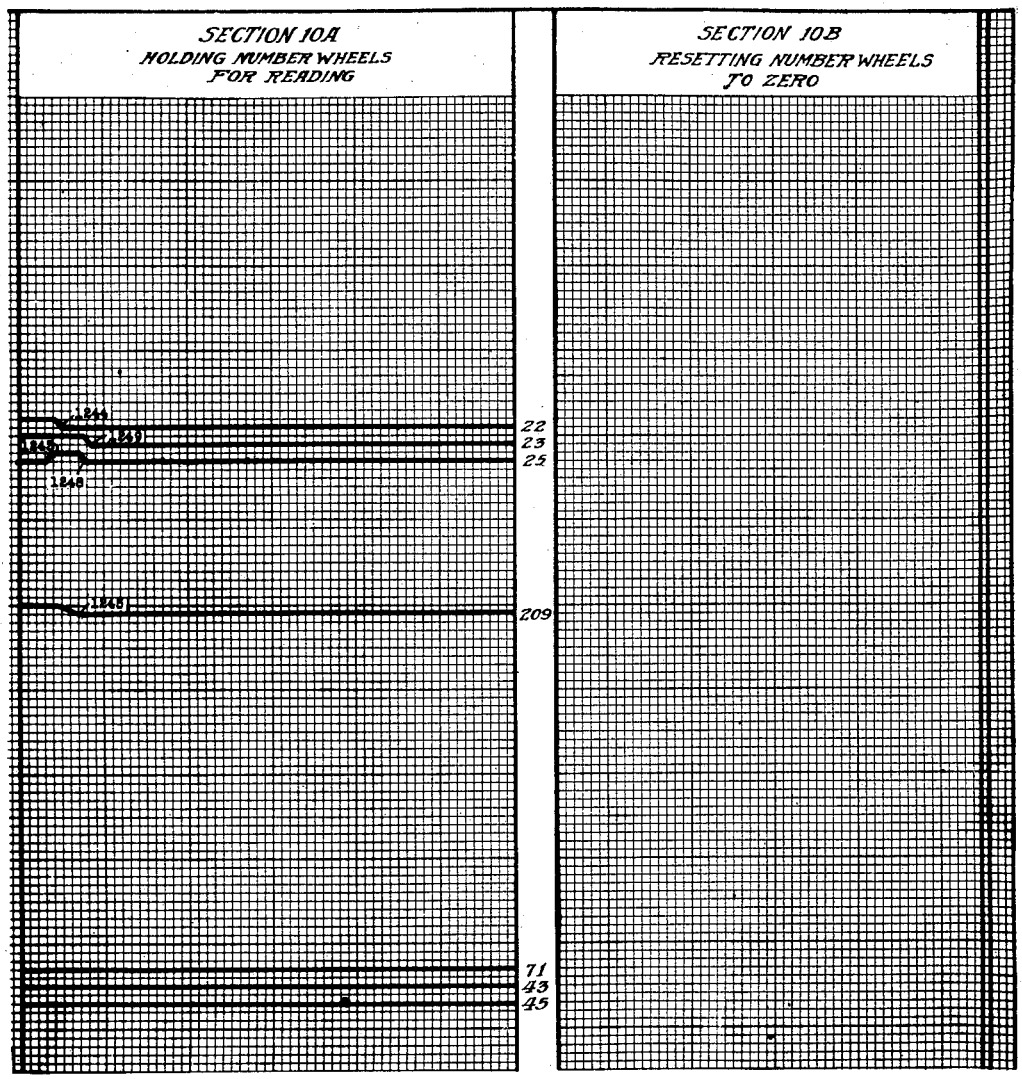
Figure 47:
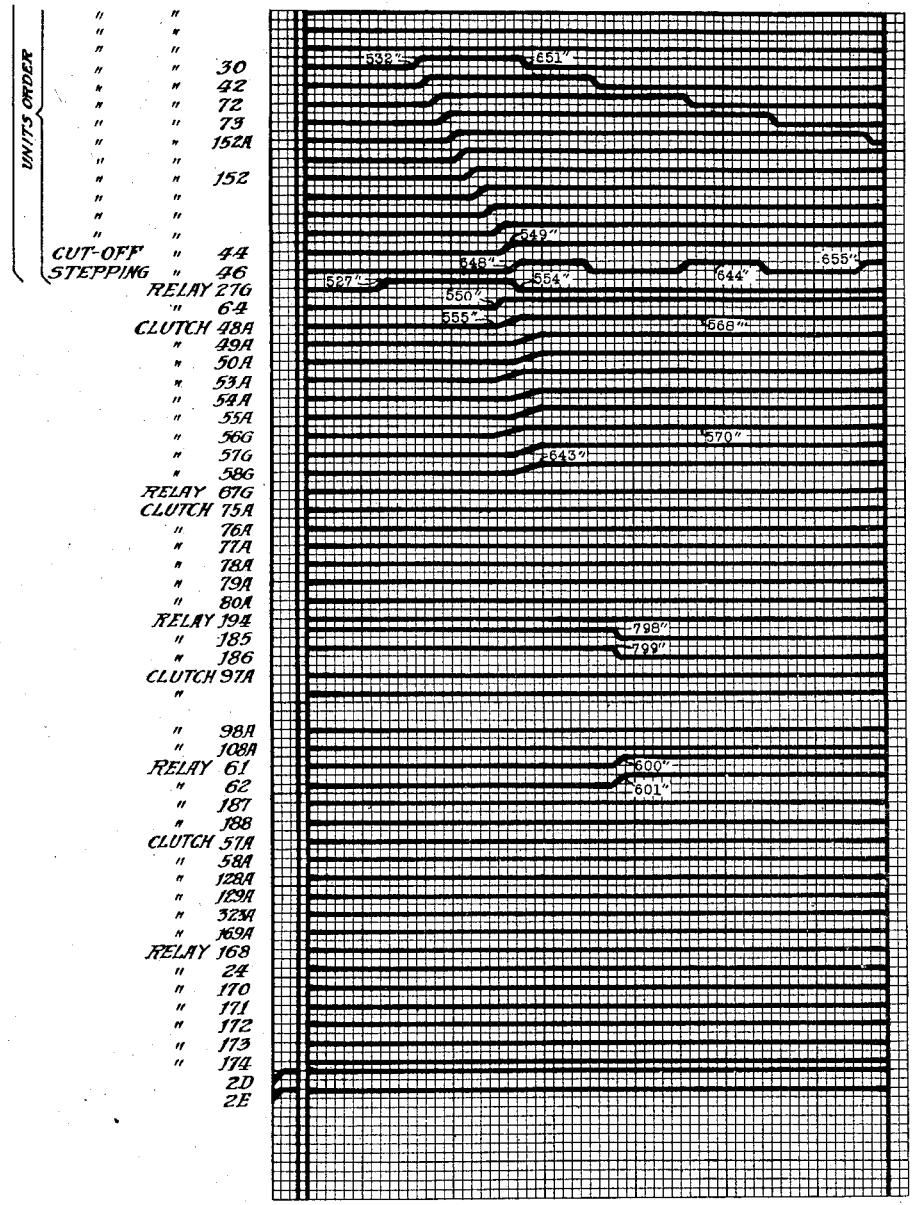
Figure 48:
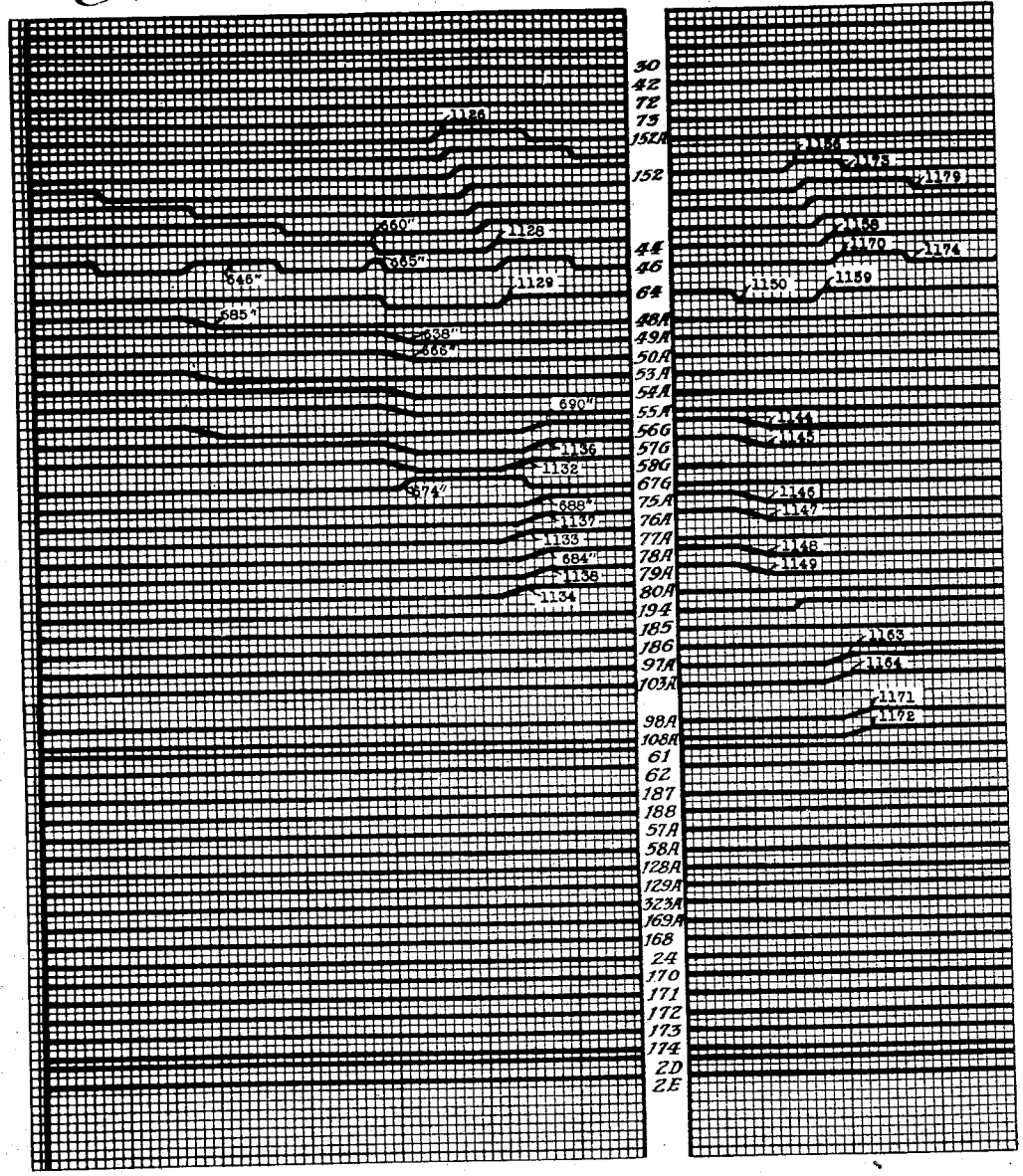
Figure 49:
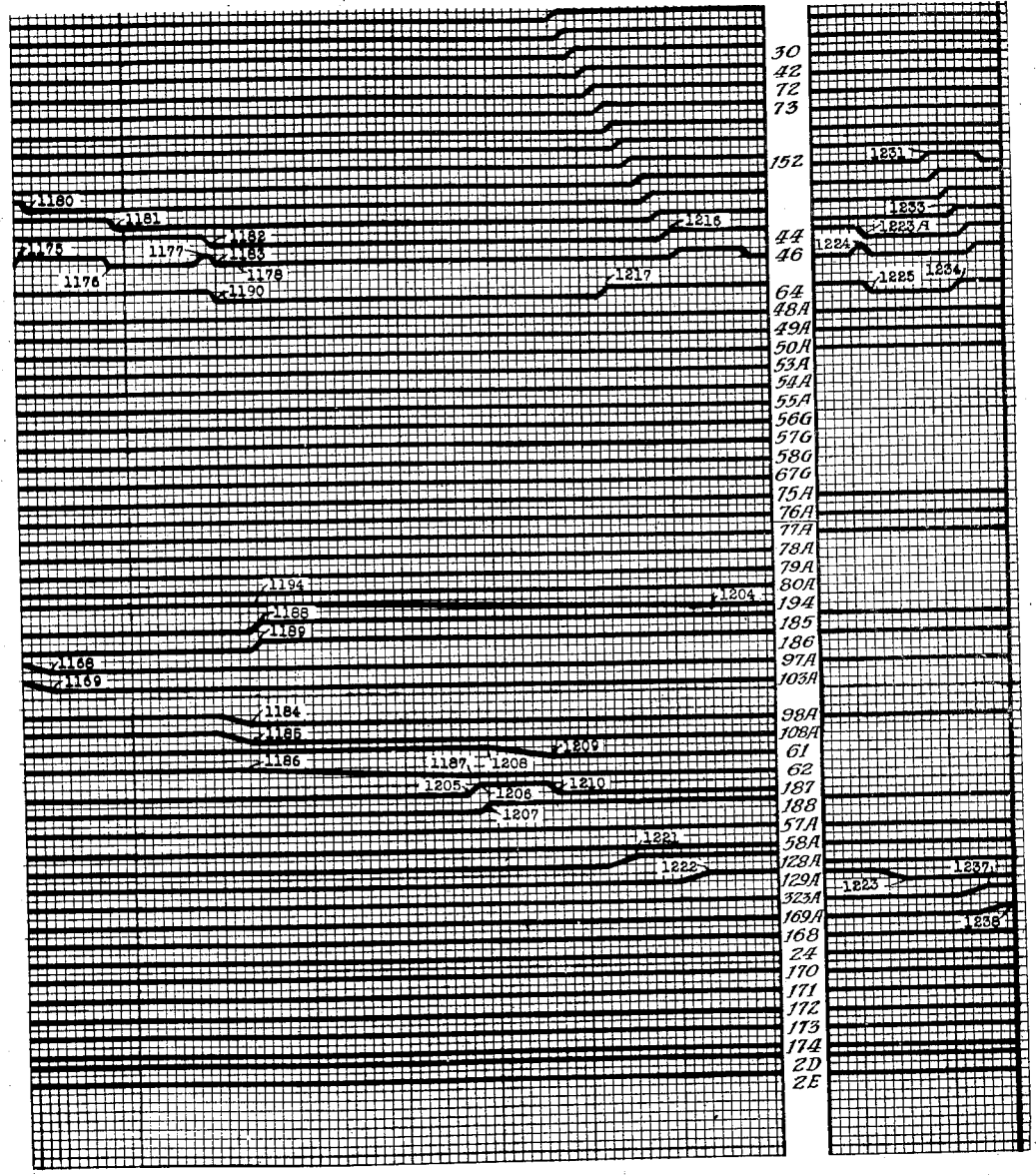
Figure 50:
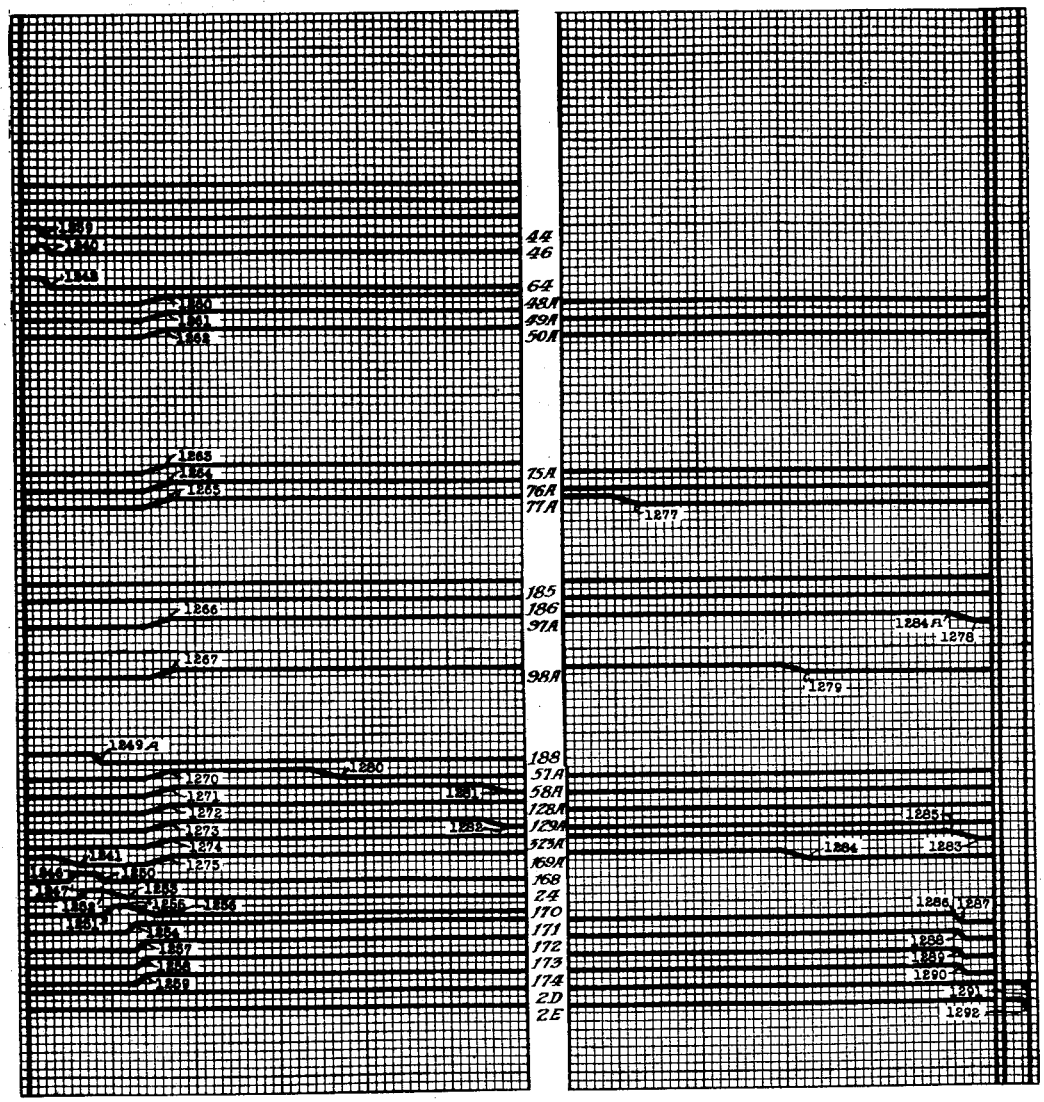
Figure 51:
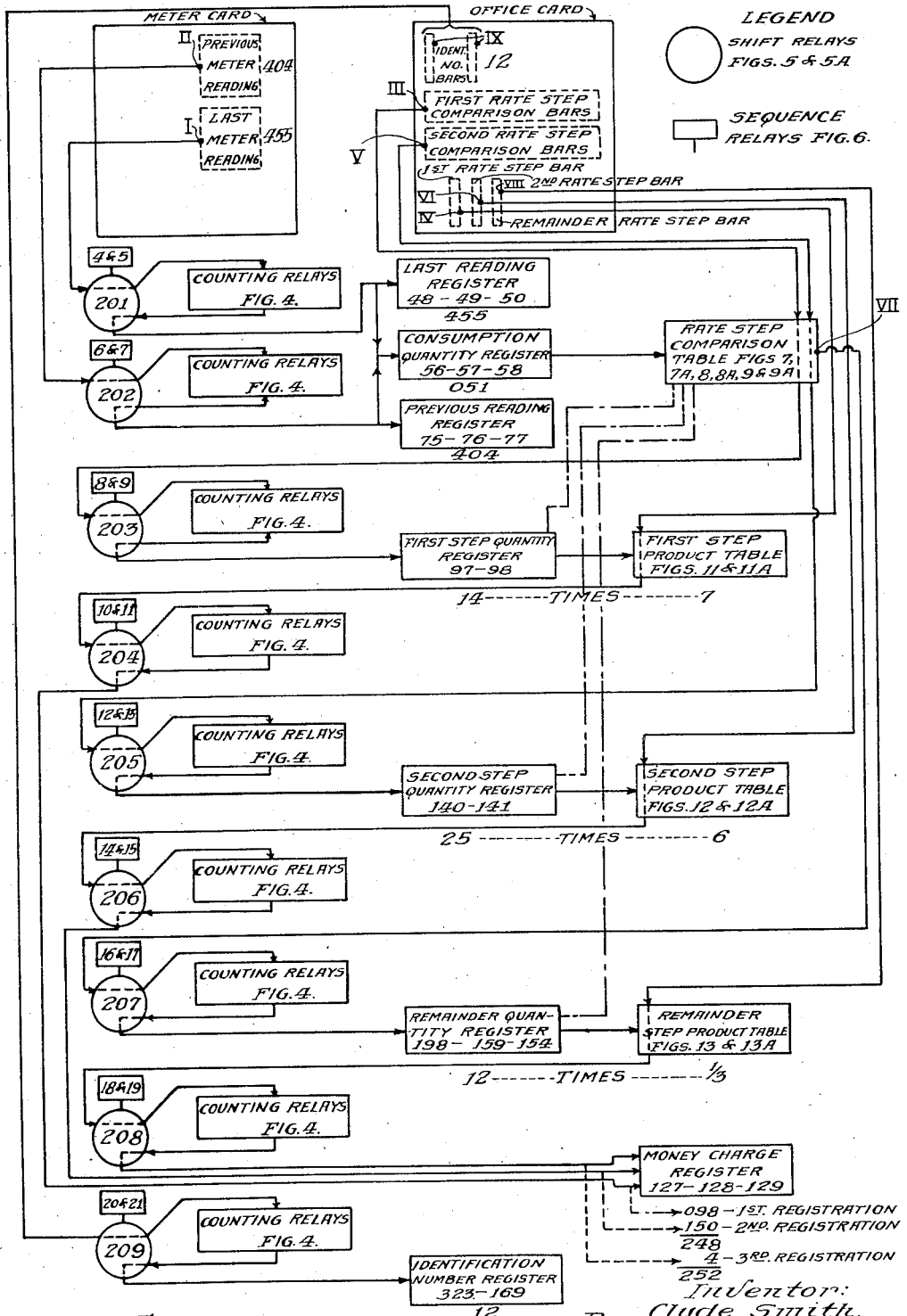

Figures 39 to 42, when joined, are a timing chart illustrating the beginning of another typical operation of the machine, Figures 39 and 40 forming the upper section of said chart when placed end to end from left to right in the order named, and Figures 41 and 42 forming the lower section of said chart when placed respectively under Figures 39 and 40.

Figures 43 to 50, when joined, are a timing chart illustrating a minimum charge operation of the machine, Figures 43 to 46 forming the upper section of said chart when placed end to end from left to right in the order named, and Figures 47 to 50 forming the lower section of said chart when placed respectively under Figures 43 to 46.

Figure 51:
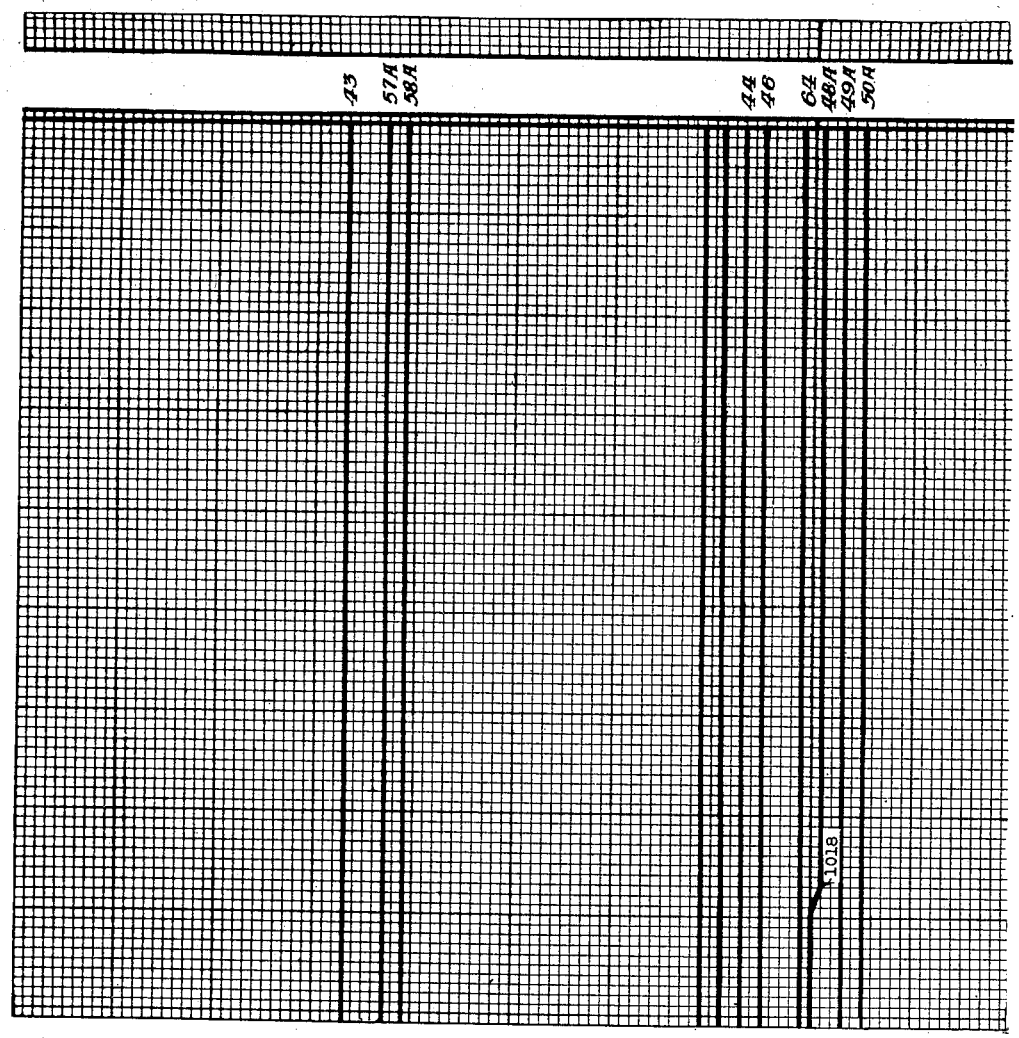
Figure 34:
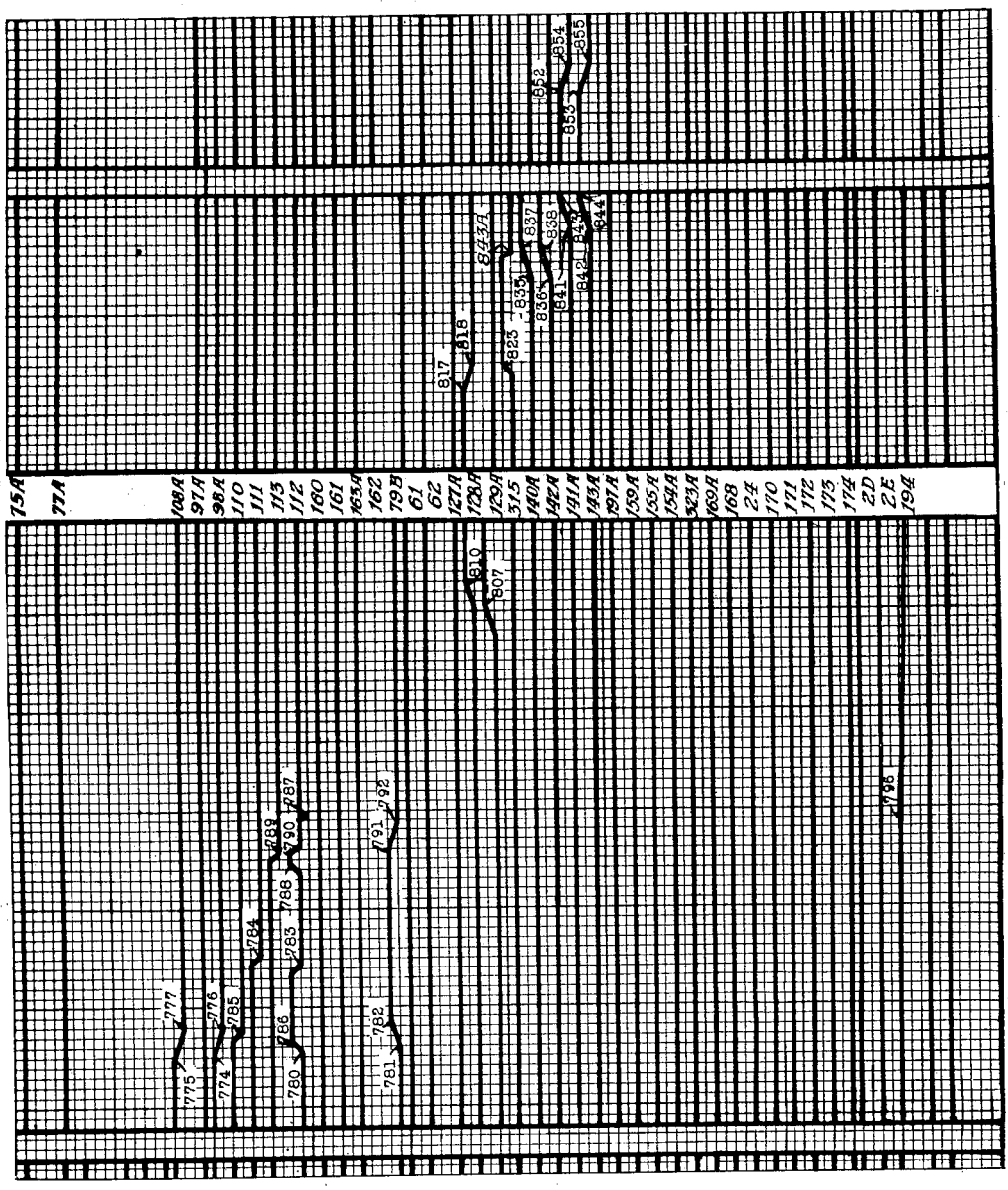
Figure 35:
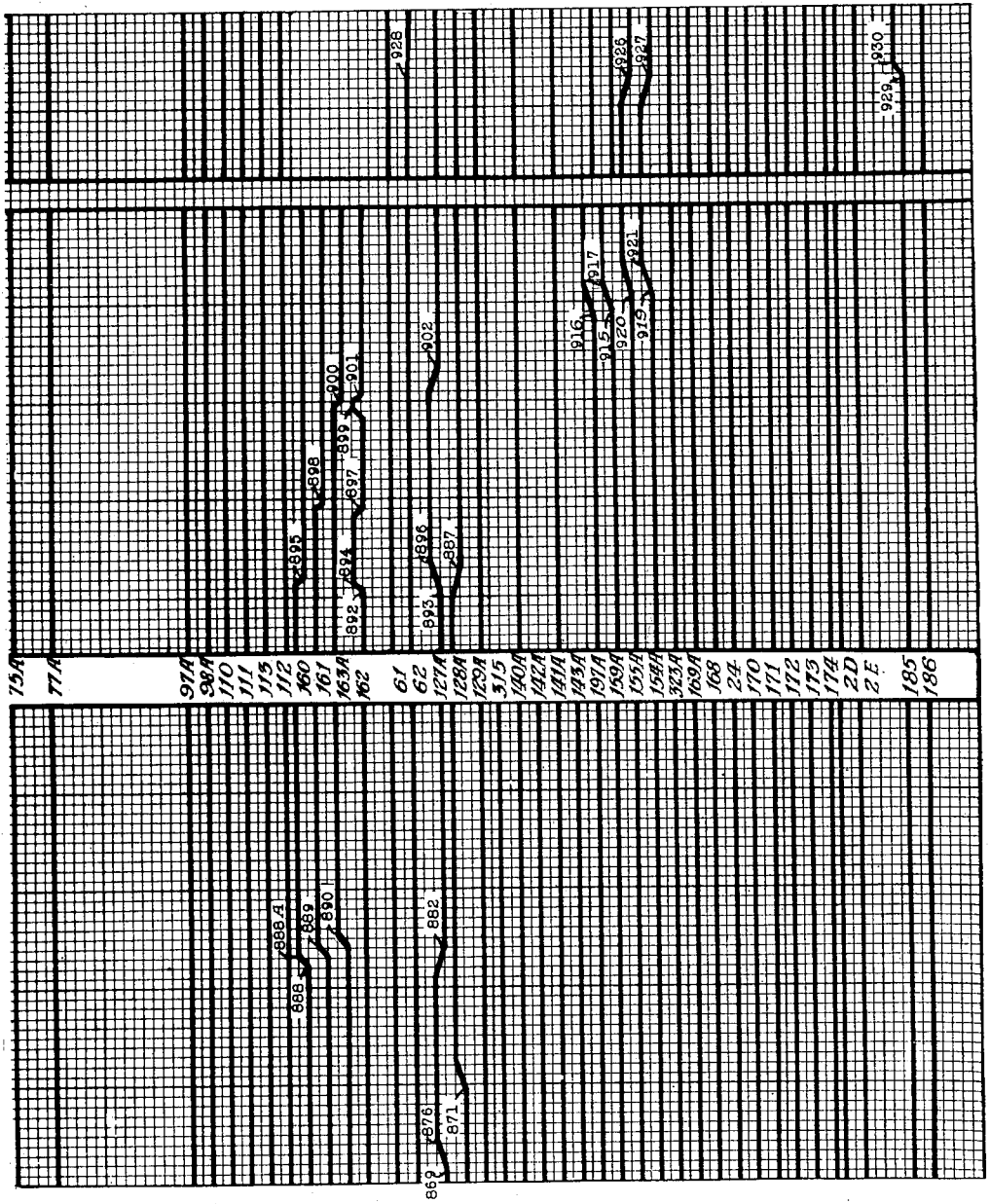
Figure 36:
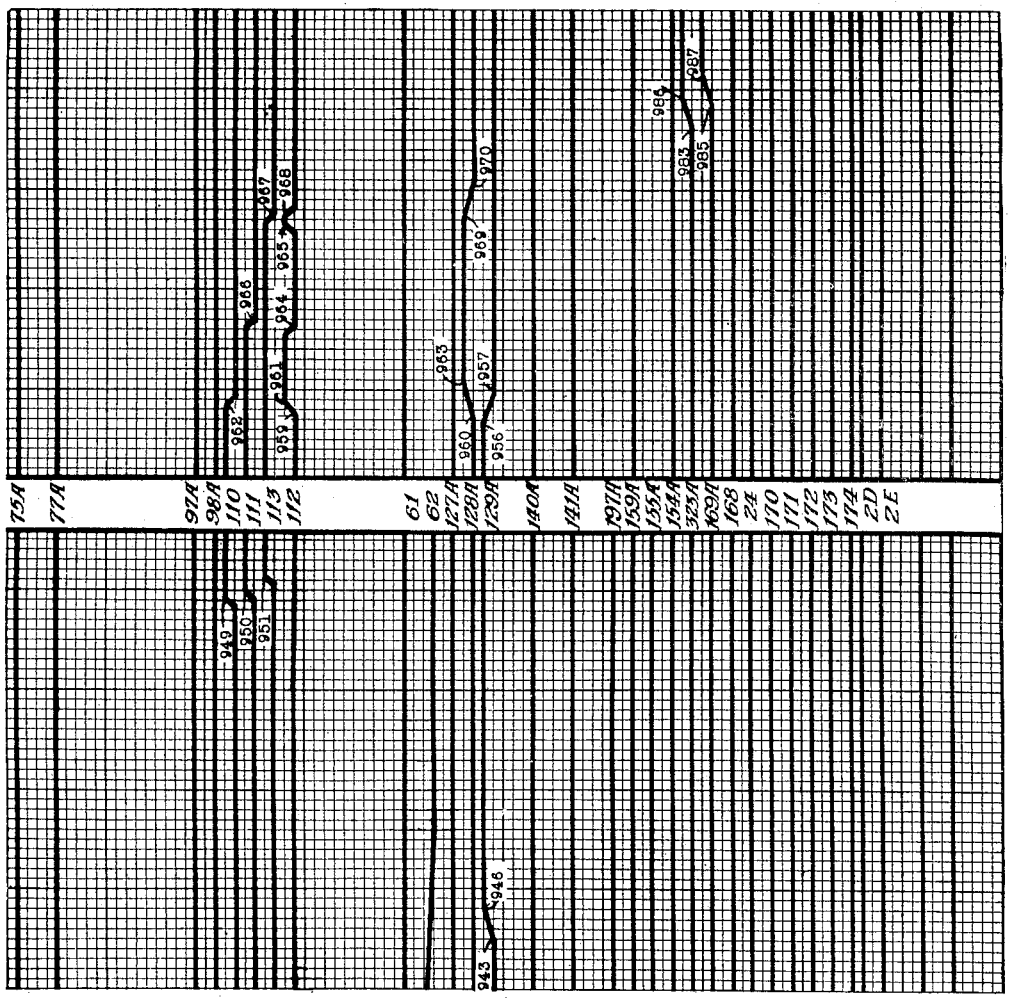
Figure 37:
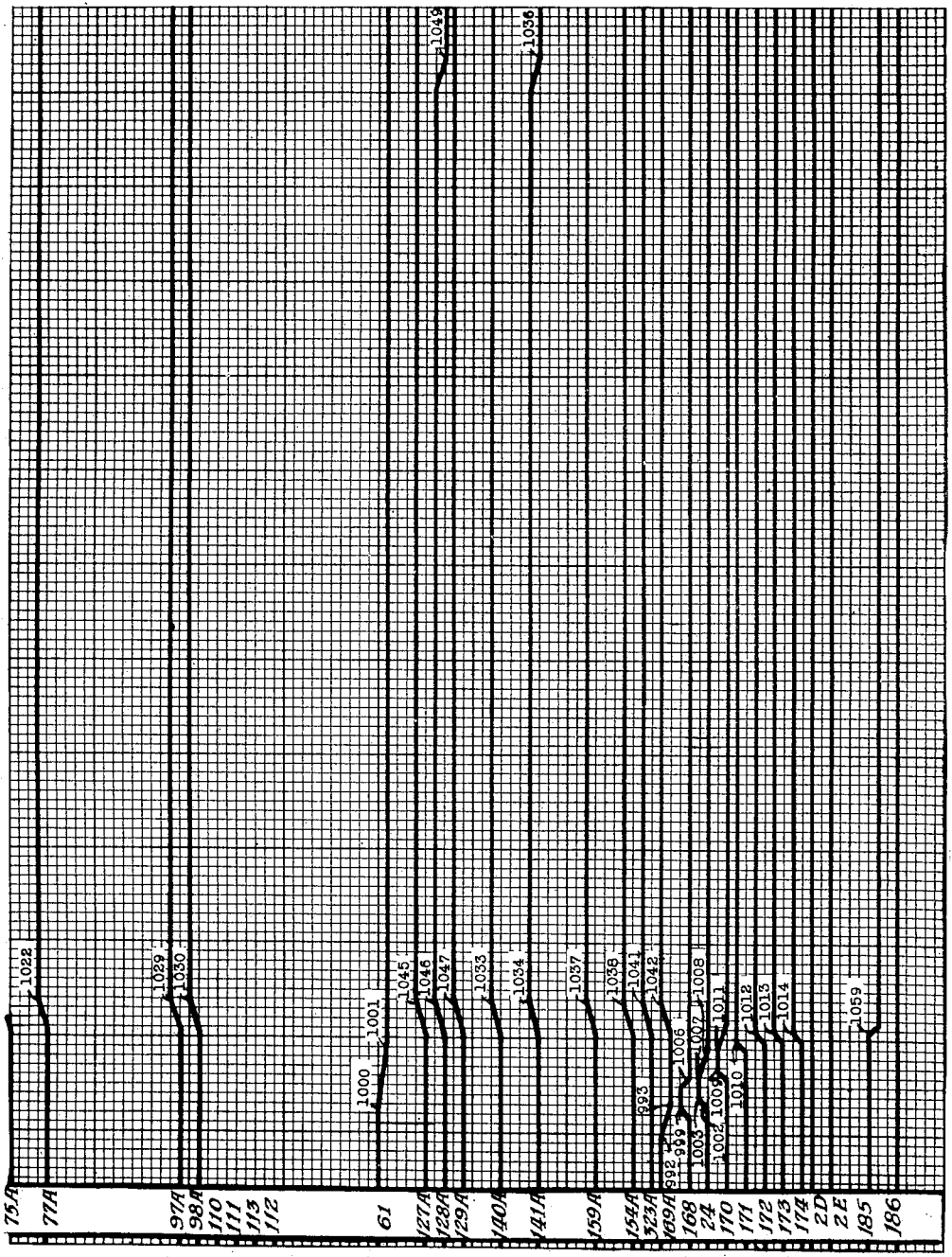
Figure 38:
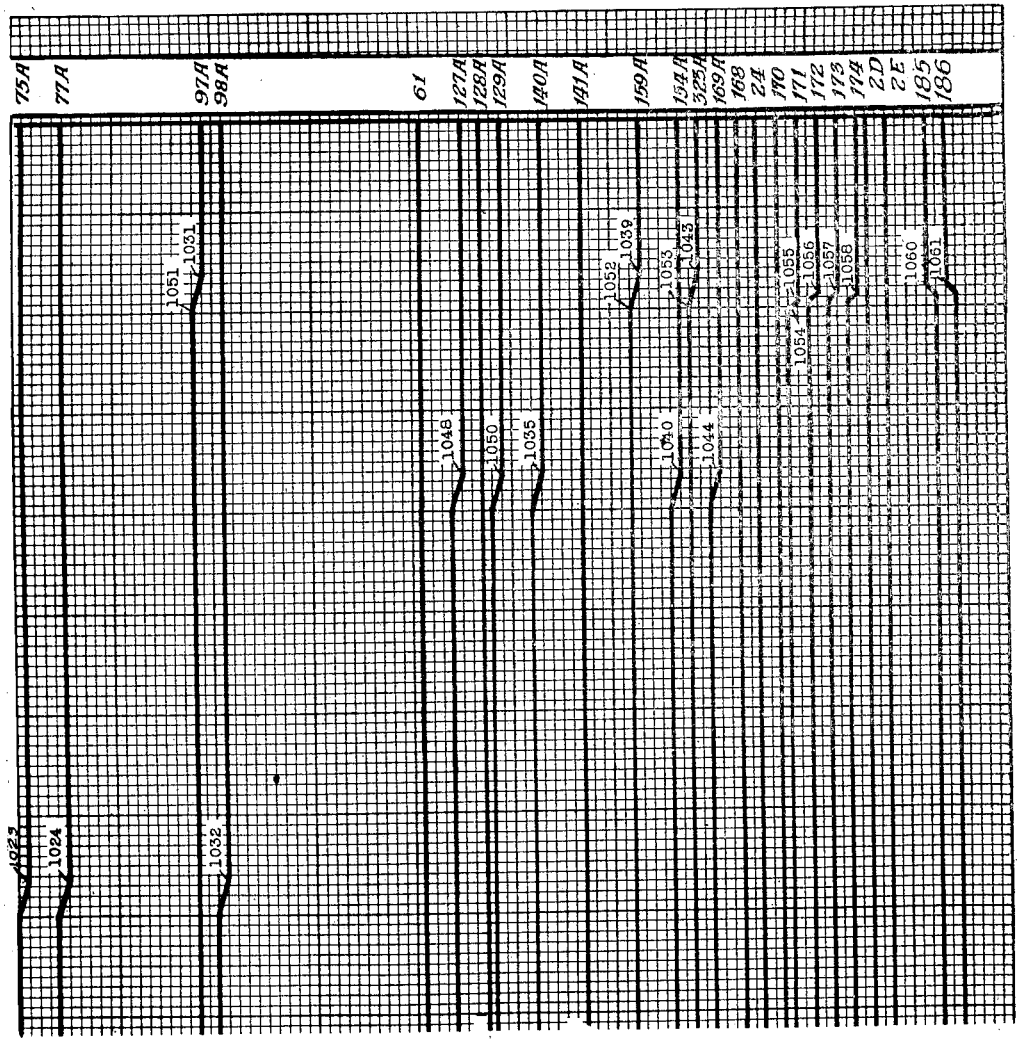

Figure 51 is a flow chart illustrating a typical operation of the machine in computing the charge for a consumption quantity sufficiently large to include both rate step quantities and a remainder.

Figure 52:
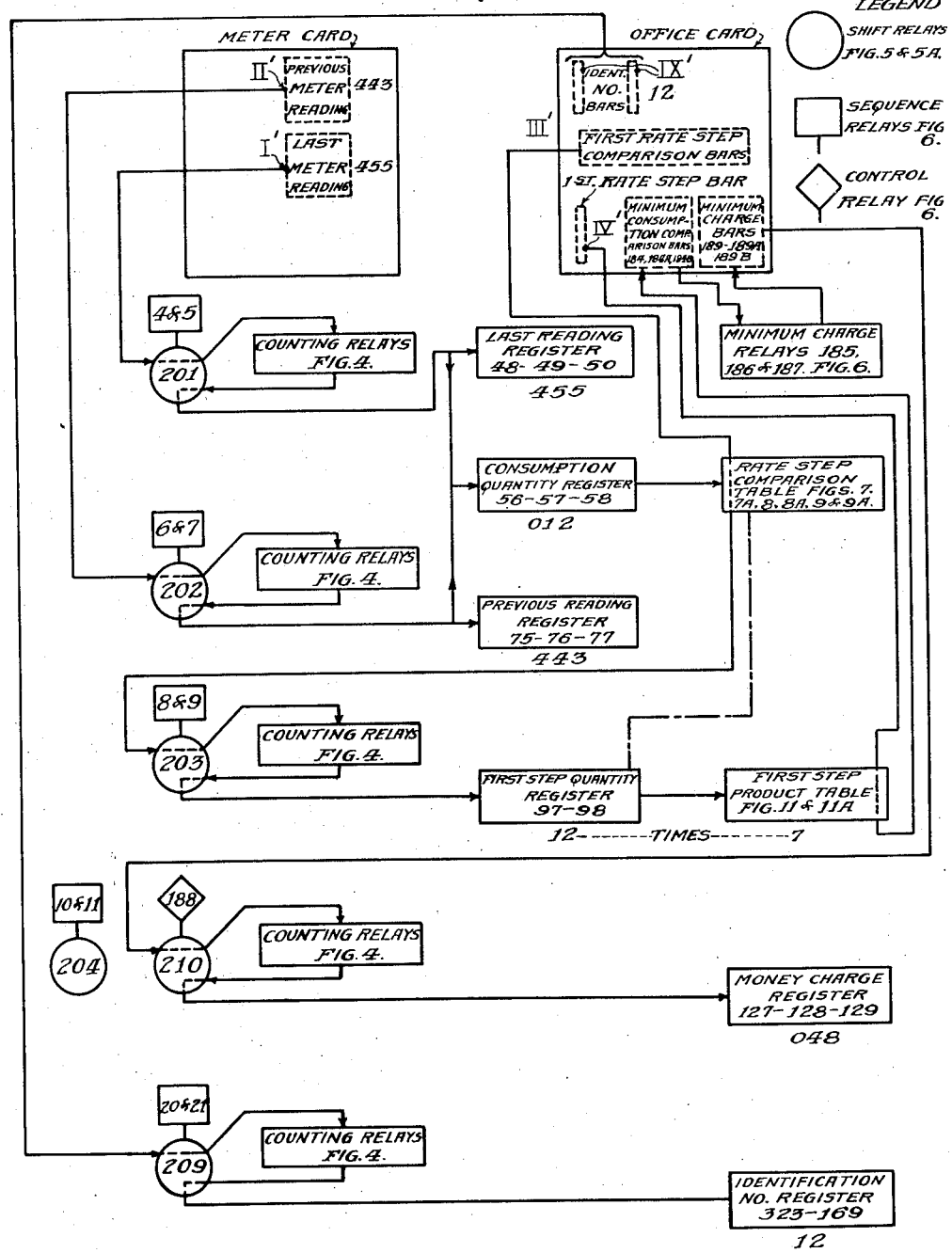

Figure 52 is a flow chart illustrating a machine operation entailing the entry of a minimum charge for a limited consumption quantity.

Description of apparatus

In describing the apparatus, which is made up very largely of conventional elements, I indicate the functions of many of the parts and circuits. A full account of the operation follows; in which only the circuits are traced in detail.

Figure 1:
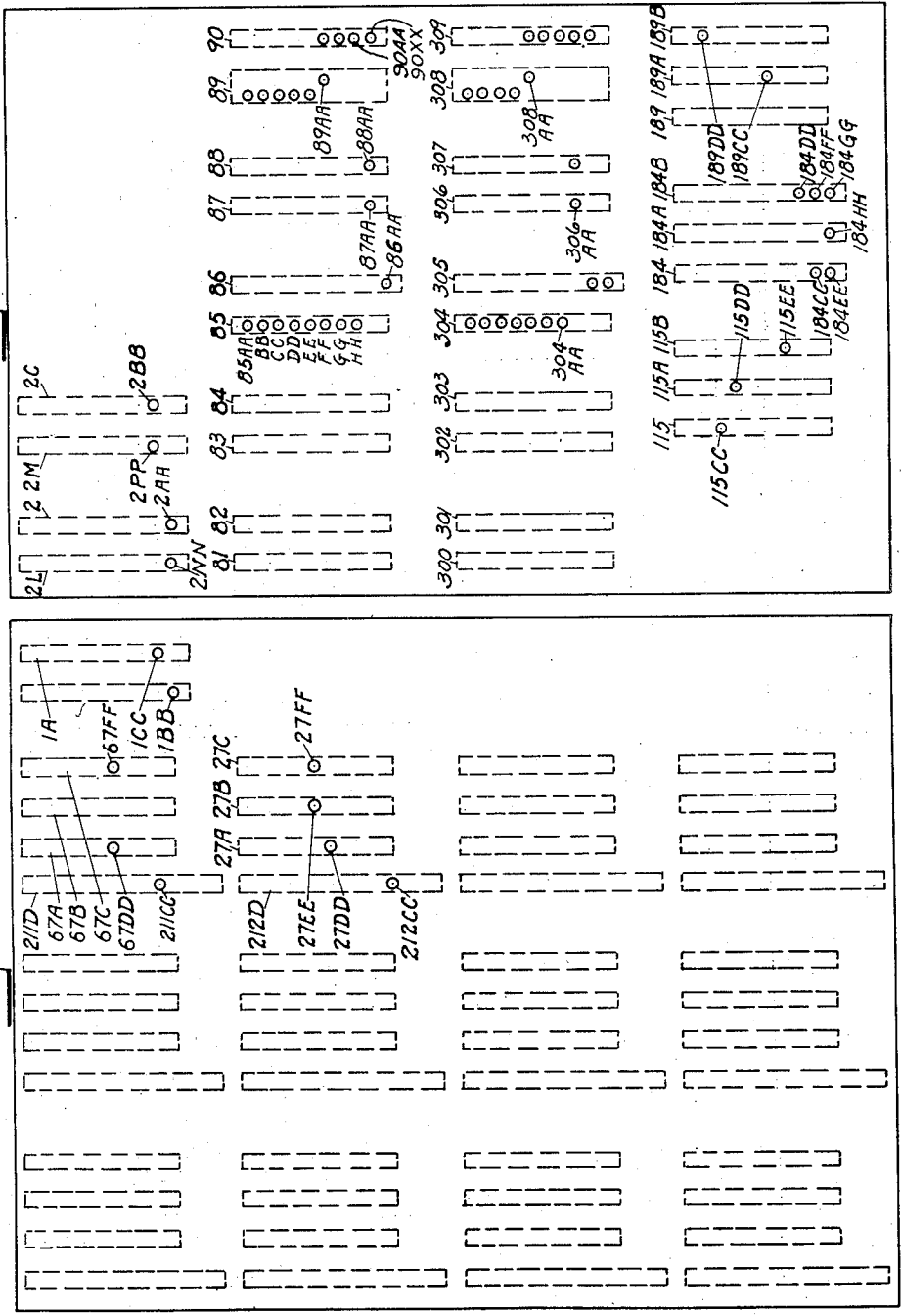
Figure 1 is an outline of a meter card for twelve months, with perforations for meter readings in September and October, and for the identifying number for matching with the office card. The bars are shown in dotted outline as they would be positioned in practice.

Perforated cards. Figures 1 and 1A

In the preferred form, two cards are illustrated as used for each customer. These cards have their conventional use of insulating sets of numerically positioned contact fingers from contact bars at all points except as contact is permitted through correspondingly positioned perforations. Through such sets of bars and fingers are led the potential electrical paths for most of the machine operations; current is directed into the paths determined by the perforations and the circuit arrangements.

The cards are shown in outline with their perforations shown as on bars which are indicated in dotted lines. These bars bear the same reference characters as appear in Figures 3, 7, 8 and 9.

Figure 1 outlines the meter card. It is designed for twelve months use, a set of bars being provided for each month. It is shown with holes, as from a meter reader's perforator, for September and October; the former, at 67DD and 67FF, representing here the "previous reading", 404 (there being no perforation for the 0); the latter, at 27DD, 27EE, 27FF, representing the "last reading", 455. The monthly perforations remain in the card; this month's last reading becomes next month's previous reading. For the selection for any month's billing of the proper perforations for the two readings, selecting bars 211D and 212D, with perforations respectively at 211CC, in the ninth position for September, and at 212CC in the tenth position for October, are provided. Their use is explained below in connection with Figure 3.

Figure 1A outlines the office card. This contains conventional perforations for three rates—115CC for 7, 115DD for 6 and 115EE (in position 3, however) for 1/3; for a minimum money charge of 48—189CC and 189DD; and for registering the identifying number, 12—2NN and 2PP. Special perforations for assuring the matching of the two cards are those at 2AA and 2BB, associated with 1BB and 1CC of Figure 1.

Perforations are indicated in special positions, for the minimum consumption bars, 184, 184A, 184B, for the comparison of numbers and circuit selection, and for the first step bars 81—90 inclusive and second step bars 300 to 309 inclusive for the comparison of numbers and selection of limited registering and computative actions. These are in accordance with a peculiar system for the comparison of numbers and selective electrical action which is explained at length in my specification Serial Number 572,075, and more briefly herein in connection with Figure 3.

*Registering wheels. Figure 2*

In Figure 2 are shown three groups of registering wheels, in conventional form, driven by motor 52 and its associated gears and shafts. The three wheels shown in line with 500—500 are for the purpose of registering the last meter reading, and indirectly of computing the consumption quantity; they are advanced to their numerical position by the action of counting relays (Fig. 4) as described in the first sequence of operation. The three in line with 502—502 are for a like purpose in relation to the previous meter reading and consumption; they are likewise governed by the counting relays. The three in line with 501—501 are gear-driven in connection with the last and previous reading operations, for the purpose of registering their numerical difference, which is the consumption quantity.

Each registering wheel assembly, alike for the previous and last readings, includes for each order of numbers, a number wheel, or band, as 49 (in the tens order of last reading), a zero-setting wheel, as 49B, and contact, as 49E, a shunting wheel, as 49C, a shunting contact, as 49D, and a conventional magnetic clutch, as 49A. These wheels ride freely on their several shafts; they are driven with the shaft when connected thereto by a clutch, as 49A, under control of the counting relays of the order, as 29 and its mate 41 (Fig. 4). The armature of the clutch is attached to the shaft; the field piece is formed by the hub of the wheel; the coil is stationary. Associated with each assembly is a gear, as 54, and its clutch as 54A.

A consumption wheel assembly is fully described and illustrated in detail in my specification Serial Number 563,572. The assembly for each order of numbers is composed of two divisions—one including a number wheel, as 57 (in the tens order), a zero-setting wheel, as 57B, zero-setting contacts, as 57H, a zero-setting clutch, as 57A, a carry-over wheel, as 57W, and contact, as 57J; the other division including a carry-over clutch, as 57N, a carry-over shunting wheel, as 57F, and contacts, as 57L, a gear wheel, as 57E, a contact-closing wheel (less contacts), as 57D, a carry-over contact-closing wheel, as 57S, and contact, as 57K, a back stop wheel, as 57C, a back stop, as 57X. A fragmentary side view of a contact-closing wheel, with a full set of contacts, is shown in Figure 8. A sleeve, as 57M, serves for both divisions of the assembly, and a clutch, as 57G, serves to bind them together, so that the two may move in unison, riding freely on shaft 59. The three back stops, 56X, 57X, 58X, are joined to bar 60, which is for the purpose of closing contact 60B by pin 60A when off zero, and closing contact 60D by pin 60F when at zero. Related electrical connections are described in connection with the operations. Special descriptions are given below of the special wheels and of the carry-over equipment.

The entire consumption assembly is driven clockwise equivalently with the last reading wheels by shaft 51, clutch 54A, gears 54 and 57E, and clutch 57G, and counterclockwise equivalently with the previous reading wheels by shaft 322, clutch 79A, gears 79 and 57E, and clutch 57G. The right-hand division is later driven backward on the several steps of subtraction in connection with rate steps by gears 57E, 54, 105A.

For a transfer operation to effect a carry-over between the last and previous readings, both divisions of the consumption assembly are moved by the action of a clutch, as 57N, a shunting wheel, as 57F, shunting contacts, as 57L, gears, as 57E and 79, and a clutch, as 79C. For a transfer operation involving the carry-over movement of the contact-closing wheel division, as related to wheel 57D, gears 57E and 79, clutch 79B, shunting wheel 79D, and shunting contact 79E, are effective. Full details of the mechanism are included in the specification referred to, 572,075.

*Contact bars and fingers. Figure 3*

The contact bars and fingers of Figure 3, and of Figures 7, 8 and 9, are of conventional form, and substantially alike. Their purpose is to complete selected electrical paths through the various card perforations.

The wiring of each set of fingers is made up to form a cable; the cable is shown as broken off at a point near the fingers and at a point near the other terminus—at both places bearing the same reference character.

The bars included in Figure 3 are: last reading, 27A, 27B, 27C, at 513; previous reading, 67A, 67B, 67C, at 511; rate multiplier, 115, 115A, 115B, at 514; minimum consumption, 184, 184A, 184B, at 515; minimum money, 189, 189A, 189B, at 516; identifying number, 2L, 2M, and matching, 2 and 2C, at 518; and meter card matching bars 1, 1A, at 517.

For the last and previous reading, rate multiplier, minimum consumption and money, and identifying number bars, each finger is in a numerical position, and (except for the minimum consumption fingers on bars 184, 184A, 184B, and rate multiplier fingers on bars 115, 115A, 115B) is wired to a correspondingly positioned contact in a shift relay, as 201 (Fig. 5). Units finger 27F is the fifth finger counting up from the bottom; it is wired to contact 26C, the fifth contact counting from right to left in the left-hand group of 27 contacts. There are as many contacts in the left-hand section of each shift relay as there are fingers on the bars enumerated, or nine each for units, tens, and hundreds.

As will be illustrated in detail in the description of operation, bars for previous and last readings, identifying number, and rate multiplier, are momentarily grounded at different stages of operation by the deenergization of the first relay, as 4 (Fig. 6), of a sequence relay pair, and in turn energizes the due counting relays (Fig. 4). The ground is removed by the deenergization of the second relay of a sequence relay pair, as 5 (Fig. 6), leaving the counting relays still energized through a local circuit. The minimum money bars are an exception as to the source of their grounding; they receive current upon the energization of relays 185, 186, 187 (Fig. 6) contingent upon the consumption wheels returning to zero within limit of the minimum quantity perforations—in the example, 12.

Of like conventional form, but with special circuit connections, for the purpose of effecting numerical comparisons and alternative registrations, are the minimum consumption bars (Fig. 3 at 515) and the first step and second step comparison bars (Figs. 7, 8, 9, respectively in line with 475—475 and 476—476), all of which are described at length in my specification Serial Number 572,075, and more briefly hereinafter. The circuits are traced in the description of operation.

For a minimum consumption in two digits, three bars are illustrated in Figures 1A and 3, of which 184B is the units bar, 184 the tens equal bar, and 184A the tens control bar. Each of these has ten spaces for perforations, 0 to 9. As illustrated in Figure 1A, the perforations for a minimum comparison of 12 are: for the tens equal bar, 184, in the position of the standard figure (1) and for every lower figure, i. e., perforations 184CC and 184EE in positions 1 and 0; for the tens control bar, 184A, in every position lower than the standard figure, i. e. 184HH, in position 0; for the units bar, 184B, in the position of the standard figure (2) and in every position lower, i. e., 184DD, 184FF, 184GG, in positions 2, 1, 0.

Through the preferred circuit, as illustrated, there comes to be a special path from the closed contact-closing wheel contacts, as 97B, 98B (Fig. 11), through the fingers and bars (Fig. 3) and relays, as 185, 186 (Fig. 6), if two or three of the bars are grounded by reason of coincidence of wheel position and card perforations. This path is utilized to effect the registration of a minimum money charge according to perforations for bars 189A and 189B. An illustration of the operation is included under the heading Operation for minimum charge.

Four sets of meter reading bars are shown at 510, 511, 512, 513, instead of twelve monthly sets as indicated in Figure 1. Each set includes meter reading bars, as 27A, 27B, 27C, a selector bar, as 212D, and a relay, as 27G. Common to all sets of selector bars are switches 213, 211, 214, 212. The monthly bars are so wired that any set may be used for any month; for example, each finger, as 67D, at 511, the No. 4 finger in the hundreds order, is wired in multiple through cable 68 and conductors as 69A, 68A, to finger 27D and all other No. 4 fingers in the same order.

Each meter reader's card contains twelve separate fields in each of which meter readings may be perforated, the machine being responsive to two such meter readings, one for the last month and one for the previous month. The card is always placed in the same position with respect to the meter reading bars irrespective of the field in which perforations for a particular month are made. Multi-contact switches 211 and 212 ground conductors as 211A and 212A which lead to corresponding fingers cooperating with the various selector bars as 212D. When, for example, the switch 212 is set on the third contact from the right, Fig. 3, ground will be extended to the number three wire 212A leading to all of the numbers three fingers as 212C cooperating with the selector bars, but since only a card field cooperating with one of the selector bars will have a number three perforation therein, the only meter reading field to be sensed will be the field controlled through such one of the selector bars.

For the purpose of preselecting a set of meter reading bars for use, a system is provided, consisting of two sets of switches, 213 and 211, 214 and 212, a bar, as 212D, and twelve fingers, as 212C, one for each month. Switches as 211 and 212 have a contact for each month—twelve being shown, with four wired. The contacts of one switch are multipled to the like-positioned contacts of the other. Fingers, as 212C, are multipled to the other like-positioned fingers in the several sets of selector bars; these in turn are multipled to other like-positioned contacts in switches 211 and 212. Switches 213 and 214 are for the purpose of connecting switches 211 and 212 to conductors 66J and 66H, the last and previous wires, so that any reading may be made effective as last or previous.

With this arrangement, when wire 66J is grounded, with switches 214 and 212 set as shown in Figure 3, conductor 212A will be grounded, grounding finger 212C; and through perforation 212CC bar 212D is grounded, energizing relay 27G, grounding through conductors as 27H bars 27A, 27B, 27C.

To insure the discovery of loss or misplacement of a meter card in relation to the regular run of office cards, four matching bars, 1, 1A, 2, 2C, and their fingers, are provided. For registering an identifying number, bars 2L and 2M, and their fingers, are provided. It is convenient to use the identifying number for this safeguard—though if the identifying number should have half a dozen digits, it would hardly be necessary to use them all. For initially closing the matching, or safeguarding, circuit, contacts 2R and 1D are provided, one for each of the customer's two cards; these are shown in conventional form and are closed by the placing of the cards. On the closure of these two contacts by cards having the same identifying perforations, circuits are set up between bars 1 and 2 and between bars 1A and 2C, energizing relays 2D and 2E, and conditioning the machine for operation. Unless both these relays are thus energized, the starting circuit is incomplete. Bars 2L and 2M set up a circuit to the counting relays to register the number perforated for identification on special number wheels 168 and 169 (Fig. 14).

*Counting relays. Figure 4*

These relays, all of which are shown in the lower portion of Figure 4, are for the purpose of positioning the several number wheels, except those for consumption-quantity. There are three groups illustrated, respectively for hundreds, tens, and units, with nine pairs in each group for the digits 1 to 9. They are arranged in a chain of two rows of relays for each order of numbers. Relays 28 and 31 as a pair represent 4 in the hundreds order; 29 and 41, 5 in the tens; 30 and 42, 5 in the units.

Each relay in the lower row, as 28, 29, 30, has three windings, as 28A, 28D, 28E. The first relay in the row to be energized will be energized from a contact finger, as 27D, through windings as 28D, which energization is momentary; once energized, relays as 28 lock up through windings as 28E, contacts as 28C and 40A, so long as contact 40A is closed. Such a circuit is traced in the description of the first sequence of operation.

On energization of such a relay as 28 from the fourth finger, as 27D, on the associated contact bar, as 27A, its mate, 31, is energized through contact 28B; relay 31 in its turn energizes relay 32 through contact 31C; and in like manner a relays representing lower numerical values in th chain are energized. Relay 38, designated a cut off relay, is in addition to the paired relays; i is first energized by contact 37C of the No. 1 pair and remains energized so long as contact 37C closed. On deenergization of relay 37, control relay 38 passes to contact 40A, through conta 38B and winding 38A. On energization of r lays as 30, contacts as 30F are grounded, energizing relay 84, opening sequence control contact T, deenergizing the sequence control relay 25 (Fig. 6). This removes ground from all the associated contact bars, 27A, 27B, 27C, and frees relays 28, 29, 30, from this source of energization. When these latter relays become energized, they are locked up through contacts as 28C and 40A, and hold their mates, as 31, energized through contacts as 28B.

On the energization of a cut-off relay, as 38, contacts as 38C, 38D, 38E, 38F, are grounded. Contacts 38C completes a circuit to energize stepping relay 40, closing contact 40B and opening contact 40A with a make-before-break effect. On the opening of contact 40A, relay 28 is deenergized, through contact 28C and winding 28E; and on the closing of contact 40B, relay 31 is held energized through contact 31B and winding 31A so long as relay 40 is energized.

Subject to the energization of relay 40 as effected by closing the contact 38C, energization and deenergization of relay 40 are alternately effected by a shunting contact as 48D (Fig. 2) which is closed and opened by the contact closing or shunting wheel 48C associated with the number wheel 48, shunting wheel 48C closing and opening contact 48D in each digital advance of the number wheel 48 so that the contact 48D is closed and opened during the movement of each digit on the number wheel 48 into registering position during an advance of said wheel.

The result is to count the number represented by the position of the effective finger on the contact bar and of the first-energized counting relay, and to advance the number wheel accordingly. This one lot of counting relays is the means of positioning all number wheels except the gear-driven consumption wheels, 56, 57, 58 (Fig. 2).

The counting relays and the carry-over relays, described more fully hereinafter, (Fig. 4) are shown wired to a common cable, 250. The three groups of nine wires each are for initially energizing the selected relay; they are formed in one leg of the cable, 250A; they lead to like-positioned contacts in the left-hand group of contacts of shift relays (Figs. 5 and 5A). The contacts of the several relays, as 44E and 44D, are wired by means of conductors, as E and F, to another leg, 250B, and are multipled to the contacts in the right-hand group of the shift relays. Conductors are lettered A to S; each occupies a position in the shift relays corresponding to its letter, beginning with A as the first right-hand pair.

*Carry-over apparatus. Figure 4*

Carry-over action may be required on consumption wheels (Fig. 2 on a line with 501—501) as they are driven subtractively by the previous reading wheels (Fig. 2 on a line with 502—502), or on the consumption contact closing wheels 56D, 57D, 58D, (Fig. 2 on a line with 501—501), as they are driven subtractively by the first step, second step, and remainder wheels (Figs. 10, 10A, 10B). The wheels of the different orders in all of these registers are driven separately and simultaneously, and any carry-over action must be effected after they are stopped from such driving.

Associated with the necessary wheels are conventional carry-over contact closing wheels, as 57W with consumption number wheel 57 (Fig. 2) and 57S with consumption contact-closing wheel 57D and 128H with money wheel 128 (Fig. 15) to initiate a due carry-over action.

In Figure 4 denoted generally at 425 are shown the carry-over relays and connections, in two orders of members to carry over from units to tens and from tens to hundreds. Relays 110, 111, 113, are for the former; 160, 161, 163A, for the latter. Examples of their action are given under operation headings. The operation is essentially the same as that of the counting relays, though the relays of the lower row, as 110, have two windings instead of three.

In the present machine there is but one such equipment for all purposes; this is made selectively available for any required carry-over action, through the medium of shift relays.

*Shift relays. Figures 5 and 5A*

The ten shift relays, 201 to 210, are for the purpose of momentarily connecting, in the due order of use, the several groups of fingers to energize the counting relays and the carry-over relays, and to connect the operating circuits of the counting relays to the several clutches of the number wheels. They are here shown for the first time.

There is one multi-contact shift relay for each of ten operations governed by counting relays: respectively, last reading, previous reading, first step registering, first step rate multiplication, second step registering, second step multiplication, remainder registering, remainder multiplication, identifying number, minimum money charge. The relays are alike in construction and use, except that the number of contacts in the right-hand portion varies with the number of circuits to be established.

Each shift relay, as 201, consists of an operating magnet, as 26, and two groups of normally open contacts, as 26A. The left-hand group contains a pair of contacts for each counting relay; the right-hand group a pair from each branch of the circuit from the operating contacts of the counting relays to the clutches and other parts of the number wheels.

These shift relays are controlled from the sequence relays (Fig. 6), and each in turn is energized so long as its operation is in progress. When energized, armatures, as 252, close all contacts by means of bars, as 252A. The right-hand contact of each pair of contacts, in the left-hand group, is wired to a cable, as 68, which terminates in a like-numbered cable in Figure 3. A like contact in the right-hand group is wired to a cable, as 47, which also terminates in a like-numbered cable in Figure 2. Other like relays have other like cables terminating near their connecting apparatus. The left-hand contact of each pair of contacts, as 26C, is wired to cable 250, through branches, as 250A, to a relay as 30; and each such contact of each pair in each shift relay is likewise multipled to each other in cable 250 and to a relay as 30.

One side of the left-hand group of contacts of shift relays 201 and 202 is multipled in cable 68, as both relays have access to the meter reading bars, as at 511 and 513 in Figure 3. One side of the right-hand group of contacts of shift relays 204, 206, 208, 210, is also multipled in cable 126, as all four relays have access to the money wheels (Fig. 15).

Contacts P3, Q3, L3, K3, and P5, Q5, L5, K5, are also multipled in cable 109, to effect carry-overs on the consumption wheels (Fig. 2, 501—501), on the movement of the first and second step registering wheels (Figs. 10 and 10A).

The shift relay for each operation is energized at the beginning of the operation, and so continues until the beginning of the next. These relays operate in their order as here numbered from 201 to 209 if there is a full round of operation. If the consumption is less than the first step, then only relays 201, 202, 203, 209, and 210 operate. Relay 210 is for the purpose of connecting the minimum money bars to the counting relays for registering the minimum money charge on the money wheels.

Contact X3 (Fig. 5—shift relay 203) is for the purpose of energizing slow relay 194, in order to prevent the premature release of relay 20 as is described in connection with the operation for minimum charge.

Sequence relays. Figure 6

The sequence relays are illustrated in the upper portion of Figure 6. They are of a conventional double-wound type, with conventional contacts. Their function is to govern the sequence of operations, not in an invariable order, but with provision for eliminations in certain computative contingencies, without loss of time or cycle-completing movements. The circuits and actions of particular sequence relays are detailed in the descriptions of the sequences of operation.

The sequence relays are associated in a chain of pairs, numbered 4 and 5, 6 and 7, successively to 22 and 23; numbers 12 to 19 being in a subchain of four pairs. They are at first energized, or prepared for energization, by the closing of key 3. This energizes relay 4, closing contact 4B, energizing relay 5, which grounds contact 5C, energizing relay 6, and so on until the chain to pair 10—11 is energized. Pair 20—21 is energized from relay 5, contact 5E, and in turn energizes relays 22—23 and sequence control relay 25, the latter finding battery through contact 23C and ground through contacts V, U and T (Fig. 4). Energization in this manner of relay 25 immediately deenergizes relay 4 of the pair 4—5. The contacts 25B and 25C controlled by the relay 25 are make before break contacts. The even-numbered relay of each pair is deenergized by the opening of contact 25C in due turn on successive energizations of control relay 25; the odd-numbered relays on such deenergizations, by the opening of contact 25B.

Each pair governs an operation. In example, relay 4 on deenergization opens contact 4B, freeing relay 5 through its winding 5F from relay 4 as an energizing source, and placing it under control of relay 25 through winding 5A, contact 5B, and contact 25B, and at the same time closing through contacts 4E and 5D the starting circuit for the first operation. The sequence control contacts T, U and V (Fig. 4) are selectively opened in the course of each operation, as is explained more fully hereinafter, and the opening of any of these contacts frees control relay 25 from ground which thereupon deenergizes and this deenergizes the odd numbered sequence relay, in the present instance relay 5, which in due time opens the starting circuit. It requires the closure of all control contacts T, U and V to energize again the control relay, deenergize the next even-numbered sequence relay, and start the next operation.

There are sundry contingent actions in the machine, to which sequence relay actions are adapted.

Relays 9 and 11 of pairs 8—9 and 10—11 have a separate source of deenergization—contact 187A of relay 187. The pair 8—9 governs the first step registering, 10—11 the first step multiplication. When the minimum charge operation is effective (as described under an operation heading), such multiplication is to be eliminated—an effect obtained through contact 187A. When there is no consumption, relays 8—9 are also released.

Pairs 12—13, 14—15, 16—17, 18—19, are associated in a subchain which becomes actually energized upon the movement of consumption back stop wheels, 56C, 57C, 58C (Fig. 2), from zero, and which may be deenergized entirely at any computative stage by the return of such wheels to zero. This enables unnecessary operations to be eliminated and tends to speed up the machine, and when the back stop wheels 56C, 57C and 58C have returned to zero, say for example during registration of the second step quantity, in a manner explained hereinafter, the sequence relays 16, 17, 18 and 19 will be released since there will be no remainder on the consumption wheels and consequently the remainder registration and remainder multiplication effected under control of the sequence relays 16, 17, 18 and 19 will be and may be eliminated. The release of each pair of sequence relays is effected in the manner described for the pair 4—5.

Pairs 20—21 and 22—23 are energized on all operations: 20—21 from contact 5E of relay 5, at the same time as relay 6, for the purpose of registering the identifying number; 22—23 from 20—21, to hold the number wheels at the close of all computations for a given bill, and to start the zero-setting operation to prepare for the next bill.

Pairs 20—21 and 22—23 have as one source of energization contacts such as 5E on each of the odd-numbered relays, except 21, which holds them energized from contact 21C. The object of so holding them energized on each sequence of operation is that they may be placed under control of contacts 25C and 25B of sequence control relay 25 at any stage of computation that may result in disposing of the registered consumption quantity.

Each even-numbered relay, as 4, and excepting 22, has a contact, as 4D, for energizing shift magnets, as 26, on each sequence of operation. When closed, it is grounded from a contact, as 6B, from the beginning of one sequence to the beginning of the next, at which time relays such as 6 are deenergized.

Auxiliary relays. Figure 6

Certain relays have sundry functions in relation to the sequence relays.

Relay 61 is for the purpose of setting up a circuit from contacts 62B and 61A to condition relay 187 for operation in event the minimum charge operation becomes effective. It is prepared for energization by contact 23E, and is energized by contact 60B (Fig. 2) on the movement of the consumption wheels from zero. It is held energized through contact 61B until a minimum operation is started or until the beginning of the zero-setting operation.

Relay 62 is for the purpose of supplying battery through contact 62A, conductor 62C, to sequence relays 13, 15, 17, 19, when it is energized. When deenergized, contact 62B grounds contact 61A as above described. This relay is also prepared for energization on the closing of contact 23E; it is energized on the movement of any of the consumption wheels from zero; it is deenergized on the return of all such wheels to zero.

Relay 187 momentarily grounds, through contact 187C and conductor 187F cable 66, cable 66 (Fig. 3), conductor 66B, the minimum money bars 189, 189A, 189B. Contact 187A removes battery from conductor 187E and sequence relays 9 and 11 on a minimum charge operation. Contact 187D energizes relay 188.

Relay 188 when energized opens contacts 188B and 188D and closes 188C; contact 188B releases, through conductor 188E and contacts 188C and 61B, relay 61 on a minimum charge operation. Also contact 188D, through conductor 188G and contact 18D as described for the minimum charge operation, prevents superfluous operation of shift relay 208 (for the remainder); and contact 188C, through conductor 188H, energizes shift magnet 191. Once energized, relay 188 remains locked up through contact 188A, conductors 193 and 193A, contact 23E, until the end of the sequence relay operation.

Relays 185 and 186 are the minimum control relays. As described for the minimum charge operation, they are energized from the minimum consumption bars 184, 184A, 184B; they can be effective only when the consumption wheels return to zero within the limit of the perforations for these bars. If the first step quantity is 14 and the consumption figure is in units only, say 1 or 9, bars 184 and 184A are grounded and relays 186 and 185 energize; if the consumption is in two digits, say 11, bars 184 and 184B are grounded and relays 186 and 185 energize. As described for the minimum charge operation, they establish at contacts 186A and 185A one leg of a circuit to energize relay 187 on a minimum charge operation; also, through contacts 185B and 186B and conductor 185C, the circuit to shift magnet 114 is opened, preventing its superfluous energization for multiplication.

Relays 170, 24, 168, are for the purpose of holding the number wheels for reading and for starting the releasing operation. They are controlled from sequence relays 22 and 23. Relay 168 is energized from contact 22E of deenergized relay 22 and contact 23D of energized relay 23 on the last operation of the sequence relays; contact 168C releases relay 61 if the operation advances to or beyond the multiplication of the first step; contact 168A energizes slow relay 24 on energization of relay 168; contact 168B grounds contact 24B of relay 24 which remains energized a predetermined length of time for the purpose of energizing relay 170 in turn a predetermined length of time. Relay 24 energizing opens contact 24A, releasing sequence control relay 25 on its final operation, releasing relay 168, closing contact 168B, energizing through contact 24B relay 170. Relay 24 deenergizing closes contact 24C; and as relays 168 and 24 are released, with slow-to-release relay 170 still energized, contacts 24C and 170A complete a circuit to the zero-setting relay 171 (Fig. 10), starting the zero-setting operation.

*Contact-closing wheels, contacts, contact bars, conductors. Figures 7, 8, 9, 7A, 8A, 9A*

Sundry wheel assemblies include contact-closing wheels, conventional in form: the consumption wheels (Fig. 2), the first step registering (Fig. 10), second step registering (Fig. 10A), and remainder registering (Fig. 10B). The purpose of each of these is to establish circuits, according to numerical position, to govern a succeeding operation.

Each such wheel has a stud, situated as at zero, which in any numerical position of its associated number wheel closes all of a series of contacts situated relative to it in that position. In Figure 7, and in Figure 7A its extension, are shown ten such series of contacts, with contact-closing wheel 56D in fragmentary side view (Fig. 7) for the hundreds; in Figures 8 and 8A, wheel 57D and a like series for the tens; and in Figures 9 and 9A, wheel 58D and a like series for the units. These figures show also the circuit connections of these contacts with fingers of contact bars and with cables leading to shift relays. The bars in line with 475—475 in the three upper figures are for the first step of comparison and registration; those in line with 476—476 are for the second step. The wheels are shown in neutral positions.

They are all fully described in my specification Serial Number 572,075. Their mode of operation, with tracing of the circuits, will appear below under various operation headings.

First step comparison bars are numbered 81, 82, 84 (for hundreds), 85, 86, 88 (for tens), and 90 (for units); second step bars, correspondingly, 300, 301, 303, 304, 305, 307, and 309. In each order with the comparison bars is a special registration bar: for the first step, 83 (for hundreds), 87 (for tens), 89 (for units); for the second step, respectively, 302, 306, 308. Special perforations for such bars are illustrated in Figure 1A. Fingers associated with these bars are connected by conductors to counting relays (Figure 4) through the contacts of the shift relays (Figs. 5, 5A), and to contact-closing wheels (Figs. 10, 10A, 10B) also through shift relays. The bars are shown with their circuit connections in Figures 7, 8, 9; the first step in line with 475—475, the second in line with 476—476. Their operation is included under operation headings below.

Briefly as to the perforations and their effects: In the first step, the three comparison bars for the tens are designated, 85 a high bar, 86 (with a zero space) a low bar, 88 an equal bar; that for the units, 90, is a combined equal and low bar. Those for the hundreds correspond to those for the tens. The bars for registration, 83, 87, 89, respectively for hundreds, tens, and units, are designated maximum bars, their function being to register the maximum amount in the first step (in the example, 14) when this is reached or exceeded—any excess of consumption above such amount belonging to the second step. In the tens order, the perforations for the high bar are in every position above the standard figure (1), as 85AA to 85HH, the lowest being in the 2 position; the perforations for the low bar are in every position below the standard figure, as 86AA in the 0 position; for the equal bar and for the maximum bar, in the position of the standard figure, as 88AA and 87AA respectively, in the 1 position. For the units combined bar, 90, is a perforation in the position of the standard figure and every lower position; for the maximum bar (which includes the functions of a high bar), there is a perforation on the right-hand side in the position of the standard figure, and on the left side in every position above.

Fingers positioned numerically on all of these bars are connected with conductors extending to contacts closable by the contact-closing wheels in corresponding numerical positions. From such wheels conductors extend also to the correspondingly positioned counting relays governing the first step registering wheels. From the fingers of the maximum bars, 83, 87, 89, circuits extend also directly to such relays. Circuits as thus referred to will be traced in the description of the third and fifth sequences of operation.

From the sequence relay controlling the operating sequence (in the illustration, the third), all comparison bars are grounded, but not the maximum bars. According to the standing of the contact-closing wheels for the several orders, corresponding fingers are grounded through the perforations, making some one of the three comparison bars in each order (above the lowest) effective. High bars can not be made effective for energizing counting relays and producing registrations except through maximum bars; low and equal bars may effect such results through contact-closing wheels.

Associated with high bars 81 and 85 are high relays, respectively 310 and 312. Relay 310 is energized from bar 81, through a finger, as 81F, conductor, as 81G, contact, as 81H, conductors, as 81J and 81K, when the hundreds wheel stands in a higher position than the standard figure. When energized, relay 310 grounds the three maximum bars, 83, 87, 89, from its contacts 310A, 310B, 310C, and energizes directly through their perforations in the equal positions the corresponding counting relays. Relay 310 prevents through its contact 310D the energization of relay 313, which might otherwise effect energization of counting relays according to contact-closing wheels. Relay 312 serves in a like manner for the tens.

Associated with low bars, 82, 86, are low relays, 311, 313. Relay 311 is energized from bar 82 when the hundreds wheel stands in a lower position than the standard figure. When energized, it grounds through contacts 311A, 311B, 311C, conductors, as 311E, and contacts, as 311F, energizing counting relays directly from contact-closing wheel contacts. Also it opens contact 311D and prevents energization of relay 312. Relay 313 serves in like manner for the tens.

In the units position is a combination bar, 90, for which the card is perforated in the equal and every lower position, and from which a registration is effected according to any coincidence of a finger contact and the contact-closing wheel position. Bar 89 is also a combination bar. Fingers on its high (left) side are connected with the wheel contacts, and on its maximum (right) side directly with the counting relays. Grounding any contact on this bar energizes the counting relay connected with the contacting finger on the maximum side.

The portions of the card cooperating with the maximum bars, 83, 87, in the two orders above units are perforated in the positions of the standard figures for the respective orders. Each is made effective to register such figure, without regard to the position of the contact-closing wheel, when grounded by the high relay associated with the high bar. In the units order there is no comparing function that can affect any lower order, and the provision for maximum registration can be combined in one bar, 89, with the high card perforations. If the contact-closing wheel position coincides with any such high perforation, the registration is effected for the equal position, from which only can a circuit be closed to the counting relays.

The bars and their connections for the second step are similar to those described for the first step.

*Step registering wheels. Figures 10, 10A, 10B*

First step, second step, and remainder registering wheel assemblies, as associated with number wheels 97, 98 (Fig. 10), 140, 141 (Fig. 10A), 198, 159, 154 (Fig. 10B), including shunting wheels, zero-setting wheels, and contact-closing wheels, as mentioned in relation to Figure 2. When driven forward, successively under control of counting relays, they drive backward, through gears, the consumption contact-closing and associated wheels, with the effect of subtraction and of preparing the starting of the next operation due soon after the consumption wheels reach zero; at the stopping place of each, they register the amount of actual consumption in each of the first and second steps, whether all or part of the allowance as perforated, and the actual remainder, if any.

Their structure is similar to that of the registering wheels as described above. Their operation is detailed under several operation headings below.

*Multiplying contacts and circuits. Figures 11, 11A, 12, 12A, 13, 13A*

In Figures 11 and 11A are fragmentary side views of contact-closing wheels 97B and 98B of the first step registering wheels (Fig. 10), with their contacts and wiring shown in developed views. These wheels and connections are for the purpose of setting up circuits to register on the money wheels directly the predetermined product of their numerical setting (as of the first step consumption quantity) times the rate. At 490 are shown the tens first step contact-closing wheel 97B, and the tens sets of contact pairs in 0, 1, 2, order. Contacts as 117, 117A, are for setting up a transfer circuit from the tens to the units. Contacts as 177 and 178 are for setting up a part of the circuit for the minimum operation. At 491 is a like arrangement for the units wheel, with its ten sets or series of contact pairs, as 118 to 119A (in the No. 4 set, Fig. 11A, with eighteen pairs), for continuing circuits from the tens through for registration. This arrangement exemplifies a rate of 7.

Figures 12 and 12A are essentially the same, arranged for a rate of 6.

Figures 13 and 13A show the arrangement, in somewhat different form, for a rate of 1/3.

In my co-pending application, Serial No. 572,075, the method is that of repeated additions, controlled by counting and multiplying relays. The method herein developed is that of prearranged potential electrical circuits or paths adapted for connection in practically the same environment as before and for producing like results more directly and more speedily. Given the quantity setting and the selected ground connection, the only physical movements are those required to register the predetermined product.

With the description which follows of specific means are included some statements of principles and illustrations of adaptability.

While the process of registering the product of two factors, one settable and the other predetermined in the arrangement of circuits, is repeatedly referred to herein as multiplication, it is not the ordinary multiplying process of a calculating machine, or of theoretical arithmetic, wherein the multiplicand is added in so many times according to the multiplier. It is rather a short cut to the product, as in the reading of a multiplication table. As illustrated herein by the use of one-third as the nominal multiplier (equivalent in result to dividing by three), the method is equally applicable to short-cut registration of the predetermined quotient of division of a settable dividend. It will be understood that the terms of multiplication and division in phrases herein will sometimes relate rather to the result than to the process. In such multiplication, it may be noted, there is no real distinction between multiplicand and multiplier.

The examples in this specification are for multiplication by 7 (or of 7, indifferently), as in Figures 11 and 11A; by or of 6 (Figures 12 and 12A), and by 1/3 (or division by 3, indifferently) in Figures 13 and 13A. The capacity for 7 and 6 is illustrated with two orders in the settable multiplicand (tens and units) and three orders in the product; for 1/3, in four orders. It is to be noted that in a product by a whole number the units figure will always be the same with a given units figure in the multiplicand, while the tens and hundreds will show variations with variations in the tens figure in the multiplicand. If hundreds, thousands, and higher figures should be included in the multiplicand, the variations of any one of them would effect variations in no more than two figures of the product.

For the product registration, there are the three money number wheels (Fig. 15), each of which is governed in its movement, digit by digit, by the counting relays (Fig. 4). For each position, except zero, of each number wheel, there is a pair of these relays. As any pair is energized, it causes, in the manner elsewhere described, the associated number wheel to move forward as many digit places as may be represented by its numerical position. Connected with each relay pair (through a shift relay, as 204, not material to this explanation), is a registration conductor adapted to energize the pair when electrified through connection with ground. Of such conductors there are 27, nine each for hundreds, tens and units of product, illustrated by the three groups of vertical lines, 492, 493, 494, at the right in Figure 11. They are accessible in common to conductors from contacts closable by the contact-closing wheels, 97B and 98B, shown in fragmentary side view.

For closure by the stud on the units contact-closing wheel, 98B, in each numerical position is a set of sixteen to twenty contact pairs, as 118 to 119A (Fig. 11A), for the purpose of conditioning paths through transfer and registration circuits to become effective with the action of sequence relay pair 10—11. Each set above zero includes one contact for the (invariable) units in the due product, eight to ten each for the tens, and seven to ten each for the hundreds, according to the arithmetical requirements. From one contact of every tens pair, a conductor extends to a particular one of the nine tens registration conductors; likewise for the hundreds. From the other contact of the units pair, a conductor extends to common conductor 119, which is momentarily grounded in the fourth sequence of operation. From the other contact of every tens and hundreds pair, a conductor extends, in regular arrangement, to a particular one of a series of transfer conductors, which are severally connectable to a common conductor, 116A (likewise to be grounded), through a tens or hundreds contact, as 117, 117A, closable by the tens wheel, 97B. The transfer conductors are illustrated principally by the vertical lines under 491 in Figure 11. They are accessible in common to the conductors from the tens sets of contact pairs. (The vertical wires illustrated as connecting with contacts as 178, 177, 179, are related to the alternative minimum operation, as referred to below.)

The effect of multiplication is obtained through the systematic arrangements of connections between the several conductors and contacts, whereby a path predetermined for each due product is connected with ground and made effective to register for every possible position of the tens and units contact-closing wheels.

Reference characters are applied in Figures 11 and 11A to illustrate the operation with the wheels in the position of 14 (the assumed first step quantity) with a rate of 7 for multiplication. From the No. 4 set of contact pairs, 118 to 119A, assumed to be closed in the course of operation by the units wheel, it is observable that the conductors extend to the right to connect with the three groups of registration conductors. Observing the numerical postions of these latter conductors—1 to 9 from left to right in hundreds, tens, and units groups—, the terminating connections are: the units conductor, 119B, from contact 119A, in 8—which is always effective; the first tens conductor in 2; the second tens conductor, 117E, from contact 117D, in 9; and successively for hundreds and tens, in 1 and 6, 3 (with no tens), 3 and 7, 4 and 5, 5 and 1, 5 and 8, 6 and 5. The effective registrations would be respectively the products of 7 times 4, 14, 24, 34, 44, 54, 64, 74, 84, 94; or 28, 98, 168, 238, 308, 378, 448, 518, 588, 658. The due registration must be selected from among these possibilities according to the tens wheel position, whether at zero or an integer. The selection is through the grounding of certain common conductors.

From each of the several tens contacts, it is observable that two conductors, beginning with 117 (for product hundreds) and 117A (for tens) in the No. 1 position, extend to connect in regular order with transfer conductors. The regularity of the connections with these latter from the contact pairs is broken only by the omission of connections which might represent zeroes. The tens contacts, as 117, 117A, are connectable also with ground, through conductor 116A.

Returning to the reading of connections with the contact pairs in the No. 4 units place: The conductor to the left from units contact 119A connects with groundable conductor 119 (always to register 8 when the units wheel closes the No. 4 set). The first conductor to terminate in a tens registration conductor (to register 2) through its contact pair connects with the transfer conductor, 264, connectable to ground through the closure of the zero contacts, 264A, of the tens wheel. The conductor, 117E, terminating in the registration conductor for 9 of 98, through contact 117D, connects with the transfer conductor, 117C, third from the right, which is the one connecting with the tens conductor, 117B, from the No. 1 group of tens contacts. With the fourth conductor (the hundreds from this group), there is here shown no connection, since there is no hundreds figure due in the product. The fifth and sixth transfer conductors are groundable by the tens wheel in its No. 2 position; they are connected respectively through the contact pairs to the conductors that effect the registration of the 6 and 1 of 168. So it goes from the seventh and eighth for the registration of 7 times 34 to the nineteenth and twentieth for the registration of the 5 and 6 of 658, or 7 times 94.

These observations are typical, not only for the arrangement in Figures 11 and 11A, but also for that of Figures 12 and 12A illustrating a multiplier of 6. The only variations, except in the unessential detail of zero omission, are in the particular connections with the registration conductors to the counting relays, as predetermined for the entirely different series of products.

Below, in connection with Figure 16, are described rate selector multi-contact relays interpositioned in such manner as to permit selection to be made as among registration conductors connected up for different multipliers, with but one system of transfer conductors and contact pairs as here described.

It will appear that while the various contacts and transfer conductors must be arranged to conform to the regularity of the system of arithmetical numeration in order to provide a distinctive path for each number up to the capacity of the set-up, the terminals for registration may be arranged to register any arithmetical or even arbitrary relation that may be desired. The example of consumption assumed for illustrating operation herein is 51 k. w. h., divided into three rate steps of 14 at 7 cents, 25 at 6 cents, 12 at 1/3 cent, with total registration on the money wheels of 252.

The product of the multiplication of 14 by 7 is readable in Figs. 11 and 11A as 98 in which the units registration conductor for the No. 4 position of the units wheel may be seen as the uppermost conductor 119B, which terminates in the No. 8 conductor to the units group 494 to the counting relays, and is traceable through the units contact pair 119A to conductor 119, which is momentarily grounded in due course of operation. The tens registration conductor is the third, 117E (Fig. 11A) which terminates in the No. 9 conductor 493 to the counting relays and is traceable through its contact pair 117D, transfer conductor 117C, and the No. 1 set of contacts 117A, assumed to be closed by the tens wheel, to conductor 116A, to be grounded in due sequence.

The product of the multiplication of 25 by 6 in the second rate step, referred to above, is readable in Figs. 12 and 12A as 150. Since there will be no significant digit in the units order, in this case, there is no conductor leading from the No. 5 switch group, shown in Fig. 12A, and corresponding to the conductor 119B, described above, with reference to the first rate step, and as shown in Fig. 11A. The tens and hundreds registration conductors are, respectively, the third and fourth conductors, designated as 146E and 145E, terminating in the fifth and first of their conductors designated, respectively, as 146F and 145F, and leading to the counting relays, and traceable through their contact pairs, 146D and 145D, conductors 146C and 145C, transfer conductors 146B and 145B, and the No. 2 set of contacts, 146 and 145, assumed to be closed by the tens wheel 140B (Fig. 12) to conductor 116B, to be grounded in due sequence.

It will also appear, while observing this arrangement for the setting of 51, that the registration connections could be changed to effect the registration of 17 as the quotient of division by 3, or 34 as the product of multiplication by 2/3. The change would leave ineffective the particular conductor now shown as terminating for the 3 of 357, or the corresponding transfer conductor. Under the heading next below is a description of multiplication by 1/3, illustrated in Figures 13 and 13A, from which are omitted such circuits as would be superfluous for this purpose alone.

The particular multipliers herein illustrated, by an arrangement of circuits adapted to a multiplicand in two figures and a product in three, are 7 and 6; by an arrangement of circuits adapted to a multiplicand in four figures and a fractional multiplier, is 1/3. These should suffice to indicate the adaptability of the means for other single-digit and fractional multipliers, or, as the equivalent of certain fractions, single-digit divisors.

There are other adaptabilities that may be explained without illustration in drawings.

The capacity of the set-up as illustrated in the detail of circuits is for two digits in the multiplicand and three in the product. To provide for another digit in each place would require additional contacts for the contact-closing wheels, transfer conductors, contact pairs, and registration conductors, in like systematic arrangement; and in such numbers as would provide a path for every possible position of three contact-closing wheels instead of two, terminating in four groups of counting relays instead of three.

*Fractional multiplication—or division. Figures 13 and 13A*

For multiplying by a fraction with a numerator of 1—equivalent to division by the denominator—the means are essentially the same as described for multiplying by an integer; i. e., systematically prearranged circuits and contacts electrifiable through contact-closers settable in numerical positions. They are illustrated in somewhat different form, and with less capacity.

In multiplying, as by 7, the effect in the product may be progressive through increasing values in the orders of numbers; i. e., upwardly into tens, or hundreds, or thousands, etc. In division, as by 3, the effect in the quotient may be progressive through diminishing values in the orders of numbers from the highest to the lowest; i. e., downwardly from, say, thousands, through hundreds and tens to units and, it may be, remainder. For examples: 3 times 1236 is 3708; times 5236, 15708—only the thousands and ten-thousands figures in the product being changed with the change in the thousands figure of the multiplicand; 1236 divided by 3 is 412; 5236 divided by 3 is 1745 (plus)—every figure in the quotient being changed with the change in the thousands figure of the dividend.

Such variations, with a given divisor, have a limited round of repetition. With 3 as the divisor, the possibilities in the quotient with any figure in the dividend are, a remainder of 0, 1, or 2, to govern the effect in the next order below. These are regularly repeated with successive additions of 1 to such a dividend figure. With 9 as a divisor, the like possibilities and repetitions are, 0, 1, 2 . . . 8.

The illustration for 3 as the divisor is in Figures 13 and 13A. As in Figures 11 and 12, the vertical lines at the right represent circuits to the counting relays, numerically arranged. Four contact-closing wheels (one more than in Fig. 10B) are shown in fragmentary side view at 495, 496, 497, 498, respectively for thousands, hundreds, tens, and units, each with ten sets of contact pairs subject to closure in each numerical position of each wheel. For the tens and hundreds in each position, there are full sets of six pairs of contacts: one contact of each pair is connected with transfer conductors of the order above for the circuits of the selected path; of the other contacts, three are for establishing circuits to the registration conductors to energize counting relays (though one may be dead as representing 0), and three are for establishing circuits through transfer conductors to the contacts of the order below representative of a remainder (including 0 as such). For the thousands—in the 4-digit capacity of the particular illustration—there is one contact in each position for transfer, and a second in each position above No. 2 for registration. For the units there are three contacts in each position for registration (though one in each position below No. 3 is dead). Remainders below units are disregarded.

The numerical illustration in the operation description hereinbelow is that of 12 multiplied by 1/3. Referring here to the units contact pairs and conductors in the No. 2 position, it is to be observed that from one contact, as 200A, of their respective pairs there are two registration conductors extending, as 200B, to the right, to the units counting relay conductors No. 4 and No. 7. These represent the result respectively with an effectual 1 or 2 in the tens place—either such a figure uninfluenced by the hundreds or thousands figure, as in 312 or 1522, or its equivalent as a remainder from above, as in 402 or 1762. With only zeroes above the units place, there would be no integral quotient here, and so no conductor is provided. The conductors terminate likewise in 4 and 7 in the tens and hundreds registration conductors in this No. 2 position. The conductors in the No. 3 position in the units, tens and hundreds terminate in registration conductors 1, 4 and 7; in the No. 4 position in registration conductors 1, 4 and 8; in the No. 5 position in registration conductors 1, 5 and 8; in the No. 6 position in registration conductors 2, 5 and 8; in the No. 7 position in registration conductors 2, 5 and 9; in the No. 8 position in registration conductors 2, 6 and 9; and in the No. 9 position in registration conductors 3, 6 and 9. In the No. 1 position the conductors terminate in the registration conductors 3 and 7.

Referring again to the units contact pairs and conductors in the No. 2 position, it is to be observed that from the other contact of the three pairs, three conductors, as 157D, extend leftwardly to three common transfer conductors, as 157C, with each of which is also connected a conductor from one of every pair of tens contacts. The numerical positions of these common conductors from left to right is respectively 2, 1, 0. Their connections with the units registration conductors is, the 2 with the 7, and the 1 with the 4, while the 0 is associated with a dead contact in the group of contacts for the No. 2 position in the units order.

The relation between the tens and the hundreds is essentially the same as that between the units and the tens. Referring to the contact pairs of the No. 1 tens position, it may be observed that there are two like registering conductors (and a dead contact), three like transfer conductors to the right to the three common conductors for paths to the units contact pairs, and three like conductors to the left to the three common conductors for paths from the hundreds contact pairs, the connection with each of which latter has two branches. Through the six, connections may be selectively made for paths to the (two or) three registration conductors and the three transfer conductors.

The arrangement illustrated in Figures 13 and 13A has capacity for effecting division by 2 with no other changes than those required in the connections of the registration circuits to the counting relays, including the disconnection of those whose arithmetical effect should be nil. The latter would, for the most part, be those related to the transfers of 2 in the system for dividing by 3.

To increase the capacity, as for dividing by 6 or 7, the added circuits would be of like character with those illustrated. The number of contact pairs usually required in full sets for orders above units would be double the number representing the quotient; viz, for 6, six registration and six transfer circuits; for 7, a total of fourteen for the two kinds.

Utilizing facilities elsewhere shown, sundry effects in fractions could be had without changing the registration terminals. To multiply by 2/3, for example, the result could be obtained by taking the product by 1/3 and adding it a second time, under control of multiplying relays. With selectable arrangements for taking fifths, sixths, sevenths, eighths, and ninths, and with provisions for multiplying the results, the following fractional parts would be quickly computable: 1/2, or 4/8; 1/3, or 2/6; 1/4, or 2/8; 1/5, 1/6, 1/7, 1/8, 1/9; besides, 2/3, 3/4, 4/5, 3/8, and other commonly used multiples.

The arrangement illustrated for division by 3 has capacity also for multiplication by 3, with proper changes in connection of registration conductors, the transfer conductors supplied for the remainders of 0, 1 and 2 in the division being just those needed for carry-overs in the multiplication.

*Minimum charge circuits. Figures 11 and 11A*

In Figures 11 and 11A are shown only portions of the minimum charge circuits. The purpose of these circuits and their connections is to effect the registration of a selected minimum money charge, not computed from the consumption quantity, when that quantity is less than a given amount.

For closure by the tens and units consumption contact-closing wheels, 97B (at 490, Figure 11), and 98B (at 491) are contacts as 178 and 177 in the No. 1 position of the tens, and 179 in the No. 2 position of the units wheel. Conductors, as 177A and 179A, lead through cables, as 181, 182, 183, to comparison bars at 515 of Figure 3. The minimum charge circuits are related to the sequence relay pair 8—9 of the third sequence of operation, and to auxiliary relays, as 61, 187, 185, as described above in relation to Figure 6. Their effect on the counting relays is through shift relay 210 (Fig. 5A).

Description of the comparison bars and their mode of selecting an alternative circuit for registration is included above in relation to Figure 3. Description of the operation of the minimum charge circuit is contained below under a special heading.

*Identifying number wheels. Figure 14*

Wheels 323 and 169 are for the purpose of registering the identifying number of the customer, as it may be perforated in the office card, and made effective through bars 2 and 2C (Fig. 1A). They are of the same construction as the first step and other registering wheels (Figs. 10, 10A, and 10B). They are operated as are the money wheels, from the counting relays of Figure 4, as will be described in the ninth sequence of operation.

Money wheels. Figure 15

Wheels 127, 128 and 129 are for the purpose of registering the final money charge of the bill. They are of the same construction as other registering wheels, as those in line 500—500 of Figure 2, with the addition of carry-over contact-closing wheels, as 128H, and contacts, as 128J.

They are driven in sundry operations under control of the counting relays (Fig. 4), according to the minimum charge setting, or the rate multiplication or multiplications in one or more steps.

Because of successive independent registrations, these wheels are provided with carry-over apparatus, governed in common with that of other such wheels by the relays of Figure 4.

Rate selector relays. Figure 16

Figure 16 shows an auxiliary plan for using each of the ten groups of contact pairs and their associated circuits, as shown in Figures 11 and 11A, for more than one rate multiplier, selectable by a card perforation. The illustration includes only two series of such contact pairs, which with their connected conductors to left and right, the vertical groups of conductors, the two contact-closing wheels, the tens contacts, and the conductors connectable to ground, are analogous to those similarly placed in Figure 11. Connections are not completed to circuits and mechanisms of other drawings.

Contact-closing wheels 270 and 271 are shown in fragmentary side view, with two series of contact pairs, for the No. 0 and 1 positions, with the same arrangement as in Figure 11 of connected conductors for transfer and registration. There is an additional relay-controlling contact, as 280, in each series.

For automatically selecting one of several rates, multi-contact relays, as 274 and 275, are provided; a full equipment would be one in each of the ten positions for each rate that may be selected. The illustration includes examples only for 7 and 6 in each of the first two positions. These are representative not only for products but for quotients and other arithmetical relations to numerical settings of the wheels.

One side of each such selector relay is wired to a contact, as 280, where battery is found, conditioning it for operation on the closing of the contact by wheel 271. The other side of each such relay is connected in multiple with all relays of the same order, as 274A, through a conductor, as 277, which terminates in a contact finger, as 276A. The right-hand contact, as 279, of every pair in the series closed by wheel 271 is wired in multiple to the left-hand contact of a like-positioned pair of contacts in rate selectors 274 and 275, in lieu of direct wiring to predetermined conductors to counting relays. From the right-hand contacts of the selector relays, conductors extend to connect with conductors to the counting relays in just the same arrangement for product registration as appears in the corresponding terminals for 7 and 6 in Figures 11 and 12.

With the closing of contacts as 279 and 280 by wheel 271, the circuits of the vertical group of transfer conductors are transferred to the contacts of relays 274 and 275, and through contact 280 both relays are conditioned for operation, and the selected paths are completed for electrification. Rate selector bar 276 has a finger, as 276A, for each rate in the equipment, thus making the rates selectable by card perforation.

As an example of operation: For 11 times 6, the wheels close contacts 281 and 282 and their like, and 280; the card is perforated to permit finger 276B to contact with bar 276; conductors 286 and 287 and bar 276 are grounded; the bar grounds finger 276B and conductor 278, energizing through contact 280A rate selector relay 275A, closing its several contacts. For the tens path, conductor 286 grounds contact 281, conductor 281A, contact 282, conductor 284, contact 285, conductor 285A, energizing the No. 6 tens counting relay. For the units, conductor 287 grounds contact 288, conductor 290, contact 291, conductor 291A, energizing the No. 6 units relay.

For 11 times 7, finger 276A is grounded, grounding conductor 277, energizing rate selector relay 274A; conductors 286 and 287 ground contacts 282 and 288. For the tens path, contact 282 grounds conductor 282A, contact 283, conductor 283A, energizing the No. 7 tens relay. For the units, conductor 287 grounds contact 288, conductor 288A, contact 289, conductor 289A, energizing the No. 7 units relays.

It will be evident that by suitable switching means, such as is described elsewhere, as between the first and second step rate multiplication, the sequences of such multiplication could be had through these rate selector relays as well as through the separate complete circuit systems illustrated in Figures 11 to 13A. It will also be evident that as a particular means such multi-contact relays as are here described are only one of several forms that could be adopted. Considering this selection between systems of circuits as part of the setting for registration, the circuits remain of the character mentioned for those first shown, in that with a given setting no movements are required between the application of ground and the commencement of registering action.

Before describing the operation of the machine in detail, a perspective of a normal operation and a minimum charge operation will be depicted with reference to the flow charts shown in Figs. 51 and 52.

Flow chart schematically representing a typical machine operation. Fig. 51

After the meter card and office card have been placed in the machine and the machine has been conditioned for operation following the pressing of the starting key 3, the sequence relay 4 deenergizes closing contacts 4D and 4E to respectively establish circuits for closing the contacts of shift relay 201 and impressing ground upon the last meter reading bars 27A, 27B and 27C. Therefore, at point I as indicated on the meter card, the last meter reading 455 (perforated in the last meter reading area) is picked up and carried over circuits leading through certain of the closed contacts of shift relay 201, thence to the counting relays which are thus set up according to the amount 455 and back through certain other of the closed contacts of shift relay 201 to the last reading register 48—49—50 and to the consumption quantity register 56—57—58. In each of these registers the amount 455 is set up.

Subsequently in the operation of the machine, sequence relay 6 deenergizes causing the closing of the contacts on shift relay 202 and the completion of circuits whereby the previous meter reading 404 indicated at point II on the meter card is picked up. This previous meter reading is perforated in the card whereby circuits are determined and established through certain of the contacts of shift relay 202 for setting up the counting relays in an arrangement representative of said reading 404. The counting relays when set up are operative through other contacts of shift relay 202 for setting up the amount 404 in the previous reading register 75—76—77 and setting the consumption quantity register 56—57—58 back the amount 404 whereby this register then stands at 051, which is the difference between the readings 455 and 404. The rate step comparison table (Figs. 7, 7A, 8, 8A, 9 and 9A) which is controlled by the consumption quantity register is set in accordance with the amount 051.

Later in the operation of the machine sequence relay 8 deenergizes effecting the closing of the contacts on shift relay 203 and the impression of ground upon the first rate step comparison bars. Circuits thus established through fingers which are permitted to selectively engage the first rate step comparison bars through office card perforations, lead from point III through the rate step comparison table over predetermined circuit legs so that continuations thereof after passing through contacts on shift relay 203 will energize the counting relays in an arrangement representative of the first rate step quantity 14. Other of the contacts on shift relay 203 connect the counting relays with the first step quantity register 97—98 so that this register is actuated to display said first rate step quantity. Contact closing wheels, movable with the first rate step quantity register wheels, set the variable factor in the first step product table in accordance with the setting of said register. The dot-dash line connecting the first step quantity register 97—98 and the rate step comparison table is representative of a mechanical connection established between these parts while the register is set up and by means of which the setting of 051 in said table is diminished by the setting entered in the register. At the end of this sequential operation, therefore, the contacts in control of the rate step comparison table stand at 037.

When later sequence relay 10 deenergizes, shift relay 204 closes its contacts and ground is impressed upon first rate step bar as indicated at point IV. A card perforation at point IV selects a circuit leading through a first step product table having a predetermined base factor (in the present instance a factor of 7). The circuits of this product table are so arranged that the setting of its contacts (which determine the variable factor) in accordance with the amount set up in the first step quantity register will result in the conductors leading therefrom being energized in an arrangement representative of the product of the base factor 7 and the amount 14 set up on said register. These circuits, leading through certain of the contacts on shift relay 204, cause the counting relays to be set up in an arrangement representative of the product of 7 and 14 which is 98. The counting relays which are connected through other contacts of the shift relay 204 with the money charge register 127—128—129 cause the amount 098 to be entered in this register, this being the amount of the first registration.

The next sequential operation of the machine involves the deenergization of sequence relay 12 whereby shift relay 205 is actuated for closing its contacts and ground is impressed upon the second rate step comparison bars beneath the office card. Therefore, at point V circuits predetermined by office card perforations lead through the rate step comparison table and emerge therefrom in an arrangement representative of the amount of the second rate step which is 25. These circuits continue through certain contacts of shift relay 205 for energizing the counting relays in an arrangement representative of the second rate step quantity 25. When thus set up the counting relays establish circuits through other contacts of shift relay 205 for energizing the clutches of the second step quantity register 140—141 whereby this register is caused to receive the second rate step quantity. The second step product table, the variable factor of which is controlled by contacts upon the second step quantity register, is conditioned in accordance with this register reading. The dot-dash line connecting the second step quantity register and the rate step comparison table is representative of the mechanical connection, effective during set up of the second step quantity register, for turning contact closing wheels backwardly and thus changing the setting of the first step comparison table. During setting of the second step quantity register to 25, therefore, the contact closing wheels in control of the rate step comparison table were turned backwardly by the amount 25 from the previous setting 037, leaving the rate step comparison table set for a remainder of 012.

Sequence relay 14 deenergizes in the next sequential operation thereby causing shift relay 206 to close its contacts, and causing the impression of ground upon the second rate step bar beneath the office card wherefore a contact finger which is permitted to engage this bar through a card perforation is grounded. From this selectively grounded finger at point VI the circuit is carried to the second step product table. In the present instance the product table thus selected has a base factor 6, and since its variable factor has been set at 25, the circuits leading therefrom through contacts on shift relay 206 cause the counting relays to be energized in an arrangement representative of the product 150. Circuits extending from the counting relays through other contacts of shift relay 206 actuate the money charge register 127—128—129 for setting up the additional amount 150 as the second registration. The money charge register at the end of this sequential operation will read 248.

The succeeding sequential operation involves the deenergization of sequence relay 16 which causes the closing of the contacts on shift relay 207 and the impression of ground upon the rate step comparison table which is now set to represent the remainder 12 of the consumption quantity. Grounded circuits therefore emerge from the rate step comparison table as indicated at point VII and pass through certain of the contacts on shift relay 207 for energizing the counting relays in an arrangement representative of the remainder 12. Such energized counting relays are then effective through other contacts of the shift relay 207 for setting up the remainder quantity register to display 12. Contact closing wheels associated with the remainder register condition the remainder step product table by setting the variable factor at 12. This register has a base factor 1/3. The dot-dash line connecting the remainder quantity register and the rate step comparison table is representative of a mechanical connection established during set up of the remainder quantity register for subtracting the amount 12 from the setting of said table. That is, the rate step comparison table which stood at 12 at the beginning of the present sequential operation is now moved back to 0.

Sequence relay 18 deenergizes during the next sequential operation, closing the contacts of shift relay 208 and impressing ground upon the remainder rate step bar beneath the office card. A contact finger which is permitted to engage the remainder rate step bar through a card perforation is thus grounded, establishing a circuit which carries from point VIII to the remainder step product table. This remainder step product table having a base factor 1/3 and having its variable factor set at 12, energizes circuits leading therefrom through certain contacts of shift relay 208 to the counting relays, wherefore said relays are energized in an arrangement representative of the product 4. The counting relays are thus enabled by means of circuits extending through other contacts of the shift relay 208 to set up the additional amount 4 in the money charge register. This third registration in the money charge register brings the total reading to 252.

Finally there is sensed from the office card the customer's identification number, this operation entailing the deenergization of sequence relay 20 to cause closing of the contacts on shift relay 209 and the impression of ground upon the identification number bars beneath the office card. Contacts representative of the customer's number are permitted to engage the grounded bars through card perforations so that ground is picked up through such contacts as are indicated at points IX. Circuits thus grounded at points IX pass through contacts of shift relay 209 for setting up the counting relays in an arrangement representative of the identification number 12. Said counting relays are thereafter effective through circuits passing through other contacts of the shift relay 209 for setting up of the identification number register 323—169 to read 12.

Holding the number wheels of the various registers for reading and subsequent reset to 0 follows immediately after the above described sequential operations, but independently of control perforations in the cards, and therefore such holding and resetting operation is not indicated upon this flow chart.

*Flow chart schematically illustrating a minimum charge operation. Fig. 52*

This minimum charge operation assumes a consumption of 12 which is the difference between a last meter reading 455 and a previous meter reading 443. There is no difference between the first sequential operation and that described above with reference to Fig. 51. Subsequent to the conditioning of the machine, after the pressing and releasing of starting key 3, sequence relay 4 deenergizes to cause the closing of the contacts on shift relay 201 and the impression of ground upon the last meter reading bars beneath the meter card. Contact fingers in registry with the last meter reading section of the card and representative of the reading 455 are permitted to engage these bars through card perforations, wherefore circuits beginning at point I' are led through contacts of shift relay 201 to set up the counting relays in an arrangement representative of the amount 455. Thus conditioned, the counting relays extend circuits through other contacts of shift relay 201 for entering the amount 455 in the last reading register 48—49—50 and in the consumption quantity register 56—57—58.

The succeeding sequential operation involves the deenergization of sequence relay 6, the closing of the contacts on shift relay 202 and the impression of ground upon the bars beneath the previous meter reading section of the meter card. These bars, through card perforations, are engaged by contact fingers representative of the amount 443. From these fingers, at point II', circuits carrying ground lead through contacts upon the shift relay 202 for energizing the counting relays in an arrangement representative of 443. In turn the counting relays establish circuits through other contacts of shift relay 202 for moving the number wheels of the previous reading register 75—76—77 forwardly to 443, and for moving backwardly the number wheels of the consumption quantity register by the amount 443 from 455 to 012. At the end of this sequential operation the consumption quantity register stands at 012 as well as the rate step comparison table which is mechanically controlled through contact closing wheels in the consumption quantity register.

Sequence relay 8 subsequently deenergizes in the third sequential operation, closing the contacts of shift relay 203 and impressing ground upon the first rate step comparison bars beneath the office card. Since the consumption quantity 12 is no more than the amount of the first rate step 14, the circuits established through card perforations at III' in registry with the first rate step comparison bars and passing through the rate step comparison table, emerge from said table as a representation of 12 (the consumption quantity) and extend through the shift relay 203 for setting up 12 in the counting relays. In the regular manner the counting relays thereafter, by means of circuits extending through other contacts of the shift relay 203, cause the registration of 12 in first rate step quantity register 97—98. Contacts upon the first step quantity register condition the first step product table for performing the multiplication operation employing its base factor 7 and the variable factor 12, although this multiplication operation will not take place since the minimum charge operation later contravenes as described below. The dot-dash line extending between the first step quantity register and the rate step comparison table represents a mechanical connection between these parts whereby said rate step comparison table is moved backwardly from 12 to 0, while the first step quantity register is moved forwardly from 0 to 12. This movement of contacts in control of the rate step comparison table from 12 to 0 is accompanied by the movement of backstop wheels on the consumption quantity register from 12 to 0, whereby contacts 60D and 60B (Fig. 2) are manipulated for permitting a minimum charge operation during the succeeding sequential machine operation.

At the beginning of the next sequential operation, when sequence relay 10 deenergizes, ground is impressed upon first rate step bar beneath the office card. Thus ground is picked up at point IV' by a finger engaging the first rate step bar through a card perforation and is impressed upon the first step product table. Since the first step product table is set at 12, an amount equal or less than the minimum charge consumption quantity 12, the grounded circuits emerging from said product table impress ground upon such of the minimum consumption comparison bars, which are engaged by selected fingers engaging said bars through office card perforations, that complete circuits to the minimum charge relays 185, 186 and 187 for causing their energization. Of these minimum charge relays, relay 187 causes the energization of control relay 188 (Figs. 6 and 52) and also impresses ground upon the minimum charge bars beneath the office card. Minimum charge relays 185 and 186 interrupt the circuit which would otherwise result in the closing of the contacts on shift relay 204, whereas control relay 188 upon energizing causes the closing of the contacts on shift relay 210. Hence the circuits energized from the minimum charge bars are carried through certain contacts on shift relay 210 for energizing the counting relays in an arrangement representative of the minimum charge amount which is 048. Thus energized, the counting relays establish circuits through other contacts of the shift relay 210 for setting up the amount 048 in the minimum charge register 127—128—129.

The next sequential operation, for entering the customer's identification number in the register 323—169, takes place under control of the sequence relays 20 and 21 and perforations in the office card in the same manner described hereinabove with respect to the flow chart shown in Fig. 51.

The operations above outlined with reference to the flow charts (Figs. 51 and 52) will now be described in detail.

Operation

The first series of operations now to be described proceed under control of a meter card perforated as that shown in Fig. 1 and also under control of an office card perforated as that shown in Fig. 1A. Since the meter card is perforated for a past meter-reading of 455 and a previous meter-reading of 404, the apparatus will sense and record the consumption quantity of 051 which consumption quantity is large enough to cause the apparatus to effect entries for each of the two rate steps and for a remainder and hence carry out its entire series of operations. These operations are illustrated graphically in the operation chart shown in Figs. 18 to 38.

Subsequently a description will be given of an operation based upon a consumption which is less in amount than the first rate step and which results in the employment of that part of the apparatus for effecting a minimum charge. A second chart (Figs. 43 to 50) graphically illustrates such minimum charge operation.

Matching of cards

The office and meter cards of a customer are fed into place between the various contact bars and the contact fingers associated therewith (Fig. 3). The meter card (Fig. 1) is of such thickness as to close contact 1D and the office card which is engaged with the contact 2R is of such thickness as to close this contact. Ground is thus extended from contact 2R through contact 1D to bars 1 and 1A. Contact fingers 1B and 1C respectively engage the bars 1 and 1A through card perforations 1BB and 1CC and thus extend ground from bars 1 and 1A to contact fingers 2A and 2B and these fingers which respectively engage the matching bars 2 and 2C through card perforations 2AA and 2BB cause these bars to be grounded. Ground is extended from the thus grounded matching bars 2 and 2C to relays 2D and 2E which relays then begin energization at points 505 and 506 indicated on the chart (Fig. 32) and complete energization at points 507 and 508, closing contacts 2H, 2J, 2F and 2G. Had not the meter card, containing the card perforations 1BB and 1CC corresponded to the office card containing card perforations 2AA and 2BB the series circuit just described for extending ground to and causing energization of relays 2D and 2E would not have been established and said relays would have failed to energize for conditioning the apparatus for operation in the manner now to be described.

Contacts 2H and 2F prepare a circuit from contact 21D of sequence relay 21 (Fig. 6) to the identifying bars 2L and 2M (Fig. 3) and fingers 2N and 2P which engage the bars 2L and 2M through card perforations 2NN and 2PP. This prepared circuit becomes energized at a later time in the operation as is explained fully under that heading of the description entitled "Registering customer's identifying number."

Contact 2J extends ground to contact 2G, conductor 2K (Figs. 3 and 6) whereby ground is supplied to the starting key 3 (Fig. 6). With ground thus provided at the starting key 3 the apparatus is conditioned to begin operation upon the depression of such key.

Preparation for operation of sequence relays

Figure 18:
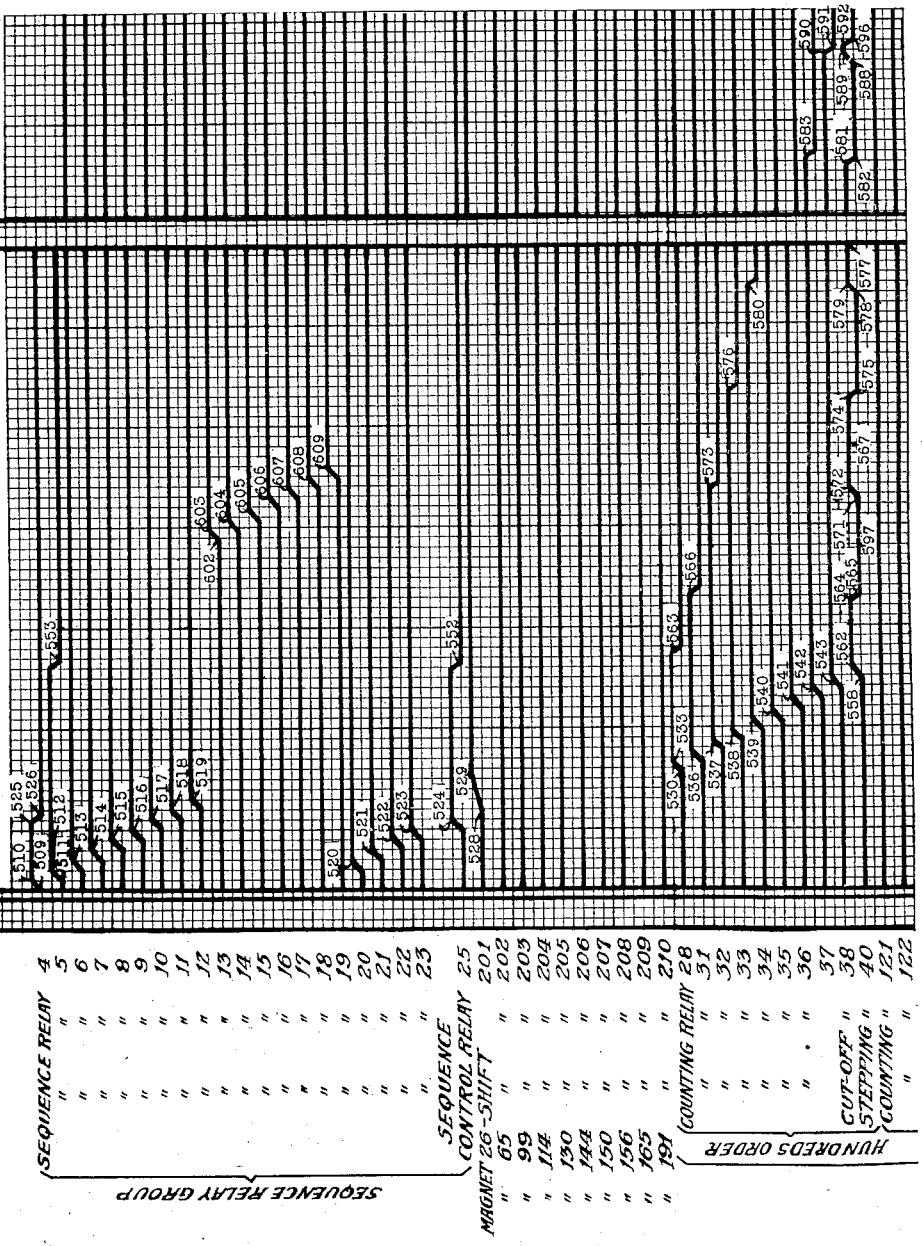
Figure 19:
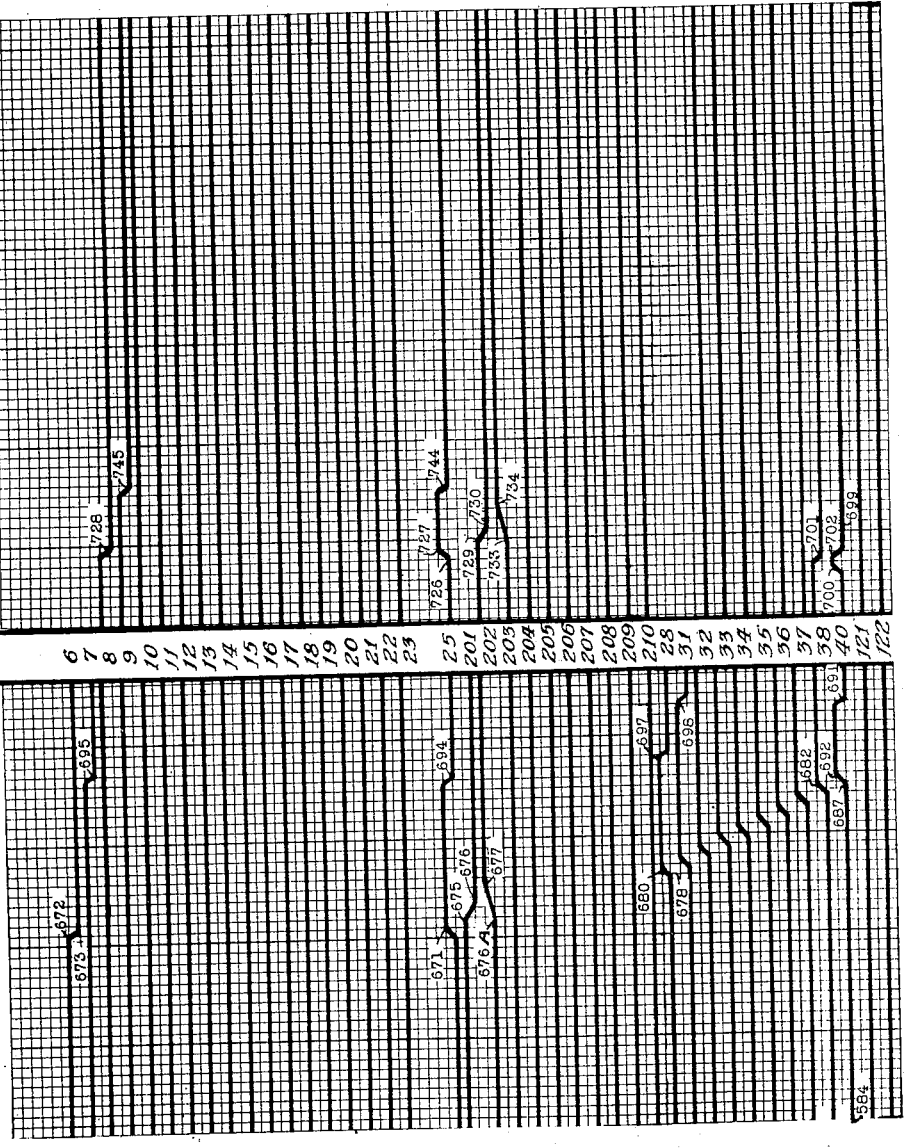
Figure 20:
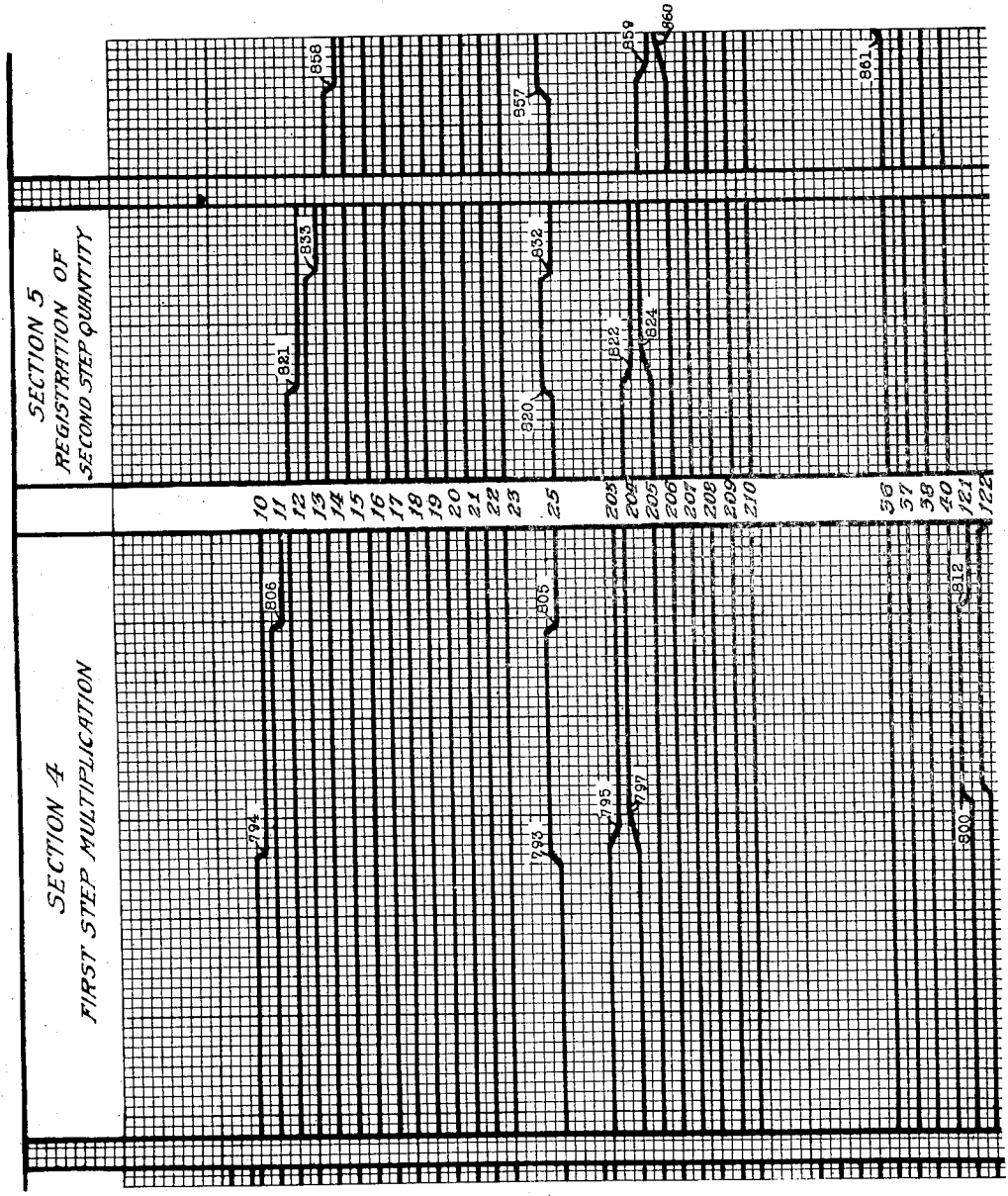
Figure 21:
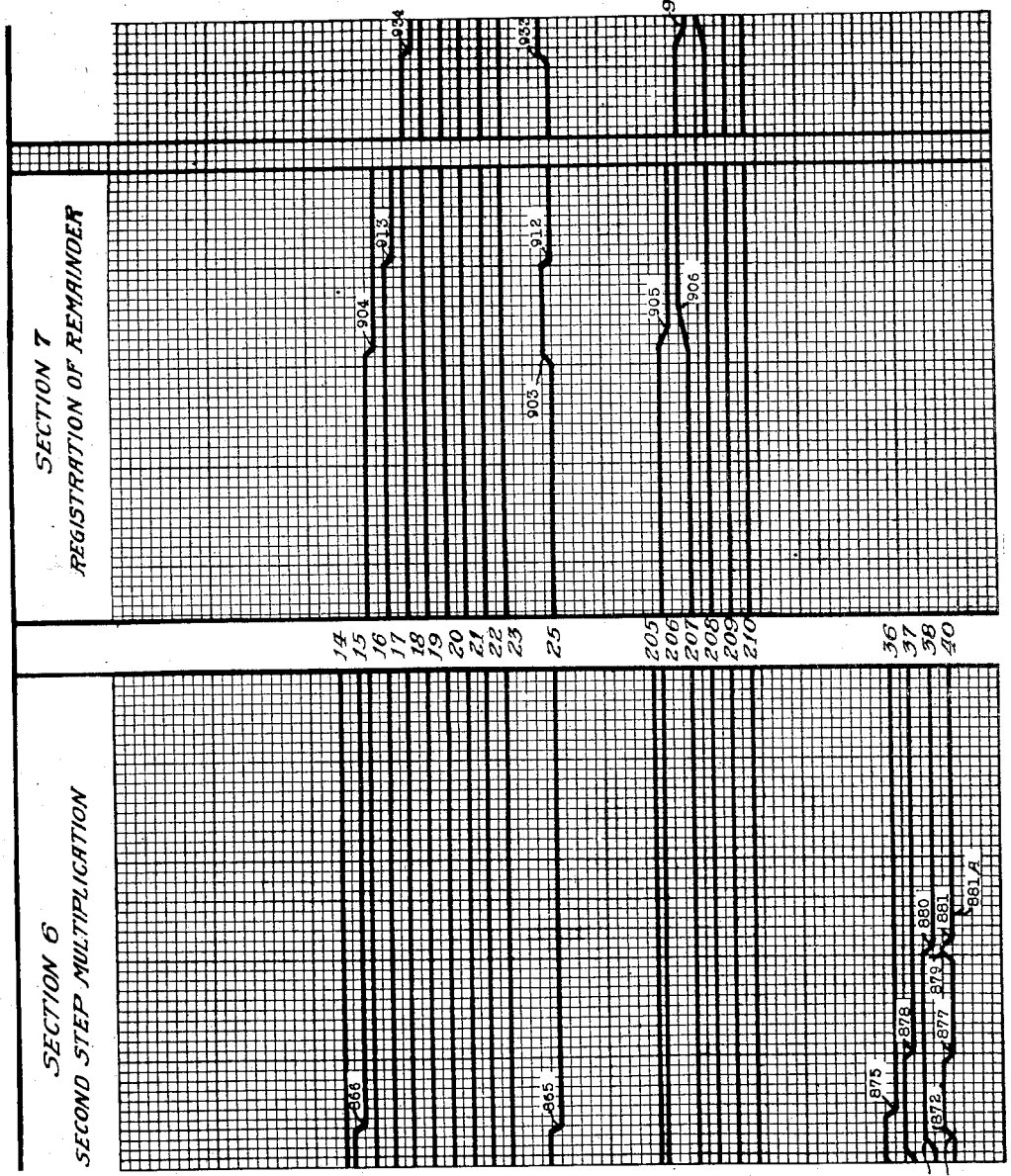
Figure 22:
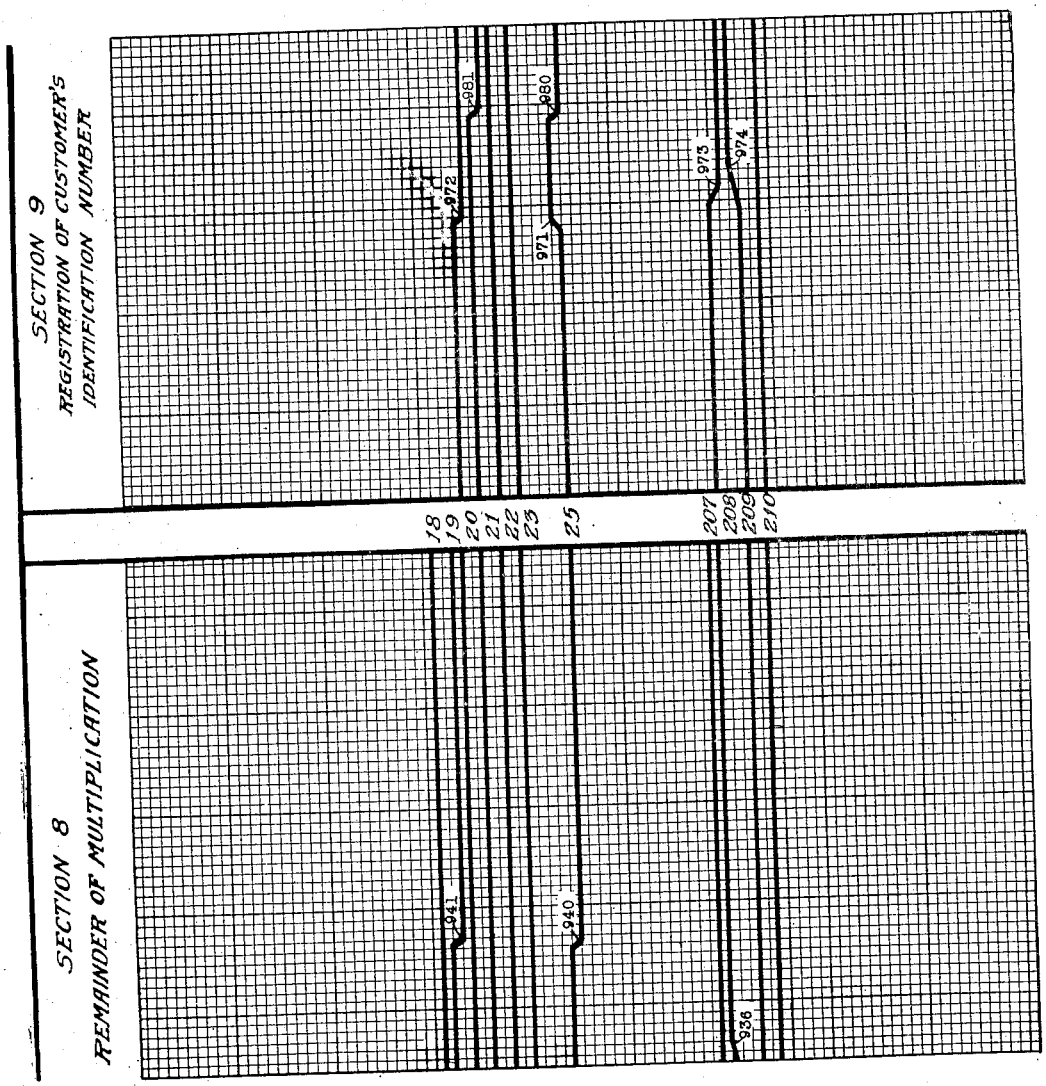
Figure 23:
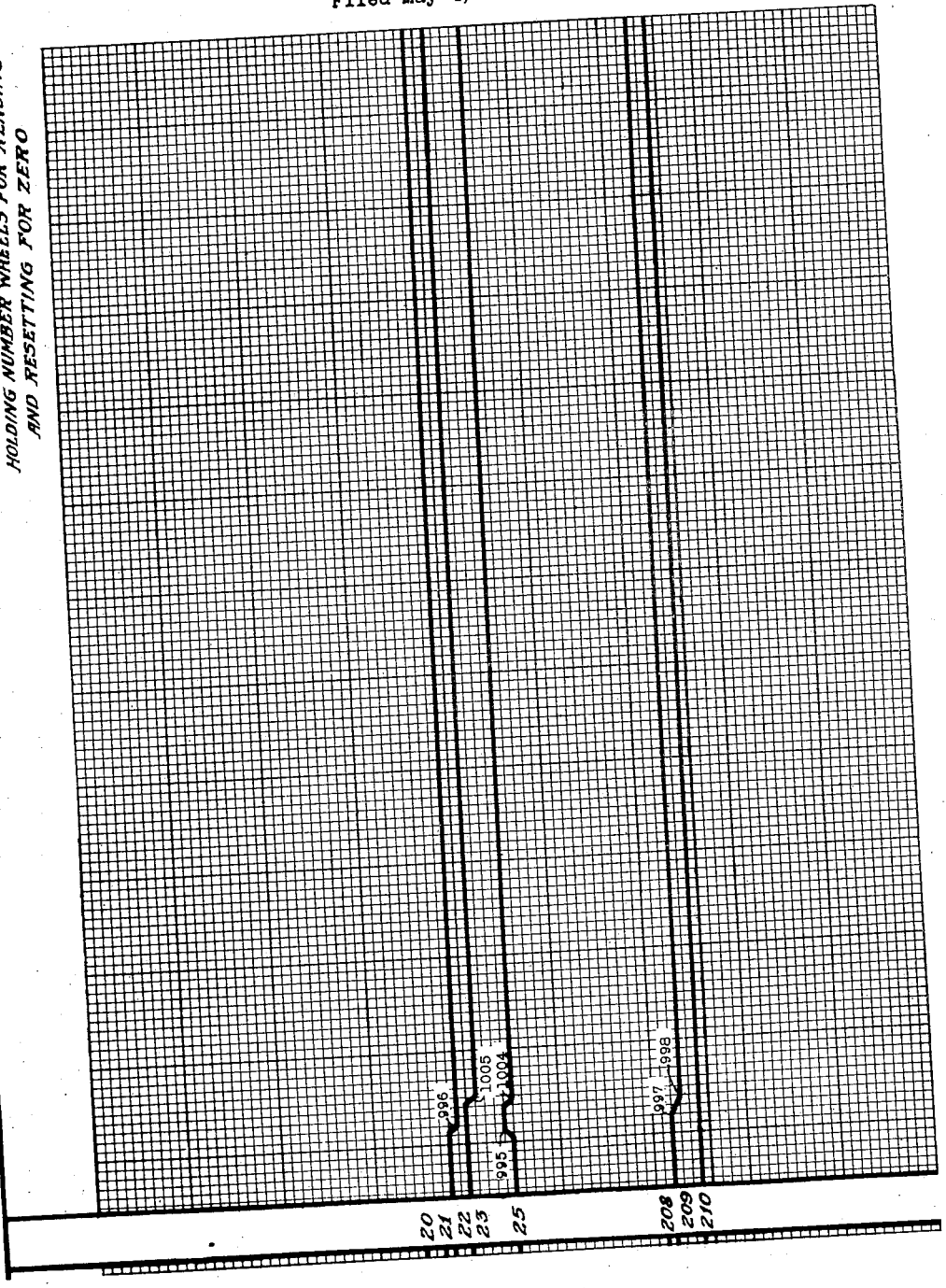
Figure 24:
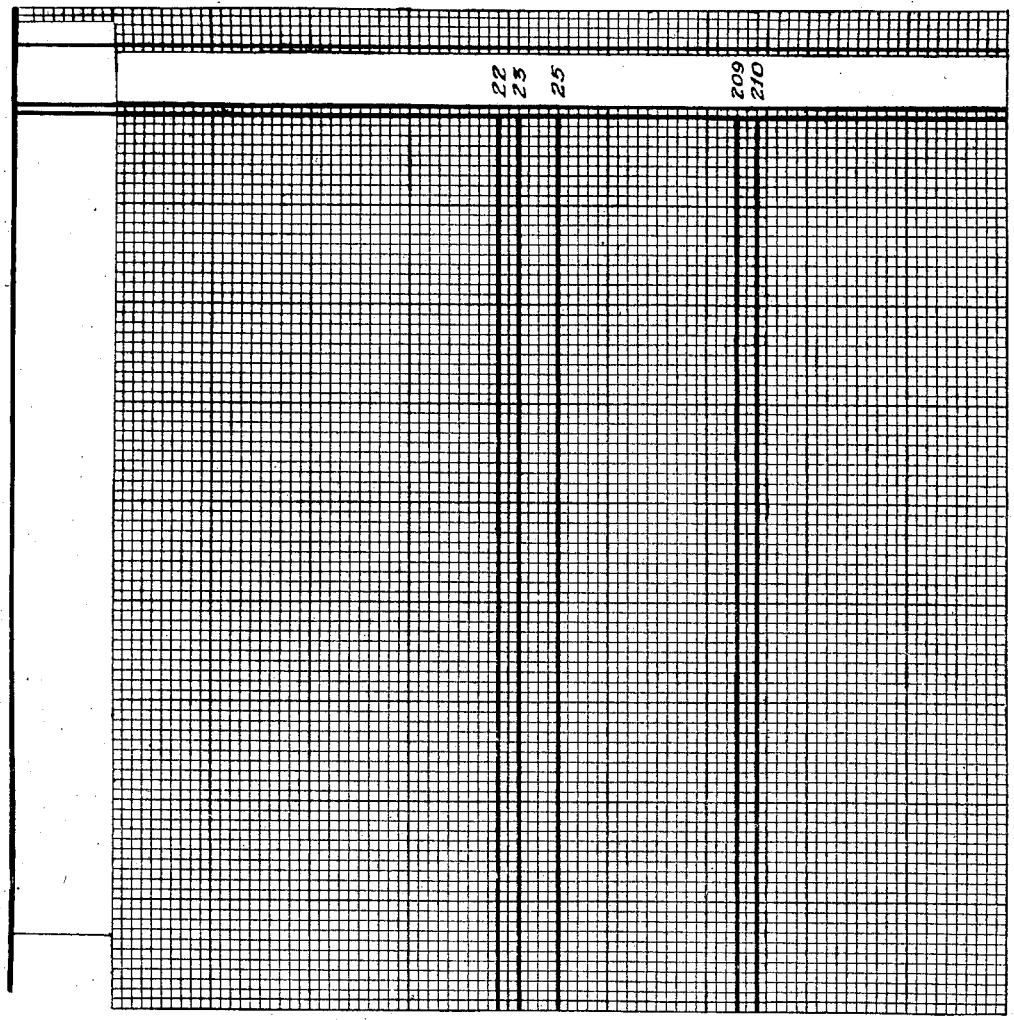

When starting key 3 is momentarily pressed ground is extended to winding 4A of sequence relay 4 which relay is thus potentialized at point 509 and subsequently becomes energized at point 510 as shown in the chart (Fig. 18). Sequence relay 4 energizing closes contacts 4B and 4C and opens contacts 4D and 4E. Contact 4C connects the right hand winding 4F of relay 4 with contact 25C of sequence control relay 25 thus providing a holding circuit for maintaining relay 4 energized so long as relay 25 remains unenergized and contact 25C closed. Closed contact 4B extends ground to winding 5F of sequence relay 5 which is thus potentialized as indicated at point 511 and later becomes energized at point 512.

Relay 5 energizing closes contact 5C which extends ground to the left hand winding of sequence relay 6 which is thereby potentialized and later becomes energized at point 513. Contact 5B of relay 5 also closes preparing a circuit to contact 25B of sequence control relay 25 so that when relay 25 is later energized and contact 25B closed a holding circuit will be provided for relay 5 after the deenergization of relay 4 and the opening of contact 4B.

Sequence relay 7 is caused to energize at point 514 by the energization of relay 6 and the closing of contact 6B; relay 8 is caused to energize at point 515 by the energization of relay 7 and the closing of contact 7C, and in like manner relay 9 becomes energized at point 516 by the energization of relay 8; relay 10 becomes energized at point 517 by the energization of relay 9; relay 11 becomes energized at point 518 by the energization of relay 10; and relay 12 becomes energized at point 519 by the energization of relay 11. However, energization of relays 13, 14, 15, 16, 17, 18 and 19 does not occur at this time since the odd numbered ones of this group of relays are not now provided with battery, the energization of this group of relays being effected later upon movement of the consumption wheels 56, 57 or 58 (Fig. 2) from zero position to supply such battery in a manner fully explained hereinafter.

When relay 5 energized at point 512, contact 5E extended ground through conductor 20F to winding 20A of sequence relay 20 whereupon relay 20 was potentialized and later energized at point 520. Later when relays as 7, 9 and 11 energize, their contacts corresponding to contacts 7E close and supplement the ground of contact 5E upon conductor 20F so that winding 20A of relay 20 will remain energized so long as any of these relays having contacts as 7E are energized. When relay 20 energized at point 520 contact 20B closed and caused energization of relay 21 at point 521, and contact 21C of relay 21 when closing extends ground to winding 22A of relay 22 which is thus caused to energize at point 522. Relay 22 in turn, when energized, closes contact 22B thereby extending ground to and causing energization of sequence relay 23 at point 523. Relay 23 thus energized closes contact 23C which closes a circuit starting with ground and battery through conductor 23H, contact 24A of unenergized relay 24 (Fig. 6), conductor 24D, sequence control relay 25, conductor 25A (Figs. 6 and 4), and through the several relay contacts V, U and T to ground, relay 64 (Fig. 4) being unenergized at this time. When the circuit just traced is established sequence control relay 25 begins energization which is completed at point 524 preparatory to setting up circuits now to be described for effecting entry of the last meter-reading upon the number wheels of the last reading register 48—49—50 and upon the number wheels of the consumption quantity register 56—57—58 (Fig. 2).

*Operation of sequence control relay*

Sequence control relay 25 is now energized from battery at contact 23C of sequence relay 23 (Fig. 6) and by means of the series circuit including contacts V, U and T (Fig. 4). The opening of any one of these contacts will cause deenergization of the sequence control relay 25. Only the closure of all such contacts will energize this relay.

*Operation of first sequence relay and last reading counting relays (first sequence)*

This first energization of sequence control relay 25 closes contact 25B prior to opening contact 25C. The opening of contact 25C removes ground from the right-hand winding 4F of sequence relay 4, and since at this time the starting key 3 has been manually released and the left-hand winding 4A already deenergized, relay 4 begins deenergization with the winding 4F at point 525 and completes such deenergization at point 526. Thus deenergized, relay 4 opens contact 4B causing deenergization of the right-hand winding 5F of sequence relay 5. But since contact 25B of sequence control relay 25 was closed prior to the opening of contact 25C ground is imposed upon the left-hand winding of relay 5 holding such relay energized after the deenergization of its right-hand winding. It will be noted, however, that relay 5 now held energized under the control of its left-hand winding will deenergize later upon the deenergization of sequence control relay 25 and the consequent opening of contact 25B. Deenergized relay 4 extends ground through contact 4E thereof, contact 5D of sequence relay 5, conductor 5G (Figs. 6 and 5A), cable 66 (Figs. 5A and 3), conductor 66J, switches 214 and 212, conductor 212A, conductor 212B, contact finger 212C, contact bar 212D which is engaged by the finger 212C through card perforation 212CC (Fig. 1) and to relay 27G and the battery and ground associated therewith. Thus relay 27G is potentialized and caused to energize at point 527. The contacts as 27H of energized relay 27G are closed extending ground therefrom to contact bars 27A, 27B and 27C. These contact bars are in registry with that section of the meter card (Fig. 1) which is perforated for the last meter-reading. Card perforations 27DD and 27EE and 27FF permit fingers 27D and 27E and 27F to engage the contact bars 27A, 27B and 27C thereby extending ground from the contacts as 27H through the contact bars and the contact fingers, conductors 68A, 68B and 68C, cable 68, (Figs. 3 and 5) to contacts 26A, 26B and 26C of the left-hand group of contacts on shift relay 201. When these contacts 26A, 26B and 26C are closed they will extend the above described prepared circuit, including the contact bars 27A, 27B and 27C (Fig. 3), to the counting relays (Fig. 4) to cause energization thereof in an arrangement representative of the last meter-reading 455. The manner in which the contacts 26A, 26B and 26C and in fact all contacts of the shift relay 201 are closed will now be described.

With the deenergization of sequence relay 4 at point 526 contact 4D closed extending ground from closed contact 6B of energized sequence relay 6 through conductor 4X (Figs. 6 and 5) to shift magnet 26 potentializing said magnet at point 528. The shift magnet 26 became energized at point 529 concurrently with the closing of the contacts of shift relay 201. In this way circuit is extended from contacts 26A, 26B and 26C of the shift relay 201 through cable 250E and cable 250 (Figs. 5 and 4) respectively to the central windings of counting relays 28, 29 and 30, these relays being simultaneously potentialized at points 530, 531 and 532 and becoming energized at points 533, 534 and 535.

Relay 28 energizing closes contacts 28B and 28C. Contact 28C establishes a holding circuit for the left-hand winding 28E of relay 28 through conductor 40E and contact 40A of stepping relay 40 so long as this stepping relay remains unenergized. Contact 28B places ground upon the left-hand winding of relay 31 thus causing energization of relay 31 at point 536. Relays 28 and 31 are representative of the digit 4 in the hundreds order. Energized relay 31 closes contact 31B which through conductor 40F is connectable with contact 40B of stepping relay 40 when the stepping relay is energized. Thus during energization of the stepping relay 40, while contact 31B is closed, a holding circuit will be provided for counting relay 31. Energized relay 31 through its contact 31C causes energization of winding 32A and of relay 32 at point 537. Relay 32 thus energized closes contact 32B causing energization of relay 33 at point 538. Relays 32 and 33 are representative of the digit 3 in the hundreds order. In a like manner the relays of lower numerical value in the sequence 34 and 35 (2) and 36 and 37 (1) and also cut-off relay 38 are energized respectively at points 539, 540, 541, 542 and 543. Cut-off relay 38 is energized from grounded contact 37C of counting relay 37 incident to the energization of said counting relay. Once energized the counting relays as 32 in the lower row of the double row of counting relays pertaining to the hundreds order have as a source of energization their left-hand windings, contacts as 32C, conductor 40E and contact 40A of stepping relay 40 while this stepping relay remains unenergized. Similarly the cut-off relay 38 has as a source of energization its right-hand winding 38A, contact 38B, conductor 40E and contact 40A when the stepping relay 40 is unenergized. The counting relays in the upper row of the double row pertaining to the hundreds order, when energized, are adapted to be held energized through their contacts as 35B and conductor 40F when stepping relay 40 is energized thus closing contact 40B.

Contact 28B of counting relay 28 will hold relay 31 energized so long as relay 28 remains energized. Relay 31 is held energized later when stepping relay 40 is energized and relay 28 is deenergized, such energization being provided for through contact 31B, conductor 40F and contact 40B of stepping relay 40.

In the manner described above with respect to the counting relays in the hundreds order counting relay 29 upon its energization at point 534 closes its right-hand contact causing energization of counting relay 41 at point 544. In turn counting relay 41 closes its left-hand contact thereby extending ground to and causing energization of counting relay 192 at point 545. Thus the counting relays pertaining to the tens order are successively locked up or energized, and upon the energization of counting relay 71 at point 546 contact 71C is closed thereby extending ground to and causing energization of cut-off relay 43 at point 547. Relays 29 and 41 when energized are representative of the digit 5 in the tens order; counting relay 192 and the counting relay thereabove are representative of 4; the next two vertically aligned relays are representative of the digit 3; relay 139 and the counting relay thereabove are representative of the digit 2 while counting relays 70 and 71 are representative of the digit 1.

In the lower group of counting relays (Fig. 4) which pertain to the units order, relays 30 and 42 are representative of the digit 5; relays 72 and 73 are representative of the digit 4 while the remaining relays similarly paired to the left are respectively representative of the digits 3, 2 and 1. Counting relay 30 when energized at point 535 caused energization of relay 42 which in turn caused energization of relay 72 and so on, the relays energizing successively one after the other in the manner hereinabove described with reference to the counting relays pertaining to the hundreds and tens orders. Ultimately, with the energization of counting relay 152C at point 548 and the closing of the left-hand contact thereof ground is extended to cut-off relay 44 which is thus caused to energize at point 549.

As will be observed from the chart (Figs. 18 and 25) the energization of the chains of counting relays in the units, tens and hundreds orders occurs simultaneously at points 533, 534 and 535, the locking up or energization of the counting relays in each of these orders taking place independently of the energization in the other orders but overlapping in point of time. Since a fewer number of counting relays were to be locked up in the hundreds order than in the tens and units orders, this locking up operation is completed first in the hundreds order and therefore cut-off relay 38 locks up or energizes prior to cut-off relays 43 and 44, the latter two cut-off relays energizing simultaneously since the time of their energization is predetermined by the same number of counting relays to be locked up.

The first of the cut-off relays (Fig. 4) to be locked up, and in this instance cut-off relay 38, closes its contact as 38F thereby impressing ground upon relay 64 (Fig. 4) which then begins energization at point 550. When relay 64 energizes at point 551 contact T opens thereby interrupting the series circuit including the sequence control relay 25 (Fig. 6) whereupon said relay begins deenergization which is completed at point 552. Thus deenergized, relay 25 first closes contact 25C and then opens contact 25B. The closing of contact 25C extends ground to and provides a holding circuit for relay 6 through contact 6C. Contact 25B when opened breaks the energization circuit for sequence relay 5 through its contact 5B and winding 5A, whereupon sequence relay 5 begins deenergization which is completed at point 553. Contact 5D of sequence relay 5 opens thereby removing ground from conductor 5G (Figs. 6 and 5A), cable 66 (Figs. 5A and 3), conductor 66J, switches 214 and 212, conductors 212A and 212B, contact finger 212C, contact bar 212D and relay 27G which is thus caused to deenergize at point 554. The contacts as 27H of deenergized relay 27G remove ground from the contact bars 27A, 27B and 27C pertaining to the last meter-reading, cable 68 (Figs. 3 and 5), contacts 26A, 26B and 26C of shift relay 201, cable 250E and cable 250 (Figs. 5 and 4) to the central windings of counting relays 28, 29 and 30, whereupon said central windings begin deenergization.

Energized stepping relay 38 in addition to the closing of its contact 38F also closed contacts 38C, 38D and 38E. Contact 38C extends ground through conductor 40C and stepping relay 40, and conductor 40D to conductor G, while contacts 38D and 38E respectively extend ground to conductors J and H. Conductors G, J and H lead into cable 250B thence into cable 250 (Figs. 4 and 5) to contacts G1, J1 and H1 of shift relay 201, cable 47 (Figs. 5 and 2), conductors 47G, 47J and 47H and respectively to clutches 48A, 53A and 56G. These clutches, therefore, with the closing of contacts 38C, 38D and 38E are potentialized at points 555, 556 and 557. Stepping relay 40 which is in series with the energization circuit for clutch 48A is potentialized concurrently with said clutch at point 558 upon the closing of contact 38C. Clutches 48A, 53A and 56G thus potentialized become energized at points 559, 560 and 561. Stepping relay 40 becomes energized more quickly at point 562.

When stepping relay 40 energizes at point 562 contact 40B thereof is closed prior to the opening of contact 40A. The closing of contact 40B extends ground to the right-hand winding 31A of counting relay 31 thereby providing a circuit for holding said relay energized while stepping relay 40 remains energized. The opening of contact 40A removes this source of energization through conductor 40E and contact 28C for the left-hand winding 28E of counting relay 28 whereupon said winding of the counting relay deenergizes. At this time, however, relay 27G (Fig. 3) has not deenergized whereby ground at the contacts thereof which is the source of energization for the central windings of counting relays 28, 29 and 30 remains effective. Therefore counting relay 28 remains energized through its central winding. The deenergization of relay 27G (Fig. 3) at point 554 opens its contacts thereby breaking the energization circuit for the central windings of counting relays 28, 29 and 30 whereupon relay 28 begins deenergization at point 563 concurrently with the deenergization of its central winding. Counting relays 28 and 30 are not deenergized at this time, although their central windings now deenergize, because stepping relays 45 and 46 are at this time unenergized so that the contacts 45A and 46A provide a source of energization for the left-hand windings of counting relays 29 and 30.

The energization of clutch 48A (Fig. 2) at point 559 connects the number wheel 48 for forward rotation with the shaft 51. Closing or energization of the clutch 53A at the same time and as indicated at point 560 in the operation chart connects the gear wheel 53 for rotation with the shaft 51. Gears 53 and 56E have the same number of teeth wherefore rotation of the gear 53 causes rotation of gear 56E at the same speed but in the opposite direction. Energization of the clutch 56G at point 561 establishes a driving connection between the gear 56E and the sleeve 56M wherefore the number wheel 56 and the parts associated therewith upon the sleeve 56M are caused to rotate in unison with the gear 56E. The digits appearing upon the periphery of the number wheel 56 are so arranged that the rotation thereof by the gears 53 and 56E will be a forward rotation.

Shortly after the number wheels 48 and 56 take motion the shunting wheel 48C which is common to the wheel unit pertaining to number wheel 48 carries a lobe 48S thereon into position for closing shunting contact 48D. One side of the shunting contact 48D is connected through a conductor 48X with a contact 172X of relay 172 (Fig. 2), the contact 172X being grounded so long as relay 172 remains unenergized. In this manner ground is extended to one side of the shunting contact 48D. The other side of shunting contact 48D is connected with conductor 47G at a point 47T which is between the battery associated with the clutch 48A and the stepping relay 40 (Fig. 4). Therefore, upon the closing of the contact 48D ground is applied to conductor 47G at point 47T. This application of ground at point 47T is ineffective so far as concerns energization of the clutch 48A since this ground simply supplements the ground impressed upon the conductor 47G from contact 38C of cut-off relay 38 (Fig. 4). The number wheel 48 therefore continues rotation, but such application of ground at point 47T is effective for shunting out stepping relay 40 (Fig. 4) since this relay will be then impressed with ground potential upon both sides. With the closing of shunting contact 48D therefore and the impressing of ground on conductor 47G at point 47T stepping relay 40 begins deenergization at point 564. When stepping relay 40 deenergizes at point 565 contact 40B opens subsequent to the closing of contact 40A. The closing of contact 40A impresses ground through contact 32C upon the left-hand winding of counting relay 32 thereby providing a holding circuit for maintaining counting relay 32 energized. The opening of contact 40B however removes ground from contact 31B and the right-hand winding 31A of counting relay 31, and since the left-hand winding of counting relay 31 had previously been deenergized by the opening of contact 28B when counting relay 28 deenergized, said counting relay 31 now begins deenergization with its right-hand winding at point 566.

As rotation of the number wheels 48 and 56 proceeds and shortly prior to the entry of the first digit 1 on each thereof as indicated at point 567 on the operation line pertaining to the stepping relay 40 and at points 568, 569 and 570 on the operation lines pertaining to the clutches 48A, 53A and 56G, the lobe on shunting wheel 48C moves beyond the position where it is effective for closing shunting contact 48D whereupon said shunting contact opens removing the shunt from stepping relay 40 (Fig. 4) which then begins energization at point 571. When stepping relay 40 completes energization at point 572 contact 40B thereof closes prior to the opening of contact 40A. This closing of contact 40B impresses ground upon the right-hand winding of stepping relay 33 thereby holding said relay energized. The opening of contact 40A removes ground from the left-hand winding of counting relay 32. The central winding of counting relay 32 was not energized during this operation and the right-hand winding thereof previously deenergized when counting relay 31 deenergized and opened contact 31C. Therefore, with the opening of contact 40A of stepping relay 40 counting relay 32 begins deenergization with its left-hand winding at point 573.

Number wheels 48 and 56 continue rotation and subsequent to entry of the first digit 1 thereon as indicated at point 567 on the line pertaining to stepping relay 40, the succeeding lobe 48S on shunting wheel 48C is carried into position for closing shunting contact 48D whereby ground is again impressed upon the conductor 47G at point 47T to again shunt out stepping relay 40 whereupon said stepping relay begins deenergization at point 574. When stepping relay 40 completes deenergization at point 575 contact 40A is closed prior to the opening of contact 40B. This closing of contact 40A provides a holding circuit for counting relay 34 through its left-hand winding. The opening of contact 40B relieves ground from the right-hand winding of counting relay 33 and since the left-hand winding of relay 33 was deenergized at the time of deenergization of relay 32 this relay 33 now begins deenergization with its right-hand winding at point 576. Shortly prior to the entry of the digit 2 upon each of the number wheels 48 and 56 as indicated at point 577 on the line pertaining to stepping relay 40, the lobe 48S of shunting wheel 48C which had been effective for holding closed the shunting contact 48D is removed from such operative position whereupon shunting contact 48D opens removing the shunt from stepping relay 40. Said stepping relay then begins energization at the point 578. Stepping relay 40 is thus permitted to reenergize at point 579 and close contact 40B prior to opening contact 40A. The closing of contact 40B impresses ground upon the right-hand winding of energized counting relay 35 thereby providing a holding circuit for said counting relay so long as stepping relay 40 remains energized. The opening of contact 40A removes ground from the left-hand winding of counting relay 34, and since the right-hand winding of counting relay 34 was previously deenergized upon the deenergization of counting relay 33, counting relay 34 now begins deenergization with its left-hand winding at point 580.

With continued rotation of the number wheels 48 and 56 the lobes 48S upon shunting wheel 48C are effective shortly after said number wheels rotate beyond a digital position for closing the shunting contact 48D and thus shunting out the stepping relay 40, opening contact 40B and releasing the then energized counting relay of highest numerical value in the upper row of the double row of counting relays pertaining to the hundreds order, and for causing the shunting contact 48D to open shortly prior to the number wheels reaching the next digital position with the effect of removing the shunt from stepping relay 40 thereby permitting it to energize opening contact 40A and releasing the then energized counting relay of highest numerical value in the lower row of the double row of counting relays pertaining to the hundreds order. In this fashion the locked up or energized counting relays in the hundreds order are successively deenergized, two of said relays, one in the lower row and the other in the upper row as relays 28 and 31, being deenergized as an incident to the entry of each digit upon the number wheels 48 and 56.

This action of deenergizing counting relays takes place during that interval of time represented by the space between chart sections 1 and 2, and subsequently shortly after the entry of the third digit 3 upon each of these number wheels 48 and 56 a lobe 48S on the shunting wheel 48C is carried into position for closing shunting contact 48D thereby depotentializing stepping relay 40 at point 581. When the stepping relay is fully deenergized at point 582 contact 40A has been closed prior to the opening of contact 40B. The thus closed contact 40A impressed ground upon the right-hand winding of cut-off relay 38 through contact 38B. Counting relay 36 will have already been deenergized by this time thereby opening its right-hand contact and deenergizing the left-hand winding of counting relay 37. Hence, with the opening of contact 40B which removes ground from the right-hand winding of counting relay 37 this counting relay begins deenergization with its right-hand winding at point 583. Number wheels 48 and 56 continue rotation and shortly prior to the entry of the fourth digit 4 upon each of these number wheels as indicated at points 584, 585, 586 and 587 respectively upon the lines pertaining to the stepping relay 40 and clutches 48A, 53A and 56G, the shunting contact 48D is opened thereby permitting potentialization of stepping relay 40 at point 588. Stepping relay 40 later completes energization at point 589, opening contact 40A thus removing ground from the right-hand winding of cut-off relay 38 and since the left-hand winding of this cut-off relay was previously deenergized when counting relay 37 deenergized, cut-off relay 38 now begins deenergization with its right-hand winding at point 590. Cut-off relay 38 when becoming deenergized at point 591 opens its several contacts. The opening of contact 38C interrupts the series circuit including stepping relay 40 and the clutch 48A (Fig. 2) whereupon these parts respectively begin deenergization at points 592 and 593. The opening of contacts 38D and 38E interrupts the energization circuits respectively for clutches 53A and 56G (Fig. 2) whereupon these clutches begin deenergization at points 594 and 595. Stepping relay 40 deenergizes at point 596 whereas the clutches 48A, 53A and 56G deenergize at points 585, 586 and 587 to effect release of the number wheels 48 and 56 from their driving connection with the shaft 51 concurrently with said number wheels displaying the digit 4.

Prior to the energization of clutches 48A, 53A and 56G, or, prior to the beginning of rotation of the number wheels 48 and 56, all of the backstop wheels 56C, 57C and 58C stood at zero and therefore presented a notch in each of their peripheries to the backstop members 56X, 57X and 58X. When said backstop members 56X, 57X and 58X were thus permitted to seat in their respectively complemental notches in the backstop wheels 56C, 57C and 58C the backstop bar 60 was permitted to occupy its innermost radial position with respect to the shaft 59. While in this position the backstop bar 60 was effective for closing contact 60D and for opening contact 60B. When any of the backstop wheels 56C, 57C or 58C are moved from their zero position, the notch therein will be carried from registry with its cooperative backstop members as 56X and thereby move the backstop bar 60 to its most outward position radially of the shaft 59 thereby lifting the contact closing member 60F from the contact 60D and lifting the contact opening member 60A from the contact 60B whereby the contact 60D is permitted to open and the contact 60B is permitted to close. Therefore, when the number wheel 48 had moved from its zero position to a position indicated at 597 (Fig. 18) on the line pertaining to stepping relay 40 in chart section 1, the backstop member 56X is cammed out of the notch in the backstop wheel 56C thus moving the backstop bar 60 to its outermost position radially of the shaft 59 and permitting contact 60D to open and contact 60B to close. This closing of contact 60B extends ground from contact 172X of relay 172 (Fig. 2) through conductor 48Y, conductor 66K (Figs. 2 and 6), slow-to-release relays 61 and 62, conductor 193A and through contact 23E of energized sequence relay 23 to battery. This energization circuit for relays 61 and 62 is maintained so long as any of the backstop wheels 56C, 57C or 58C is off zero and sequence relay 23 is energized for closing its contact 23E.

Relay 62 when energized closes contact 62A thereby extending battery through such contact and conductor 62C (Fig. 6) to sequence relays 13, 15, 17 and 19. Sequence relay 12 upon its energization at point 519 closed contact 12B thereby impressing ground upon the right-hand winding of sequence relay 13, but since at that time contact 62A of relay 62 was not closed for carrying battery to the other side of this winding of sequence relay 13 said sequence relay did not energize. However, with the energization of relay 62 and the closing of contact 62A with the consequent impression of ground upon one side of the winding of sequence relay 13, this winding and the relay 13 begin energization at point 602.

Since battery is then also available from contact 62A to the windings of sequence relays 15, 17 and 19 the energization of relay 13 at point 603 results in the remainder of the unenergized sequence relays becoming successively energized. Energized sequence relay 13 causes energization of relay 14 at point 604; energized relay 14 causes energization of relay 15 at point 605; energized relay 15 causes energization of relay 16 at point 606; energization of relay 16 causes energization of relay 17 at point 607; energized relay 17 causes energization of relay 18 at point 608; and energized relay 18 causes energization of relay 19 at point 609.

When cut-off relay 43 energized at point 547 its various contacts were closed and thereby grounded. Contact 43C extended this ground through conductor 45C and stepping relay 45 to conductor D (Fig. 4). Grounded contact 43D impressed ground upon conductor F; contact 43E impressed ground upon conductor E; and contact 43F impressed ground upon the conductor leading to control relay 64 (Fig. 4) but without effect since ground was previously impressed upon this conductor by the energization of cut-off relay 38 and the closing of its contact 38F. Grounded conductors D, F and E lead into cable 250B (Fig. 4) thereby extending these grounded circuits through contacts D1, F1 and E1 of shift relay 201 (Fig. 5), cable 47 (Figs. 5 and 2), conductors 47D, 47F and 47E to clutches 49A, 54A and 57G whereupon these clutches are potentialized at points 610, 611 and 612. Stepping relay 45 which is in series with clutch 49A is potentialized concurrently therewith at point 613. Energization of stepping relay 45 at point 614 effects the closing of contact 45B prior to the opening of contact 45A, such opening of contact 45A removing ground from the left-hand winding of counting relay 29 which then begins deenergization at point 615 since the central winding of this counting relay was previously deenergized upon the deenergization of relay 27G (Fig. 3) at point 554 and the opening of the contacts as 27H of this relay which removed the initial source of ground for the initially energized counting relays 28, 29 and 30.

When clutch 49A energizes at point 616 the number wheel 49 and its associated parts are connected for rotation with the shaft 51 (Fig. 2). Energization of clutch 54A at point 617 connects the gear 54 for rotation with the shaft 51 whereby the gears 54 and 57E are caused to rotate at the same angular velocity as number wheel 49. Energization of clutch 57G at point 618 effects a driving connection between the unit rotatable with the gear wheel 57E and the sleeve 57M upon which the number wheel 57 and its associated parts are mounted. In this manner the gear wheel 57E and the number wheel 57 are caused to rotate in unison and at the same speed as number wheel 49, the numbers upon the periphery of the wheel 57 being so arranged that this rotation of said number wheel will be forwardly.

Shortly after rotation of number wheels 49 and 57 is under way and these wheels move off zero the shunting wheel 49C comprising a part of the number wheel unit including the number wheel 49 carries one of its lobes 49S into position for closing the shunting contact 49D whereupon this shunting contact is operative, in the manner previously described with reference to shunting contact 48D, to extend ground from contact 172X (Fig. 2) and to a point 47U upon conductor 47D for shunting out stepping relay 45 which is in series with the clutch 49A. In this manner stepping relay 45 is depotentialized at point 619 and later deenergizes at point 620.

The first digit 1 is entered on the number wheels 49 and 57 at the time indicated by point 621 on the line pertaining to the stepping relay 45. Digit 2 is entered during that interval of time represented by the space between chart sections 1 and 2, the digit 3 is entered at point 622 (chart section 2) and digits 4 and 5 are entered at the times indicated by the points 623 and 624. Shortly prior to the entry of the first digit 1 at point 621 the lobe 49S on shunting wheel 49C is carried beyond this position thereby permitting contact 49D to open and remove the shunt from stepping relay 45 which is then repotentialized and later becomes energized at point 625. Between the entry of the first digit 1 at point 621 and the point of entry of the second digit 2 a succeeding contact on the shunting wheel 49C is effective for closing the shunting contact 49D to cause deenergization of the stepping relay 45 at point 626 and for later opening of the shunting contact 49D to cause reenergization of stepping relay 45 at point 627. In this fashion the shunting wheel 49C continues operation to cause deenergization of stepping relay 45 shortly after the number wheels 49 and 57 move beyond a digital position and to cause reenergization of said stepping relay shortly prior to these number wheels reaching the next digital position. Each time stepping relay 45 is deenergized as at point 620 the contact 45B thereof opens freeing from ground and causing deenergization of the counting relay as 41 of the highest numerical value then locked up in the upper row of the double row of counting relays pertaining to the tens order. In this instance the deenergization of stepping relay 45 at point 620 causes deenergization of counting relay 41 at point 628. Each time the stepping relay 45 is energized as at point 625 the contact 45A thereof opens freeing from ground and causing deenergization of the counting relay as 192 of highest numerical value then locked up in the lower row of the double row of counting relays pertaining to the tens order. When energizing at point 625 the stepping relay 45 causes deenergization of counting relay 192 at point 629. Thus two counting relays, one in the upper row and one in the lower row, are deenergized during the movement of the number wheels 49 and 57 from one digital position to the next, and finally after all of the counting relays have been deenergized and shortly prior to the number wheels 49 and 57 having entered thereon the fifth digit 5 at point 624, the fifth lobe upon the shunting wheel 49C will be carried from the position where it had been effective for closing shunting contact 49C to a position permitting said contact to open and in turn permit energization of stepping relay 45 at point 630. Since at this time counting relay 71 has been already deenergized at point 631, contact 71C thereof will have opened and caused deenergzation of the right-hand winding of cut-off relay 43 and, therefore, when stepping relay 45 energizes at point 630 the opening of contact 45A and removal of ground from the left-hand winding of cut-off relay 43 will cause said winding and the relay 43 to begin deenergization at point 632. When this cut-off relay 43 deenergizes at point 633 its several contacts are opened. The opening of contacts 43C, 43D and 43E break the previously described circuits which had provided for the energization of stepping relay 45, clutch 49A, clutch 54A and clutch 57G whereupon these parts simultaneously begin deenergization at points 634, 635, 636 and 637. The clutches 49A, 54A and 57G later deenergize at points 638, 639 and 640 at such time as effects release of the number wheels 49 and 57 from the constantly rotating shaft 51 when they respectively display the digit 5.

Since the same number of counting relays (representative of the digit 5) are locked up in the units order as in the tens order, the cut-off relay 44 became energized at point 549 at the same time as the cut-off relay 43 at point 547. This energization of cut-off relay 44 caused its several contacts to close whereby the contact 44C extended ground through conductor 46C and stepping relay 46 to conductor A, while contacts 44D and 44E extended ground respectively to conductors C and B. Contact 44F impressed ground upon the conductor leading to control relay 64 but without effect since this conductor was previously grounded by the closing of contact 38F of cut-off relay 38. The circuits of grounded conductors A, C and B are extended through cable 250B, cable 250 (Figs. 4 and 5), contacts A1, C1 and B1 of shift relay 201, cable 47 (Figs. 5 and 2), and through conductors 47A, 47C and 47B to clutches 50A, 55A and 58G. Clutch 50A connects the number wheel 50 and its associate rotatable parts for rotation with the constantly rotating shaft 51. Clutch 55A connects gear wheel 55 for rotation with the shaft 51 whereby the gears 55 and 58E which have the same number of teeth are caused to rotate at the same angular velocity as number wheel 50. Clutch 58G when energized is effective for establishing a driving connection between the gear 58E and the sleeve 58M which carries the number wheel 58 and its associated rotatable parts. Therefore, when the clutches 50A, 55A and 58G are energized at points 641, 642 and 643 the number wheels 50 and 58 take motion from the shaft 51 and rotate at the same speed. The numbers upon the peripheries of these number wheels are so arranged that this rotation thereof will be forwardly.

Inasmuch as the cut-off relays 43 and 44 are energized simultaneously at points 547 and 549, the clutches for causing rotation of the number wheels 50 and 58 are energized at the same time as the clutches for causing rotation of number wheels 49 and 57. During rotation of number wheels 50 and 58 the shunting wheel 50C opens and closes shunting contact 50D with the same effect upon stepping relay 46 (Fig. 4) as shunting contact 49D has upon the stepping relay 45 during the rotation of number wheels 49 and 57. Since the same number of counting relays (five pairs) are locked up in the units order as in the tens order the digit 5 will be entered upon each of the number wheels 50 and 58, this entry taking place simultaneously with the entry upon number wheels 49 and 57. Hence at point 644 on the line pertaining to stepping relay 46 the first digit 1 is entered upon number wheels 50 and 58, and the digits 3, 4 and 5 are entered thereon at points 645, 646 and 647.

Stepping relay 46 which is in series with the clutch 50A (Fig. 2) was potentialized at point 648 simultaneously with potentialization of the clutch 50A at point 649 and later becomes energized at point 650. Such energization of stepping relay 46 opens contact 46A, thereby removing ground from and causing deenergization of counting relay 30 at points 651. During rotation of number wheels 50 and 58 and the consequent opening and closing of shunting contact 50D the stepping relay 46 is alternately deenergized and reenergized whereby the counting relays of the units order are successively released. Between the zero position of these number wheels as at point 643 on the line pertaining to the clutch 58G and the position where the first digit 1 is entered at point 644 on the line pertaining to stepping relay 46, the stepping relay will first be deenergized at point 652 and later energized at point 653. Between the point 644 where the first digit 1 is entered and the point (not shown) between chart sections 1 and 2 where the second digit 2 is entered, stepping relay 46 will be first deenergized at point 654 and subsequently energized at point 655. Upon each deenergization of stepping relay 46, the locked up counting relay then of highest numerical value in the upper row of the double row of counting relays pertaining to the units order will be deenergized; for example, counting relay 42 becomes deenergized at point 656 immediately after deenergization of stepping relay 46 at point 652. When stepping relay 46 next energizes at point 653, counting relay 72 is caused to deenergize at point 657, counting relay 72 then being the highest in numerical value locked up in the lower row of the double row of counting relays pertaining to the units order. This action continues until eventually after deenergization of counting relay 152C at point 658, this being the last of the energized counting relays to deenergize, stepping relay 46 is permitted to energize at point 659, thereby opening contact 46A and removing ground from cut-off relay 44, which is thus depotentialized at point 660 and later deenergized at point 661. When cut-off relay 44 deenergizes, the contacts thereof open, breaking the energization circuit for clutches 50A, 55A and 58G, and for the stepping relay 46 which is in series with the energization circuit for clutch 50A; whereupon the clutches respectively begin deenergization at points 662, 663 and 664, and the stepping relay begins deenergization at point 665. With the deenergization of clutches 50A, 55A and 58G at points 666, 667 and 668 the number wheels 50 and 58 are uncoupled from the constantly rotating shaft 51. At this time both the last reading register 48—49—50 and the consumption quantity register 56—57—58 will read 455, the amount of the last meter-reading.

*Registration of previous reading (second sequence)*

Cut-off relays 43 and 44 deenergize simultaneously at points 633 and 661, and since they are the last of the cut-off relays (Fig. 4) to deenergize, ground is removed thereby from the conductor leading to control relay 64 by the opening of contacts 43F and 44F. The removal of ground from control relay 64 results in depotentialization thereof at point 669 and subsequent deenergization at point 670. Thus deenergized, control relay 64 permits the closing of contact T whereby the energization circuit for sequence control relay 25 (Fig. 6) is established, causing energization of this relay at point 671. Relay 25 then opens contact 25C, removing ground from sequence relay 6 through contact 6C whereupon this relay begins deenergization at point 672. When sequence relay 6 deenergizes at point 673, contact 6B opens, causing deenergization of the right-hand winding of sequence relay 7 whereby relay 7 remains energized through its left-hand winding and contact 7B so long as sequence control relay 25 remains energized and contact 25B closed. Deenergized sequence relay 6 grounds contact 6E, extending ground through contact 7D, conductor 7G (Figs. 6 and 5A), cable 66 (Figs. 5a and 3), conductor 66H, switches 213 and 211, conductor 211A, conductor 211B, contact finger 211C, monthly selector bar 211D, which is engaged by contact finger 211C through card perforations 211CC (Fig. 1) and to relay 67G and the battery associated therewith. Therefore, upon deenergization of sequence relay 6, the relay 67G is potentialized and later energizes at point 674.

This energization of relay 67G causes its contacts to close and impress ground upon the bars 67A, 67B and 67C pertaining to the previous meter-reading. Contact fingers 67D and 67F which respectively engage the contact bars 67A and 67C through card perforations 67DD and 67FF (Fig. 1) are thus grounded, and from these fingers, ground is extended through conductors 69A and 69C, cable 68 (Figs. 3 and 5) to contacts 65A and 65C of shift relay 202. Contact fingers 67D and 67F pertain respectively to the hundreds order and the units order of the previous meter-reading and signify a meter-reading of 404 inasmuch as no card perforations were provided for permitting fingers to engage the bar 67B which pertains to the tens order. When the shift relay 202 (Fig. 5) is closed in the manner now to be described all of the contacts on said shift relay are closed, including the contact 65A and 65C, which are then effective for extending the previously prepared circuit extending through contact fingers 67D and 67F (Fig. 3) to the counting relays (Fig. 4) so as to initiate energization of such of these counting relays as is representative of the amount 404.

Deenergization of sequence relay 6 and the opening of contact 6B also removed ground from contact 4D of sequence relay 4 and from conductor 4X (Figs. 6 and 5) whereby magnet 26 depotentialized at point 675, and upon the deenergization of this magnet at point 676, the contacts of shift relay 201 opened. Deenergized sequence relay 6 also closes contact 6D thereby extending ground from contact 8B of energized sequence relay 8 to conductor 6X (Figs. 6 and 5) to magnet 65, which magnet is thus potentialized at point 676A and upon its energization at point 677 closes the contacts of shift relay 202. The circuit then completed from contacts 65A and 65C of shift relay 202 to the counting relays (Fig. 4) impresses ground upon counting relays 28 and 72 through their central windings, so that these relays are potentialized at points 678 and 679 and later energized at points 680 and 681.

Energization of counting relays 28 and 72 starts energization in sequential order of the counting relays of lower numerical value in the hundreds and units orders. Eventually the last of these counting relays to be energized or locked up, namely, counting relays 37 and 152C are locked up and cause energization of cut-off relays 38 and 44 at points 682 and 683. Since four pairs of counting relays are locked up in each of the hundreds and units orders, cut-off relays 38 and 44 energize simultaneously.

Contact 38C of energized relay 38 now extends ground through conductor 40C and stepping relay 40 to conductor G. Contact 38D extends ground to conductor J, while conductor 38E extends ground to conductor H. Conductors G, J, and H extend through cable 250 (Figs. 4 and 5) and to contacts G2, J2 and H2 among the right-hand group of contacts upon shift relay 202. And since this shift relay is now closed, the circuit is extended from these contacts into cable 74 (Figs. 5 and 2), thence through conductors 74G, 74J and 74H respectively to the clutches 75A, 78A and 56G and to the batteries associated with these several clutches. These clutches are therefore caused to begin energization at points 684, 685 and 686. Stepping relay 40 which is in series with the energization circuit for clutch 75A is potentialized simultaneously therewith at point 687. When clutch 75A energizes at point 688 the number wheel 75 is connected with the constantly rotating shaft 322 for rotation forwardly therewith. When clutch 78A is energized at point 689 the gear 78 will be connected for rotation with the shaft 322 and thereby cause rotation of the gear 56E which is in mesh with the gear 78. Gears 78 and 56E have an equal number of teeth and therefore rotate at the same speed but in opposite directions. The energization of the clutch 56G at point 690 connects the sleeve 56M and the number wheel 56 thereon with the gear 56E. Number wheels 75 and 56 take motion simultaneously at the same speed of rotation, the number wheel 75 rotating forwardly while the number wheel 56 rotates reversely or subtractively.

Shortly after the number wheels 75 and 56 take motion in the manner described from the constantly rotating shaft 322, the shunting wheel 75B associated with the number wheel 75 carries a lobe thereon into position for closing shunting contact 75D making this contact effective for extending ground from grounded relay contact 172X through conductor 48Y to point 74S on conductor 74G, which point is between the battery associated with clutch 75A and stepping relay 40 (Fig. 4). In this manner stepping relay 40 is shunted out and caused to deenergize at point 691. When stepping relay 40 first energized at point 692 contact 40A was opened removing this source of ground for counting relay 28 whereupon the left-hand winding of this counting relay deenergized. The relay 28 did not deenergize at that time, however, since its central winding was still energized through the circuit causing its initial energization. This initial energization circuit is later interrupted in the following manner. When cut-off relays 38 and 44 energized, their contacts 38F and 44F impressed ground upon the conductor leading to control relay 64 thus energizing this relay at point 693 and opening contact T. Contact T, when opened, interrupted the energization circuit for sequence control relay 25 (Fig. 6) which then deenergized at point 694 opening contact 25B. This opening of contact 25B removed ground from sequence relay 7, causing deenergization thereof at point 695 and the consequent opening of contact 7D. In this manner the circuit beginning with ground at contact 6E and leading through contact 7D and conductor 7G and ultimately through switches 213 and 211 (Fig. 3) to relay 67G (Fig. 3) is broken, causing deenergization of relay 67G at point 696. When relay 67G deenergizes and opens contacts as 67H, the energization circuit for the central windings of counting relays 28 and 72 is broken. Since the left-hand winding of counting relay 28 is already deenergized at this time, said relay 28 begins deenergization at point 697 concurrently with the deenergization of its central winding. Therefore, when the stepping relay 40 deenergized at point 691 and opened its contact 40B the sole source of ground for holding stepping relay 31 energized was removed and this relay then began deenergization at point 698.

During rotation of the number wheels 75 and 56, the shunting wheel 75B is operative to close the shunting contact 75D shortly after these number wheels move beyond a digital position and is further operative for permitting said shunting contact to open shortly prior to the wheels arriving at the next digital position. Thus a pair of counting relays (Fig. 4) are released as an incident to the movement of these number wheels from each digital position to the next.

After the third digit 3 is additively entered upon the number wheel 75 and the third digit 1 is subtractively entered upon the number wheel 56 (which entries are completed during that interval of time represented by the space between chart sections 2 and 3) and shortly prior to the entry of the fourth digits respectively 4 and 0, upon these number wheels as indicated at point 699 upon the line pertaining to stepping relay 40, the shunting wheel 75B is moved beyond the position where its fourth lobe had been effective for closing shunting contact 75D so that said contact opens to remove the shunt from stepping relay 40 and permit said relay to energize at point 700. This energization of stepping relay 40 opens contact 40A thus removing the source of energization for cut-off relay 38 which then begins deenergization completed at point 701. Deenergized cut-off relay 38 opens its contacts 38C, 38D and 38E thereby breaking the energization circuits for stepping relay 40, clutch 75A, clutch 78A and clutch 56G, whereupon these parts are respectively depotentialized at points 702, 703, 704 and 705. When the clutches 75A, 78A and 56G deenergize at points 706, 707 and 708 the number wheels 75 and 56 are released from their driving connections with the constantly rotating shaft 322 at the time they have been rotated respectively forwardly and backwardly through four digital positions, the number wheel 75 now standing at 4 and the number wheel 56 now standing at 0 since it stood at 4 at the beginning of its backward or subtractive rotative movement.

With the energization of cut-off relay 44 at point 683, contacts 44C, 44D and 44E were closed, contact 44C extending ground through conductor 46C and stepping relay 46 to conductor A, contact 44D extending ground to conductor C, and contact 44E extending ground to conductor B. These conductors A, C and B lead through cable 250 (Figs. 4 and 5) and to contacts A2, C2 and B2 on shift relay 202. From these contacts the circuit extends through cable 74 (Figs. 5 and 2) and respectively through conductors 74A, 74C and 74B to clutches 77A, 80A and 58G which are potentialized at points 709, 710 and 711. Stepping relay 46 which is in series with clutch 77A is potentialized simultaneously therewith at point 712. When clutches 77A, 80A and 58G energize at points 713, 714 and 715 the number wheels 77 and 58 are connected for rotation with the constantly rotating shaft 322, the number wheel 77 being connected directly with said shaft for forward rotation and the number wheel 58 being connected with said shaft through gears 80 and 58E, clutch 58G, and the sleeve 58M for backward or subtractive rotation. The action with respect to the rotation of number wheels 77 and 58 is the same as that described above with reference to number wheels 75 and 56. During rotation of these number wheels the shunting wheel 77B coacts with the shunting contact 77D to shunt out stepping relay 46 (Fig. 4) each time the number wheels pass beyond a digital position and to remove the shunt and permit such stepping relay to energize shortly prior to the number wheels reaching the next digital position. The first three digital positions 1, 2 and 3 are attained by the number wheel 77 during that interval of time represented by the space between chart sections 2 and 3, and eventually after all locked up counting relays in the units order (Fig. 4) have been deenergized by the alternate energization and deenergization of stepping relay 46 and shortly prior to the fourth digit 4 being entered on the number wheel 77 as indicated at point 716 on the line pertaining to stepping relay 46 the shunting contact 77D is permitted to open, thus causing energization of stepping relay 46 at point 717. This energization of stepping relay 46 opens contact 46A, removing ground from cut-off relay 44 which relay then begins deenergization that is completed at point 718. Thus deenergized, cut-off relay 44 opens its several contacts including contacts 44C, 44D and 44E which break the energization circuits for stepping relay 46 and clutches 77A, 80A and 58G which clutches are thereby depotentialized at points 719, 720, 721 and 722. These clutches later deenergize at points 723, 724 and 725 to demobilize the driving connections of the number wheels 77 and 58 with the constantly rotating shaft 322 at the time the number wheel 77 has been rotated forwardly four digital positions to display 4 and the number wheel 58 has been rotated backwardly four digital positions to display 1, this number wheel having previously stood at 5. Number wheel 57 of the consumption quantity register 56—57—58 was undisturbed during this operation while number wheels 56 and 58 were each turned backwardly four digital positions to respectively display the digits 0 and 1. Number wheel 57, therefore, remains at 5 and the consumption quantity register displays the reading 051.

In the just described subtractive movement of the number wheels 56 and 58 in the consumption quantity register 56—57—58 there is no carry-over action. The operation during a carry-over action in this sequence will be illustrated later in that part of the description appearing under the sub-heading Carry-over in consumption quantity subtraction.

*Preparing for first-step rate action (third sequence)*

When cut-off relays 38 and 44 (Fig. 4) deenergized simultaneously at points 701 and 718 ground was removed from the conductor leading to control relay 64 (Fig. 4) whereupon this relay deenergized at point 725 closing contact T and establishing the energization circuit, beginning with ground at such contact, for sequence control relay 25. Sequence control relay 25 thus potentialized at point 726 energizes at point 727, opening contact 25C and causing deenergization of sequence relay 8 at point 728.

This deenergization of sequence relay 8 opens contact 8B, thereby breaking the circuit beginning with ground at such contact and including contact 6D and conductor 6X (Figs. 6 and 5) and magnet 65 whereby this magnet is depotentialized at point 729 and deenergizes at point 730 pusuant to opening the contacts on shift relay 202. Deenergized relay 8 closes contact 8E to establish a circuit extending ground through contact 9D, conductor 9G, cable 320 (Figs. 6 and 9A), conductor 9G and to the first-step comparison bars 81, 82, 84 (Fig. 7), 85, 86, 88 (Fig. 8), and 90 (Fig. 9). This starts the first action in subtracting 14, the amount of the first rate step indicated by the card perforations (Fig. 1A) for coinciding with the first step bars 85, 86, 87, 88, 89 and 90, from the total consumption 051 registered on the consumption quantity register 56—57—58 (Fig. 2), and in recording 14 on the first step registering wheels 97 and 98 (Fig. 10).

The first step consumption quantity being punched in the card for 14, according to the plan illustrated in Fig. 1A, and the actual consumption being 051, an effective circuit will be established through the conductor 9G to the first step bars 85, 86, 88 and 90 the hundreds bars 81, 82 and 84 being ineffective during this operation because of there being no card perforations in registry with these bars. Bar 85, through card perforations 85AA, 85BB, 85CC, 85DD, 85EE, 85FF, 85GG and 85HH, grounds the fingers 85A, 85B, 85C, 85D; 85E, 85F, 85G and 85H. For bar 86, finger 86A which engages this bar through card perforation 86AA is grounded but without effect since the contact closing wheel 57D (Figs. 2 and 8), of which the lobe is effective for singly closing the multiple contact switches shown schematically in Figs. 8 and 8A is now effective for closing the number 5 of said multiple contact switches. These multiple contact switches correspond to the digits 0 through 9 as viewed from top to bottom in Figs. 8 and 8A. The lobe upon contact closing wheel 57D which now stands at 5 with the number wheel 57 is in registry with the number 5 multiple contact switch to close only the contacts of such switch and leave open the contacts on the remainder of such switches. Consequently the 0 multiple contact switch will have its contacts open and the conductor leading from finger 86A (Fig. 8) will be dead-ended at this switch. But since the number 5 of the multiple contact switches pertaining to the tens order is closed by the lobe upon said contact closing wheel 57D, circuit will be extended from the grounded contact bar 85 through finger 85E, conductor 85J, contact 85K, conductors 85L and 85M, relay 312 (Fig. 8) and to the battery at contact 311D (Fig. 7). With the establishment of this circuit relay 312 is potentialized at point 731. Attention is again directed to the fact that the source of ground for the circuit just described for energization of relay 312 is at contact 8E of sequence relay 8 (Fig. 6), and that this circuit is established at the time sequence relay 8 deenergizes and closes contact 8E. When relay 312 energizes at point 732, contact 312B thereof impresses ground upon bar 87, the circuit being extended from this bar to contact finger 87A which is permitted to engage the bar through card perforation 87AA and to conductor 100A (Figs. 8 and 8A). Contact 312A is also grounded with the energization of relay 312 and impresses such ground upon bar 89 (Fig. 9), and from this bar the circuit is extended through finger 89A, which is permitted to engage this bar through card perforation 89AA, and conductor 100B (Figs. 9 and 9A). Since contact closing wheel 58D (Figs. 2 and 9) now stands at 1 in accordance with the reading on the units order number wheel 58 in the consumption quantity register, the number 1 multiple contact switch, second from the top in the vertical row of such switches pertaining to the units order (Figs. 9 and 9A), is closed and the rest of such multiple contact switches are open. There are no lateral leads from conductor 100B to closed switch number 1, second from the top, and such laterals as extend to contacts of the other switches which are now open are dead-ended and without effect during the present operation.

Conductor 100A (Figs. 8 and 8A) previously described as being grounded from relay contact 312B pertains to the tens order and has the numerical value of 1 which value is correlated with the number 1 position of said conductor upon the left-hand side of the vertical group of nine conductors of which it forms a part. Likewise, conductor 100B (Figs. 9 and 9A) which pertains to the units order and which is grounded from relay contact 312A, has the numerical value of 4 and hence is correlated with its number 4 position from the left in that vertical group of nine conductors of which it forms a part.

First rate step comparison bar 90 is grounded from conductor 9G and carries this ground to finger 90X which is permitted to engage the bar through card perforation 90XX (Fig. 1A). Finger 90X extends this ground through conductor 91X, contact 92X of the number 1 multiple contact switch now closed by the lobe on contact closing wheel 58D, conductor 93X and to conductor 100X which has the numerical value of 1 which is correlated with its number one position at the left in the vertical group of nine conductors pertaining to the units order leading into cable 100. The ultimate effect of grounding conductor 100X will be of no consequence as will become apparent in the ensuing part of this description. Grounded conductors 100A and 100B, however, are instrumental in the entry of 14, the amount of the first rate step, in the first rate step register (Fig. 10).

Conductor 100A pertaining to the tens order, and conductors 100B and 100X pertaining to the units order all lead into cable 100 (Figs. 8A and 9A) and reappear from said conductor in Fig. 5, where they are respectively connected with contacts 99A, 99B and 99X of shift relay 203. Later, when shift relay 203 is operated for closing its contacts in the manner now to be described, this circuit leading to contacts 99A and 99B is extended to counting relays 70 and 72 (Fig. 4) thereby initiating energization of these counting relays in an arrangement representative of the amount 14. Closed contact 99X extends ground to counting relay 152B causing energization thereof.

Deenergized sequence relay 8 also closed contact 8D, thereby extending ground from closed contact 10B of sequence relay 10, through conductor 8X (Figs. 6 and 5) to magnet 99, which magnet was thereby potentialized at point 733. When the magnet 99 later energized at point 734, the contacts of shift relay 203 were closed, completing the above described circuits, including conductors 100A, 100B and 100X (Figs. 8A and 9A) leading respectively to counting relays 70, 72 and 152B and causing energization of these counting relays at point 735, 736 and 736A. The counting relays of lower numerical value in the tens and units orders then energize or lock up, there being one pair of such counting relays to energize in the tens order and four pairs of such counting relays to lock up in the units order. After energization of the last of the counting relays to energize in the tens order, energization of cut-off relay 43 occurs at point 737. Cut-off relay 44 energizes at point 738 subsequent to energization of counting relay 152C at point 736B.

When cut-off relay 43 energizes at point 737 its several contacts close. Contact 43C then extends ground through conductor 45C and stepping relay 45 to conductor D and contact 43E extends ground to conductor E. These conductors D and E lead through cable 250 (Figs. 4 and 5) respectively to the closed contacts D3 and E3 of shift relay 203, from which the circuits continue through cable 102 (Figs. 5 and 10) and conductors 102D and 102E to clutches 97A and 103A to battery. With the completion of these circuits, stepping relay 45 and the clutches 97A and 103A are potentialized at points 739, 740 and 741. Stepping relay 45 is therefore caused to energize at point 742 and open contact 45A to effect deenergization of the left-hand winding of counting relay 70, said counting relay remaining energized, however, through its central winding which is still connected with the source for its original energization.

When cut-off relay 44 energized at point 738, contact 44C became effective for extending ground through stepping relay 46 to conductor A and contact 44E for extending ground to conductor B. Conductors A and B lead through cable 250, (Figs. 4 and 5) to closed contacts A3 and B3 of shift relay 203 and the circuits continue through cable 102 (Figs. 5 and 10) and conductors 102A and 102B respectively to clutches 98A and 108A causing potentialization of these clutches at points 750 and 751. Stepping relay 46 which is in series with clutch 98A is potentialized at point 752 and energizes at point 753. This energization of stepping relay 46 opens contact 46A removing this source of energization for the left-hand windings of then energized counting relays 72 and 152B, which left-hand windings thereupon deenergize and leave these relays 72 and 152B energized through their central windings which are still connected with the sources for their original energization. It will be recalled that the central winding of relay 152B obtains ground through contact finger 90X (Fig. 9) which is in series with the circuit originating with ground at contact 8E of sequence relay 8 (Fig. 6). Ground for the central winding of counting relay 72 originates at contact 312B of relay 312, (Fig. 8).

Also when cut-off relays 43 and 44 energized at points 737 and 738 contacts 43F and 44F impressed ground upon the conductor leading to control relay 64, energizing relay 64 at point 743, opening contact T and breaking the energization circuit for sequence control relay 25 which is thus caused to deenergize at point 744. This deenergization of relay 25 opens contact 25B, releasing sequence relay 9 at point 745, freeing from ground the contact 9D, conductor 9G (Figs. 6, 9A, 9, 8 and 7) and the first step bars, including bar 85 thereby effecting deenergization of relay 312 at point 746 and the opening of its contacts 312A and 312B. The opening of these contacts 312A and 312B respectively break the energization circuits for the central windings of counting relays 72 and 70; and since at this time the left-hand windings of these counting relays have already been deenergized by the opening of contacts 45A and 46A, said counting relays begin deenergization at points 747 and 747A together with their central windings. Counting relay 152B began deenergization at point 736C immediately upon deenergization of sequence relay 9 since the central winding of relay 152B was directly in series with contact 9D. Shortly after deenergization of counting relay 152B at point 754 said relay is picked up and energized at point 755 and thus reestablished in the locked up chain of units order relays and is thus enabled to normally provide means for holding the relays of lower numerical value energized until such time as they are normally deenergized by the action of stepping relay 46. The fact that counting relay 152B was energized simultaneously with the energization of counting relay 72 resulted in earlier energization of cut-off relay 44 than would have been the case if only relay 72 had been energized, and this is because the ancillary chain of counting relays energized from relay 152B is shorter than the significant chain energized from relay 72. Consequently the potentialization of clutch 98A at point 750 is earlier as also is the time when said clutch completes energization at point 762 and starts rotation of the number wheel 98 (Fig. 10). But this forward advancement of the time when number wheel 98 begins rotation is without material effect because the shunting wheel 98B movable with this number wheel is always effective to deenergize the clutch 98A after the number wheel has been advanced the number of digital positions corresponding to the number of pairs of locked up counting relays in the significant chain pertaining thereto. When the clutch 98A is thus energized to cause an earlier initial movement of the number wheel 98 said clutch will also be deenergized correspondingly earlier. It will be observed from the chart that the relays in the significant chain of counting relays energized from relay 72 are normally and successively deenergized during rotation of number wheel 98 and its shunting wheel 97D. That is, counting relay 72 is deenergized first as a consequence of relay 312 deenergizing at point 746; counting relay 72 next deenergizes at point 747B shortly after number wheel 98 moves off 0; the counting relay of next lower numerical value is deenergized at point 747C shortly prior to entry of the first digit 1 at point 764, and so on. This action continues normally in view of the fact that the ancillary chain of counting relays locked up pursuant to the initial energization of counting relay 152B at point 736A are never permitted to reach such a degree of deenergization as would result in premature deenergization of cut-off relay 44 and of the clutch 98A. Even in an extreme case when nine pairs of relays are to be locked up by a circuit including a significant contact finger as 89X (Fig. 9) and when but a single pair of relays are locked up in the same order by a circuit including an ancillary contact finger as 90X (in which case counting relays 124A and 152B would be locked up), the ancillary chain of locked up relays will be reenergized by and consolidated into the significant chain of locked up nine pairs of relays before deenergization of the cut-off relay pertaining to such relays can occur. It should also be noted that the ancillary relay chain of relays will never include more relays than the significant chain, for the control card (Fig. 1A) is always perforated to permit only contact fingers of numerical value equal to or less than the units order digit in the rate step amount to engage the equal and low bar as 90.

A clutch 97A (Fig. 10) when energized at point 748 is effective for connecting the associated tens order number wheel unit, including gear 97C, with the constantly rotating shaft 322D, whereupon the gear 97C begins rotation and causes rotation of gear 103. Energization of clutch 103A at point 749 effects a driving connection between the gear 103 and the shaft 103C. Shaft 103C has upon its left end (Fig. 2) a gear 105A which is in mesh with the gear 54 which is freely rotatable upon the shaft 51 at this time since the clutch 54A is unenergized. Inasmuch as but a single pair of counting relays are locked up in the tens order, the clutch 97A (Fig. 10) will remain energized only long enough to advance the number wheel 97 one digital position from 0 to 1, and during this rotation the gears 97C and 103 and the gears 105A, 54 and 57E (Fig. 2) are effective for subtractively rotating, one digital position, the tens contact closing wheel 57D, the backstop wheel 57C, shunting wheel 57F, and the carry-over wheel 57S. These backwardly or subtractively rotated parts rotate independently of the sleeve 57M and of the number wheel 57, since at this time the clutch 57G is unenergized. Therefore, though these backwardly rotated parts are thus stationed at numerical position 4, the number wheel 57 remains in the position for displaying 5.

Shortly prior to entry of the digit 1 on number wheel 97, the shunting contact 97E is opened permitting reenergization of stepping relay 45 at point 755 and the resulting deenergization of cut-off relay 43 at point 756. Stepping relay 45 and clutches 97A and 103A then begin deenergization at points 757, 758 and 759. When clutches 97A and 103A deenergize at points 760 and 761 the number wheel 97 will stand at 1 while the contact closing wheel 57D (Figs. 2 and 8) will stand at 4.

When clutches 98A and 108A (Fig. 10) energize at points 762 and 763 both the number wheel 98 and the gear 98C are connected for rotation with constantly rotating shaft 322D. Clutch 108A is then effective for connecting the gear 108, which is driven by gear 98C, with shaft 108C (Figs. 10 and 2). The left end of shaft 108C carries a gear 105C which meshes with gear 55 which is freely rotatable upon shaft 51 and which meshes with gear 58E. These gear trains and the shaft 108C are adapted during forward rotation of the number wheel 98 to cause backward rotation of the gear 58E, contact closing wheel 58D, carry-over wheel 58S and backstop wheel 58C at the same speed as number wheel 98. Entry of the first digit 1 upon the number wheel 98 is completed at the time indicated by point 764 upon the line pertaining to stepping relay 46 and the second digit 2 is entered upon said number wheel at the time indicated by point 765. When number wheel 98 has been rotated forwardly one digital position the carry-over wheel 58S (Fig. 2) will have been rotated backwardly one digital position from 1 to 0. This backward rotation of the carry-over wheel 58S and the parts rotatable therewith is relative to the sleeve 58M and the number wheel 58 since clutch 58G is unenergized. Therefore, when contact closing wheel 58D moves backwardly from 1 to 0 the number wheel 58 remains stationary and continues to display the reading 1. By the time the number wheel 98 has rotated to the second digital position 2 at point 765 the carry-over wheel 58S will have moved backwardly an additional digital position through 0 to 9, and during such movement at point 766 as indicated on the line pertaining to stepping relay 46, the lobe on carry over wheel 58S will momentarily close carry-over contact 58K thereby impressing ground upon conductor 109L which leads into cable 109 (Figs. 2 and 5) and to contact L3 on shift relay 203. This circuit is extended through cable 250 (Figs. 5 and 4), cable 250B, conductor L and to carry-over relay 110 causing energization of said relay at point 767.

Relay 110 thus energized causes successive energization of carry-over relays 111 and 113 at points 768 and 769. This chain of carry-over relays locks up and is held locked up from contact 112A of stepping relay 112 so long as this stepping relay remains unenergized.

Shortly prior to the entry of the fourth digit 4 on number wheel 98 and to the subtractive entry of the fourth digit 7 on the contact closing wheel 58D (Figs. 2 and 9), the shunting contact 98E associated with the unit of number wheel 98 opens removing the shunt from stepping relay 46 permitting this relay to energize at point 770 thereby opening contact 46A and removing the single remaining source of energization for cut-off relay 44 since all of the counting relays in the units order have now been deenergized, cut-off relay 44 depotentializing at point 771. Later when cut-off relay 44 deenergizes at point 772, contacts 44C and 44E thereof open breaking the energizing circuits for stepping relay 46 and clutches 98B and 108B whereupon these parts begin deenergization at points 773, 774, and 775. When clutches 98A and 108A fully deenergize at points 776 and 777 the number wheel 98 will stand at 4 while the contact closing wheel 58D (Figs. 2 and 9) will stand at 7. The first rate step register 97—98 (Fig. 10) will now read 14 while the contact closing wheels 56D, 57D and 58D of the consumption quantity register 56—57—58 will stand at 047. Since the contact closing wheels 56D, 57D and 58D, after the setting up of the amount of the first rate step in the first rate step register 97—98, are supposed to be set to represent the difference between the consumption quantity 051 and the first rate step 14, the setting of 047 of these contact closing wheels is incorrect. The setting should be 037 instead of 047 and, therefore, must be modified by a subtractive carry-over operation described below under the sub-heading Carry-over in first step subtraction.

Before describing the subtractive carry-over operation however, attention is directed to contact X3 upon shift relay 203 (Fig. 5). When shift relay 203 is operated to close its several contacts including contacts X3, ground is extended through this contact and conductor 194B (Figs. 5, 5A and 6) to slow-to-release relay 194 to cause energization thereof as indicated at point 778. Energization of relay 194 is of no significance in the present operation wherein there is sufficient consumption to cause entries in each of the rate step registers. The utility of slow-to-release relay 194 is present only when the consumption quantity is so low that a minimum charge operation will be effected by the machine, omitting a portion of the sequence operations during an interval of time when the relay 194 is effective for holding sequence relay 20 energized. This action of slow-to-release relay 194 is fully explained hereinafter as an incident to the operation of the machine for effecting a minimum charge.

*Carry-over in first step subtraction*

When cut-off relay 44 deenergizes at point 772, contact 44F opens removing the final source of ground from the conductor leading to control relay 64 and this relay 64 is thus caused to deenergize at point 779, closing contact T. But since energized carry-over relay 113 at this time is holding its contact U open, this closing of contact T fails to energize sequence control relay 25. The deenergization of relay 64, however, in its closing of contact 64A establishes a circuit beginning with ground at contact T and leading through contact 113C, stepping relay 112 and contact 64A to conductor K. The ground from contact T is also extended through contacts 113D and 113E to conductors N and M but without effect in this part of the operation since they have no laterals leading to any contacts on closed shift relay 203.

Grounded conductor K leads through cable 250 (Figs. 4 and 5) to contact K3 of shift relay 203 from which the circuit is extended through cable 109 (Figs. 5 and 2) and conductor 109K to clutch 79B and the battery associated therewith. Stepping relay 112 (Fig. 4) and clutch 79B which are in series with the circuit just traced are potentialized at points 780 and 781. Clutch 79B when energizing at point 782 connects the gear 79 with the constantly rotating shaft 322 and thereby causes the gear 57E and the contact closing wheel 57D associated therewith to begin reverse rotation. During rotation of these parts the shunting wheel 79D rotating with the clutch 79B carries one of its lobes against shunting contact 79E thereby shunting out and causing deenergization of stepping relay 112 at point 783. This deenergization of stepping relay 112 causes deenergization of carry-over counting relay 111 at point 784, carry-over counting relay 110 having been previously deenergized at point 785 pursuant to energization of stepping relay 112 at point 786. Shortly prior to the contact closing wheel 57D having moved backwardly one digital position as indicated at point 787 on the line pertaining to stepping relay 112, the lobe of shunting wheel 79D is moved from its cooperative position with respect to the contact 79E wherefore said contact opens removing the shunt from stepping relay 112 which then reenergizes at point 788 causing the deenergization of carry-over cut-off relay 113 at point 789. Deenergized relay 113 opens contact 113C thus breaking the energization circuit for the stepping relay 112 and the clutch 79B which depotentialize at points 790 and 791. Thereafter the clutch 79B deenergizes at point 792 when the contact wheel 57D has been moved backwardly one digital position from 4 to 3. The contact closing wheels 56D, 57D and 58D of the consumption quantity register now occupy positions representative of the reading 037 which is the difference between the consumption amount 051 and the first rate step amount 14.

Deenergized carry-over cut-off relay 113 closes contact U thereby completing the energization circuit, beginning with ground at contact T, for sequence control relay 25 which then energizes at point 793.

*Preparation for first step multiplication (fourth sequence)*

Relay 25 when energizing at point 793 opens contact 25C causing deenergization of sequence relay 10 at point 794, opening contact 10B whereby the right-hand winding of sequence relay 11 is deenergized leaving this relay energized through its left-hand winding and relay contact 25B so long as sequence control relay 25 remains energized. Contact 10B also removes ground from contact 8D, conductor 8X (Figs. 6 and 5) and shift magnet 99 whereby this magnet deenergizes at point 795 incident to opening the contacts of shift relay 203. Contact X3 of shift relay 203 is thus opened removing the source of energization for slow-to-release relay 194 (Fig. 6) whereupon this relay begins deenergization at point 796. As has been explained hereinabove relay 194 plays no part in the typical operation of the machine now being described.

Contact 10E of deenergized sequence relay 10 closed extending ground through contact 11D, conductor 11G, cable 66 (Figs. 6 and 3), conductor 66G, first step rate selector bar 115 and to finger 115C which is permitted to engage said bar through card perforation 115CC. Finger 115C, as will presently appear is connectable with the product table (Figs. 11 and 11A) based upon a fixed factor of 7, which product table functions to energize certain conductors of numerical notation in a fashion to represent the product of the first step quantity (12) and 7. If the first step quantity were to be charged at a rate different than 7 per unit then a different contact finger than 115C would be permitted to engage the rate selector bar 115, this different finger being connected with a product table based upon a different fixed base factor corresponding to the different rate. From contact finger 115C the circuit continues through conductor 116A, cable 116 (Figs. 3 and 11A), conductor 116A (Figs. 11 and 11A) to contacts 117 and 117A of the number 1 multiple contact switch in the tens order of the product table (Figs. 11 and 11A) based upon the fixed factor 7. The left-hand vertical row of multiple contact switches in this product table pertain to the tens order of the variable factor and are representative from top to bottom of the digits 0 through 9. The right-hand vertical row of multiple contact switches in such product table pertain to the units order of the variable factor and are representative from top to bottom of the digits 0 to 9. These rows of multiple contact switches are respectively associated with the contact closing wheels 97B and 98B of the first step register (Fig. 10), and since this register now stands at 14 the contact closing wheel 97B (Fig. 11) will present its lobe in the position for closing the contacts of the number one multiple contact switch in the tens order, or, the switch second from the top in the left-hand vertical row of switches. Contact closing wheel 98B of said register when standing at 4 will present its lobe in position for closing the contacts of the multiple contact switch fifth from the top in the units order vertical row of switches (Figs. 11 and 11A).

The ground carried through conductor 116A to the closed contacts 117 and 117A (Fig. 11) is extended from contact 117A through conductors 117B and 117C, contact 117D of the number 4 multiple contact switch in the units order and conductor 117E to conductor 117F which is the number 9 conductor in the vertical group of nine conductors generally designated 493 (Figs. 11 and 11A). The conductors in this group pertain to the tens order and are respectively representative, from left to right, of the digits 1 to 9. Conductor 117F, therefore, is representative of the digit 9 in the tens order.

Conductor 116A (Fig. 11A) shortly after emerging from cable 116 is connected with a lateral 119, and ground is extended through this lateral 119 to contact 119A of the number 4 multiple contact switch of the tens order and thence through conductor 119B to vertical conductor 119C in the right-hand group of vertical conductors generally designated 494 in Figs. 11 and 11A. These conductors 494 pertain to the units order and are respectively representative, from left to right, of the digits 1 to 9. Conductor 119C, therefore, is representative of the digit 8 in the units order. Conductors 117F and 119C now grounded through the above described circuits are representative of the numerical amount of 98. Such conductors lead into cable 120 (Fig. 11A) from which they emerge in Fig. 5 where they are individually connected with contacts 114A and 114B of shift relay 204. When this relay is closed in the manner now to be described the circuit will be completed from said contacts to the counting relays (Fig. 4) to cause energization of these counting relays in an arrangement representative of the amount 98.

When sequence relay 10 deenergized at point 794 contact 10D closed completing the circuit which extends ground from contact 12B through said contact 10D, conductor 10X, contacts 185B and 186B of relays 185 and 186 which are now deenergized, conductor 185C (Figs. 6 and 5) to shift magnet 114, thus energizing this magnet at point 797 for closing the contacts upon shift relay 204.

When the backstop wheels 56C, 57C and 58C of the number wheel units pertaining to the consumption quantity register 56—57—58 (Fig. 2) all stood at zero at the beginning of this operation, the member 60F upon bar 60 was operative for closing contact 60D. While contact 60D was thus closed a circuit was established beginning with ground at contact 172X (Fig. 2) and extending through conductor 48Y, contact 60D, conductor 63E (Figs. 2 and 3), cable 116 (Figs. 3 and 11A) and conductor 180 to contacts 264S and 264T of the zero multiple contact switch in the tens order of the product table. This switch was then closed since no entry had yet been made in the first step register (Fig. 10); contact closing wheels 97B and 98B each stood at 0. Consequently the grounded circuit was extended through contacts 264S and 264T, conductors 264U and 264V, cables 181 and 183 (Figs. 11A and 3), conductors 264U and 264V (Fig. 3), the zero contact fingers which engages the bars 184 and 184A through card perforations 184EE and 184HH (Fig. 1A), the bars 184 and 184A, conductors 66D and 66C, cable 66 (Figs. 3 and 5A) and through conductors 66D and 66C (Figs. 5A and 6) to control relays 185 and 186 and the batteries associated therewith thereby causing energization of said relays. Shortly after the beginning of the operation when the number wheel unit associated with the number wheel 56 (Fig. 2) was moving between zero and 1, and as indicated at point 597 (Chart section 1) on the line pertaining to stepping relay 40, the member 56X and the bar 60 were cammed radially outwardly by the backstop wheel 56C thereby opening contact 60D concurrently with the closing of contact 60B. This opening of contact 60D interrupted the series circuit described immediately above which originated with ground at contact 172X (Fig. 2) for causing energization of control relays 185 and 186 (Fig. 6). When contact 60D was thus opened relays 185 and 186 began deenergization at points 798 and 799. With relays 185 and 186 thus deenergized the contacts 185B and 186B thereof close preparing the above described circuit which was completed by the closing of contact 10D for causing energization of shift magnet 114 at point 797.

The closing of contacts 114A and 114B of shift relay 204 upon the energization of shift magnet 114 at point 797 projects the circuit including the conductors 117F and 119C (Figs. 11 and 11A) representaive of the digits 9 and 8 to the central windings of counting relays 121 and 124 (Fig. 4). These relays then energize at points 800 and 801 whereupon the associated counting relays of lower numerical order successively lock up, and when cut-off relay 44 locks up at point 802 its several contacts close including contact 44F. Since cut-off relay 44 energizes prior to the energization of cut-off relay 43 at point 803, the contact 44F, when closing, is the first to impress ground upon the conductor leading to control relay 64, this relay energizing at point 804. Energized relay 64 opens contact T causing deenergization of sequence control relay 25 at point 805 and consequently deenergization of sequence relay 11 at point 806. Deenergized relay 11 opens contact 11D thereby removing ground from conductor 11G which through the circuit above traced extended ground to the central windings of counting relays 121 and 124. Therefore, this opening of contact 11D causes deenergization of these central windings.

Energized cut-off relay 44 closes a circuit from ground at contact 44C and leading through stepping relay 46 to conductor A, whereas cut-off relay 43 closes a circuit from ground at contact 43C and leading through stepping relay 45 to conductor D. Conductors A and D lead through cable 250 (Figs. 4 and 5) respectively to contacts A4 and D4 of shift relay 204, thence the circuits are extended through cable 126 (Figs. 5 and 15), conductors 126A and 126D to clutches 129A and 128A and the batteries associated therewith. Cut-off relay 44, therefore, when energizing is effective through contact 44C to complete a circuit through stepping relay 46 and clutch 129A to cause energization of this clutch at point 807 and the movement of the number wheel 129 with constantly rotating shaft 322D. Stepping relay 46 which is in series with the clutch 129A begins energization simultaneously therewith and completes such energization at point 808. The energization of cut-off relay 43 similarly completes the circuit causing energization of stepping relay 45 and clutch 128A at points 809 and 810, wherefore the number wheel 128 is connected to and rotates with the shaft 322D.

When stepping relay 46 energized at point 808 and opened contact 46A the left-hand winding of counting relay 124 was deenergized, the relay 124 remaining energized, however, through its central winding until deenergization of sequence relay 11 at point 806 which interrupted the initial source of energization for this counting relay. Counting relay 124 began deenergization at point 811 upon the deenergization of sequence relay 11 at point 806. Since sequence relay 11 was already deenergized at the time stepping relay 45 energized at point 809, the central winding of counting relay 121 was already deenergized and hence relay 121 began deenergization at point 812 immediately upon this energization of stepping relay 45.

During rotation of the number wheels 128 and 129 the shunting wheels 128D and 129D associated therewith are operative in the manner hereinabove described with reference to other shunting wheels of like construction, for opening and closing shunting contacts 128E and 129E for alternately deenergizing and energizing stepping relays 45 and 46 and thus successively releasing the locked up counting relays in the tens and units orders. The number wheel 129 is advanced eight digital positions from 0 to 8, the digit 8 being entered on this number wheel during that period of time represented by the space between chart sections 4 and 5. Shortly prior to the digit 9 being entered on number wheel 128 at the time indicated by the point 813 on the line pertaining to stepping relay 45, the shunting contact 128E is permitted to open removing the shunt from stepping relay 45 which relay then reenergizes at point 814. This energization of stepping relay 45 occurs after all of the counting relays in the tens order have been deenergized and therefore cut-off relay 43 which is next in the chain is caused to deenergize at point 815. When thus deenergized, cut-off relay 43 opens contact 43C thereby breaking the series circuit including stepping relay 45 and clutch 128A whereupon these parts begin deenergization at points 816 and 817. When clutch 128A deenergizes at point 818 the number wheel 128 will be released from the shaft 322D at the time of displaying the digit 9. The money register 127—128—129 will now read 098.

*Registration of second step counting relays (fifth sequence)*

The deenergization of cut-off relay 43 at point 815, since this cut-off relay is the last of the cut-off relays to deenergize, removes ground from control relay 64 which relay then deenergizes at point 819 closing contact T and causing energization of sequence control relay 25 at point 820. This energization of relay 25 causes deenergization of sequence relay 12 at point 821. Contact 12B opens, deenergizing the right-hand winding of sequence relay 13 which relay is then held energized through its left-hand winding under control of contact 25B. The opening of contact 12B also removes ground from the circuit including contact 10D and conductors 10X and 185C thereby causing deenergization of shift magnet 114 (Fig. 5) at point 822 and the consequent opening of the contacts of shift relay 204.

Contact 12E of relay 12 closes extending ground through contact 13D, conductor 13G, cable 320 (Figs. 6 and 9A) and conductor 13G (Figs. 9A and 9), grounding second step comparison bars 300, 301, 303 (Fig. 7), 304, 305, 307 (Fig. 8) and 309 (Fig. 9). The second step portion of the card is perforated as illustrated in Fig. 1A for the second step amount of 25. Contact closing wheels 57D and 58D (Figs. 2, 8 and 9) now stand at 37 thereby closing the number 3 multiple contact switch in Fig. 8 and the number 7 multiple contact switch in Fig. 9A. From grounded conductor 13G circuit is extended, for the tens order, to bar 304, finger 304A which is permitted to engage the bar 304 through card perforation 304AA, conductor 304B, contact 304C, conductor 304D, relay 315 and contact 314D (Fig. 7) to battery whereupon the relay 315 is caused to energize at point 823. Contact 315B now closed grounds bar 306, contact finger 306A which is permitted to engage the bar 306 through card perforation 306AA and conductor 138A which leads into the cable 138 pertaining to the second step quantity. Cable 138 reappears in Fig. 5 where conductor 138A emerges therefrom and is connected with contact 130A.

For the units order, with the contact closing wheel 57D standing at 7, the circuit starts with grounded contact 315A (Fig. 8) and leads through bar 308 (Fig. 9), finger 308A which is permitted to engage the bar 308 through card perforation 308AA, conductor 138B, cable 138 and contact 130B of shift relay 205 (Fig. 5). When shift relay 205 is closed in the manner now to be described, contacts 130A and 130B which have been grounded project the grounded circuits leading thereto respectively to the central windings of counting relays 139 and 30 (Fig. 4).

Sequence relay 12 when deenergizing also closed contact 12D and thereby extended ground from contact 14B through said contact 12D and conductor 12X (Figs. 6 and 5) to shift magnet 130, this magnet energizing at point 824 and closing all of the contacts upon shift relay 205. When shift relay 205 is caused to close its contacts in this manner the counting relays 139 and 30 begin energization at points 825 and 826, and when these relays energize at points 827 and 828 the relays of lower numerical value associated therewith begin energization one after another.

Since only two pairs of counting relays are locked up in the tens order the cut-off relay 43 is the first to energize as indicated at point 829 thereby closing contact 43F and impressing ground upon control relay 64 which is thus caused to energize at point 831, opening contact T and causing deenergization of sequence control relay 25 at point 832. Contact 25B opens effecting deenergization of sequence relay 13 at point 833, the opening of contact 13D and the indirect interruption at relay contacts 315A and 315B of the energization of circuits for the central windings of counting relays 139 and 30 which windings then begin deenergization.

Energized relay 43 closes contact 43C completing a circuit from ground and extending through stepping relay 45 and conductor D. Contact 43E impresses ground upon conductor E. These circuits including conductors D and E continue through cable 250 (Figs. 4 and 5), contacts D5 and E5 of shift relay 205, cable 139 (Figs. 5 and 10A) and conductors 139D and 139E respectively to clutches 140A and 142A and the batteries associated therewith. Hence the stepping relay 45 and the clutches 140A and 142A are potentialized simultaneously at points 834, 835 and 836. When clutch 140A energizes at point 837 the number wheel 140 in the tens order of the second step quantity register is connected for rotation with the constantly rotating shaft 322D as are the gears 140C and 142. Clutch 142A energizes at point 838 to connect gear 142 with the shaft 103C so that the shaft 103C will be driven from the shaft 322D and at the same speed.

When cut-off relay 44 energizes at point 839, contact 44C impresses ground upon one end of a circuit passing through stepping relay 46 and conductor A. Contact 44E impresses ground upon a circuit including conductor B. Conductors A and B lead through cable 250 (Figs. 4 and 5) to contacts A5 and B5 of shift relay 205 from where the circuits are extended through cable 139 (Figs. 5 and 10A) and conductors 139A and 139B respectively to clutches 141A and 143A pertaining to the units order of the second step quantity register. Stepping relay 46 and clutches 141A and 143A begin energization simultaneously at points 840, 841 and 842. When clutch 141A energizes at point 843 the number wheel 141 and gears 141C and 143 will be connected for rotation with the shaft 422D. Clutch 143A energizes at point 844 to connect the gear 143 with the shaft 108C so said shaft will be driven from and at the same speed as shaft 322D.

When stepping relay 45 energized at point 830, contact 45A opened deenergizing the left-hand winding of counting relay 139, but said relay 139 remained energized through its central winding until deenergization of relay 315 (Fig. 8), at point 843A following deenergization of sequence relay 13 at point 833. Counting relay 139 then began deenergization at point 845. Since relay 315 was already deenergized at the time stepping relay 46 energized at point 846, the central winding of stepping relay 30 was already deenergized and therefore said counting relay began deenergization at point 847 with its left-hand winding immediately upon the opening of contact 46A.

Shafts 103C and 108C, as stated hereinabove, carry gears 105A and 105C upon their left ends (Fig. 2) so that during forward rotation of the number wheels 140 and 141 the gear trains associated with these two shafts are adapted to reversely rotate the contact closing wheels 57D and 58D of the number wheel units pertaining to the tens and units orders in the consumption quantity register (Fig. 2). Inasmuch as two pair of counting relays were locked up in the tens order the number wheel 140 will be advanced two digital positions from 0 to 2, whereas the number wheel 141 will be advanced five digital positions from 0 to 5. Meanwhile, the contact closing wheels 57D and 58D will be rotated backwardly respectively two and five digital places, the contact closing wheel 57D thus being moved backwardly from 3 to 1 and the contact closing wheel 58D being moved backwardly from 7 to 2.

During rotation of the number wheel 140 the shunting wheel 140D operates to successively close and open shunting contact 140E whereby ground obtained from the right-hand contact of relay 173 is successively impressed upon and removed from the conductor 139D at a point adjacent to the clutch 140A and between said clutch and stepping relay 45 (Fig. 4). In this manner stepping relay 45 is alternately deenergized and energized to cause successive deenergization of the counting relays locked up in the tens order. Likewise, the shunting contact 141E associated with the units' order shunting wheel 141D is adapted to effect deenergization and energization of stepping relay 46, and thus successively deenergize the counting relays in the units order during rotation of the number wheel 141. After the counting relays locked up in the tens order have been deenergized the cut-off relay 43 will in turn be deenergized causing deenergization of stepping relay 45 and of the clutches 140A and 142A (Fig. 10) at such time that the number wheel 140 is disconnected from the shaft 322D while displaying 2, this occurring during the period of time represented by the space between chart sections 5 and 6. After all of the counting relays in the units order have been deenergized and shortly prior to the entry of the fifth digit 5 upon the number wheel 141 as indicated at point 848 on the line pertaining to the stepping relay 46, the shunting contact 141E is permitted to open, allowing reenergization of stepping relay 46 at point 849 and consequent deenergization of the cut-off relay 44 at point 850. Contacts 44C and 44E are thus opened and cause simultaneous depotentialization of stepping relay 46 and clutches 141A and 143A at points 851, 852 and 853. When clutches 141A and 143A deenergize at points 854 and 855 the number wheel 141 will be disconnected from the constantly rotating shaft 322D while displaying the reading of 5. The number wheels 140 and 141 of the second step quantity register now read 25 while the contact closing wheels 57D and 58D of the consumption quantity register (Fig. 2) now read 12.

*Preparation for second step multiplication (sixth sequence)*

The multiplication to be exemplified is 25 times 6, of which the product is 150. The factor 25 is the amount of the second step quantity whereas the factor 6 is a fixed factor having its value determined by the arrangement of the circuits in the product table shown in Figs. 12 and 12A. When the last of the cut-off relays deenergizes and in this instance when cut-off relay 44 deenergizes at point 850, ground is removed from control relay 64 which deenergizes at point 856 closing contact T and causing energization of sequence control relay 25 at point 857. Contact 25C opens, deenergizing sequence relay 14 at point 858. Contact 14B opens causing deenergization of the right-hand winding of sequence relay 15 which relay then remains energized through its left-hand winding so long as contact 25B remains closed. The opening of contact 14B also removes ground from the contact 12D, conductor 12X (Figs. 6 and 5) and from shift magnet 130 which deenergizes at point 859 opening the contacts of shift relay 205. Contact 14E closes extending ground through contact 15D, conductor 15G, cable 66 (Figs. 5A and 3), conductor 66F, second step rate selection bar 115A, contact finger 115D which is permitted to engage the bar 115A through card perforation 115DD, conductor 116B, cable 116 (Figs. 3 and 11A) to conductor 116B (Figs. 11A, 12A and 12). In the product table for the second step quantity multiplication the switches are arranged similarly to those in the first step product table shown in Figs. 11 and 11A. That is, there are two vertical rows of switches. The left-hand row pertains to the tens order and the switches therein correspond from top to bottom to the digits 0 to 9, whereas the right-hand row pertains to the units order and the switches therein correspond to the digits 0 to 9.

Inasmuch as the second step register (Fig. 10A) now stands at 25 the contact closing wheels 140B and 141B thereof (Figs. 10A and 12) will be turned to the position for closing the number 2 multiple contact switch in the tens order and for closing the number 5 multiple contact switch in the units order. Therefore grounded conductor 116B will be connected through contacts 145 and 146 with the conductors 145A and 146A, the circuit being extended through vertical conductors 145B and 146B, thence to lateral conductors 145C and 146C, contacts 145D and 146D, conductors 145E and 146E and respectively to vertical conductors 145F and 146F. Conductor 145F is the number 1 conductor of the left-hand group of nine vertical conductors representative of the digits 1 to 9 in the hundreds order, whereas conductor 146F is the number 5 conductor of the group of nine vertical conductors which are from left to right representative of the digits 1 to 9 in the tens order. Conductor 148 which branches from the conductor 116B in Fig. 12A and from which circuit is extendible through the units order switches selectively to conductors in the right hand group of nine vertical conductors pertaining to the units order, is ineffective during this operation inasmuch as the product is 150. The number 5 multiple contact switch in the units order is the only units order switch closed at this time and it will be seen that this switch is ineffective for connecting conductor 148 with any of the vertical conductors in said units order group.

Conductors 145F and 146F lead through cable 163 (Figs. 12A and 5A) to contacts 144A and 144B of shift relay 206 and when this relay is closed in the manner now to be described the circuit is extended through these contacts and conductors passing through the cable 250 (Figs. 5A, 5 and 4) to the central windings of counting relays 36 and 29. Deenergized sequence relay 14 closes contact 14D thereby carrying ground from contact 16B to conductor 14X (Figs. 6 and 5A) and to shift magnet 144 causing energization of this magnet at point 860. When the shift magnet 144 is thus energized the contacts of shift relay 206 are closed and counting relays 36 and 29 begin energization at points 861 and 862. The counting relays of lower numerical value then successively energize and inasmuch as only a single pair of counting relays are locked up in the hundreds order the cut-off relay 38 will be the first of the cut-off relays to energize as indicated at point 863. This energization of cut-off relay 38 closes contact 38F energizing control relay 64 at point 864, opening contact T and causing deenergization of sequence control relay 25 at point 865. Contact 25B opens deenergizing sequence relay 15 at point 866 opening contact 15D thereby removing the source for initial energization of relays 36 and 29. Energized cut-off relay 38 also closed contact 38C effecting a circuit from ground through stepping relay 40 to conductor G.

Later when cut-off relay 43 energized at point 867 contact 44C likewise effected a circuit from ground through stepping relay 45 and conductor D. Conductors G and D lead through cable 250 (Figs. 4 and 5A) to contacts G6 and D6, the circuit continuing through cable 126 and conductors 126G and 126D (Fig. 15) to the clutches 127A and 128A of the money register 127—128—129. Stepping relay 40 and clutch 127A which are in series begin energization at points 868 and 869 upon the closing of contact 38C. Stepping relay 45 and clutch 128A begin energization at points 870 and 871 upon the closing of contact 43C. Stepping relay 40 energizes at point 872 opening contact 40A and deenergizing the left-hand winding of counting relay 36. This counting relay is thus conditioned to deenergize with its central winding at point 875 pursuant to the opening of contact 15D when sequence relay 15 deenergized at point 866. Since contact 15D opened prior to the energization of stepping relay 45 at point 873, the central winding of stepping relay 29 was thus deenergized permitting said relay 29 to begin deenergization at point 874 upon the energization of stepping relay 45 and the opening of contact 45A.

Shortly after energization of the clutch 127A at point 876 and the beginning of movement of the number wheel 127 with the constantly rotating shaft 322D the shunting wheel 127D operates to close shunting contact 127E thereby shunting out and deenergizing stepping relay 40 at point 877 and causing deenergization of counting relay 37 at point 878, and shortly prior to the entry of the first digit 1 upon the number wheel 127, as indicated at point 881A on the line pertaining to stepping relay 40, the shunting contact 127E is opened permitting reenergization of stepping relay 40 at point 879 and the consequent deenergization of cut-off relay 38 at point 880. Contact 38C opens, breaking the energization circuit for stepping relay 40 and clutch 127A whereupon the stepping relay is caused to deenergize at point 881 and the clutch is caused to deenergize at point 882 at the time the digit 1 is entered on the number wheel 127. During rotation of the number wheel 128 the shunting wheel 128D alternately closes and opens the shunting contact 128E causing alternate deenergization and energization of stepping relay 45 whereby the locked-up counting relays in the tens order are successively deenergized, and shortly prior to the entry of the fifth digit 4 upon this number wheel, as indicated at point 883 on the line pertaining to stepping relay 45 and after all of the counting relays have been deenergized, the shunting contact 128E opens permitting reenergization of stepping relay 45 at point 884 and the consequent deenergization of cut-off relay 43 at point 885. Contact 43C opens thereby breaking the energization circuit for stepping relay 45 and clutch 128A which parts then respectively deenergize at points 886 and 887.

*Carry-over operation*

At the beginning of entry of the amount of 150 upon the money register 127—128—129 (Fig. 15) such register held the reading of 098. While the amount 150 was being entered in this register and specifically while the tens order number wheel 128 was being advanced from 9 to 0 during the entry of the first of the five additional digits thereon, carry-over contact 128J was momentarily closed by the lobe upon the carry-over wheel 128H whereby a circuit beginning with ground at the left-hand contact of relay 174 (Fig. 14) was completed through said contact 128J, conductor 126Q, cable 126 (Figs. 15 and 5A), contact Q6, cable 250 (Figs. 5A and 4), conductor Q, carry-over stepping relay 160 and to battery. Thereupon the relay 160 was potentialized at point 888 and when energized at point 888A closed contact 160B, causing energization of carry-over counting relay 161 at point 889. Relay 161 in turn when energized closed contact 161C causing energization of carry-over cut-off relay 163A at point 890. Relay 160 energized and locked up through contact 160C which is provided with ground from contact 162A of stepping relay 162 so long as this latter relay remains unenergized. Likewise the carry-over cut-off relay 163A locks up through its right-hand contact from grounded contact 162A.

Energized relay 163A also opens contact V. Therefore, when cut-off relay 43 deenergized at point 885 and opened contact 43F causing deenergization of control relay 64 at point 891, the closing of contact T was ineffective for effecting energization of sequence control relay 25 since the energization circuit therefor normally completed by the closing of contact T was broken at contact V. Deenergized relay 64 also closed contact 64B thereby completing a circuit beginning with ground at contact T and including contact UU of carry-over cut-off relay 113, contact 163C, stepping relay 162, contact 64B of relay 64, conductor P, cable 250 (Figs. 4 and 5A), contact P6, conductor 149, conductor 126G, cable 126 (Figs. 5A and 15), conductor 126G (Fig. 15), clutch 127A and the battery associated therewith. Thus upon the deenergization of relay 64 the above traced circuit is closed causing potentialization of the carry-over stepping relay 162 and of the clutch 127A at points 892 and 893. Stepping relay 162 energizes at point 894 opening contact 162A and causing deenergization of carry-over counting relay 160 at point 895. Number wheel 127 is connected to and begins rotation with the constantly rotating shaft 322D when the clutch 127A energizes at point 896 and shortly after the number wheel 127 takes motion a lobe upon shunting wheel 127D is carried under shunting contact 127E closing said contact thereby shunting out stepping relay 162 (Fig. 4) which then deenergizes at point 897, opening contact 162B and causing deenergization of carry-over counting relay 161 at point 898. Shortly prior to the first digit 2 being entered on the number wheel 127 contact 127E is opened permitting reenergization of the stepping relay 162 at point 899 wherefore contact 162A opens causing deenergization of carry-over cut-off relay 163A at point 900. Contact 163C opens, breaking the energization circuit for stepping relay 162 and the clutch 127A whereupon these parts are respectively deenergized at points 901 and 902, the number wheel 127 being disconnected from the shaft 322D upon the deenergization of the clutch 127A and at the time said number wheel displays the reading of 2. The money register 127—128—129 now stands at 248 which is the sum of 098 and 150.

*Energization of third step counting relays (seventh sequence)*

When carry-over cut-off relay 163A deenergized at point 900 contact V closed completing the energization circuit for sequence control relay 25, beginning with ground at contact T, whereupon this relay is caused to energize at point 903 and effect deenergization of sequence relay 16 at point 904. Contact 16B opens, deenergizing the right-hand winding of sequence relay 17 and leaving this relay energized through its left-hand winding and contact 25B so long as relay 25 remains energized. The opening of contact 16B also removed ground from contact 14D and conductor 14X (Figs. 6 and 5A) causing deenergization of shift magnet 144 at point 905 and the opening of the contacts of shift relay 206.

Contact 16E of sequence relay 16 is closed completing a circuit beginning with ground and extending through contact 17D, conductor 17G, cable 320 (Figs. 6 and 9A) and conductor 17G (Fig. 9A). Contact closing wheels 57D and 58D (Figs. 2, 8 and 9) now stand at 12 which amount is the remainder of the consumption quantity 051 after the successive substraction therefrom of the first step and second step quantities 14 and 25. From grounded conductor 17G (Fig. 9A) the circuit is extended through conductor 195, conductor 195A (Figs. 8A and 8), contact 195B of the number one multiple contact switch, now closed by contact closing wheel 57D, to conductor 151A which is representative of the digit 1 in the group of nine vertical conductors of which it is one. Ground is also extended from grounded conductor 17G (Fig. 9A) through vertical conductor 196, contact 196A of the number 2 multiple contact switch which is now closed by contact closing wheel 58D, and to conductor 151B which is the number 2 conductor in the group of nine vertical conductors of which it is one.

Conductors 151A and 151B lead through cable 151 (Figs. 9A and 5A) to contacts 150A and 150B of shift relay 207, and when this shift relay is closed in the manner now to be described these circuits are extended respectively to the central windings of counting relays 70 and 152 (Fig. 4).

Contact 16D of sequence relay 16 is closed upon the deenergization of said relay at point 904 thereby extending ground from contact 18B through conductor 16X (Figs 6 and 5A) and to shift magnet 150, causing energization thereof at point 906 and the closing of all contacts upon shift relay 207. With this closing of the contacts on shift relay 207 the circuit is extended through contacts 150A and 150B and cable 250 to effect energization of counting relays 70 and 152 at points 907 and 908. Subsequent to energization of counting relays 70 and 152 the related counting relays of lower numerical value successively energize and ultimately cut-off relays 43 and 44 energize at points 909 and 910. Cut-off relay 43 energizes first causing energization of control relay 64 at point 911, the opening of contact T and the deenergization of sequence control relay 25 at point 912. Contact 25B opens deenergizing sequence relay 17 at point 913 thereby opening contact 17D and removing the source of energization for the central windings of locked up counting relays 70 and 152.

Cut-off relay 43 when energizing at point 909 closes contact 43C extending ground through stepping relay 45 and conductor D. Contact 43E also closes extending ground to conductor E. Conductors D and E lead through cable 250 (Figs. 4 and 5A) to contacts D7 and E7 of shift relay 207, the circuits being carried forwardly through cable 153 (Figs. 5A and 10B), conductors 153D and 153E to clutches 159A and 197A and the batteries associated therewith. Therefore, with cut-off relay 43 energizing at point 909 the stepping relay 45 and clutches 159A and 197A are potentialized at points 914, 915 and 916. When clutch 159A energizes at point 917 the number wheel 159 and the associated parts rotatable therewith are clutched to the constantly rotating shaft 322D and begin forward rotation while the shunting wheel 159D closes and opens the shunting contact 159E for shunting out and thereby deenergizing and reenergizing stepping relay 45 to cause successive deenergization of the locked up counting relays in the tens order. Shortly prior to the number wheel 159 rotating a single digital position to display the digit 1 shunting contact 159E is opened to permit reenergization of stepping relay 45 to cause deenergization of the cut-off relay 43. The deenergized cut-off relay 43 opens contacts 43C and 43E thereby breaking the energization circuits for stepping relay 45 and clutches 159A and 197A, the clutch 159A being thus deenergized to release the number wheel 159 from shaft 322D at such time as results in this number wheel stopping while displaying the digit 1. This takes place during the interval of time represented by the space between chart sections 7 and 8.

When cut-off relay 44 energized at point 910 contacts 44C and 44E closed, contact 44C completing a circuit from ground through stepping relay 46 and conductor A, and contact 44E completing a circuit from ground through conductor B. From conductors A and B these circuits are continued through cable 250 (Figs. 5A and 4), contacts A7 and B7 of shift relay 207, cable 153 (Figs. 5A and 10B), conductors 153A and 153B, and clutches 154A and 155A to battery. Stepping relay 46 and clutches 154A and 155A are thus potentialized at points 918, 920 and 919. When clutch 154A energizes at point 921 the number wheel 154 takes motion with the constantly rotating shaft 322D while the shunting wheel 154D serves to alternately close and open the shunting contact 154E with the above described effect of alternately deenergizing and energizing stepping relay 46 so as to unlock the locked up counting relays in the units order. Eventually shortly prior to the entry of the second digit 2 upon the number wheel 154, as indicated at point 922 on the line pertaining to stepping relay 46 and after all of the counting relays have been deenergized, the shunting contact 154E is opened permitting energization of stepping relay 46 at point 923, thereby causing deenergization of cut-off relay 44 at point 924. This deenergization of cut-off relay 44 opens contacts 44C and 44E thereby deenergizing stepping relay 46 and clutches 154A and 155A respectively at points 925, 927 and 826. The remainder register 198—159—154 will now display the reading of 012, or, the remainder amount.

While the number wheel 159 was rotating forwardly one digital position from 0 to 1 gear 159C which rotates with the number wheel 159 was effective for driving the gear 197 and also the shaft 103C since at this time clutch 197A was energized. As explained above, shaft 103C when driven in this manner is operative through the gears 105A, 54 and 57E (Fig. 2) to drive backwardly the contact closing wheel 57D and the backstop wheel 57C in the tens order of the consumption quantity register. Inasmuch as the contact closing wheel 57D and the backstop wheel 57C stood at 1 prior to the entry on number wheel 159, said wheels 57D and 57C will be moved backwardly to 0 when the number wheel 159 is advanced to 1. The backstop wheel 57C will then be in position for placing the notch in the periphery thereof in registry with the member 57X on the backstop bar 60 but without immediate effect since at this time the backstop wheel 58C has its notch out of registry with the member 58X upon said bar 60.

During rotation of the number wheel 154, the gears 154C and 155 are effective through energized clutch 155A for rotating the shaft 108C which is effective through gears 105C, 55 and 75

58E (Fig. 2) for rotating backwardly the contacting closing wheel 58D and backstop wheel 58C. The contact closing wheel 58D stood at 2 when number wheel 154 began rotation and therefore when number wheel 154 had been advanced two digital positions from 0 to 2 the contact closing wheel 58D and the backstop wheel 58C were moved backwardly from 2 to 0, placing the notch in the periphery of backstop wheel 58C in registry with the member 58X upon bar 60. Backstop wheels 56C and 57C already stood at 0 so that when backstop wheel 58C was restored to its zero position the notch therein permitted the backstop member 60 to move radially inwardly of the wheel 58C thereby opening contact 60B (Fig. 2) and closing contact 60D.

This opening of contact 60B takes ground off of conductor 66K (Figs. 2, 3, 5A and 6) thereby removing this source of potentialization for slow-to-release relays 61 and 62 whereupon relay 62 begins deenergization at point 928. Battery for relay 62 is obtained at contact 23E of sequence relay 23. Relay 61, however, is held energized through a holding circuit including contact 61B and contacts 168C and 188B of unenergized relays 168 and 188. Contact 60D is closed thereby impressing ground upon a circuit including conductor 63E (Figs. 2 and 3), cable 116 (Figs. 3 and 11A), conductor 180 (Figs. 11A and 11), contact 178 of the number 1 multiple contact switch in the tens order, conductor 177A, cable 181 (Figs. 11A and 3), conductor 181A, contact finger 184C, contact bar 184 which is engaged by the finger 184C through card perforation 184CC, conductor 66D, cable 66 (Figs. 3 and 5A), conductor 66D (Figs. 5A and 6) and relay 185 to battery. Relay 185 is thus potentialized at point 929 and caused to energize at point 930. This energization of control relay 185 is without effect in the present operation, but is effective during an operation involving limited consumption as is illustrated in an operation hereinafter described under the heading Operation for minimum charge.

*Preparation for third step multiplication (eighth sequence)*

Pursuant to the entry of 12 in the remainder register 198—159—154 (Fig. 10B), cut-off relay 44 was the last of the cut-off relays to deenergize, this deenergization taking place at point 924, opening contact 44F and causing deenergization of control relay 64 at point 932. Contact T is thus closed causing energization of sequence control relay 25 at point 933 whereupon contact 25C opens, deenergizing sequence relay 18 at point 934.

Deenergized relay 18 opens contact 18B causing deenergization of the right-hand winding of sequence relay 19 which remains energized through its left-hand winding and contacts 19B and 25B so long as relay 25 remains energized. The opening of contact 18B also removes ground from contact 16D, conductor 16X and shift magnet 150 whereupon this magnet is caused to deenergize at point 935 concurrently with opening the contacts upon shift relay 207. Contact 18E closes a circuit starting with ground and leading through contact 19D, conductor 19G (Figs. 6 and 5A), cable 66 (Figs. 5A and 3), conductor 66E, rate selector bar 115B, contact finger 115E which is permitted to engage said bar through card perforation 115EE, conductor 116C, cable 116 (Figs. 3 and 11A), conductor 116C (Figs. 11A, 12A, 13A and 13) and contact 158 (Fig. 13).

In Figs. 13 and 13A the vertical rows of switches which for the greater part are multiple contact switches pertain respectively from left to right to the thousands order, the hundreds order, the tens order and the units order of decimal notation. The switches in each row correspond from top to bottom to the digits 0 to 9. These switches are adapted to be closed by the lobes on contact closing wheels 199B, 198B, 159B and 154B, each wheel having a single lobe and each lobe being adapted to close only the switch in registry therewith. Contact closing wheels 198B, 159B and 154B are associated respectively with the number wheels 198, 159 and 154 of the remainder register (Fig. 10B). The register as illustrated in Fig. 10B omits the fourth or thousands order number wheel which has associated therewith the contact closing wheel 199B shown schematically in Fig. 13. This product table (Figs. 13 and 13A) has the circuit connections thereof so made with the contacts of the multiple contact switches as to be representative of the fixed factor 1/3; that is to say, when the multiple contact switches are closed in any arrangement determined by the setting of contact closing wheels as 154B and corresponding to the numerical reading displayed upon the number wheels of the remainder register 198—159—154 (Fig. 10B), energized conductor 116C (Figs. 13A and 13) will be connected with the four groups of vertical conductors extending along the right-hand portions of Figs. 13A and 13 so as to energize such of these conductors as represent the product of the fixed factor 1/3 and the numerical setting upon said remainder register. These four groups of vertical conductors from left to right pertain respectively to the thousands order, hundreds order, tens order and units order of decimal notation. There are nine vertical conductors in each group and in each of the groups the conductors from left to right respectively represent the digits 1 to 9.

Inasmuch as the reading 12 stands upon the remainder register 198—159—154, the contact closing wheels 159B and 154B will stand respectively at 1 and 2, and will, therefore, be effective for closing the number one multiple contact switch in the tens order and the number 2 multiple contact switch in the units order. Since the upper switches in each vertical row are the zero switches, the number 1 switch will be the second from the top in the tens order while the number 2 switch will be the third from the top in the units order. Contact closing wheels 199B and 198B stand at 0 and therefore the 0 or upper switches in the thousands and hundreds orders will be closed. The circuit from grounded conductor 116C is traceable through closed contact 158, conductor 158A, contact 158C, conductors 158D, 158E and 158F, contact 157A, conductors 157B, 157C and 157D, contact 200A and conductor 200B to conductor 200C, the latter conductor being the number 4 conductor in the units group of vertical conductors and therefore has the numerical significance of 4. The amount 4 it will be noted is the product of 1/3 and 12. Conductor 200C leads through cable 321 (Figs. 13A and 5A) to contact 156A on shift relay 208 and when this relay 208 has its contacts closed in the manner now to be described the circuit will be extended through contact 156A to the counting relays (Fig. 4) so as to cause energization thereof in an arrangement representative of 4.

Deenergized relay 18 closes contact 18D thereby completing a circuit beginning with ground at contact 20B and leading through conductor 188F, contact 188D, conductor 188G, contact 18D and conductor 18X (Figs. 6 and 5A) to shift magnet 156 thus causing energization of said magnet at point 936 and the closing of the contacts upon shift relay 208. When contact 156A is thus closed, ground originating at contact 18E of sequence relay 18 and carried through the number four vertical conductor 200C (Figs. 13 and 13A), is conducted therethrough to the central winding of counting relay 72 (Fig. 4), resulting in energization of this counting relay at point 937. The counting relays of lower numerical value then successively energize so that eventually cut-off relay 44 energizes at point 938, closing contact 44F which results in energization of control relay 64 at point 939. Contact T, thus opened, effects deenergization of sequence control relay 25 at point 940. Contact 25B opens, deenergizing sequence relay 19 at point 941 and opening contact 19D which breaks the initial energization circuit for counting relay 72.

Contact 44C also closes thereby grounding one side of the circuit passing through stepping relay 46, conductor A, cable 250 (Figs. 5 and 5A), contact A8 of shift relay 208, cable 126 (Figs. 5A and 15), conductor 126A and clutch 129A to battery. Therefore, upon the energization of cut-off relay 44, the stepping relay 46 and the clutch 129A begin energization at points 942 and 943. Stepping relay 46 energizes at point 944, opening contact 46A and causing deenergization of the left-hand winding of counting relay 72, but relay 72 does not begin deenergization until after removal of the source of its original energization by the deenergization of sequence relay 19 at point 941 and the opening of contact 19D. At that time relay 72 begins deenergization at point 945. When clutch 129A energizes at point 946 the number wheel 129 takes motion with the constantly rotating shaft 322D and during such rotation the shunting wheel 129D cooperates with the shunting contact 129E in the regular manner for alternately deenergizing and energizing stepping relay 46 to cause successive deenergization of the locked up counting relays in the units order. Prior to this rotation of the number wheel 129 the number wheels 127, 128 and 129 displayed the reading of 248. The first digit 9 is entered on number wheel 129 at the time indicated by point 947 on the line pertaining to stepping relay 46. The second digit 0 is entered on said number wheel during that period of time represented by the space between chart sections 8 and 9. At point 948, between the times of entry of the digits 9 and 0 on said number wheel, the contact 129J is momentarily closed by the lobe upon carry-over wheel 129S, but while so closed ground is extended from the left-hand contact of relay 174 (Fig. 14) through said contact 129J, conductor 126L, cable 126 (Figs. 15 and 5A), contact L8, cable 250 (Figs. 5A and 4), conductor L (Fig. 4) and the right-hand winding of carry-over counting relay 110 causing energization of said relay at point 949. Carry-over relays 111 and 113, as before, successively lock up at points 950 and 951 following the energization of relay 110.

Shortly prior to entry of the fourth digit 2 on the number wheel 129 at point 952 and after all of the counting relays in the units order (Fig. 4) have been deenergized, shunting contact 129E opens removing the shunt from and permitting energization of stepping relay 46 at point 953. Contact 46A opens effecting deenergization of cut-off relay 44 at point 954. Deenergized cut-off relay 44 opens contact 44C breaking the energization circuit for stepping relay 46 and clutch 129A which parts then begin deenergization at points 955 and 956. Clutch 129A deenergizes at point 957 to disconnect number wheel 129 from the shaft 322D when said number wheel displays the digit 2. Deenergized relay 44 also opens contact 44F deenergizing control relay 64 at point 958 and closing contact T, but without effecting energization of sequence control relay 25 since energized carry-over cut-off relay 113 now holds contact U open.

Deenergized control relay 64 also closed contact 64A thereby completing a circuit beginning with ground at contact T and leading through contact 113C, stepping relay 112, contact 64A, conductor K, cable 250 (Figs. 4 and 5A), contact K8 on shift relay 208, conductor 164, conductor 126D, cable 126 (Figs. 5A and 15), conductor 126D (Fig. 15), to clutch 128A and battery. Carry-over stepping relay 112 and the clutch 128A, therefore, begin energization at points 959 and 960.

When relay 112 energizes at point 961 contact 112A opens depotentializing carry-over counting relay 110 at point 962. When clutch 128A energizes at point 963 the number wheel 128 is connected for forward rotation with the constantly rotating shaft 322D, the shunting wheel 128D being effective during such rotation to close and open shunting contact 128E thereby shunting out and permitting reenergization of stepping relay 112 respectively at points 964 and 965 to cause deenergization of carry-over counting relay 111 at point 966 and deenergization of carry-over cut-off relay 113 at point 967. Deenergized relay 113 opens contact 113C, breaking the energization circuit for stepping relay 112 and clutch 128A which parts are thus depotentialized at points 968 and 969. Clutch 128A deenergizes at point 970 after entry of the single additional digit 5 upon number wheel 128. The money register 127—128—129 now displays the reading 252, or, $2.52 which is the sum of the charges $0.98, $1.50 and $0.04 respectively for the first step quantity, the second step quantity and the remainder quantity of consumption.

*Registering customer's identification number (ninth sequence)*

Pursuant to the deenergization of carry-over cut-off relay 113 (Fig. 4) at point 967, contact U closes, completing the energization circuit for sequence control relay 25 which immediately thereafter energizes at point 971. Contact 25C opens effecting deenergization of sequence relay 20 at right-hand winding of sequence relay 21 which then remains energized through its left-hand winding and contacts 21B and 25B so long as sequence control relay 25 remains energized. Deenergized sequence relay 20 in opening contact 20B also breaks the circuit beginning with ground at said contact and extending through conductor 188F, contact 188D, conductor 188G, contact 18D, conductor 18X and shift magnet 156 (Fig. 5A) causing said magnet to deenergize at point 973 concurrently with the opening of the contacts upon shift relay 208.

Contact 20E of deenergized relay 20 closes a circuit from ground and leading through contact 21D, conductor 21G, cable 66 (Figs. 5A and 3), conductor 66A (Fig. 3), contacts 2H and 2F, bars 2L and 2M, contact fingers 2N and 2P which are permitted to engage the bars 2L and 2M through card perforations 2NN and 2PP, conductors 166A and 166B, cable 166 (Figs. 3 and 5A) and to contacts 165A and 165B of shift relay 209. Card perforations 2NN and 2PP are placed in the office card (Fig. 1A) in an arrangement representative of the number 12 which is the customer's identification number. Therefore contact fingers 2N and 2P (Fig. 3) which correspond respectively to the digits 1 and 2 are energized from the bars 2L and 2M and are thus enabled to energize contacts 165A and 165B of shift relay 209, said contacts corresponding respectively to the digit 1 in the tens order and the digit 2 in the units order. When shift relay 209 is closed in the manner now to be described contacts 165A and 165B are effective for extending the circuit through cable 250 (Figs. 5A and 4) to the central windings of counting relays 70 and 152 which relays will then energize and result in energization of associated counting relays of lower numerical value in an arrangement representative of the number 12.

Deenergized sequence relay 20 also closes contact 20D thereby completing a circuit beginning with ground at contact 22B and leading through said closed contact 20D and conductor 20X to shift magnet 165 (Fig. 5A), causing energization of said magnet at point 974 and actuation of shift relay 209 to close its several contacts. At this time, therefore, counting relays 70 and 152 are potentialized at points 975 and 976. After the associated counting relays of lower numerical value lock up, cut-off relays 43 and 44 lock up or energize at points 977 and 978.

Cut-off relay 43 is the first to energize and in so doing closes contact 43F, impressing ground upon control relay 64 which then energizes at point 979, opening contact T and causing deenergization of sequence control relay 25 at point 980. Contact 25B opens effecting deenergization of sequence relay 21 at point 981.

Energized cut-off relays 43 and 44 close contacts 43C and 44C thereby completing circuits including stepping relays 45 and 46, contacts D9 and A9 of shift relay 209 (Fig. 5A), conductors 167D and 167A (Fig. 14) and clutches 323A and 169A of the identifying register. Stepping relay 45 and clutch 323A which are in series begin energization at points 982 and 983, whereas stepping relay 46 and clutch 169A which are in series begin energization at points 984 and 985.

When clutch 323A is fully energized at point 986 the number wheel 323 begins forward rotation with the constantly rotating shaft 322D and during such rotation the shunting wheel 323D closes and opens shunting contact 323E for deenergizing and energizing stepping relay 45 so that the locked up counting relays in the tens order are successively deenergized, pursuant to which action the clutch 323A is ultimately caused to deenergize and release the number wheel 323 from the shaft 322D concurrently with said number wheel displaying the digit 1. A similar action takes place upon the energization of clutch 169A at point 987, the shunting wheel 169D then operating to indirectly cause successive deenergization of the counting relays locked up in the units order. Eventually, prior to the entry of the second digit 2 upon number wheel 169 as indicated at point 988 on the line pertaining to stepping relay 46, shunting contact 169E is opened permitting reenergization of stepping relay 46 at point 989. Contact 46A opens effecting deenergization of cut-off relay 44 at point 990 and the opening of contact 44C which breaks the energization circuit for stepping relay 46 and clutch 129A, these parts being thus depotentialized at points 991 and 992. Clutch 169A later deenergizes at point 993 to release number wheel 169 from the shaft 322D when said number wheel displays the digit 2. At this time the register (Fig. 14) will indicate the customer's identification number 12.

*Holding number wheels for reading and releasing them (tenth sequence)*

Cut-off relay 44 upon deenergizing at point 990 opens contact 44F deenergizing control relay 64 at point 994, closing contact T and causing energization of sequence control relay 25 at point 995. Contact 25C opens deenergizing sequence relay 22 at point 996. Contact 22B opens deenergizing the right-hand winding of sequence relay 23 and leaving relay 23 energized through its left-hand winding and contacts 23B and 25B so long as relay 25 remains energized. Contact 22B opening also removed ground from contact 20D, conductor 20X and shift magnet 165 (Fig. 5A), depotentializing this shift magnet at point 997 and causing it to deenergize at point 998 concurrently with its opening of the contacts on shift relay 209.

Contact 22E of deenergized relay 22 now grounds contact 23D, conductor 23G and control relay 168 (Fig. 6) which is thus energized at point 999. Contact 168C opens, breaking the holding circuit for slow-to-release relay 61 which then begins deenergization at point 1000 and completes such deenergization at point 1001 with no effect at this time other than to condition said relay for the beginning of a succeeding operation of the machine. Relay 61 is useful during an operation entailing a minimum charge for a limited consumption as is explained hereinafter under the sub-heading Operation for minimum charge. Contact 168A of energized relay 168 impresses ground upon and potentializes slow-to-release relay 24 at point 1002. When relay 24 energizes at point 1003 contact 24A opens, breaking the energization circuit for sequence control relay 25 which immediately thereafter deenergizes at point 1004. Contact 25B opens, deenergizing sequence relay 23 at point 1005 whereupon contact 23E opens, removing battery as the source of energization for relays 61 and 62 until a succeeding operation of the machine. Contact 23C likewise opens, removing this source of battery for energization of sequence control relay 25 until a succeeding operation ensues.

Deenergized sequence relay 23 also opens contact 23D thereby removing ground from conductor 23G and control relay 168 which then begins deenergization completed at point 1006. Slow-to-release relay 24 then begins deenergization at point 1007 because of the opening of contact 168A, but contact 24B remains closed until complete deenergization of relay 24 at point 1008 and therefore when contact 168B closes with the deenergization of relay 168, circuit is completed from ground at contact 168B through contact 24B and slow-to-release relay 170 whereby this latter relay energizes at point 1009. Later, when slow-to-release relay 24 deenergizes at point 1008, contact 24C closes extending battery through contact 170A and conductor 170B (Figs. 6, 5A, 5, 4, 3, 2 and 10) to a master zero setting relay 171 causing energization of this relay at point 1010. Relay 170 is depotentialized at point 1011 when relay 24 deenergizes and opens contact 24B.

Zero setting relay 171 when energizing at point 1010 closes contact 171A thereby impressing ground upon ancillary zero setting relays 172, 173 and 174 (Figs. 2, 10A and 14) and causing these relays to energize at points 1012, 1013 and 1014. Said ancillary relays are held energized through contact 171A so long as relay 171 remains energized. Contact 171B of relay 171 also closes, connecting one side of the winding thereof with all armatures of relays 172, 173 and 174, with the exception of the left-hand armatures of relays 172 and 174 and the right-hand armature of relay 173. The other side of the winding on relay 171 is connected with ground. Contacts 172A and 172B which are closed when relay 172 is energized are connected respectively with zero setting contacts 75E and 76E associated with number wheels 75 and 76 in the previous reading register 75—76—77. Contact 172Y is connected with the zero setting contact 77E associated with the number wheel 77 of said register. Consequently, so long as any of the number wheels 75, 76 or 77 are off zero, battery will be supplied through the clutches 75A, 76A or 77A through zero setting contacts 75E, 76E or 77E to armatures 172R or 172S. Since each of these armatures is connected with conductor 175, battery will be supplied to contact 171B of relay 171 and thus the relay 171 will be held energized so long as any of the number wheels 75, 76 or 77 is off zero. The zero setting contacts 56H, 57H and 58H associated with the number wheels 56, 57 and 58 are connected with armature 172S when relay 172 is energized and consequently the batteries at clutches 56A, 57A or 58A will provide a source of energization for relay 171 so long as any of the number wheels 56, 57 or 58 are off zero. The contacts as 172C which are engageable with the armature 172T lead respectively to the zero setting contacts 48E, 49E and 50E of the number wheel units in the last reading register 48—49—50 wherefore so long as any of the number wheels in this register are off zero the batteries at clutches 48A, 49A or 50A will provide a source of energization for the relay 171.

The contacts of relay 173 (Fig. 10A) with the exception of the right-hand contact of such relay are connected individually with the zero setting contacts at 97G of the number wheel units of the registers shown in Figs. 10, 10A and 10B. These contacts, when relay 173 is energized and so long as any of the number wheels of these registers are off zero, complete circuits from the batteries associated with the clutches of these number wheels to conductor 175 and the winding of zero setting relay 171. Likewise, the contacts of relay 174 (Fig. 14), with the exception of the left most contact, are connected individually with the zero setting contacts as 323C of the registers shown in Figs. 14 and 15; and so long as any of the number wheels of these registers are off zero, battery is supplied from the clutches associated therewith, through said zero setting contacts, said contacts of relay 174, conductor 175, contact 171B and the winding of zero setting relay 171 to ground.

When any number wheel as 75 (Fig. 2) is off zero whereby its associated zero setting contact as 75E is closed, a circuit is prepared from battery at the clutch as 75A so that with the closing of the related contact as 172A of the zero setting relay as 172, said clutch energizes for connecting the number wheel with the shaft as 322 upon which it is mounted. After the number wheel takes motion and as it eventually approaches the zero position, the notch in the periphery of the associated zero setting wheel as 75C registers with an element of the zero setting contact as 75E mated therewith, permitting such contact to open and break the energization circuit for said clutch. The clutch is thus deenergized at such a time as will result in the number wheel being disconnected from the shaft at the time said number wheel arrives at the zero position.

Should it happen that the number wheel as 75 were the last of the number wheels to arrive at the zero position, this opening of the associated zero setting contact as 75E would remove the only source of battery, at the other side of the clutch 75A, for the circuit extending through contact at 172A, conductor 175 and contact 171B for the winding of relay 171, whereupon the relay 171 would be permitted to deenergize thus opening contacts 171B and 171A, the latter contact resulting in deenergization of relays 172, 173 and 174. So long, however, as additional number wheels are off zero the battery at the clutches associated therewith will provide a source of energization for relay 171.

Each of number wheels 48, 49 and 50 of the last reading register is off zero, closing zero setting contacts 48E, 49E and 50E and thus providing for energization of clutches 48A, 49A and 50A at points 1015, 1016 and 1017 immediately after the energization of zero-setting relay 172 at point 1012. Since the number wheels 48, 49 and 50 stand respectively at 4, 5 and 5, said number wheels will be advanced respectively 6, 5 and 5 digital positions before reaching zero. Shortly prior to these number wheels being advanced 6, 5 and 5 digital positions the zero setting contacts associated therewith open whereupon the clutches are depotentialized and thereafter deenergize at points 1018, 1019 and 1020 concurrently with their respective number wheels reaching zero.

Number wheel 76 of the previous reading register stands at zero and consequently zero setting contact 76E is open and clutch 76A fails to energize. Clutches 75A and 77A of said register, however, energize at points 1021 and 1022 and later deenergize at points 1023 and 1024 after number wheels 75 and 77 have been advanced six digital positions from 4 to 0.

Number wheel 56 of the consumption quantity register stands at zero wherefore zero setting contact 56J is open so that clutch 56A fails to energize. Clutches 57A and 58A of said register energize at points 1025 and 1026 and later deenergize at points 1027 and 1028 after the number wheels 57 and 58 have been moved backwardly respectively five and one digital positions to both read zero. It will be noted that shaft 59 which carries one element of each zero setting clutch 56A, 57A and 58A rotates backwardly, whereas the shafts carrying elements of the remaining zero setting clutches rotate forwardly.

Clutches 97A and 98A, following the energization of zero setting relay 173 at point 1013, energize at points 1029 and 1030 and later deenergize at points 1031 and 1032 following the opening of zero setting contacts 97G and 98G. Number wheels 97 and 98 are thus advanced nine and six digital positions to zero.

Clutches 140A and 141A of the second step quantity register (Fig. 10A) energize at points 1033 and 1034 and later deenergize at points 1035 and 1036 after advancing the number wheels 140 and 141 respectively eight and five digital positions to zero.

Clutches 159A and 154A of the remainder register (Fig. 10B) energize at points 1037 and 1038 and later deenergize at points 1039 and 1040 after advancing the number wheels 159 and 154 respectively nine and eight digital positions to zero.

Clutches 323A and 169A of the identification number register (Fig. 14) energize at points 1041 and 1042 after the closing of the contacts on zero setting relay 174, these clutches later deenergizing at points 1043 and 1044 after having advanced the number wheels 323 and 169 respectively nine and eight digital positions to zero.

Clutches 127A, 128A, and 129A of the money register (Fig. 15) energize at points 1045, 1046 and 1047 and later deenergize at points 1048, 1049 and 1050 after advancing the number wheels 127, 128 and 129 respectively eight, five and eight digital positions to zero.

Clutches 97A, 159A and 323A were the last to deenergize near the end of this operation since each of the number wheels with which they are associated had to be rotated a maximum number of digital positions before reaching zero. When these clutches were simultaneously depotentialized at points 1051, 1052 and 1053, the winding of zero setting relay 171 in series with each of these clutches was likewise depotentialized at point 1054. Zero setting relay 171 thereafter deenergized at point 1055, opening contact 171A for deenergizing zero setting relays 172, 173 and 174 at points 1056, 1057 and 1058. At this time the zero setting operation is completed and the zero setting relays deenergized preparatory to use near the end of a succeeding operation of the machine.

It will be noted that the various registers of the machine are set up sequentially thereby enabling an operator to begin transferring computed data from the machine prior to its reaching the stage for holding of the number wheels for reading and reset. Also it will be noted that the holding of the wheels for reading, printing or the like just prior to reset may be prolonged as desired by increasing the deenergization period of slow-to-release relay 24. In this manner, while relay 170 is energized, battery at contact 24C may be withheld from the circuit leading through contact 170A to the zero setting relay 171 (Fig. 10) and accordingly delay the zero setting action.

When zero setting relay 172 (Fig. 2) energizes at point 1012 contact 172X open removing ground from the circuit including contact 60D (Fig. 2), contact 178 of the number 1 multiple contact switch in the tens order of the product table (Figs. 11 and 11A) and the number 1 finger engaging the tens equal bar 184 (Fig. 3) for holding energized the control relay 185 (Fig. 6). Therefore, said relay 185 begins deenergization at point 1059. Later when zero setting relay 172 deenergizes at point 1056 near the end of the zero setting operation and when the contact closing wheels 97B and 98B (Fig. 11) of the first step register (Fig. 10) have been returned to zero for closing the zero multiple contact switches associated therewith (Fig. 11), contact 172X is again grounded and becomes effective for establishing a circuit through closed contact 60D (Fig. 2), conductor 63E (Figs. 2 and 3), cable 116 (Figs. 3 and 11A), conductor 188, contacts 264S and 264T of the zero multiple contact switch in the units order of the product table (Figs. 11 and 11A), conductors 264U and 264V, cables 181 and 183 (Figs. 11A and 3), the zero contact fingers respectively associated with contact bars 184 and 184A, said bars 184 and 184A, conductors 66D and 66C (Figs. 3 and 6) and relays 185 and 186 to the batteries associated therewith thus causing energization of said relays at points 1060 and 1061.

The cards (Figs. 1 and 1A) are now removed to condition the machine for a subsequent operation under control of different cards.

*Carry-over in consumption quantity subtraction*

In the example now to be given it is assumed that the meter card (Fig. 1) is perforated for a last reading of 455 and a previous reading of 436. When a card so perforated controls the machine, the amount 455 is first entered in the last reading register 48—49—50, and later the amount 436 is entered in the previous reading register 75—76—77. The subtraction and carry-over action performed pursuant to these entries is of such character as will cause the consumption quantity register 56—57—58 to finally read 019 which is the difference between the last reading 455 and the previous reading 436.

The present operation of the machine is illustrated graphically in the timing chart composed of Figs. 39 to 42. The sections of this chart correspond to sections 1, 2 and 3 of the first chart composed of Figs. 18, 19, 25, 26, 32 and 33 and accordingly have been designated 1', 2' and 3'. That part of the operation entailing the set-up of control and sequence relays and entering the last reading 455 is the same as before and need not be exemplified further than by the graphical showing in chart section 1' and the first part of chart section 2' where the element actions which are identical with those in the corresponding part of the first chart are designated by the same respective reference numerals with a prime added. This chart illustrates the action of only those machine elements which are necessary to the understanding of the present operation.

Departure of the present operation from that of the first operation, above described, occurs as an incident to the entry of the previous reading amount 436.

Near the end of the entry of 455 in the last reading register and in the consumption quantity register and upon the deenergization of sequence relay 6 at point 673', circuit is completed from ground at contact 6E, contact 7D, conductor 7G, cable 66 (Figs. 5A and 3), conductor 66H, switches 213 and 211, conductors 211A and 211B, contact finger 211C, contact bar 211D and relay 67G to battery, energizing relay 67G at point 674'. Ground at the right-hand contact of relay 67G is impressed through bar 67A, contact finger 67D and cable 68 (Figs. 3 and 5) to contact 65A of shift relay 202 as during the preceding operation where the digit 4 occurred in the hundreds order of the previous reading. In the present instance, however, where the previous reading is 436, the number 3 contact finger will be permitted to engage grounded contact bar 67B and the number 6 finger will be permitted to engage the grounded contact bar 67C (Fig. 3). In this manner circuits are completed through conductors in cable 68 to contacts corresponding to the digits 3 and 6 respectively in the tens and units orders of contact groups on shift relay 202. This shift relay is operated to close its contacts at point 677' whereupon the aforementioned circuits leading to the contacts thereof continue through conductors in cable 250 (Figs. 5 and 4) to the counting relays 28, 139A and 30A. Counting relays 28, 139A and 30A are thus energized at points 680', 1070 and 1071.

The counting relays of lower numerical value successively lock up and eventually cut-off relays 38, 43 and 44 energize at points 682', 1072 and 1073. Cut-off relay 43 is the first to energize, closing contact 43F thereby energizing relay 64 at point 1074, opening contact T and thus causing deenergization of sequence control relay 25 at point 1075. Contact 25B opens, deenergizing sequence relay 7 at point 1076. Contact 7D opens deenergizing control relay 67G (Fig. 3) at point 1077 whereupon the contacts of relay 67G open and remove this source of energization for the originally locked up counting relays 28, 139A and 30A.

Contacts 43C, 43D and 43E of cut-off relay 43 close as before, incident to the entry of the previous reading, causing simultaneous potentialization of stepping relay 45, clutches 57G, 76A and 79A at points 1078, 1079, 1080 and 1081. When clutches 57G, 76A and 79A energize at points 1082, 1083 and 1084, the number wheel 76 takes forward rotative movement from the shaft 322 while the number wheel 57 takes backward rotative movement from said shaft. Number wheel 76 is rotated forwardly three digital positions from 0 to 3 whereas the number wheel 57 is rotated backwardly three digital positions from 5 to 2. During that period of time represented between chart sections 2' and 3' the clutches 57G, 76A and 79A deenergize for disconnecting the number wheels 76 and 57 from their driving connections with the shaft 322 concurrently with these number wheels respectively standing at 3 and 2.

Clutches 56G, 75A and 78A are energized as before at points 690', 688' and 684' upon the energization of cut-off relay 38 at point 682'. These clutches operate as before for causing forward rotation of number wheel 75 and backward rotation of number wheel 56, four digital positions each, until number wheel 75 finally stops at 4 and number wheel 56 at 0.

When cut-off relay 44 energizes at point 1073, stepping relay 46 and clutches 58G, 77A and 80A are potentialized as before at points 1085, 1086, 1087 and 1088. Upon the energization of these clutches at points 1089, 1090 and 1091 number wheels 77 and 58 are connected for rotation with the shaft 322, number wheel 77 being rotated forwardly six digital positions from 0 to 6 while the number wheel 58 is rotated backwardly from 5 to 9. Shortly prior to number wheels 77 and 58 reaching the digital positions 6 and 9 and after all of the locked up counting relays in the tens order have been deenergized, shunting contact 77D (Fig. 2) opens, permitting energization of stepping relay 46 at point 1092. Contact 46A opens deenergizing cut-off relay 44 at point 1093. Contacts 44C, 44D and 44E open depotentializing stepping relay 46 and clutches 58G, 77A and 80A at points 1094, 1095, 1096 and 1097. These clutches subsequently deenergize at points 1098, 1099 and 1100 concurrently with the number wheels 77 and 58 stopping respectively at 6 and 9. Contact 44F opens effecting deenergization of control relay 64 at point 1101 and the opening of contact T.

While the number wheel 58 was rotating backwardly during that part of the movement between the digital positions 0 and 9 and at the time indicated by point 1102 on the line pertaining to stepping relay 46, the lobe on carry-over wheel 58W passed under carry-over contact 58J, momentarily closing said contact and impressing ground upon conductor 74L. This ground is extended through a circuit including conductor 74L, cable 74 (Figs. 2 and 5), contact L2 of shift relay 202, cable 250 (Figs. 5 and 4), conductor L and the right-hand winding of carry-over counting relay 110 and the battery associated therewith. Thereupon carry-over counting relay 110 is caused to energize at point 1103 thus causing successive energization of carry-over counting relay 111 and carry-over cut-off relay 113 at points 1104 and 1105. Energized relay 113 opened contact U, breaking the circuit from contact T to sequence control relay 25 so that subsequently when control relay 64 deenergized at point 1101 closing contact T, relay 25 failed to energize. However, the closing of contacts T and 64A upon the deenergization of control relay 64 completed a circuit beginning with ground at contact T and leading through contact 113C, carry-over stepping relay 112, contact 64A and conductor K. Contact 113E now closed extends ground from contact T to conductor M. Contact 113D extends ground from contact T to conductor N. Circuits including conductors K, M and N lead through cable 250 (Figs. 4 and 5), contacts K2, M2 and N2 of shift relay 202, cable 74 (Figs. 5 and 2), conductors 74K, 74M and 74N respectively to clutches 57N, 79C and to one side of shunting contact 57L. Clutch 57N serves the same function as clutch 57G, that is, to connect the sleeve 57M with the gear wheel 57E so that during rotation of the gears 79 and 57E number wheel 57 will be caused to rotate backwardly.

Upon the closing of contacts T and 64A the above described circuits are complete causing simultaneous potentialization of carry-over stepping relay 112 and the clutches 79C and 57N at points 1106, 1107 and 1108. When clutches 57N and 79C energize at points 1109 and 1110 the number wheel 57 will be connected for reverse rotation by the shaft 322. During this rotation the shunting wheel 57F closes shunting contact 57L in the usual manner shortly after number wheel 57 takes motion and later permits said contact to open shortly prior to the completion of wheel movement to the next digital position. In this manner the ground impressed upon one side of the shunting contact 57L through conductor 74N is first impressed upon conductor 74K and later removed from said conductor thereby causing deenergization of stepping relay 112 at point 1111 and subsequent energization of said stepping relay at point 1112. When stepping relay 112 first energized at point 1113 contact 112A opened deenergizing carry-over counting relay 110 at point 1114. The relays 111 and 113 are later deenergized at points 1115 and 1116 respectively after the deenergization of stepping relay 112 at point 1111 and the reenergization of said stepping relay at point 1112. Carry-over cut-off relay 113 upon deenergizing at point 1116 opens its several contacts thereby breaking the energization circuits for stepping relay 112 and clutches 79C and 57N which then in the regular manner deenergize at points 1117, 1118 and 1119. With this deenergization of the clutches 79C and 57N the number wheel 57 will have been rotated backwardly one digital position from 2 to 1 and the consumption quantity register will now read 019 which is the true difference between the last meter-reading 455 and the previous meter-reading 436.

When carry-over cut-off relay 113 deenergized at 1116, closing contact U, the energization circuit was completed for sequence control relay 25 which then began energization at point 1120 to initiate the net sequence operation of the machine pursuant to sensing and setting up the first step quantity on the first step quantity register (Fig. 10) in the manner hereinabove described with reference to the first chart.

In the event there is a carry-over operation for both the tens and the hundreds consumption wheels, the tens carry will take place first, and by means of opened contact UU postpone operation of the hundreds carry until after deenergization of carry-over cut-off relay 113 and the consequent closing of contact UU.

Operation for minimum charge

The minimum charge operation is an alternative operation which is initiated during the third sequence when the consumption is equal to or less than the minimum charge amount of 12 perforated in the control card (Fig. 1A).

Minimum charge perforations are made for registration with the bars 184, 184A and 184B, and the contact fingers (Fig. 3) for engaging these bars correspond from bottom to top to the digits 0 to 9. Bar 184 is the tens equal bar. Perforations will be made in the card in such positions that the contact finger corresponding to the tens digit in the minimum consumption quantity and all associated contact fingers of lower numerical value will contact the bar 184. Bar 184A is the tens control bar and the card will be perforated to permit engagement with this bar 184A of those contact fingers having digital significance less in value than the tens digit of the minimum consumption quantity. Bar 184B is the units bar and the card will be perforated to permit engagement of this bar by the contact fingers having digital significance equal to and less than the digit in the units order of the minimum consumption quantity. Since the present minimum consumption quantity is 12, card perforations will be provided for permitting the number 0 and the number 1 fingers to contact the bar 184, for permitting the 0 contact to engage the bar 184A, and for permitting the numbers 0, 1 and 2 contact fingers to engage the bar 184B.

The present minimum charge operation takes place under control of a card perforated for a last meter-reading of 455 and a previous meter-reading of 443. The difference between these two meter-readings is the consumption 12. The minimum money charge for a minimum consumption quantity is selected as 48, which amount is perforated in the card at the area registering with the minimum money bars 189, 189A and 189B.

Figure 25:
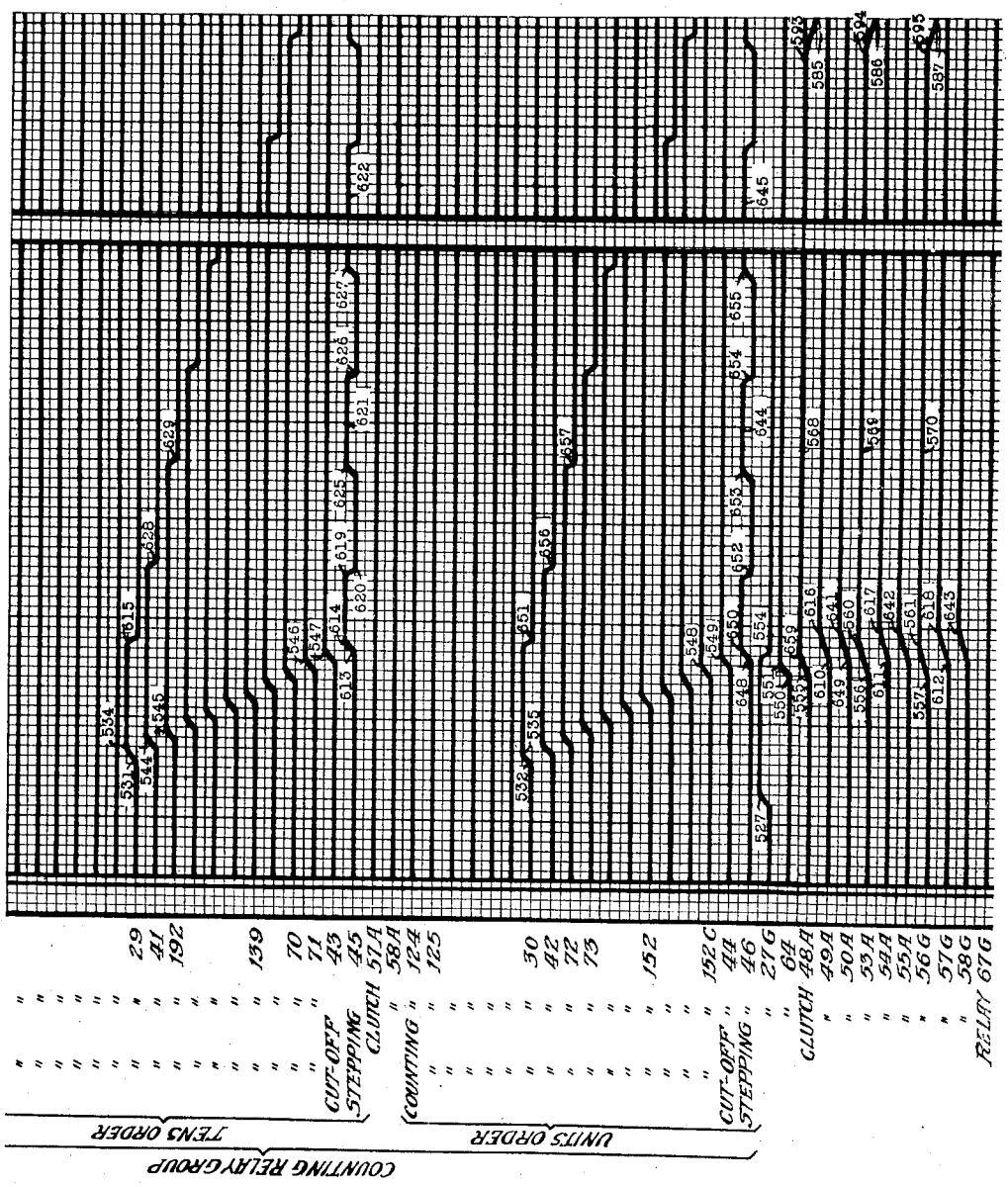
Figure 26:
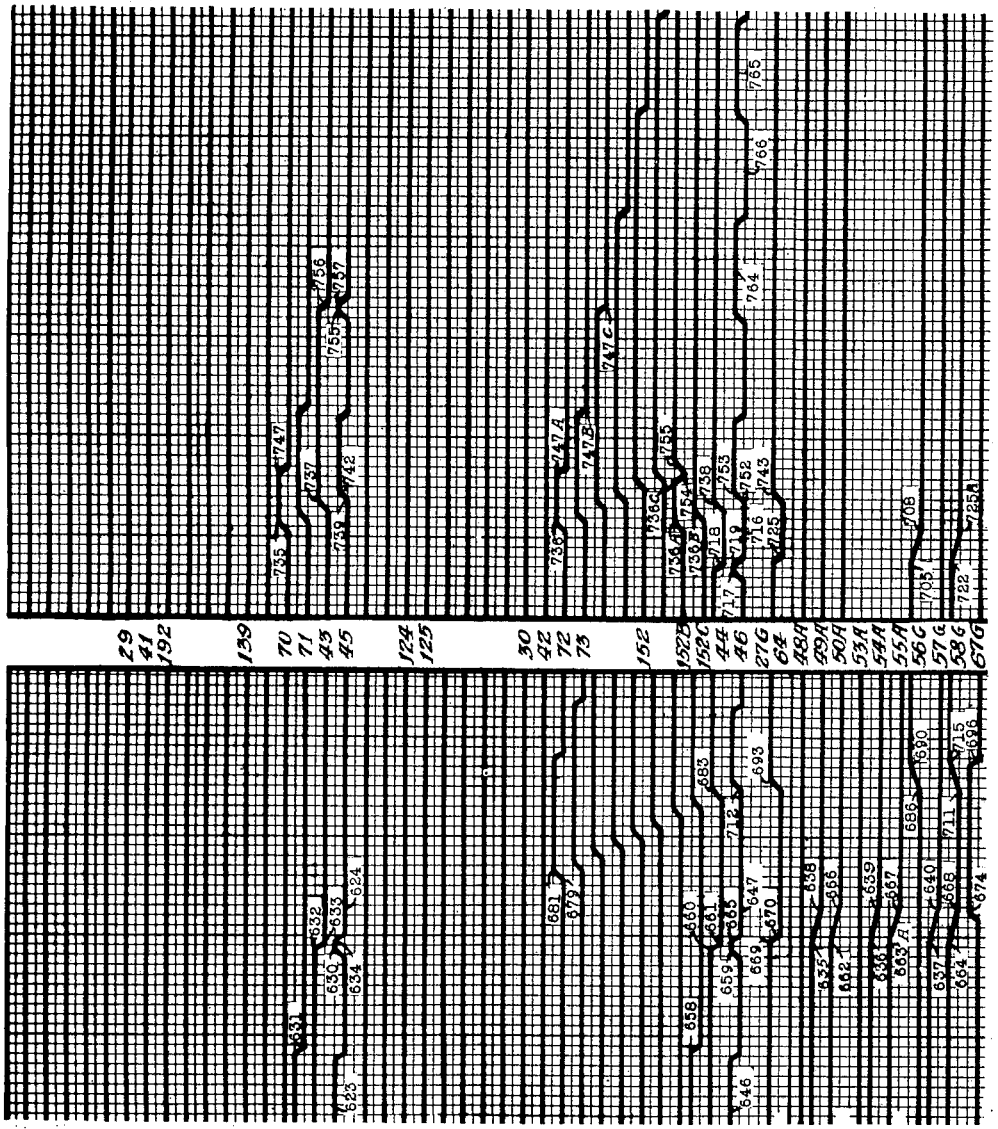
Figure 27:
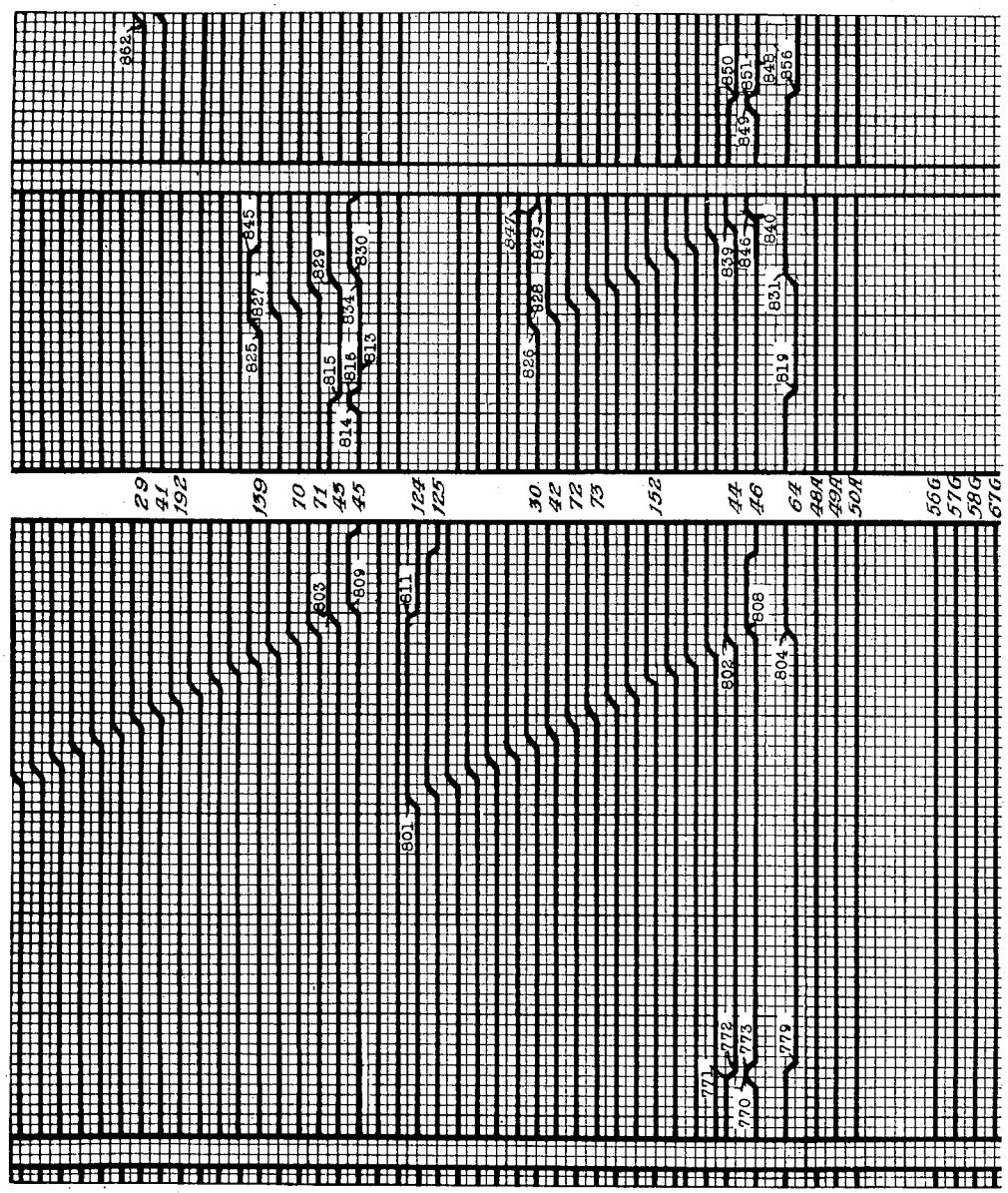
Figure 28:
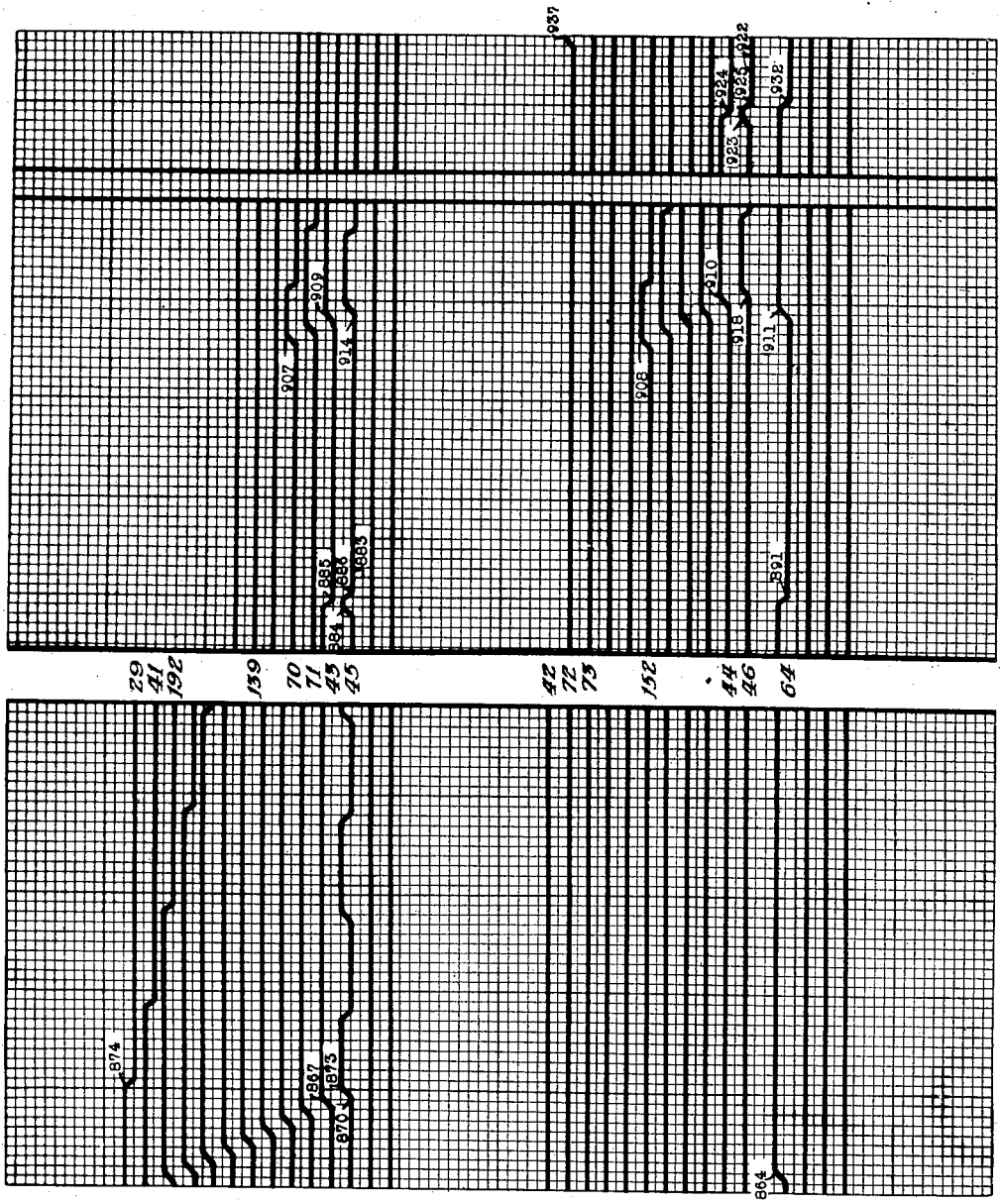
Figure 29:
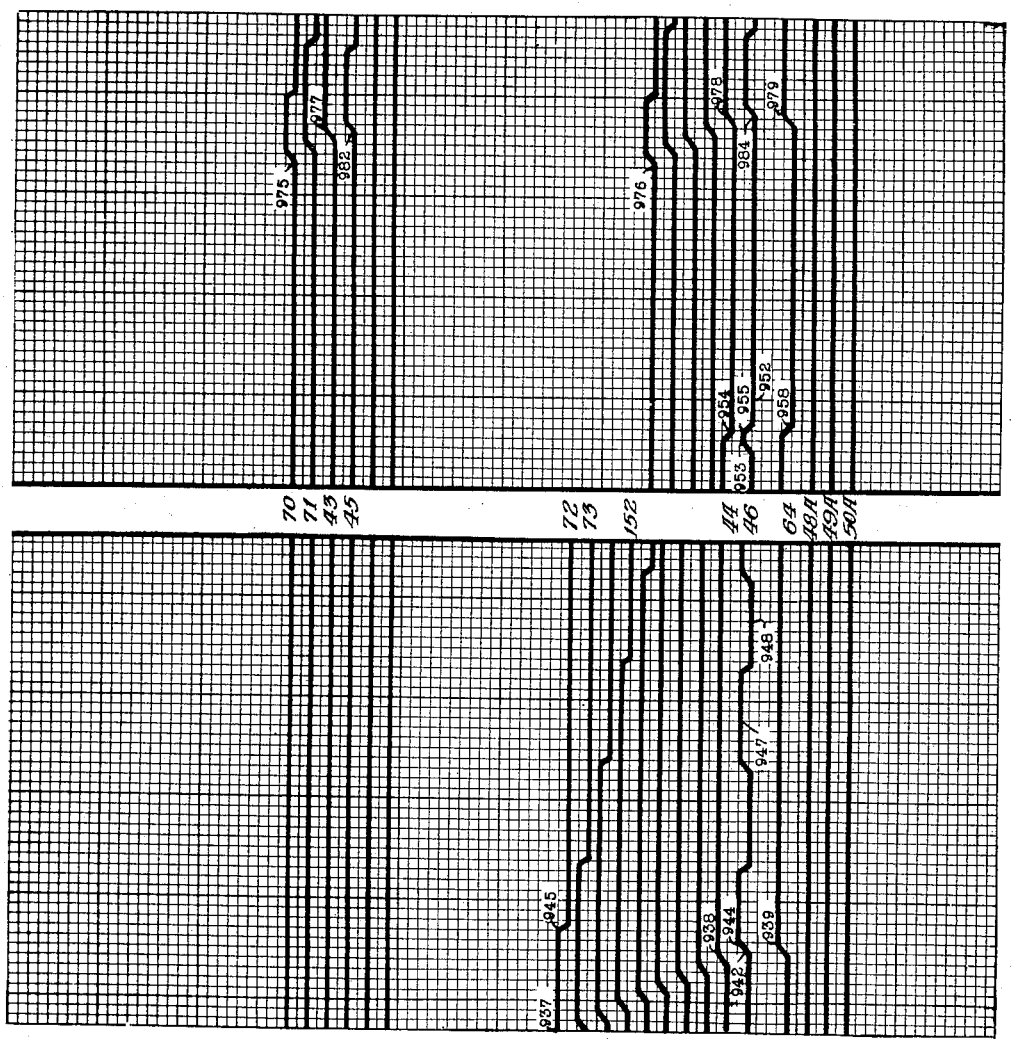

Inasmuch as the last meter-reading 455 is the same as in the first example given hereinabove, the machine will begin operation and proceed through the first sequence with the identical action of parts as shown graphically in section 1 of the chart (Figs. 18, 25 and 32). The present operation is indicated by the third chart (Figs. 43 to 50). The action of parts indicated by the first section, section 1″, of this chart is therefore identical with the action indicated by section 1 of the first chart and consequently the reference characters in this section 1″ are the same as those in chart section 1, but have a double prime added. For the most part the actions indicated in the second section, section 2″, of the present chart are the same as those in section 2 of the first chart, and where such actions are the same they are indicated by the same reference characters, further characterized by a double prime.

In the hundreds order the counting relays are locked up in an arrangement representative of the digit 4 as was the case in setting up the previous meter-reading in the first operation and therefore the actions of the parts having to do with the entry of the digit 4 in the hundreds order of the present previous reading 443 are indicated by the same reference characters, but which are additionally characterized by the double prime.

In the tens and units orders, however, the counting relays upon the closing of the contacts of shift relay 202 at point 677″ will begin energization for respectively representing the digits 4 and 3. Therefore counting relays 192 and 152A are caused to energize at points 1125 and 1126. The counting relays of lower numerical value lock up and eventually cut-off relays 43 and 44 lock up or energize at points 1127 and 1128. Cut-off relay 44 energizes first closing contact 44F, and energizing control relay 64 at point 1129, opening contact T and thus effecting deenergization of sequence control relay 25 at point 1130. Contact 25B opens deenergizing sequence relay 7 at point 1131 thereby removing the source of original energization for counting relays 28, 192, and 152A, leaving these relays under control of the stepping relays 40, 45 and 46.

Cut-off relay 44 in energizing closes contacts 44C, 44D and 44E to cause energization of stepping relay 46, clutches 77A, 80A and 58G (Fig. 2) in the manner previously described by means of circuits established through the right-hand group of contacts upon now closed shift relay 202. Clutches 58G, 77A and 80A are thus caused to energize as before at points 1132, 1133 and 1134, but during the present operation since only three pairs of counting relays are locked up in the units order these number wheels will rotate through but three digital positions, number wheel 77 being rotated forwardly from 0 to 3 and number wheel 58 being rotated backwardly from 5 to 2. The clutches associated with these number wheels are deenergized during the period of time represented by the space between chart sections 2″ and 3A.

Cut-off relays 38 and 43 energize simultaneously at points 682″ and 1127 thus closing contacts 38C, 38D, 38E, 43C, 43D and 43E effecting energization of stepping relays 40 and 45 at points 692″ and 1135, and energization of the clutches 56G, 57G, 75A, 76A, 78A and 79A at points 690″, 1136, 688″, 1137, 684″ and 1138. During energization of these clutches number wheels 75 and 76 are each rotated forwardly four digital positions from 0 to 4 while the number wheels 56 and 57 are rotated backwardly four digital positions respectively to 0 and 1. Meanwhile the shunting contacts 75D and 76D are closed and opened by the shunting wheels 75B and 77B to cause alternate deenergization and energization of stepping relays 40 and 45 and the successive deenerigaztion of the counting relays locked up in the hundreds and tens orders. Shortly prior to the movement of these number wheels to the last of their digital positions as indicated at point 1139 on the line pertaining to stepping relay 45, shunting contacts 75D and 76D open permitting reenergization of stepping relays 40 and 45 at points 1140 and 1141. Contacts 40A and 45A open effecting deenergization of cut-off relays 38 and 43 at points 1142 and 1143. Thereupon the contacts of cut-off relays 38 and 43 open resulting in deenergization of the clutches 56G, 57G, 75A, 76A, 78A and 79A simultaneously at points 1144 to 1149 when the previous reading register 75—76—77 will stand at 443 and the consumption quantity register 56—57—58 will stand at 012.

With the deenergization of cut-off relays 38 and 43 at points 1142 and 1143 the contacts 38F and 43F were opened breaking the energization circuit for control relay 64 which deenergized at point 1150 closing contact T, causing energization of sequence control relay 25 at point 1151. Contact 25C then opens deenergizing sequence relay 8 at point 1152 opening contact 8B and causing deenergization of the right-hand winding of sequence relay 9 which remains energized through its left-hand winding and contacts 9B and 25B so long as relay 25 remains energized. The opening of contact 8B also removes ground from contact 6D and conductor 6X whereby shift magnet 65 is deenergized at point 1153 opening the contacts of shift relay 202.

Contact 8E closes establishing a circuit from ground through contact 9D, conductor 9G, cable 320 (Figs. 6 and 9A), conductor 9G (Figs. 9A, 9, 8 and 7) to the first step bars 81, 82 and 84 (Fig. 7), 85, 86 and 88 (Fig. 8) and 90 (Fig. 9).

For the tens order, ground from the bar 88 is impressed upon contact finger 88A and thence the circuit is extended through conductor 88B, contact 88C of the tens number 1 multiple contact switch since the contact closing wheel 57D now stands at 1, conductor 88D and vertical conductor 100A which leads into cable 100. For the units, ground from bar 90 (Fig. 9) is carried over a circuit including contact finger 90A, conductor 90B, contact 90C of the units number 2 multiple contact switch which is now closed by the contact closing wheel 58D which stands at 2, conductor 90D and the number 2 conductor 100C which also leads into cable 100. Conductors 100A and 100C lead through cable 100 (Figs. 9A and 5) to contacts 99X and 99A of shift relay 203, and when this relay is closed by the energization of shift magnet 99 the circuits will be extended through cable 250 (Figs. 5 and 4) to counting relays 70 and 152.

When sequence relay 8 deenergized at point 1152 contact 8D closed completing a circuit beginning with ground at contact 10B now closed and leading through said contact 8D and conductor 8X to shift magnet 99 for causing energization of this magnet at point 1154. Thereupon the circuits, through contacts 99X and 99A, to counting relays 70 and 152 are completed so that these counting relays are caused to energize at points 1155 to 1156. The counting relays of lower numerical value successively energize and eventually cut-off relays 43 and 44 energize at points 1157 and 1158.

Cut-off relay 43 energizes first closing contact 43F effecting energization of control relay 64 at point 1159, the opening of contact T and deenergization of sequence control relay 25 at point 1160. Contact 25B opens deenergizing sequence relay 9 at point 1161, opening contact 9D and thus removing the initial source of energization for counting relays 70 and 152.

Energized control relay 43 closes contact 43C establishing a circuit through stepping relay 45 and conductor D. This relay also closes contact 43E impressing ground upon conductor E. From conductors D and E the circuits are continued through cable 250 (Figs. 4 and 5), contacts D3 and E3 of shift relay 203, cable 102 (Figs. 5 and 10), conductors 102D and 102E to clutches 97A and 103A to battery. Stepping relay 45 and the clutches 97A and 103A are thus caused to energize at points 1162, 1163 and 1164. Number wheel 97 is clutched to the constantly rotating shaft 322D by the clutch 97A and since a single pair of counting relays are locked up in the tens order this number wheel will be caused to rotate one digital position during which time the shunting wheel 97D is operative to alternately close and open the shunting contact 97E for indirectly effecting deenergization of the locked up counting relay 71 and cut-off relay 43 at points 1165 and 1166. This deenergization of cut-off relay 43 at point 1166 causes it to open its several contacts thereby breaking the energization circuits for stepping relay 45 and the clutches 97A and 103A, these parts thereafter deenergizing at points 1167, 1168 and 1169. When clutch 97A deenergizes at point 1168 the number wheel 97 will be disconnected from the shaft 322D while displaying the digit 1.

During rotation of the number wheel 97 forwardly the gears 97C and 103 were rotated therewith and since the clutch 103A was then energized the shaft 103C was rotated from the shaft 322D and was effective through gears 105A, 54 and 57E (Fig. 2) to rotate backwardly the backstop wheel 57C associated with the right-hand part of the tens order unit in the consumption quantity register. Since this unit of the register stood at 1 at the beginning of this sequence of operation, the backstop wheel 57C was rotated backwardly to 0 thereby placing the notch in the periphery thereof in registry with the member 67X on the contact control bar 60. Backstop wheel 56C already stood at 0 so that at this time the contact control bar 60 is held radially outwardly of the backstop wheels 56C, 57C and 58C by the engagement of the member 58X with the periphery of wheel 58C.

When cut-off relay 44 energized at point 1158 contacts 44C and 44E closed. Contact 44C impressed ground upon a circuit leading through stepping relay 46 and conductor A while contact 44E impressed ground upon a circuit including conductor B. The circuits continue from conductors A and B through cable 250 (Figs. 4 and 5), contacts A3 and B3 of shift relay 203, cable 102 (Figs. 5 and 10), conductors 102A and 102B and clutches 98A and 108A to battery. Stepping relay 46 and the clutches 98A and 108A are therefore caused to energize respectively at points 1170, 1171 and 1172. When clutch 98A energizes the number wheel 98 takes motion with the shaft 322D as does the gear 98C and the shunting wheel 98D. Upon the first energization of cut-off relay 46 at point 1170 contact 46A opens deenergizing counting relay 152 at point 1173. During rotation of the number wheel 98 and shunting wheel 98D the latter alternately closes and opens shunting contact 98E effecting alternate deenergization and energization of stepping relay 46 at points 1174, 1175, 1176 and 1177, the last energization of said stepping relay taking place shortly prior to the entry of the second digit 2 on the number wheel 98 at the time indicated by the point 1178 on the line pertaining to stepping relay 46. The alternate deenergization and energization of stepping relay 46 at points 1174, 1175 and 1176 effects successive deenergization of the locked up counting relays at points 1179, 1180 and 1181. The final energization of stepping relay 46 at point 1177 effects deenergization of the cut-off relay 44 at point 1182. Contacts 44C and 44E open, breaking the energization circuits for stepping relay 46 and clutches 98A and 108A which shortly thereafter deenergize at points 1183, 1184 and 1185.

During rotation of the number wheel 98 two digital positions forwardly the gears 98C and 108 were effective through the clutch 108A for driving the shaft 108C and the gears 105C, 55 and 55E (Fig. 2) whereby the backstop wheel 56C was rotated backwardly two digital positions. At the end of this rotation the backstop wheel 56C stands at 0 placing the notch therein in registry with the member 56X, and since this is the last of the notches on backstop wheels 56C, 57C and 58C to arrive in registry with their respective members 56X, 57X and 58X the contact control bar 60 will now be permitted to move radially inwardly of these backstop wheels thereby opening contact 60B and closing contact 60D.

This opening of contact 60B breaks the circuit beginning with ground at contact 172X (Fig. 2) and leading through said contact 60B, conductor 66K (Figs. 2 and 3), cable 66 (Figs. 3 and 5A), conductor 66K (Figs. 5A and 6), relays 61 and 62, conductor 193A and contact 23E to battery. Relay 62 is thus depotentialized at point 1186 but since this relay is a slow-to-release relay it does not deenergize until point 1187 is reached. Slow-to-release relay 61 remains energized through a holding circuit including contact 61B, contact 166C and contact 188B to ground.

Contact 60D in closing completes a circuit from ground at contact 172X (Fig. 2), through said contact, conductor 63E (Figs. 2 and 3), cable 116 (Figs. 3 and 11A), conductor 180 (Figs. 11A and 11), contact 178 of the tens order number one multiple switch now closed by the contact closing wheel 97B which stands at 1, conductor 177A (Figs. 11 and 11A), cable 181 (Figs. 11A and 3), the number 1 conductor 181A, number 1 contact finger 184C, contact bar 184 which is engaged by the contact finger 184C through card perforation 184CC, conductor 66D, cable 66 (Figs. 3 and 5A), conductor 66D (Figs. 5A and 6) to relay 185 and battery. A lateral 179X branching from grounded conductor 180 (Fig. 11) completes a circuit through contact 179 of the number 2 multiple contact switch in the units order which is now closed by the contact closing wheel 98B which stands at 2, conductor 179A (Figs. 11 and 11A), cable 182 (Figs. 11A and 3), number 2 conductor 182A, number 2 contact finger 184D, bar 184B which is engaged by the finger 184D through card perforation 184DD, conductor 6C, cable 66 (Figs. 3 and 5A), conductor 66C (Figs. 5A and 6) and relay 186 to battery. Relays 185 and 186 are therefore caused to energize at points 1188 and 1189 immediately after the setting up of the amount 12 on the number wheels of the first step register (Fig. 10) and the concurrent stationing of all of the backstop wheels 56C, 57C and 58C on the consumption quantity register (Fig. 2) at 0.

Cut-off relay 44 deenergized at point 1182 opening contact 44F causing deenergization of control relay 64 at point 1190, the closing of contact T and the energization of sequence control relay 25 at point 1191. Contact 25C opened deenergizing sequence relay 10 at point 1192. Contact 10B opened deenergizing the right-hand winding of sequence relay 11 and leaving this relay energized through its left-hand winding and contacts 11B and 25B so long as relay 25 remains energized. Contact 10B in opening also removed ground from contact 8D, conductor 8X and shift magnet 99 which thereafter deenergizes at point 1193. The contacts of shift relay 203 including contact X3 open and relay 194 which is in series with contact X3 thereupon begins deenergization at point 1194.

Contact 10D closes upon deenergization of sequence relay 10 thereby completing for a short time a circuit from ground at contact 12B and including said contact 10D, conductor 10X, contacts 185B and 186B, conductor 185C (Figs. 6 and 5) and shift magnet 114 (Fig. 5). This shift magnet 114 therefore begins energization at point 1195, but prior to complete energization of the shift magnet 114 the contacts 185B and 186B of relays 185 and 186 open at points 1188 and 1189 interrupting the energization circuit for shift magnet 114 which then begins deenergization at point 1196.

Since the amount 12 is standing upon the first step register 97—98 (Fig. 10) is not to be multiplied by the fixed factor 7, as would be the case if this amount 12 were an amount in excess of the minimum charge consumption, it is not desired that shift relay 204 energize for closing circuits to effect such multiplication. Instead it is desired that the machine now operate to effect an entry in the money register 127—128—129 (Fig. 15) of 048 which indicates a minimum money charge of $0.48.

No action now takes place until deenergization of slow-to-release relay 62 at point 1187. This deenergization of the relay 62 effects the opening of contact 62A thereby removing battery from conductor 62C and the windings of the odd-numbered sequence relays 13, 15, 17 and 19 whereupon these relays begin deenergization at points 1197, 1198, 1199 and 1200. This deenergization of relays 13, 15, 17 and 19 opens their contacts as 13C thereby effecting deenergization of relays 14, 16 and 18 at points 1201, 1202 and 1203 since relay 25 is now energized opening contact 25C and removing the other source of energization for these latter named relays. Relay 26, however, is held energized from ground at contact 194A of slow-to-release relay 194, relay 194 remaining energized until the time indicated at point 1204.

When slow-to-release relay 62 deenergizes at point 1187 contact 62B closes impressing ground upon a circuit including contact 61A, relay 187, contact 185A and contact 186A to battery. The just traced circuit when established potentializes relay 187 at point 1205 and when this relay energizes at point 1206 contact 187D closes placing battery upon relay 188 which then energizes at point 1207. Relay 188 locks up through contact 188A, conductors 193 and 193A and contact 23E to battery so long as relay 23 remains energized.

Energized relay 188 opens contact 188B removing ground from conductor 188E, contact 166C and contact 61B thereby breaking the holding circuit for relay 61 which then begins deenergization at point 1208. Relay 61 subsequently deenergizes at point 1209 opening contact 61A and interrupting the energization circuit for relay 187 which relay is thus caused to deenergize at point 1210. Relays 61, 62 and 187 are now deenergized and in condition for use during a succeeding operation.

Relay 188 when energizing at point 1207 also opened contact 188D and closed contact 188C thereby disconnecting conductor 188F from the circuit including conductor 188G, contact 18D, conductor 18X and the shift magnet 156 (Fig. 5A) and connecting said conductor 188F with the circuit including conductor 188H which leads to shift relay 191 (Fig. 5A). Therefore, since sequence relay 20 remains energized after the deenergization of relay 18 at point 1203, contact 20B remains closed impressing ground upon conductor 188F so that upon said closing of contact 188C shift magnet 191 will be potentialized at point 1211 and later energized at point 1212.

While relay 187 was energized contact 187C was closed, impressing ground upon the circuit including conductor 187F (Figs. 6 and 5A), cable 66 (Figs. 5A and 3), conductors 66B (Fig. 3), minimum money bars 189, 189A and 189B, contact fingers 189C and 189D, representative of the numerical amount of 48, and which are permitted to engage the bars 189A and 189B through card perforations 189CC and 189DD, conductor 190A and 190B, cable 190 (Figs. 3 and 5A), contacts 191A and 191B of shift relay 210, cable 250 (Figs. 5A, 5 and 4) and the central windings of counting relays 192 and 124 causing energization of these counting relays at points 1213 and 1214. This initial source for energization of the counting relays 192 and 124 is removed when relay 187 deenergizes at point 1210 opening contact 187C.

The counting relays of lower numerical order than the counting relays 192 and 124 now successively energize and eventually the cut-off relays 43 and 44 are in turn energized at points 1215 and 1216. Cut-off relay 43, being the first to energize, impresses ground through contact 43F upon the conductor leading to control relay 64 whereupon this relay 64 is energized at point 1217. Contact T opens deenergizing sequence control relay 25 at point 1218. Contact 25B opens effecting deenergization of sequence relay 11 at point 1219 whereupon contact 11C opens leaving relay 12 energized from contact 25C so long as relay 25 remains unenergized. Contact 25C in closing also provides a holding circuit for sequence relay 20 through contact 20C thereby holding relay 20 energized subsequent to deenergization of control relay 194 at point 1204. Since relay 19 is now deenergized and contact 19C opened as well as contact 194A, relay 20 will remain energized through its right-hand winding only so long as relay 25 remains unenergized.

The left-hand set of contacts upon shift relay 210 was effective for energizing the counting relays (Fig. 4) in accordance with the arrangement of card perforations in registry with the minimum money bars 189, 189A andn 189B (Fig. 3. The right-hand group of contacts upon this shift relay 210 is effective for completing circuits from the cut-off relays associated with the energized counting relays (Fig. 4) to the clutches of the money register 127—128—129 (Fig. 15). Thus upon the energization of cut-off relay 43 at point 1215 contact 43C is closed placing ground upon one end of the circuit leading through stepping relay 45 and conductor D. When cut-off relay 44 energized at point 1216 contact 44C closed placing ground upon one end of a circuit leading through stepping relay 46 and conductor A. Conductors D and A lead through cable 250, shift contacts D10 and A10 of shift magnet 210, cable 126, conductors 126D and 126A (Fig. 15) to the clutches 128A and 129A and battery. Clutches 128A and 129A are therefore energized at points 1221 and 1222 whereupon the number wheels 128 and 129 are connected with and take motion from the constantly rotating shaft 322D as do the shunting wheels 128D and 129D so that during rotation of these number wheels the shunting contacts 128E and 129E are operated to successively deenergize the counting relays locked up in the tens and units orders. Since four pairs of counting relays are locked up in the tens order and eight pairs of such relays are locked up in the units order the number wheels 128 and 129 will be caused to rotate respectively from 0 to 4 and from 0 to 8.

Number wheel 129 will be the last to cease rotation for it is advanced the farthest and shortly prior to the entry of the digit 9 upon this number wheel as indicated at point 1223 on the line pertaining to the clutch 129A, the cut-off relay 44 is caused to deenergize at point 1223A after the last energization of stepping relay 46 at point 1224 and the opening of contact 46A. This deenergization of cut-off relay 44, in addition to opening contact 44C for breaking the energization circuit for stepping relay 46 and the clutch 129A, opens contact 44F removing ground from control relay 64 which thereafter deenergizes at point 1225. Contact T closes energizing sequence control relay 25 at point 1226 whereupon contact 25C opens deenergizing sequence relays 12 and 20 at points 1220 and 1227.

The machine is now set up as described above in the first operation for sensing and causing entry of the identification number 12 on the identification number register (Fig. 14).

When relay 20 deenergizes contact 20B opens deenergizing the right-hand winding of sequence relay 21 leaving this relay energized through contact 21B and 25B so long as relay 25 remains energized. Contact 20B in opening also removes ground from the energization circuit for shift magnet 191 (Fig. 5A) whereupon this magnet deenergizes at point 1228 opening the contacts of shift relay 210. Contact 20D closes extending ground over conductor 20X to shift magnet 165 which then energizes at point 1229 closing the contacts of shift relay 209. Contact 20E is closed connecting a circuit from ground through contact 21D, conductor 21G, cable 66 (Figs. 5A and 3), conductor 66A (Fig. 3), contacts 2H and 2F, bars 2L and 2M, contact fingers 2N and 2P which respectively respect the digits 1 and 2 in the tens and units order, conductors 166A and 166B, cable 166 (Figs. 3 and 5A), contacts 165A and 165B of shift relay 209, cable 250 and the center windings of counting relays 70 and 152. These counting relays are thus energized at points 1230 and 1231. The counting relays of lower numerical value lock up in succession whereupon cut-off relays 43 and 44 are energized at points 1232 and 1233. Cut-off relay 43 energizes first, closing contact 43F energizing control relay 64 at point 1234, opening contact T and thereby effecting deenergization of sequence control relay 25 at point 1235. Contact 25B opens effecting deenergization of sequence relay 21 at point 1236, opening contact 21D and thus breaking the initial energization circuit for the counting relays 70 and 152. Contacts 43C and 44C close, completing circuits through stepping relays 45 and 46 and contacts D9 and A9 of shift relay 209 and conductors 167D and 167A (Fig. 14) to the clutches 323A and 169A associated with the number wheels on the customer's identification number register. As before, these clutches 323A and 169A energize as indicated at points 1237 and 1238 to cause rotation of the number wheels 323 and 169 respectively 1 and 2 digital positions with the shaft 322D. Shunting contacts 323E and 169E are actuated during this rotation to successively deenergize the counting relays locked up in the tens and units order and to eventually deenergize the cut-off relays 43 and 44. In this manner contacts 43C and 44C are opened to break the energization circuits for cut-off relays 45 and 46 and the clutches 323A and 169A. Cut-off relay 44 is the last of these cut-off relays to deenergize as indicated at point 1239, and in so deenergizing the opening of contact 44C effects deenergization of stepping relay 46 at point 1240 and of clutch 169A at point 1241. At this time the customer's identification register will display a reading of 12.

The cut-off relay 44 deenergizing at point 1239 opens contact 44F removing ground from contact relay 64 which thereafter deenergizes at point 1242, closing contact T and effecting energization of sequence control relay 25 at point 1243. Contact 25C opens deenergizing sequence relay 22 at point 1244. Contact 22B opens removing ground from the circuit for shift magnet 165 whereupon this magnet deenergizes at point 1245 incident to opening the contacts on shift relay 209. The opening of contact 22B also breaks the energization circuit for the right-hand winding of sequence relay 23 which then remains energized through its left-hand winding and contacts 23B and 25B only so long as relay 25 remains energized.

Contact 22E closes impressing ground upon contact 23D, conductor 23G and relay 168 to battery whereupon this relay is caused to energize at point 1246. Energized relay 168 closes contact 168A placing ground upon slow-to-release relay 24 which thereafter energizes at point 1247, opening contact 24A and breaking the energization circuit for sequence control relay 25 which is thus caused to deenergize at point 1248. Contact 25B opens deenergizing sequence relay 23 at point 1249 whereupon contact 23E opens removing battery from conductors 193A and 193 thereby breaking the holding circuit for relay 188 which thus deenergizes at point 1249A without significant effect, but placing this relay in condition to commence a succeeding operation. Contact 23D also opens removing ground from relay 168 which is thus caused to deenergize at point 1250. When relay 168 thus deenergizes, contact 168B closes impressing ground upon contact 24B now closed and slow-to-release relay 170 which begins energization at point 1251. Contact 168A opens prior to the closing of contact 168B thereby starting deenergization of slow-to-release relay 24 at point 1252. While relay 170 is energized relay 24 eventually deenergizes at point 1253 closing contact 24C thereby placing battery upon a circuit leading through said contact 24C, contact 170A and conductor 170B (Figs. 6, 2 and 10) to zero setting relay 171 effecting energization of this relay at point 1254. At the time relay 24 deenergized closing contact 24C for establishing the circuit for energization of the relay 171, contact 24B opened breaking the circuit from ground at contact 168B for the relay 170 whereupon relay 170 began deenergization at point 1255 and later deenergized at point 1256 opening contact 170A and breaking the circuit for original energization of zero setting relay 171. However, as stated hereinabove, when relay 171 energizes it closes contact 171A to cause energization of ancillary zero setting relays 172, 173 and 174 at points 1257, 1258 and 1259, which close contacts as 173A (Fig. 10A) to provide a holding circuit for the relay 171 from battery as at clutch 97A (Fig. 10) associated with number wheels as 97 (which are off zero), through carry-over contacts as 97G which are closed when said number wheels are off zero, contacts as 173A, conductor 175 and contact 171B through the winding of relay 171 to ground.

Clutches 48A, 49A and 50A of which the respective batteries are connected through zero setting contacts 48E, 49E and 50E with ground through the winding of zero setting relay 171 were caused to energize at points 1260, 1261 and 1262 after the energization of zero setting relays 172, 173 and 174 and the closing of their contacts as 172R, 172S, 172Y and 172T of relay 172 (Fig. 2). Likewise the clutches associated with each of the other number wheels which are off zero are simultaneously energized, the clutches 75A, 76A and 77A energizing at points 1263, 1264 and 1265, clutches 97A and 98A of the first step register (Fig. 10) energizing at points 1266 and 1267, the clutches 57A and 58A of the consumption quantity register energizing at points 1270 and 1271, the clutches 128A and 129A of the money register (Fig. 15) energizing at points 1272 and 1273 and the clutches 323A and 169A of the identification number register (Fig. 14) energizing at points 1274 and 1275. At the beginning of the reset operation the number wheels 48, 49 and 50 of the last reading register stand at 455 and therefore the clutches 48A, 49A and 50A deenergize after said number wheels have been rotated respectively 6, 5 and 5 digital positions to 0, the zero setting contacts 48E, 49E and 50E opening shortly prior to their respective number wheels reaching zero. This opening of the zero setting contacts and deenergization of the clutches takes place during that interval of time represented by the space between chart sections 10A and 10B. The number wheels 75, 76 and 77 of the previous reading register stand at 443 at the beginning of the reset operation and therefore must be rotated respectively 6, 6 and 7 digital positions, the zero setting contacts 75E and 76E opening to cause deenergization of the clutches 75A and 76A during the period of time between chart sections 10A and 10B, whereas the zero setting contact 77E opens to cause deenergization of the clutch 77A at point 1277. Number wheels 97 and 98 of the first step register (Fig. 10) stood at 12 so that the zero setting contacts 97G and 98G thereof were opened to cause deenergization of the clutches 97A and 98A at points 1278 and 1279 after said number wheels had been rotated forwardly respectively 9 and 8 digital positions to zero.

The shaft 59, to which the clutches 57A and 58A are adapted to connect the number wheels 57 and 58 of the consumption quantity register during the reset operation, rotates backwardly with respect to the digital arrangement upon said number wheels wherefore the number of digital positions through which said number wheels must be rotated before arriving at zero will be identical with the reading standing thereon. The number wheels 56, 57 and 58 of the consumption quantity register stood at 012 at the beginning of the reset operation whereby only zero setting contacts 57H and 58H were closed resulting in energization only of clutches 57A and 58A. Number wheel 57 is rotated backwardly only one digital position, whereas the number wheel 58 is rotated backwardly two digital positions, the zero setting contacts 57H and 58H opening at such time as to cause deenergization of the clutches 57A and 58A at points 1280 and 1281 when the wheels 57 and 58 reach zero.

Number wheels 128 and 129 of the money register (Fig. 15) stood at 48 and therefore the zero setting contacts 128R and 129R were opened to cause deenergization of the clutches 128A and 129A upon the wheels 128 and 129 being advanced six digital positions and two digital positions, clutch 128A deenergizing during the period of time represented by the space between chart sections 10A and 10B and the clutch 129A deenergizing at point 1282.

The number wheels 323 and 169 of the identification number register (Fig. 14) stood at 12 so that the zero setting contacts 323C and 169C open to cause deenergization of the clutches 323A and 169A at points 1283 and 1284 upon the number wheels 323 and 169 arriving at 0 after having been advanced 9 and 8 digital positions.

Clutches 97A and 323A were the last to deenergize, such deenergization being initiated at points 1284A and 1285 upon the opening of zero setting contacts 97G and 323C, and since the circuits including the contacts 97G and 323C were the last of the circuits in series with the winding of zero setting relay 171, said relay began deenergization at point 1286 concurrently with the beginning of deenergization of clutches 97A and 323A. Later when relay 171 deenergized at point 1287 opening contact 171A, the relays 172, 173 and 174 began deenergization simultaneously at points 1288, 1289 and 1290.

The right-hand portion, including backstop wheel 56C and contact closing wheel 56S of the number wheel unit in the hundreds order of the consumption quantity register, was returned to zero as an incident to the setting up of the previous reading register 75—76—77. The right-hand portions, including backstop wheels 56C and 58C and contact closing wheels 57S and 58S of the tens order and units order number wheel units in the consumption quantity register, were returned to zero as an incident to the setting up of the first step register (Fig. 10).

Therefore the right-hand portions of the number wheel units in the consumption quantity register stood at zero at the beginning of the zero setting operation. At the end of the zero setting operation the number wheels 56, 57 and 58 per se of the consumption quantity register and the number wheels in each of the other registers are caused to stand at zero. All registers are therefore cleared, preparatory to the beginning of a succeeding machine operation. The cards (Figs. 1 and 1A) will be removed at the end of this operation thereby permitting contacts 2R and 1D (Fig. 3) to open breaking the energization circuits for relays 2D and 2E which then deenergize at points 1291 and 1292.

While various features of the improvement are described in their relation to a complete billing machine, it will be apparent that they may be used in other relations, with more or less adaptation in themselves or in their environment, for computing, recording, and other purposes. In the broader aspects of my invention, I do not desire to be understood as limiting its embodiment to the forms herein described, in view of the variety of mechanisms that may be adopted and modifications that may be made, within the scope of the appended claims, nor to be understood as limiting the uses of the machine to such as are herein mentioned, in view of the variety that might be serviceable within the scope of the invention.

I claim:

1. In a calculating machine, the combination of a register comprising a plurality of denominational wheels, means for actuating the individual denominational wheels, relays for controlling actuation thereof, an amount representing device consisting of denominational representing units, a plurality of sets of contacts one for each unit arranged in numerical significance and selectively closed by said units, numerical value determining means comprising a plurality of circuits prearranged according to a given schedule and controlled by said selectively controlled sets of contacts for selectively enabling said relays to control actuation of said denominational wheels, each circuit including in series at least one contact controlled by each denominational representing unit, and means for initiating operation of said relays following selection of sets of contacts by said denominational representing units.

2. In a machine according to claim 1 in which the actuation control relays consist of a plurality of sets of paired relays one set for each denominational wheel of the register and wherein each pair of relays in a set controls a one digit advance of a related denominational wheel.

3. In a calculating machine, the combination of a register comprising a plurality of denominational wheels, means for actuating the individual denominational wheels, a series of members cooperating with each denominational wheel for controlling actuation thereof, an amount representing device consisting of denominational representing units, a plurality of sets of contacts one set for each unit arranged in numerical significance and selectively conditioned by said units, numerical value determining means comprising a plurality of circuits prearranged according to a given schedule and controlled by said selectively controlled sets of contacts for selectively setting up a number of members in each series corresponding to a determined numerical value to control actuation of the related denominational wheel, means for initiating actuation of said wheels and release of said members following selection of sets of contacts by said denominational representing units, and means controlled by the denominational wheels upon actuation thereof for controlling successive release of the members in the related series member by member and for interrupting actuation of the related wheel when all members in the related series are released whereby the denominational wheels are advanced in accordance with the number of members set up in each related series thereof.

4. A result computing device comprising a plurality of denominationally grouped conductors, each denominational group leading to a denominational order of a result receiving device and the conductors of each group being representative of digital values of a notation, a plurality of circuit closing means selectively settable to represent variable factors, and electrical connections from said circuit closing means to said conductors based on a fixed factor, said electrical connections being so connected to said circuit closing means and said onductors that upon closure of a given circuit closing means an electrical path is established to a conductor or conductors of denominational and digital value corresponding to the result of a computation of the factor represented by said given circuit closing means and the fixed factor.

5. A machine according to claim 4 in which a member is provided which is settable in accordance with the variable factor, and a common means on said member for selectively closing said circuit closing means in accordance with the setting of said member.

6. A result computing device comprising a plurality of denominationally grouped conductors, each denominational group leading to a denominational order of a result receiving device and the conductors of each group being representative of digital values of a notation, a plurality of sets of circuit closing means, the circuit closing means of each set being selectively settable to represent denominational digits of variable factors, predetermined electrical connections between the circuit closing means of the successive denominational sets of circuit closing means based on a fixed factor, other electrical connections between the circuit closing means pertaining to the lowest denominational order of the variable factors based on the same fixed factor, said electrical connections being such that upon closure of given of said circuit closing means an electrical path will be established to a conductor or conductors of denominational and digital value corresponding to the result of a computation of the factor represented by said given circuit closing means and the fixed factor.

7. In a machine according to claim 6 in which members respectively settable in accordance with the digits in the respective denomination orders of the variable factors are respectively associated with the sets of circuit closing means, and means provided on each of said members for selectively closing an associated circuit closing means in accordance with the setting of the member.

8. In a machine according to claim 6 wherein the predetermined electrical connections between successive orders includes conductors common to all of the circuit closing means in the lower order of two successive orders and to which the circuit closing means in the higher of the orders are selectively connected.

9. In a calculating machine adapted for a succession of operations severally including simultaneous and unsynchronized actions, the combination of, sequence control means comprising relays energizable in a chain of pairs corresponding to the respective operations and each pair adapted to start an operation upon deenergization of one of the pair, a control circuit including a series of contacts related to each operation and adapted to be opened each by the starting of an action included in such operation and to be closed by the completion of such action, and a control relay in said circuit adapted to be deenergized upon the opening of any one of such contacts and energized upon the closure of all, and adapted by its deenergization to deenergize the second relay of the pair and thereby to remove the starting circuit condition, and adapted by its energization to start immediately the next operation in sequence.

10. In an electrical calculating machine functioning in a plurality of sequential steps of operation, means for controlling sequential operations of said machine, means for conditioning the sequence controlling means upon initiation of a machine cycle, a register for receiving an amount involved in a calculation, means for reducing the amount entered in said register as steps of sequential operation proceed, and means for rendering ineffective selected ones of the conditioned sequence controlling means when the register attains a predetermined setting.

11. In an electrical calculating machine having means for effecting operations of registering and computing in sequence including necessary initial and final operations and sundry intermediate operations contingent upon the numerical positions of a quantity register, the combination of, sequence relays in pairs energizable in a chain and thereby prepared to govern the sequence of operations, including a pair specially adapted to govern the final operation, a circuit adapted to energize said pair from the initial pair, a circuit related to the zero position of the quantity register and adapted to deenergize all relays prepared to govern intermediate operations, and thereby to transfer the next ensuing operation to the action of the final pair.

12. In a record controlled calculating machine the combination of an accumulator for representing a primary amount which is to be broken into secondary amounts, a plurality of record controlled means for determining the magnitudes of said secondary amounts, a plurality of receiving devices each for receiving a secondary amount under control of corresponding record controlled means, means for entering said secondary amounts into said receiving devices, means cooperating with said entering means for successively subtracting said secondary amounts from said accumulator, means set according to the setting of said accumulator and cooperating with said record controlled means for determining whether or not entries into certain of said receiving devices are to be effected, a further amount receiving device, means for entering a remainder represented on said accumulator following the successive subtraction of said secondary amounts from the primary amount, means cooperating with said last means for subtracting said remainder from said accumulator, a plurality of numerical value computing means, one for each of said receiving devices, each comprising a plurality of circuits prearranged according to a given schedule and controlled by a corresponding receiving device to yield a product of a factor represented in said receiving device and a fixed factor, a further accumulating device for successively receiving the several products, and sequence control means for controlling sequential entries into the amount receiving devices and into said last accumulator.

13. In an electrical calculating machine, the combination of, sequence relays energizable in a chain and thereby prepared to govern a sequence of necessary initial and final operations with intermediate contingent operations; a sequence control relay adapted to control the sequence relays respectively governing said operations; a circuit adapted to energize directly through a relay related to an initial operation the sequence relays governing the final operation and to energize through such sequence relays the sequence control relay; and a circuit adapted to start the initial operation through the energization of the sequence control relay dependent solely upon the sequence relays governing the initial and final operations.

14. In a record controlled calculating machine the combination of an accumulator for representing a primary amount which is to be broken into secondary amounts, a plurality of record controlled means for determining the magnitudes of said secondary amounts, a plurality of receiving devices each for receiving a secondary amount under control of corresponding record controlled means, means for entering said secondary amounts into said receiving devices, means actuated by said entering means for successively subtracting said secondary amounts from said accumulator, a remainder amount receiving device, means for entering a remainder represented on said accumulator following the successive subtraction of said secondary amounts from the primary amount, means actuated by said last means for subtracting said remainder from said accumulator, sequence control instrumentalities for causing successive entries into the secondary amount receiving means and into the remainder receiving device, a plurality of numerical value computing means, one for each of said receiving devices each comprising a plurality of circuits prearranged according to a given schedule and controlled by a corresponding receiving device to yield a product of a factor represented in said receiving device and a fixed factor, and a further accumulating device for successively receiving the several products, said sequence control means causing sequential entries into the amount receiving devices and into the product accumulating device.

15. In a record controlled machine comprising a plurality of sensing devices utilized to read data from a plurality of cards, an accumulator, entry effecting means for said accumulator, certain of said sensing devices being responsive to data in one of said cards to control operation of said entry effecting means in effecting entries in said accumulator of a plurality of values to obtain a primary amount which is to be broken into secondary amounts, certain other of said sensing devices being responsive to data in another of said cards to determine the magnitudes of the secondary amounts, a plurality of receiving devices each for receiving a secondary amount and each correlated with one of said other sensing devices, means for entering said secondary amounts into said receiving devices under control of said certain other sensing devices correlated therewith, means actuated under control of the entering means for said secondary amounts to cause successive subtractions of the secondary amounts from the accumulator, and sequence control means for causing successive operations of the sensing devices and successive entries in the accumulator and registers.

16. In a calculating machine, a plurality of registers comprising denominational elements, entering means for each register, a common entry control means for controlling the entering means of all registers, said entry control means comprising a plurality of members arranged in denominational series, the members of each denominational series being settable in numbers proportionate to the values to be entered under control of each denominational series, means for selectively setting the numbers of said entry control means, sequence control means, devices controlled by said sequence control means for successively and selectively connecting the entry control means with the entering means of the several registers, and means controlled by the denominational elements of a connected register upon advance thereof by a corresponding entering means to release the settable members in the corresponding denominational series of the entry control means member by member.

17. In a record controlled calculating machine, a plurality of registers, an accumulator, value entering means for each register and the accumulator, a common entry control means for controlling the entering means of all of said registers and of said accumulator, a plurality of record sensing means, a plurality of result determining means, one for each register prearranged according to given schedules and each controlled by a corresponding register to yield a numerical value based on a given schedule and on the setting of a register, sequence control means, interconnecting means controlled by said sequence control means for successively interconnecting the several record sensing means with said entry control means and the value entering means for the respective registers to enter therein amounts from the record, and further connecting means controlled by said sequence means for interconnecting the several numerical value determining means with said entry controlling means and the entering means for said accumulator to enter successively result values in said accumulator under control of said registers.

18. In a record controlled calculating machine, a plurality of registers, value entering means for each register, a common entry control means for controlling the entering means of all registers, said entry control means comprising a plurality of series of settable members for each denominational order, the members of each series being conditioned in numbers corresponding to the numerical values to be entered into the respective denominational orders of the registers, record sensing means, numerical value determining means prearranged according to a given schedule and controlled by one of said registers to yield a numerical value based on said schedule and on the setting of said register, sequence control means, interconnecting means controlled by said sequence control means for interconnecting said record sensing means with said entry control means and the value entering means for the first register to enter therein an amount from the record, and further connecting means controlled by said sequence means for interconnecting said numerical value determining means with said entry controlling means and the entering means for a second register to enter a numerical value in said second register.

19. In a public utility billing machine into which cards each having a previous meter reading area and a last meter reading area are inserted, a register, means for reading the last meter reading area to ascertain the last meter reading, a second register, means for reading the previous meter reading area to ascertain the previous meter reading, common means under control of said first and second reading means for successively controlling entries of the last and previous meter readings in the first and second registers, respectively, entry effecting means for each register controlled by said common means, a third register, entry effecting means for said third register, means actuated by the entry effecting means for the first two registers for effecting operation of the entry effecting means of the third register in reverse directions, whereby the difference between the last and previous meter readings is obtained in said third register.

20. In a machine controlled by records each having a plurality of fields, each of said fields comprising amount and control value representations, a plurality of data sensing stations each comprising a plurality of normally disabled amount sensing devices and a plurality of control value sensing devices, means including a manually settable device for predetermining a control value and rendering the control value sensing devices of all stations responsive only to said predetermined value and means at each station controlled by the control value sensing devices thereof and effective upon sensing a control value representation in the related field of the record corresponding in value to the value predetermined by said settable means for enabling the amount sensing devices of the corresponding station.

21. A machine according to claim 20 wherein the amount sensing device at each station comprises normally interrupted sensing circuits and wherein the means controlled by the control value sensing device of each station includes a relay for completing said sensing circuits.

22. A record controlled machine for performing computations on data derived from pairs of cards comprising two groups of a plurality of sensing devices wherein the sensing devices in the respective groups cooperate with perforations in pairs of cards moved into predetermined sensing position in relation therewith and wherein each sensing device cooperates with a separate field, said groups of sensing devices each comprising a plurality of normally ineffective numerical value sensing means and a normally effective control number sensing means cooperating with respective perforations in the respective cards of a pair, a cycle control mechanism for rendering said ineffective sensing means for both cards of a pair effective in a predetermined sequence, normally ineffective means for initiating operation of said cycle control mechanism, and means controlled by the control number sensing means of said groups upon the detection of identical control perforations on a pair of cards for rendering said operation initiating means effective, whereby upon operation of said initiating means the cycle control mechanism causes operation of the numerical value sensing means while the pairs of cards remain in said predetermined position.

23. A calculating machine comprising a register, a series of members selectively settable to represent a numerical value and to control entry of such value into the register, means for driving an element of said register, means controlled by the set-up members for enabling the drive means to drive said element, and means controlled by the element for restoring said set-up members member by member in the course of an operation of said element by the driving means, said means controlled by the set-up members disabling said drive after the restoration of all set-up members.

24. A machine according to claim 23 wherein variably settable means are provided for controlling numerical entry into said members, and wherein further means are provided for effecting numerical entry into said settable members according to the setting of the variably settable means.

25. A calculating machine comprising a register, a series of electrically energizable members selectively energizable to represent a numerical value and to control entry of such value into the register, means for driving an element of said register, means controlled by the energized members for enabling the drive means to drive said element, and means controlled by the element for deenergizing said energized members member by member in the course of an operation of said element by the driving means, said means controlled by the energized members disabling said drive after deenergization of all energized members.

26. A machine according to claim 25 wherein variably closable electrical contacts are provided for controlling energization of said members and wherein further means are provided to complete a circuit through said contacts to energize said members.

27. A calculating machine comprising a register, a series of relays selectively energizable to represent a numerical value and to control entry of such value into the register, means for driving an element of said register, means controlled by the energized relays for enabling the drive means to drive said element, and means controlled by the element for deenergizing said energized relays relay by relay in the course of an operation of said element by the driving means, said means controlled by the energized relays disabling said drive after deenergization of all energized relays.

28. An electrical calculating machine, comprising in combination variably settable means for representing digits of successive orders of numbers, a register including number wheels of successive digital orders on a driving shaft, clutches one for engagement of each of the several number wheels with the driving shaft, means for actuating the clutches of said number wheels upon any significant setting of the settable means in corresponding orders, means for reducing the setting of the settable means in any order one step toward zero with each numerical step of the number wheel in such order, said clutch actuating means releasing each clutch after the representation of said representing means in the corresponding digital order is reduced to zero.

29. A calculating machine comprising a register, a series of relays selectively energizable to represent a numerical value and to control entry of such value into the register, means for driving an element of said register, means including an electric circuit controlled by the energized relays for enabling the driving means to drive said element, and means controlled by the element for deenergizing said energized relays relay by relay in the course of an operation of said element by the driving means, said means controlled by the energized relays opening said circuit to disable said drive after deenergization of all energized relays.

30. In a calculating machine, the combination of a chain of counting relays, said relays being energizable and lockable in variable numbers, a normally operating driving shaft, a number wheel on said driving shaft, a clutch for said number wheel adapted to connect the wheel with the shaft, an electrical circuit including a control relay in series with the winding of said number wheel clutch, a contact associated with said number wheel and adapted to deenergize and reenergize said control relay upon each digital entry on said number wheel, said control relay being adapted to unlock the locked counting relays relay by relay upon each energization and deenergization thereof, and means controlled by said control relay after unlocking of the final counting relay in the chain to interrupt the circuit of the control relay and the clutch.

31. In a machine including a group of selectively settable members, an element in said machine operable under control of said members, means for operating said element under control of the set-up members to an extent determined by the number of members set up, means for retaining the set-up members and means controlled by said element for releasing the set-up members member by member in the course of an operation of said element under control of said members.

32. In a machine including a group of electrically operated members adapted to be selectively energized, an element in said machine operable under control of said members, means for operating said element under control of the energized members to an extent determined by the number of energized members, and means controlled by said element for deenergizing the energized members member by member in the course of an operation of said element under control of said members.

33. In a machine including a group of selectively energizable relays, an element in said machine operable under control of said relays, means for operating said element under control of the energized relays to an extent determined by the number of relays energized, and means controlled by said element for deenergizing the energized relays relay by relay in the course of an operation of said element under control of said relays.

CLYDE SMITH.